United States Patent
Saupe et al.

(10) Patent No.: US 12,210,572 B2
(45) Date of Patent: Jan. 28, 2025

(54) SWITCHING MODES OF OPERATION OF A ROW DISPERSAL OPERATION DURING QUERY EXECUTION

(71) Applicant: Ocient Holdings LLC, Chicago, IL (US)

(72) Inventors: Ellis Mihalko Saupe, University City, MO (US); Andrew Park, St. Charles, IL (US)

(73) Assignee: Ocient Holdings LLC, Chicago, IL (US)

( * ) Notice: Subject to any disclaimer, the term of this patent is extended or adjusted under 35 U.S.C. 154(b) by 15 days.

(21) Appl. No.: 18/226,525

(22) Filed: Jul. 26, 2023

(65) Prior Publication Data

US 2024/0411815 A1 Dec. 12, 2024

Related U.S. Application Data

(60) Provisional application No. 63/506,852, filed on Jun. 8, 2023.

(51) Int. Cl.
*G06F 16/903* (2019.01)
(52) U.S. Cl.
CPC .................. *G06F 16/90335* (2019.01)
(58) Field of Classification Search
CPC .......... G06F 16/2282; G06F 16/24532; G06F 16/24537; G06F 16/24542; G06F 16/2455; G06F 16/24553; G06F 16/2456; G06F 16/8365; G06F 16/8373; G06F 16/90335; G06F 9/30043; G06F 9/30189
See application file for complete search history.

(56) References Cited

U.S. PATENT DOCUMENTS

| 5,548,770 A | 8/1996 | Bridges |
| 6,230,200 B1 | 5/2001 | Forecast |
| 6,633,772 B2 | 10/2003 | Ford |

(Continued)

OTHER PUBLICATIONS

A new high performance fabric for HPC, Michael Feldman, May 2016, Intersect360 Research.

(Continued)

*Primary Examiner* — Robert W Beausoliel, Jr.
*Assistant Examiner* — Cheryl M Shechtman
(74) *Attorney, Agent, or Firm* — Garlick & Markison; Katherine C. Stuckman; Bruce E. Stuckman

(57) ABSTRACT

A database system is operable to execute a query based on, during a first temporal period, executing a multiplexer operation in conjunction with a first mode of operation to generate a first plurality of multiplexer output, and executing a load operation upon the first plurality of multiplexer output to generate initial load operation output from the first plurality of multiplexer output. In response to a determination to transition to execution of the multiplexer operation in conjunction with a second mode of operation, the multiplexer operation is further executed in conjunction with the second mode of operation during a second temporal period to generate a second plurality of multiplexer output for processing via the load operation. The load operation is further executed upon the second plurality of multiplexer output to generate further load operation output.

20 Claims, 84 Drawing Sheets

(56) References Cited

U.S. PATENT DOCUMENTS

| | | | |
|---|---|---|---|
| 7,051,034 B1* | 5/2006 | Ghosh | G06F 16/90335 707/E17.14 |
| 7,499,907 B2 | 3/2009 | Brown | |
| 7,908,242 B1 | 3/2011 | Achanta | |
| 2001/0051949 A1 | 12/2001 | Carey | |
| 2002/0032676 A1 | 3/2002 | Reiner | |
| 2004/0122802 A1* | 6/2004 | Allen | G06F 16/24532 |
| 2004/0162853 A1 | 8/2004 | Brodersen | |
| 2008/0133456 A1 | 6/2008 | Richards | |
| 2009/0063893 A1 | 3/2009 | Bagepalli | |
| 2009/0183167 A1 | 7/2009 | Kupferschmidt | |
| 2010/0082577 A1 | 4/2010 | Mirchandani | |
| 2010/0241646 A1 | 9/2010 | Friedman | |
| 2010/0274983 A1 | 10/2010 | Murphy | |
| 2010/0312756 A1 | 12/2010 | Zhang | |
| 2011/0219169 A1 | 9/2011 | Zhang | |
| 2012/0109888 A1 | 5/2012 | Zhang | |
| 2012/0151118 A1 | 6/2012 | Flynn | |
| 2012/0185866 A1 | 7/2012 | Couvee | |
| 2012/0254252 A1 | 10/2012 | Jin | |
| 2012/0311246 A1 | 12/2012 | McWilliams | |
| 2013/0117257 A1* | 5/2013 | Meijer | G06F 16/2462 707/719 |
| 2013/0332484 A1 | 12/2013 | Gajic | |
| 2014/0047095 A1 | 2/2014 | Breternitz | |
| 2014/0136510 A1 | 5/2014 | Parkkinen | |
| 2014/0188841 A1 | 7/2014 | Sun | |
| 2015/0205607 A1 | 7/2015 | Lindholm | |
| 2015/0244804 A1 | 8/2015 | Warfield | |
| 2015/0248366 A1 | 9/2015 | Bergsten | |
| 2015/0293966 A1 | 10/2015 | Cai | |
| 2015/0310045 A1 | 10/2015 | Konik | |
| 2016/0034547 A1 | 2/2016 | Lerios | |
| 2017/0004173 A1* | 1/2017 | Simitsis | G06F 16/24542 |
| 2021/0365456 A1* | 11/2021 | Kondiles | G06F 16/248 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSC Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37 node 37 data set

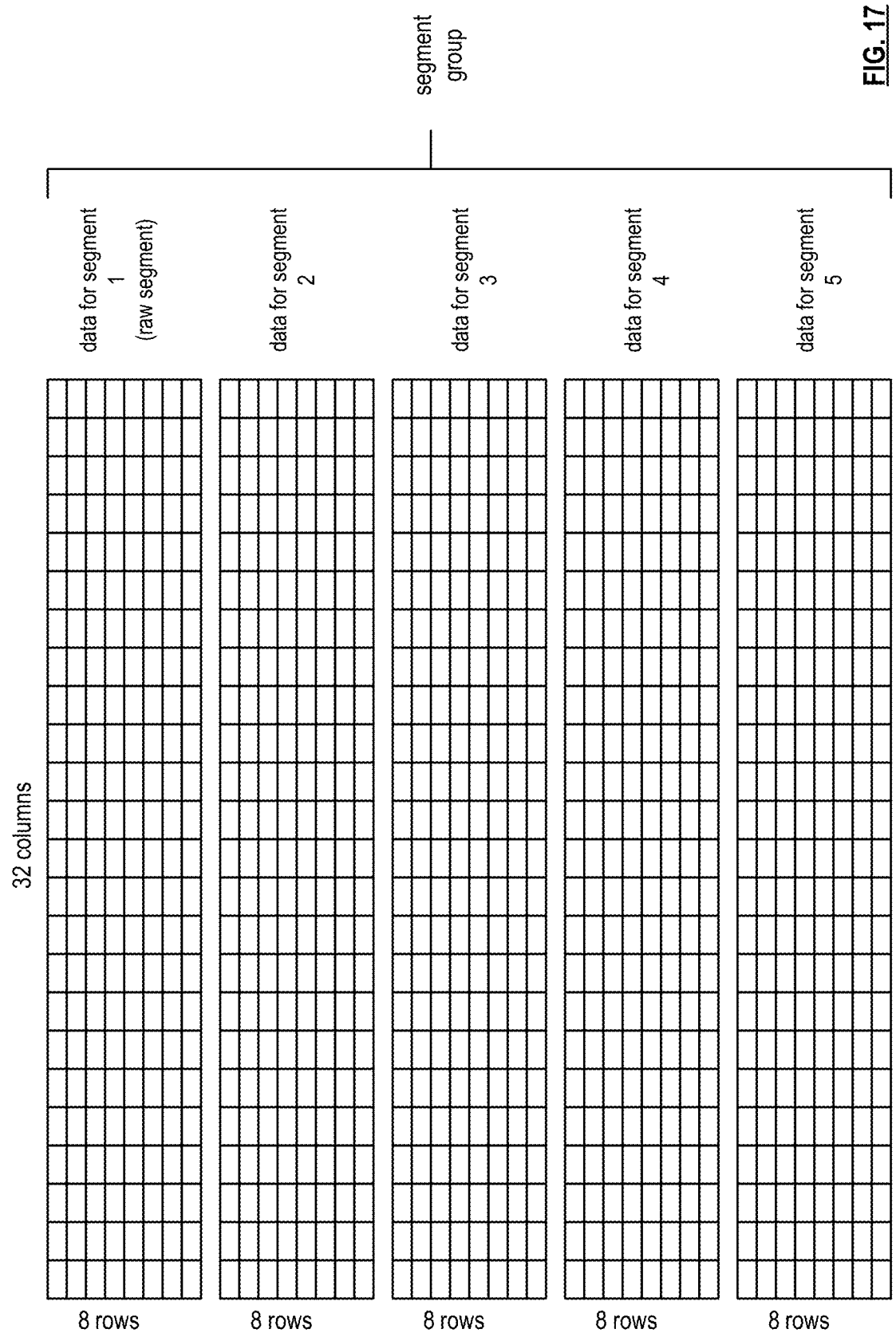

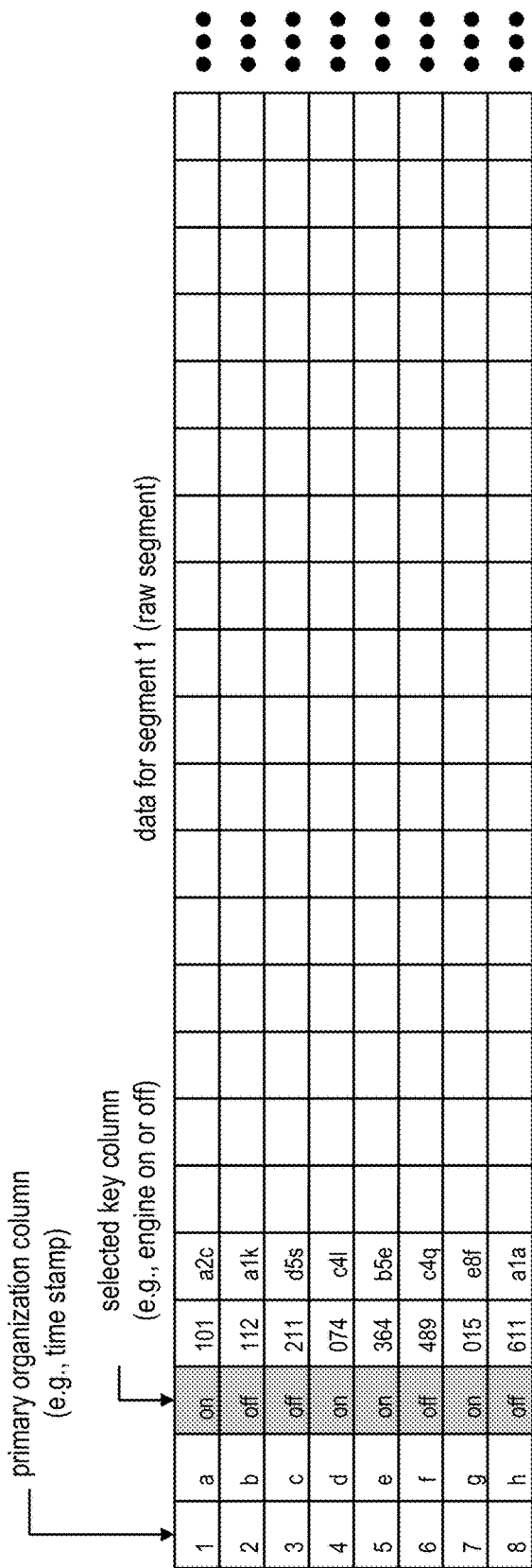

query processing system 2510

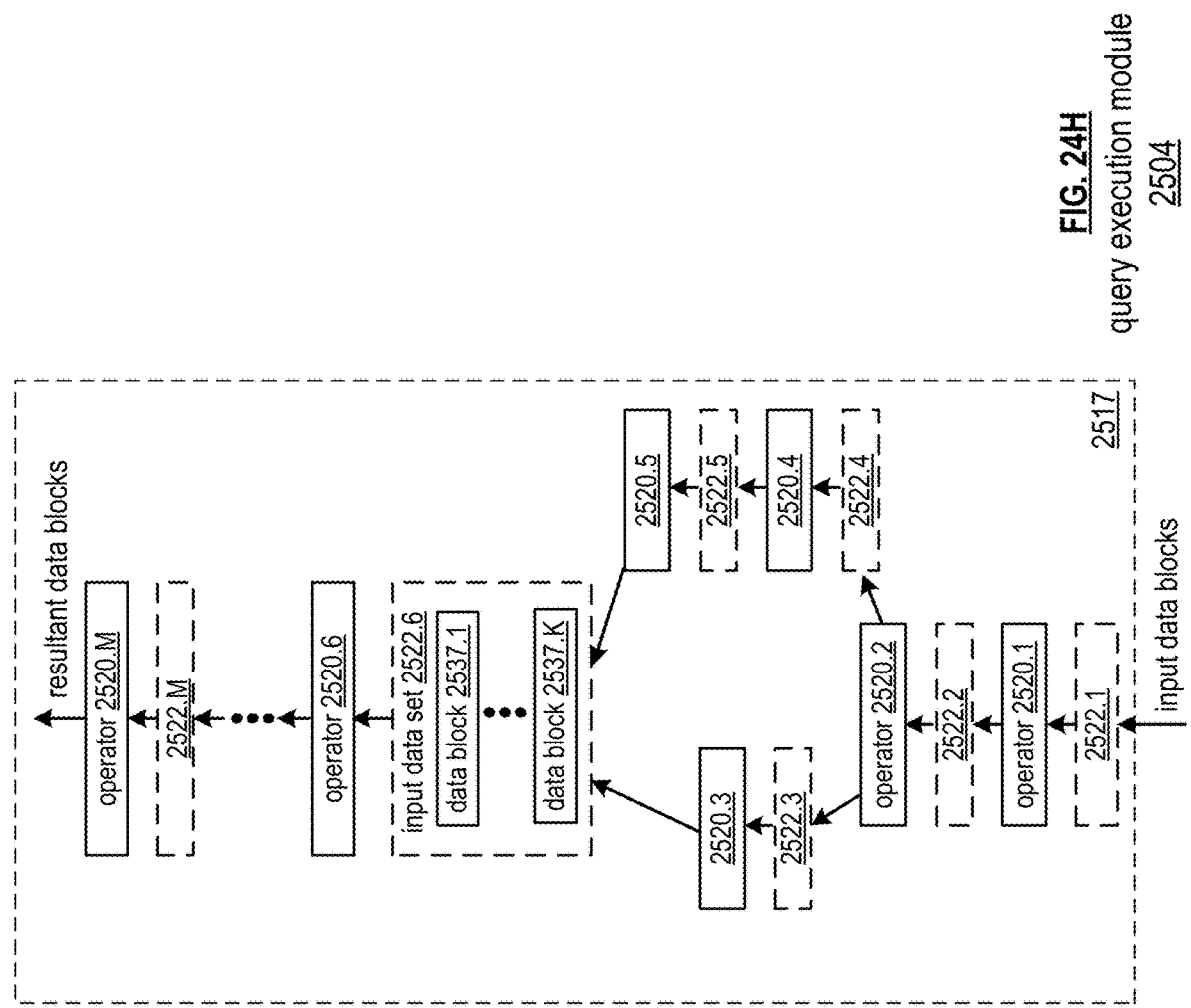

database system 10 database system 10 query execution module 2504 database system 10 join process 2530 join process 2530

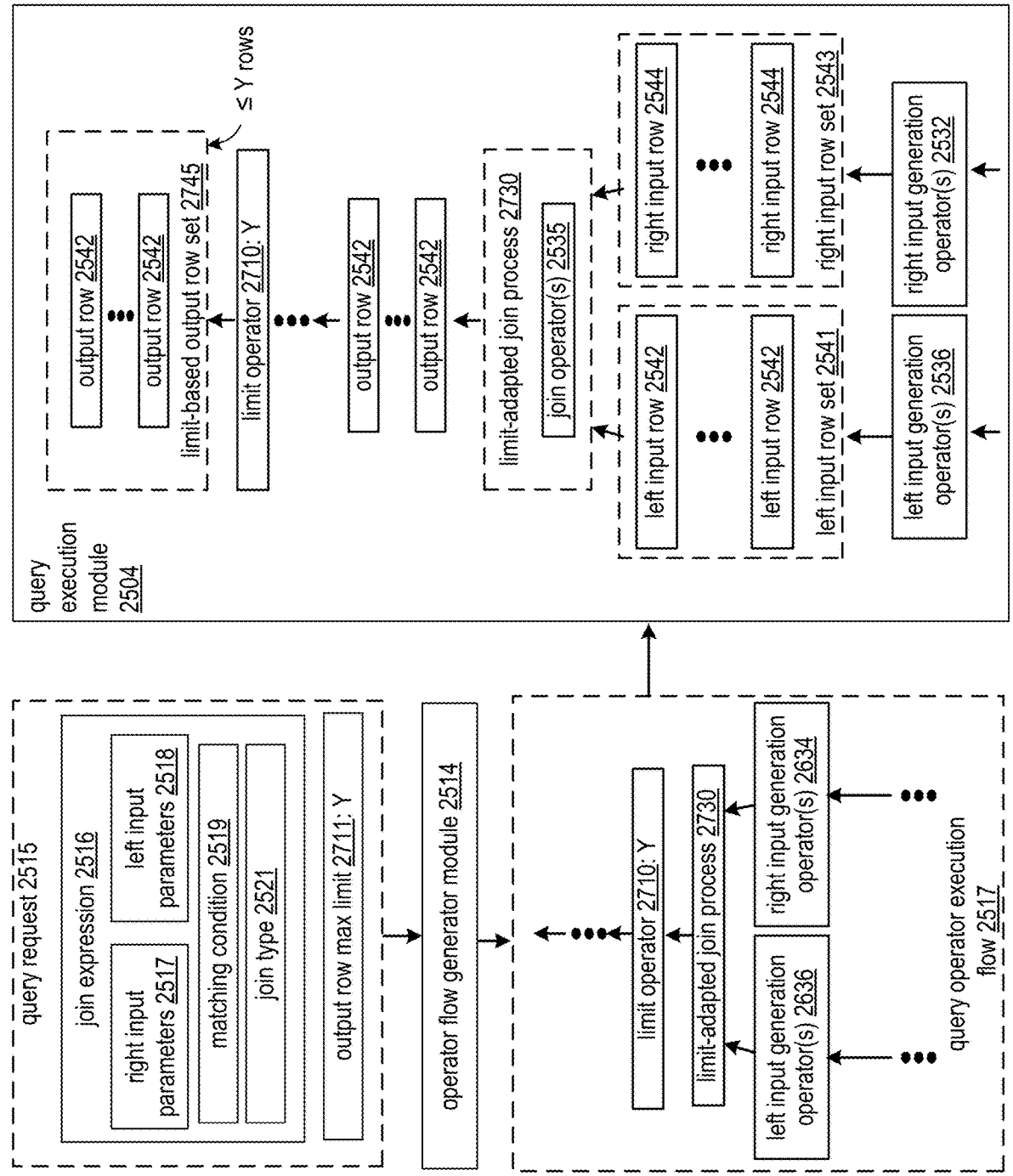

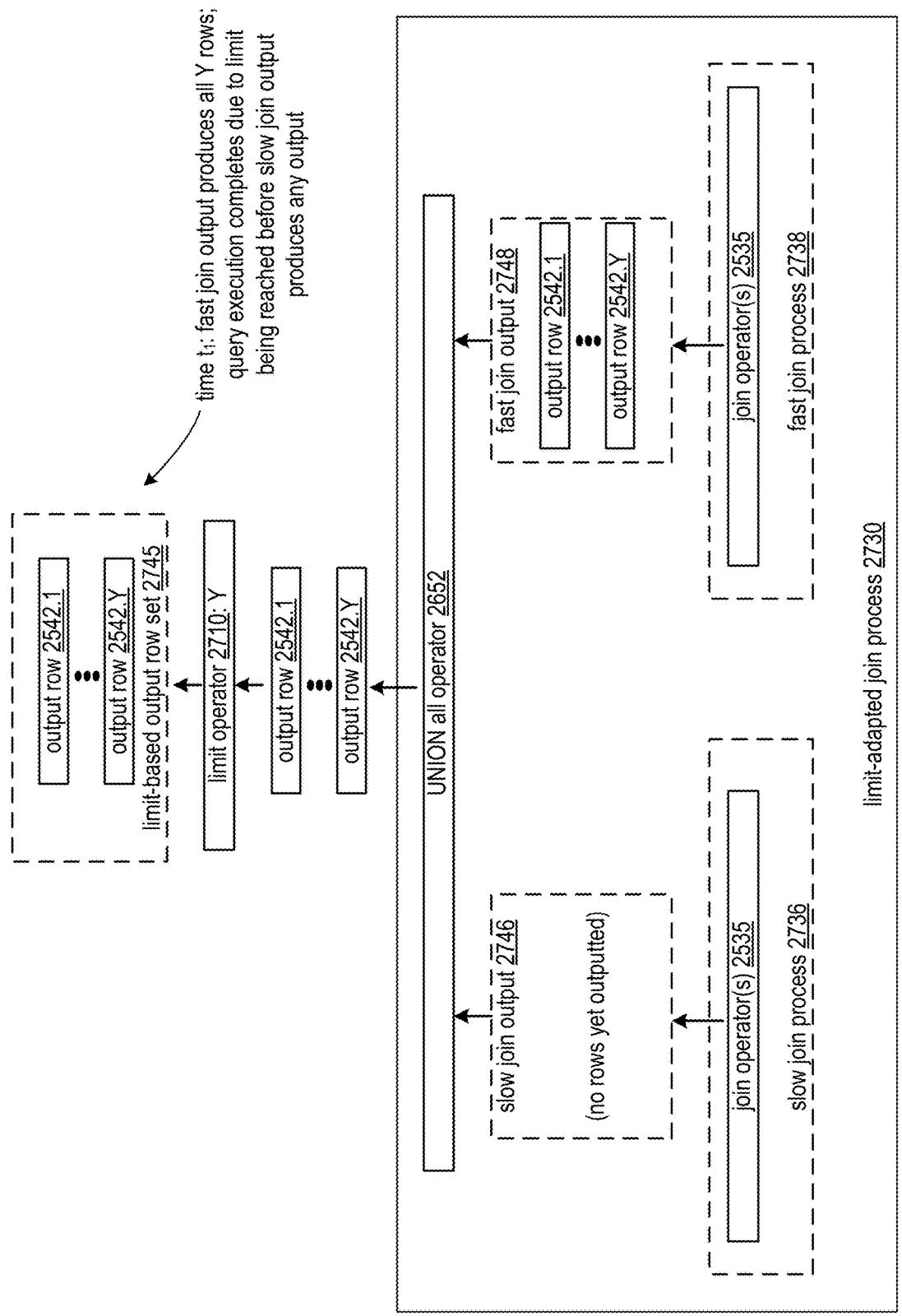

database system 10 database system 10 query execution module 2504 query execution module 2504 query execution module 2504 query execution module 2504 database system 10 query execution module 2504 query execution module 2504 query execution module 2504 database system 10 node 37

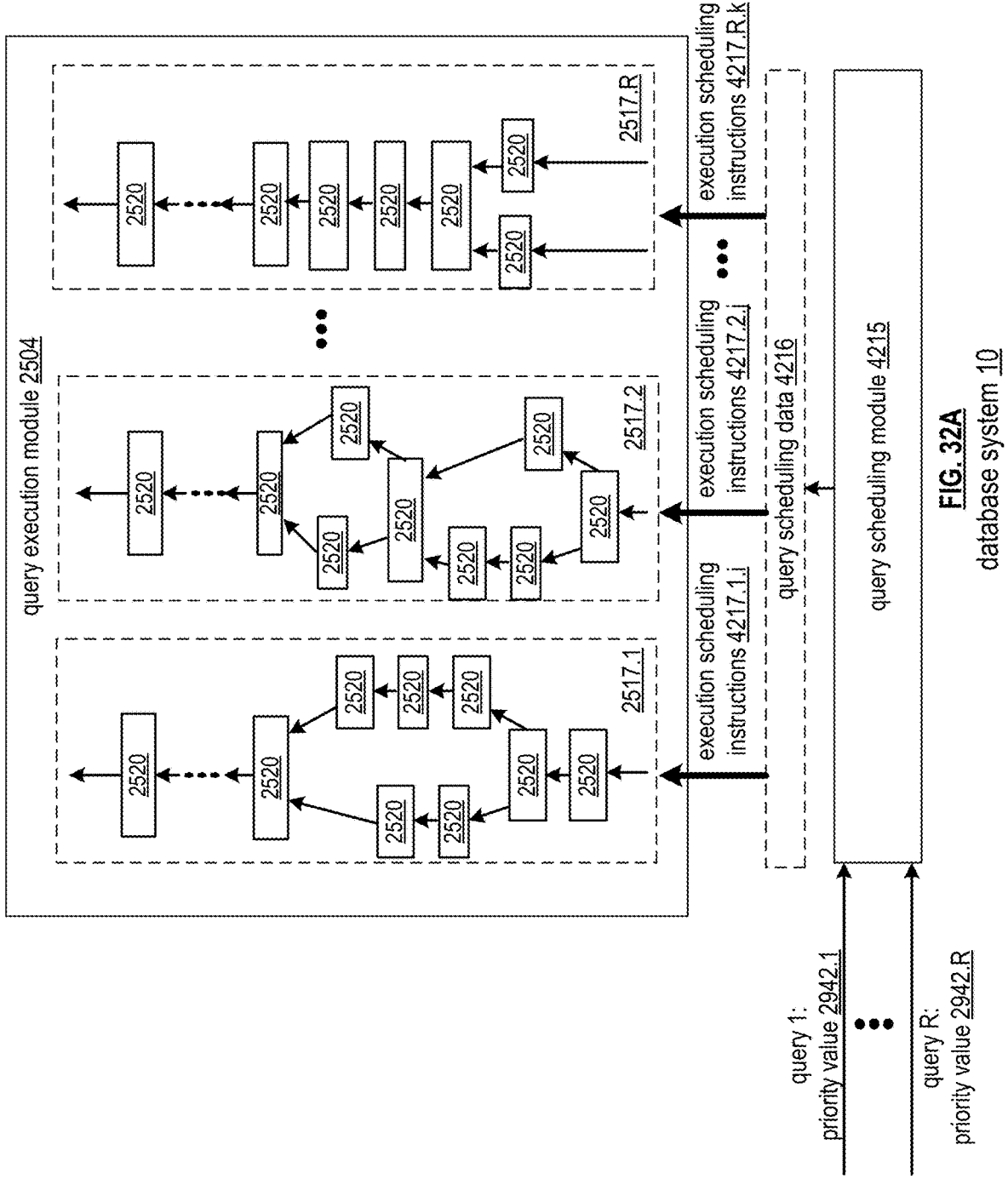

SWITCHING MODES OF OPERATION OF A ROW DISPERSAL OPERATION DURING QUERY EXECUTION

CROSS-REFERENCE TO RELATED APPLICATIONS

The present U.S. Utility Patent Application claims priority pursuant to 35 U.S.C. § 119 (e) to U.S. Provisional Application No. 63/506,852, entitled "SWITCHING MODES OF OPERATION OF A ROW DISPERSAL OPERATION DURING QUERY EXECUTION", filed Jun. 8, 2023, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention;

FIG. 24H is a schematic block diagram of a query operator execution flow in accordance with various embodiments;

FIG. 26A is a schematic block diagram of a database system executing a limit-adapted join process based on a limit applied to a join expression of a query request in accordance with various embodiments;

FIG. 26C is a schematic block diagram of a query execution module executing a limit-adapted join process where all of a limit-based output row set is produced via a fast join process in accordance with various embodiments;

FIG. 32A is a schematic block diagram of a database system that schedules execution scheduling instructions for a plurality of concurrently executing queries based on priority values in accordance with various embodiments;

DETAILED DESCRIPTION OF THE INVENTION

Figure 1:
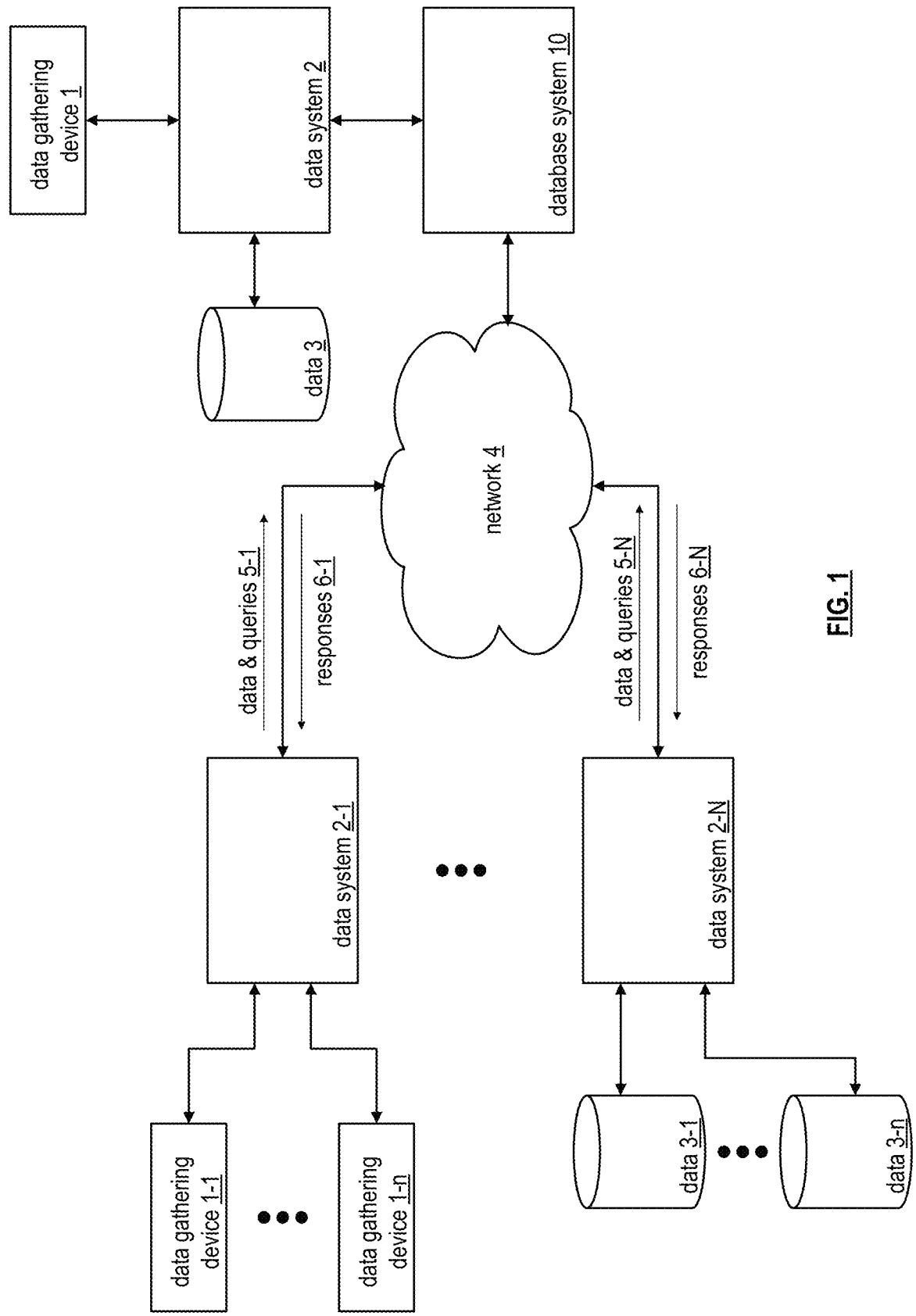
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
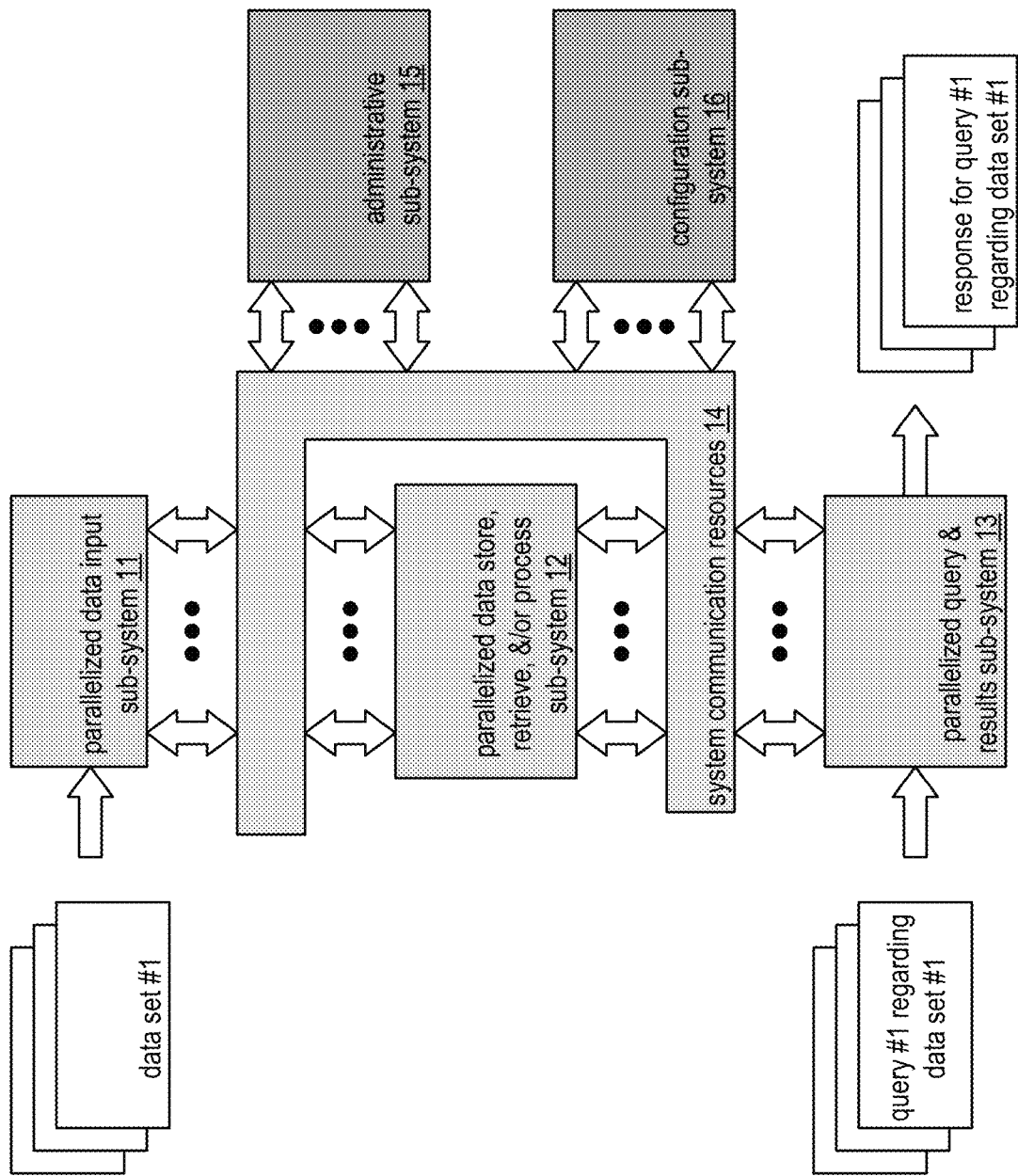
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
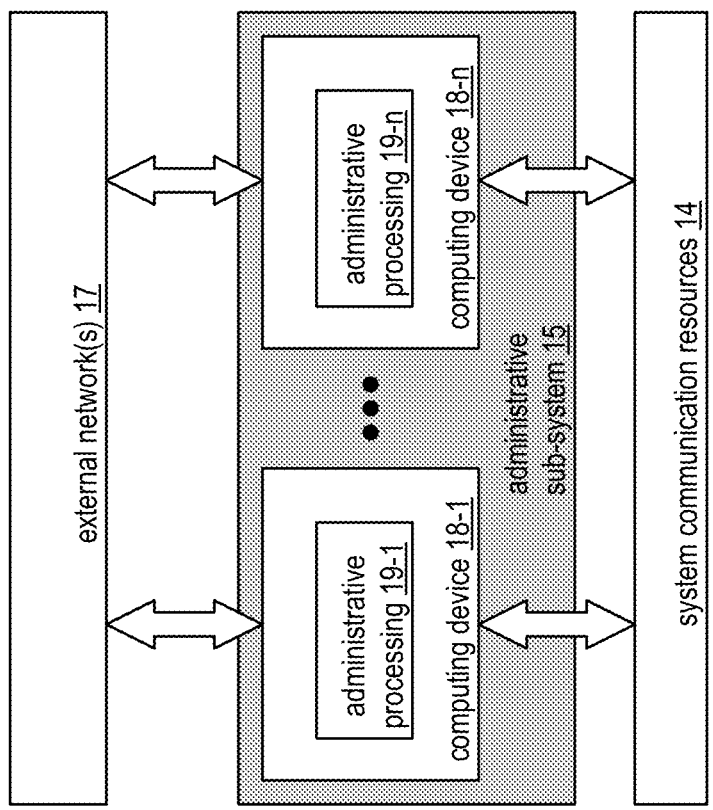
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
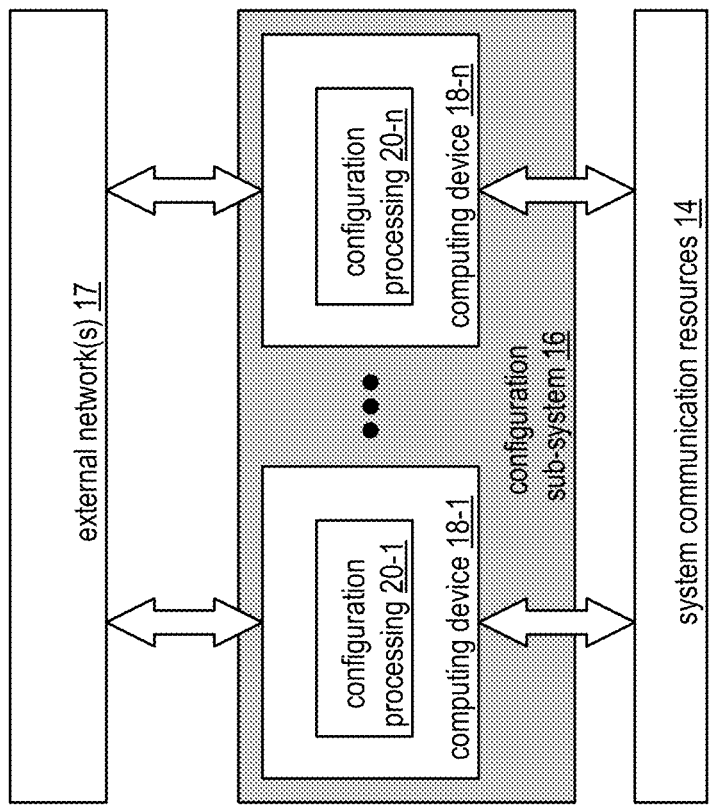
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
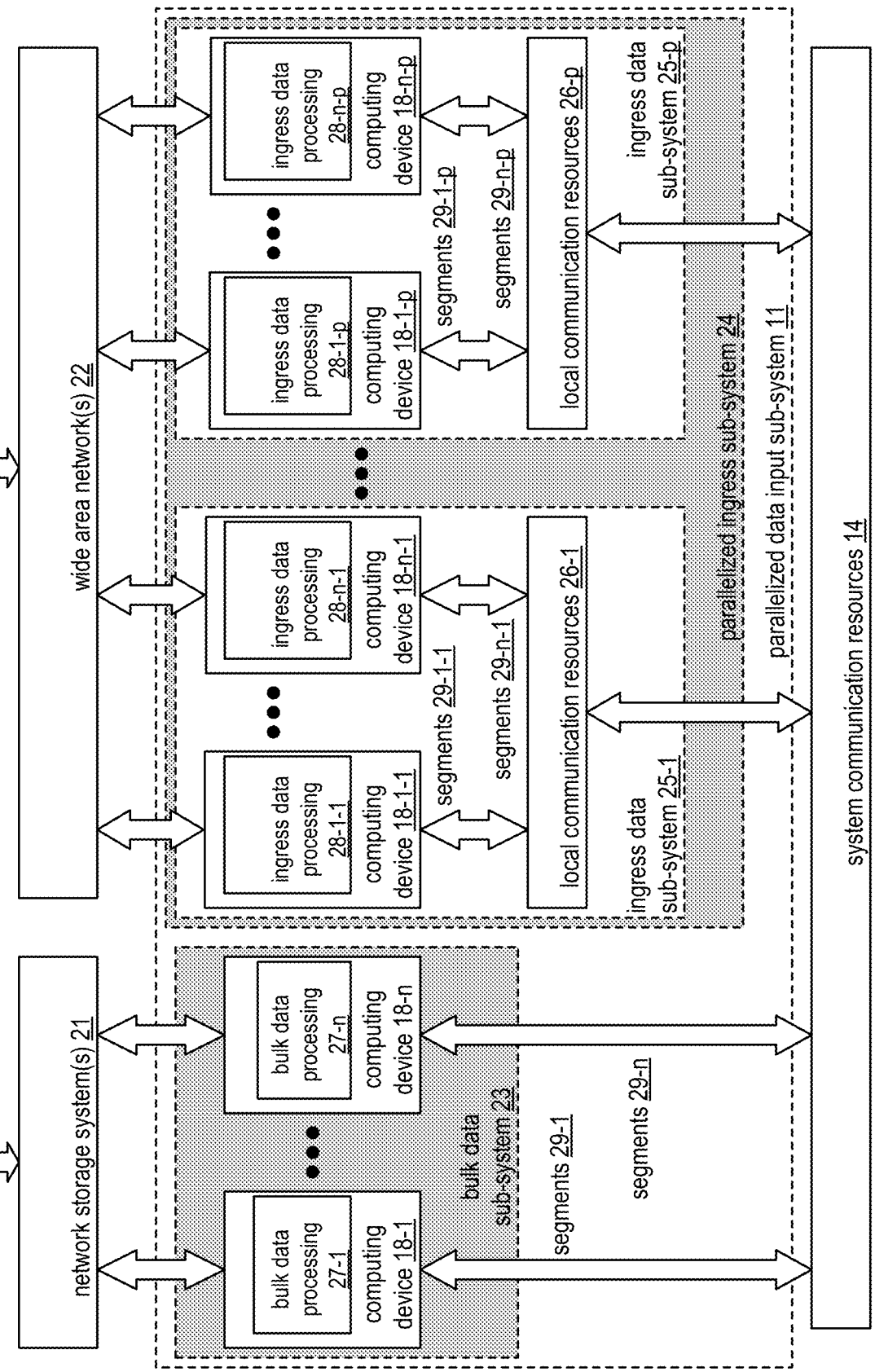
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
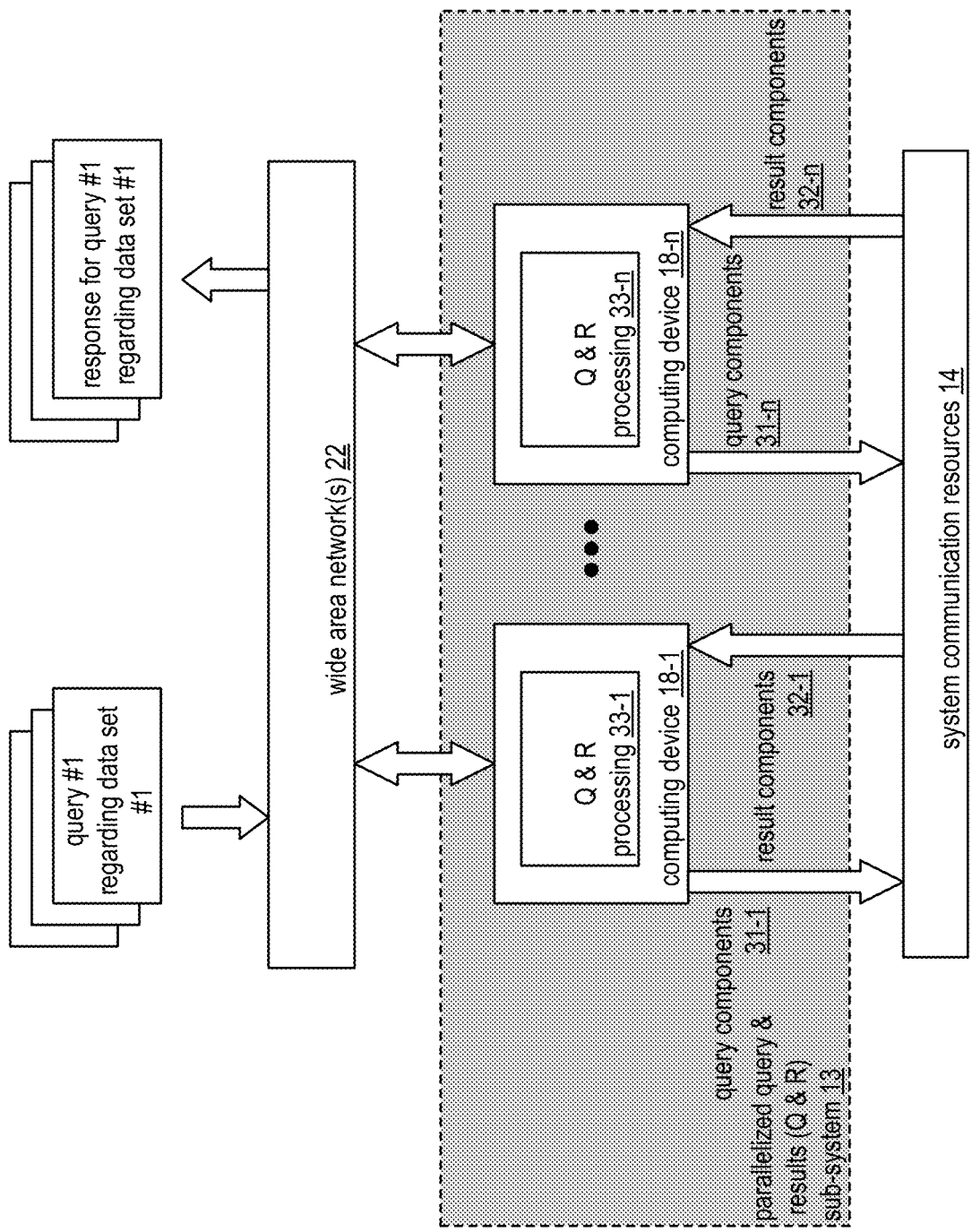
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve. &/or process sub-system 12.

Processing resources of the parallelized data store, retrieve. &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
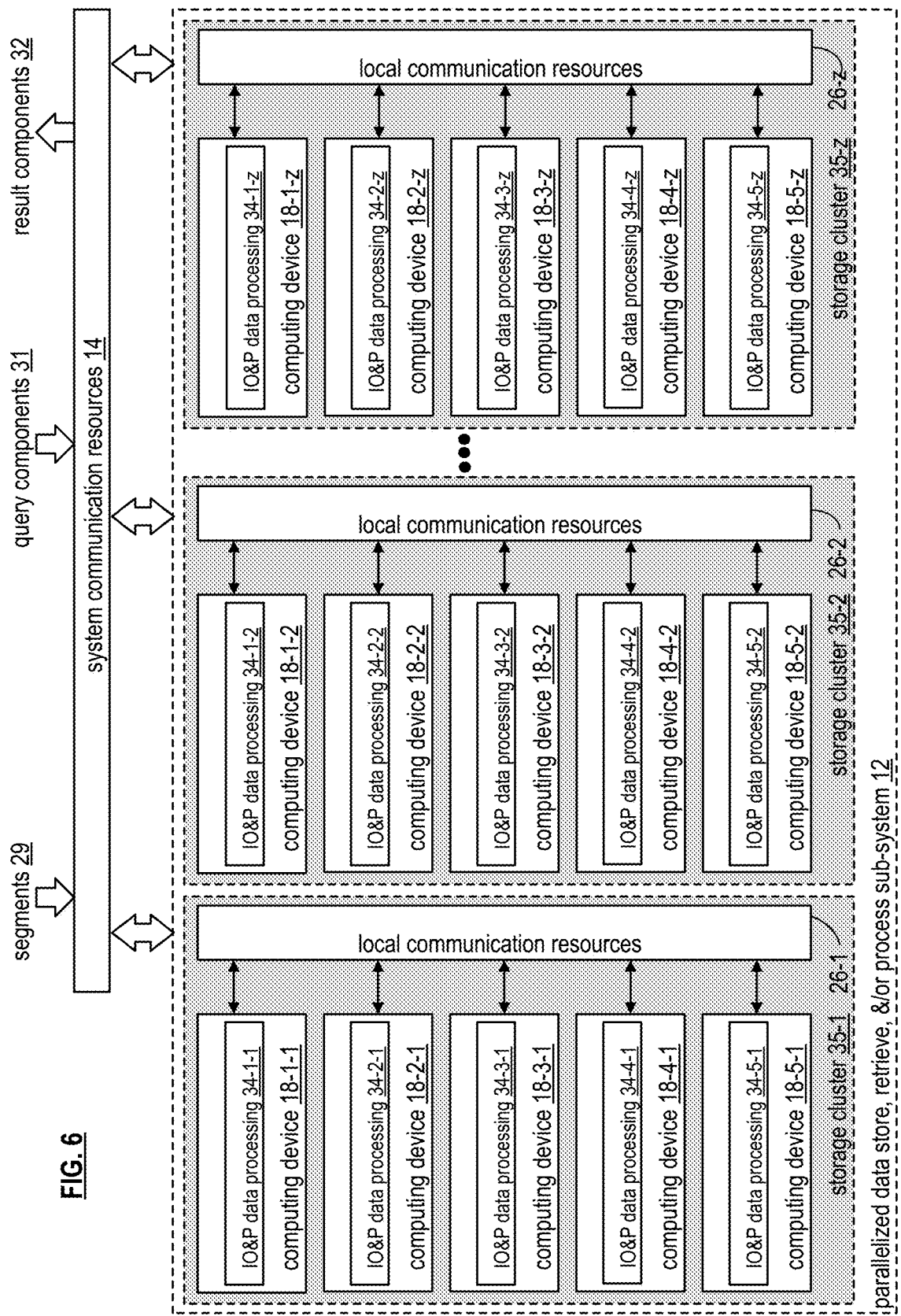
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5.

Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group: a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
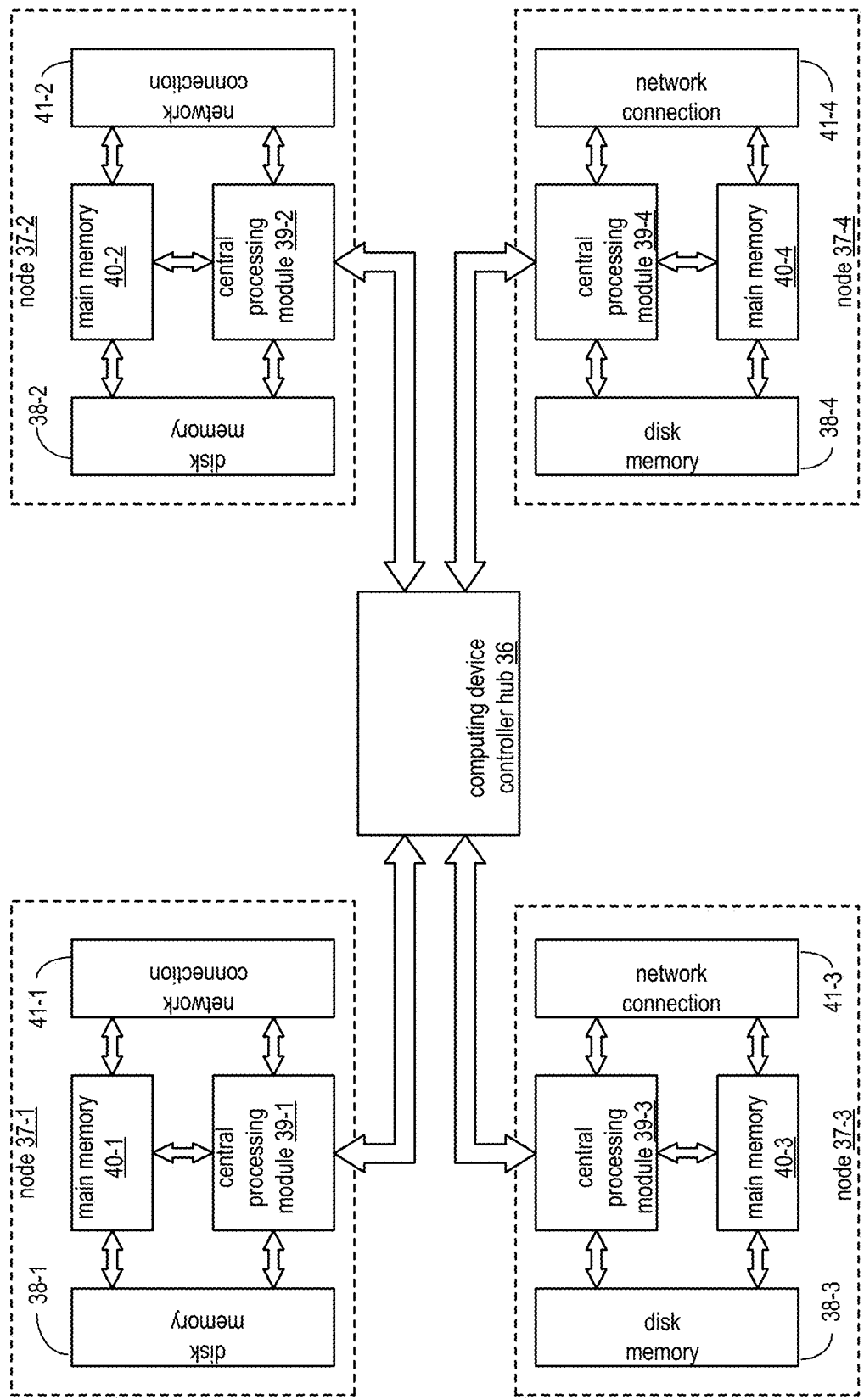
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
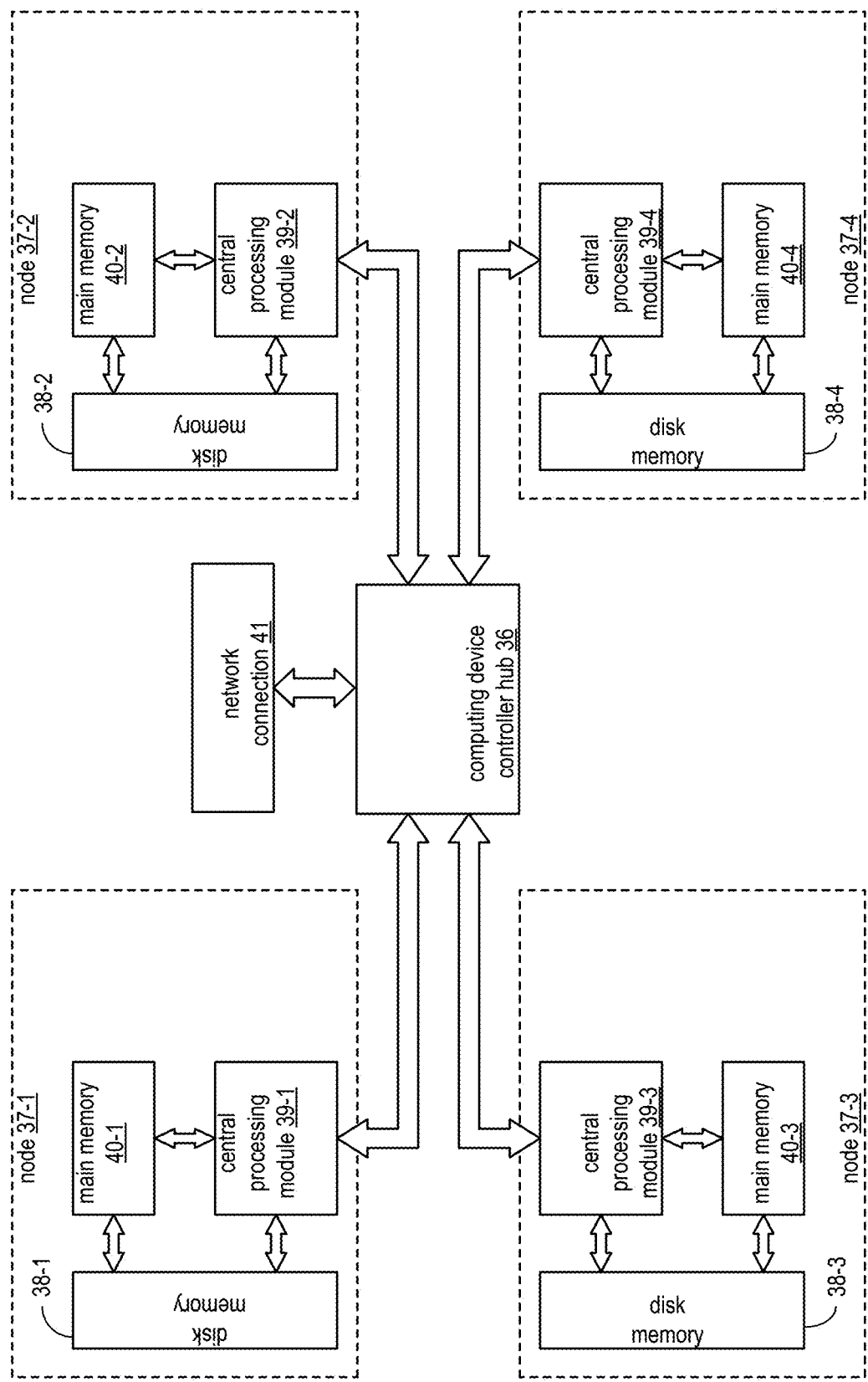
FIG. 8 is a schematic block diagram of another embodiment of a computing device in accordance with the present invention.

FIG. 8 is a schematic block diagram of another embodiment of a computing device that is similar to the computing device of FIG. 7 with an exception that it includes a single network connection 41, which is coupled to the computing device controller hub 36. As such, each node coordinates with the computing device controller hub to transmit or receive data via the network connection.

Figure 9:
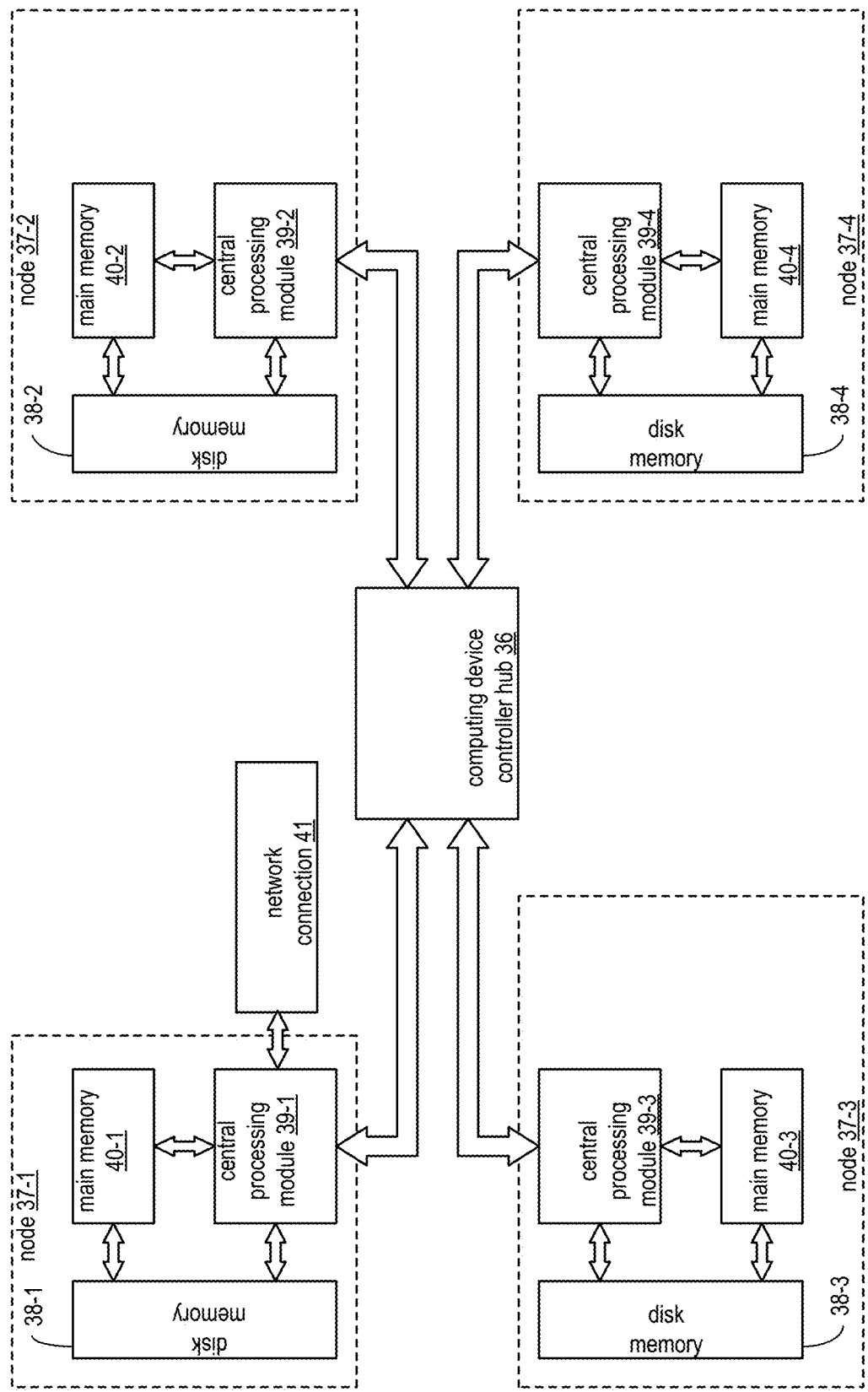
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
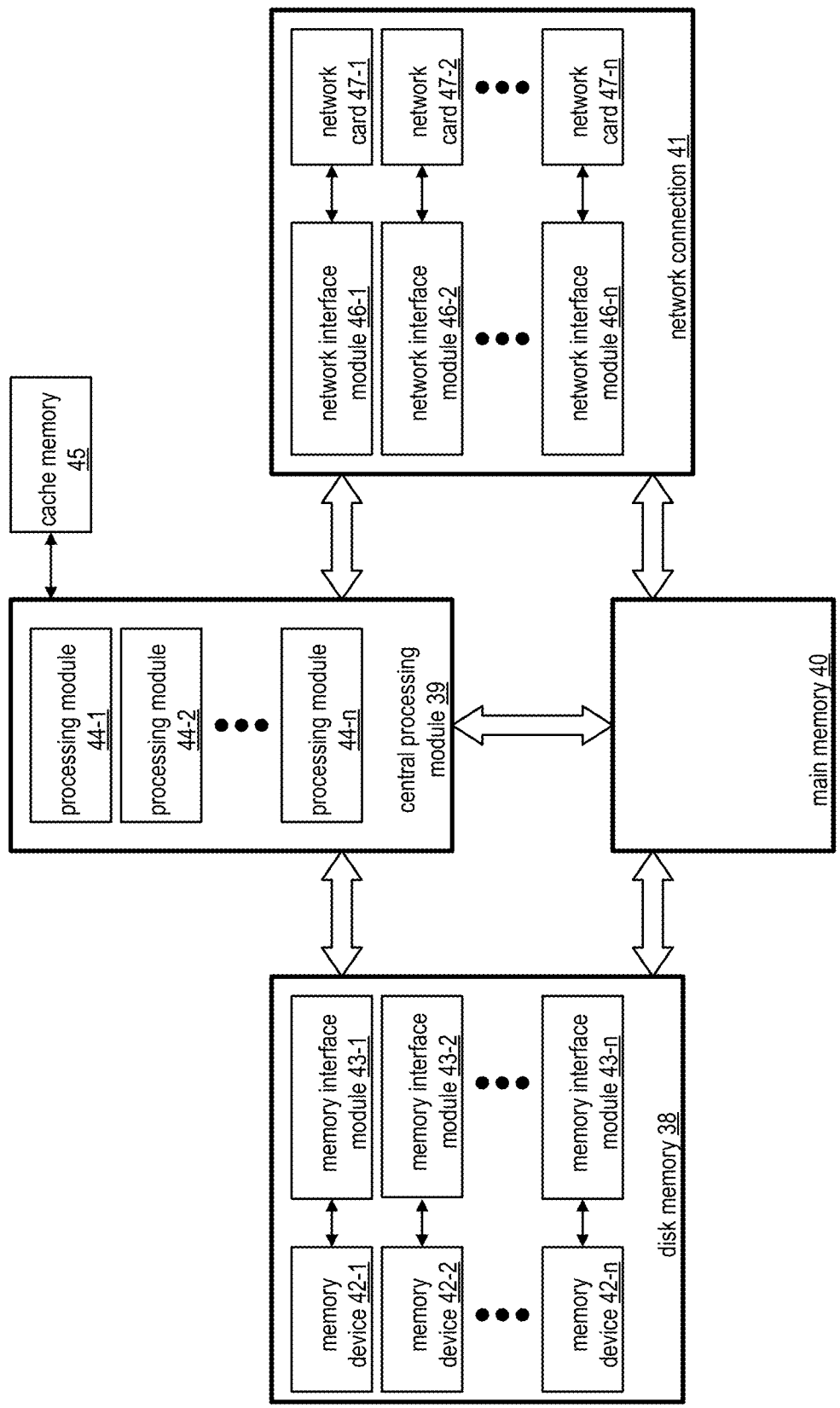
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
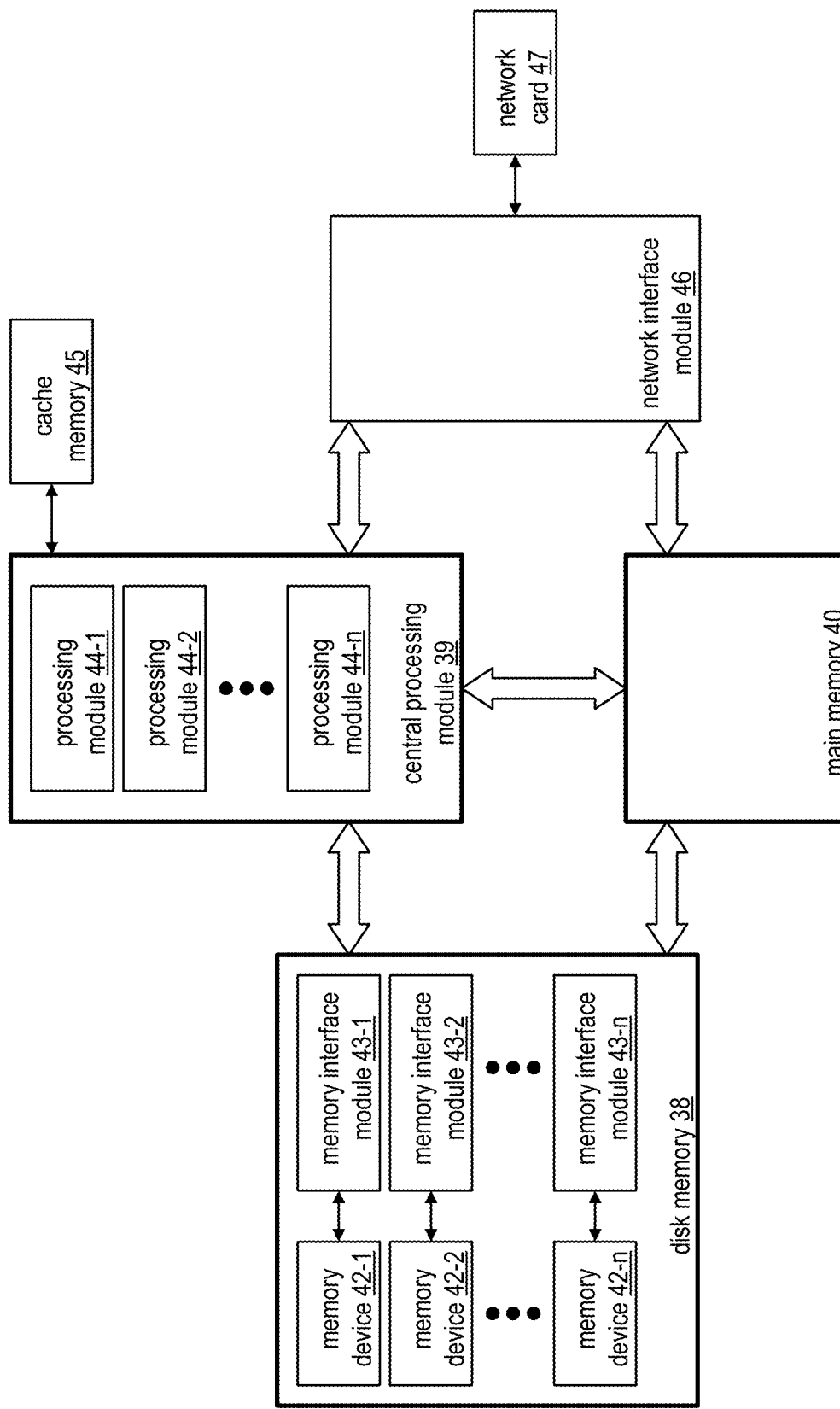
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
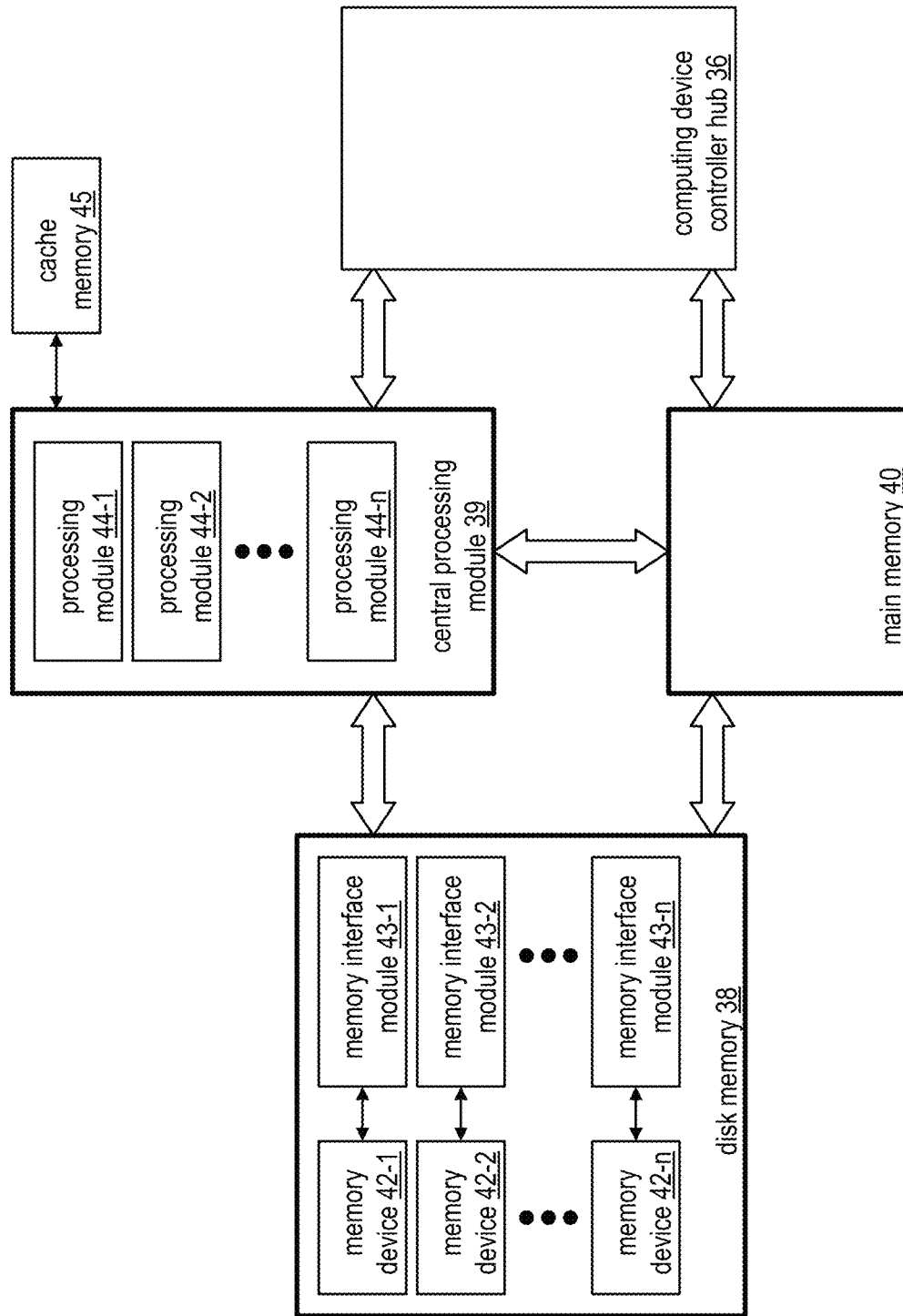
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
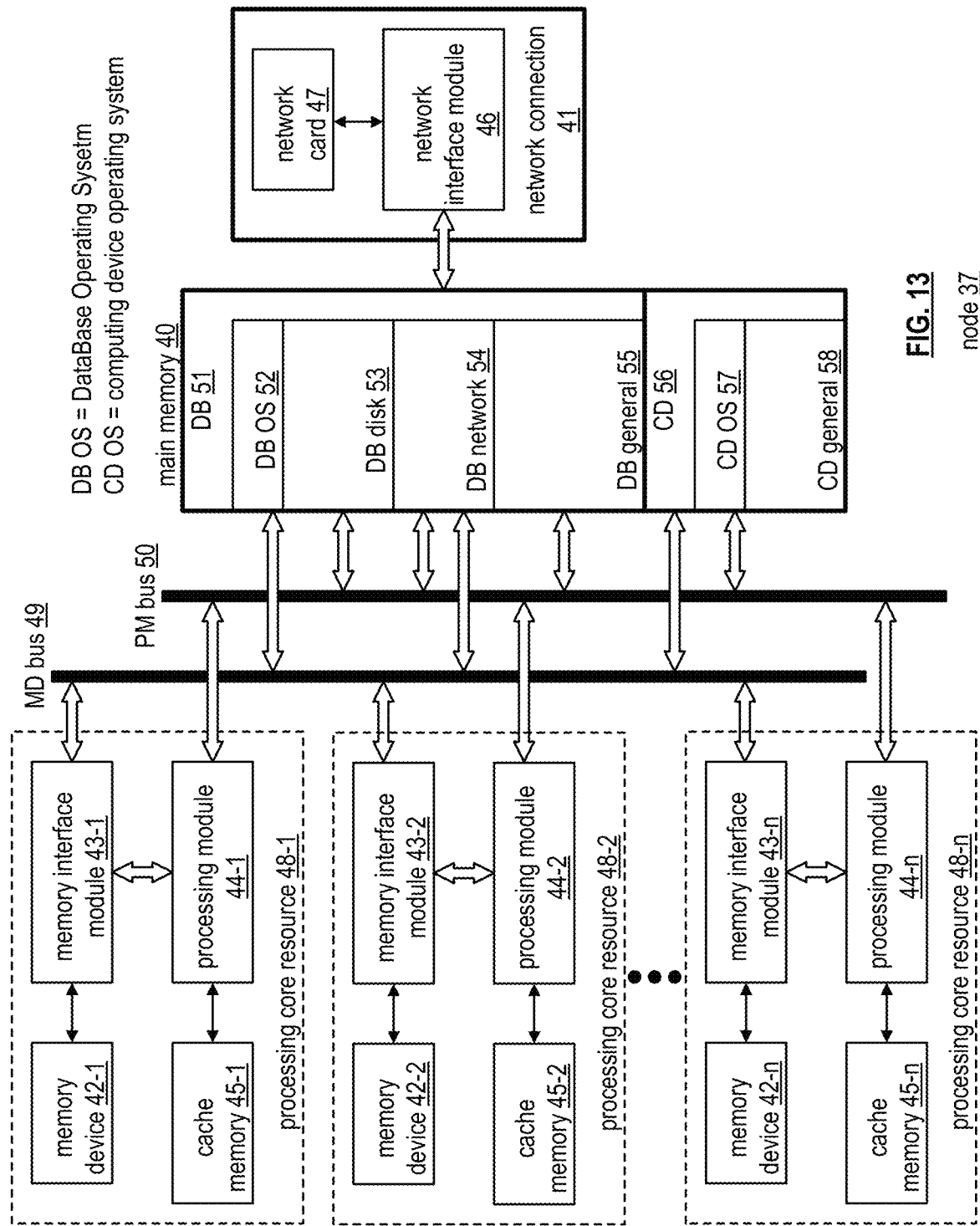
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-$n$, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-$n$, a corresponding memory interface module 43-1 through 43-$n$, a corresponding memory device 42-1 through 42-$n$, and a corresponding cache memory 45-1 through 45-$n$. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
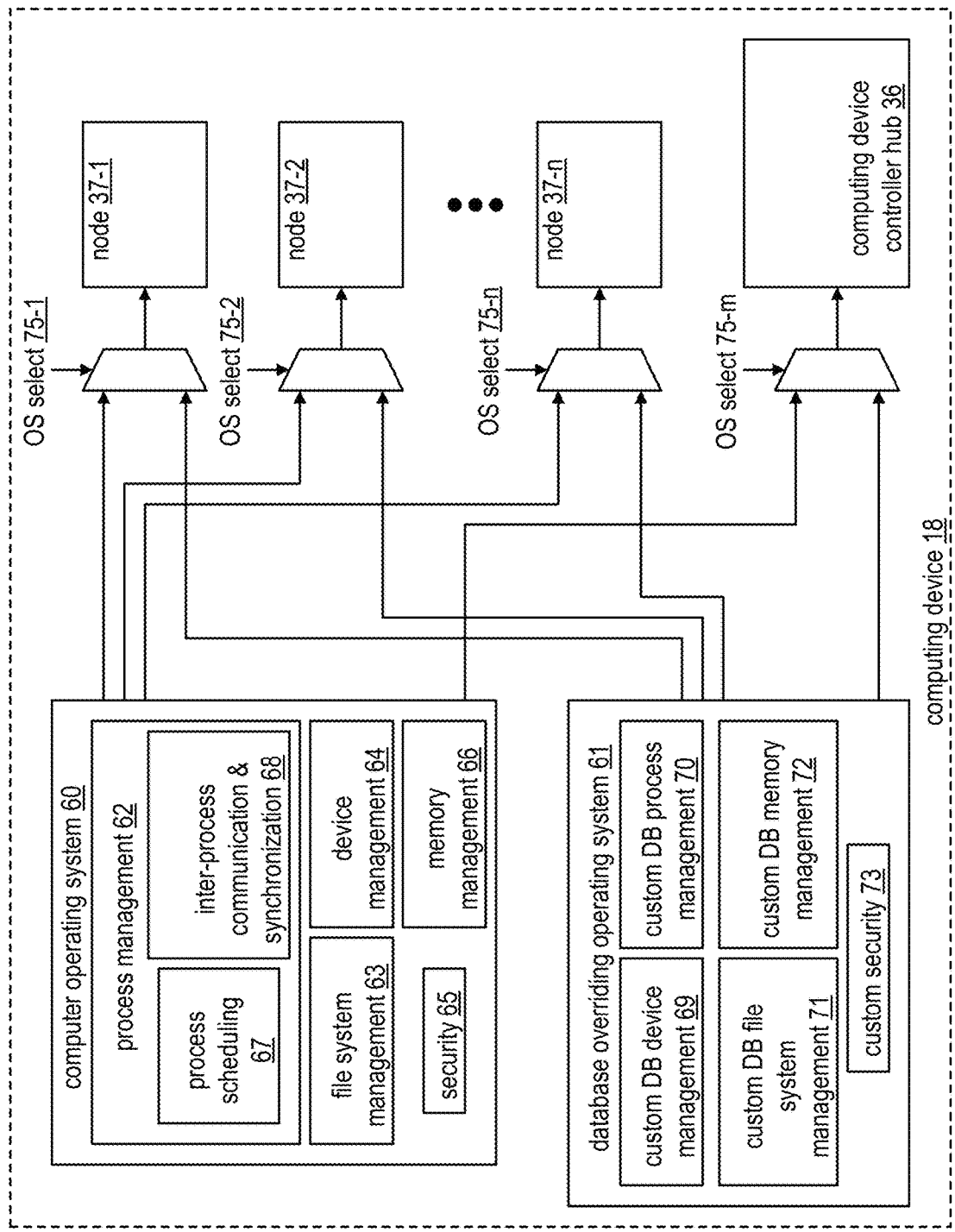
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-$n$ when communicating with nodes 37-1 through 37-$n$ and via OS select 75-$m$ when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes. Terabytes. Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes. Terabytes. Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes. Terabytes. Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
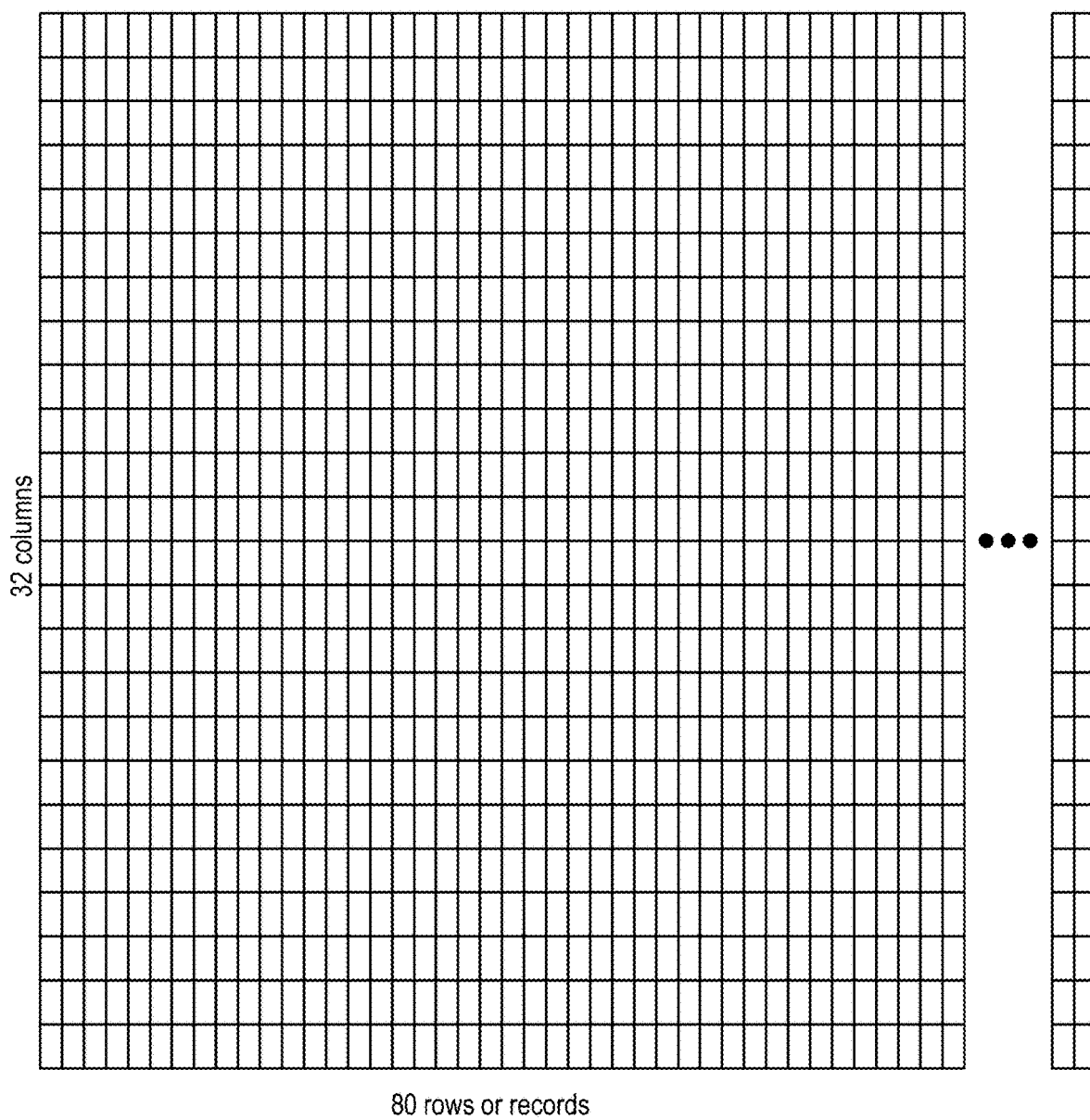

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
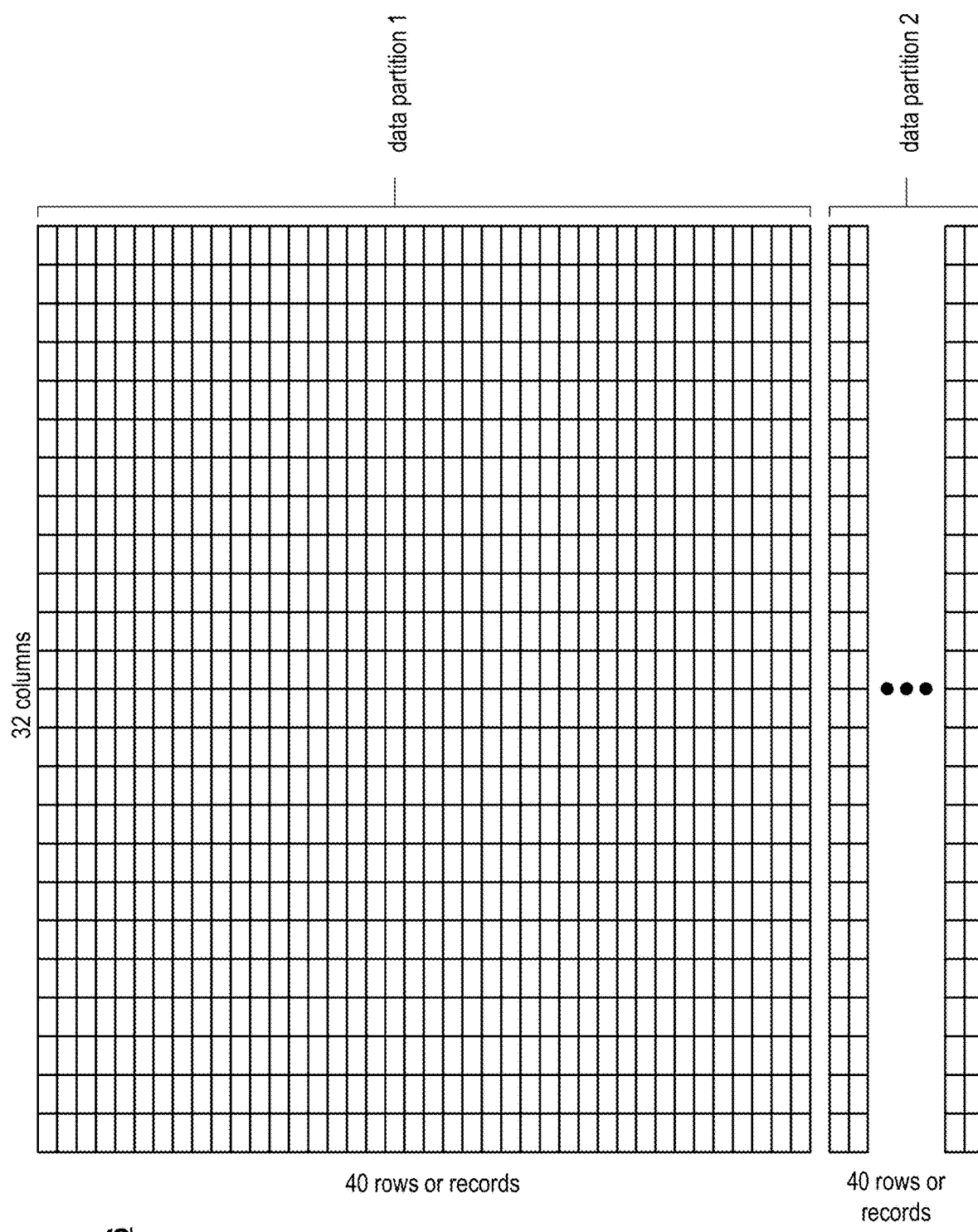

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces: thus, five segments are created. In another example, the data redundancy encoding is a two parity encoding from four data pieces: thus, six segments are created. In yet another example, the data redundancy encoding is single parity encoding from seven data pieces: thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
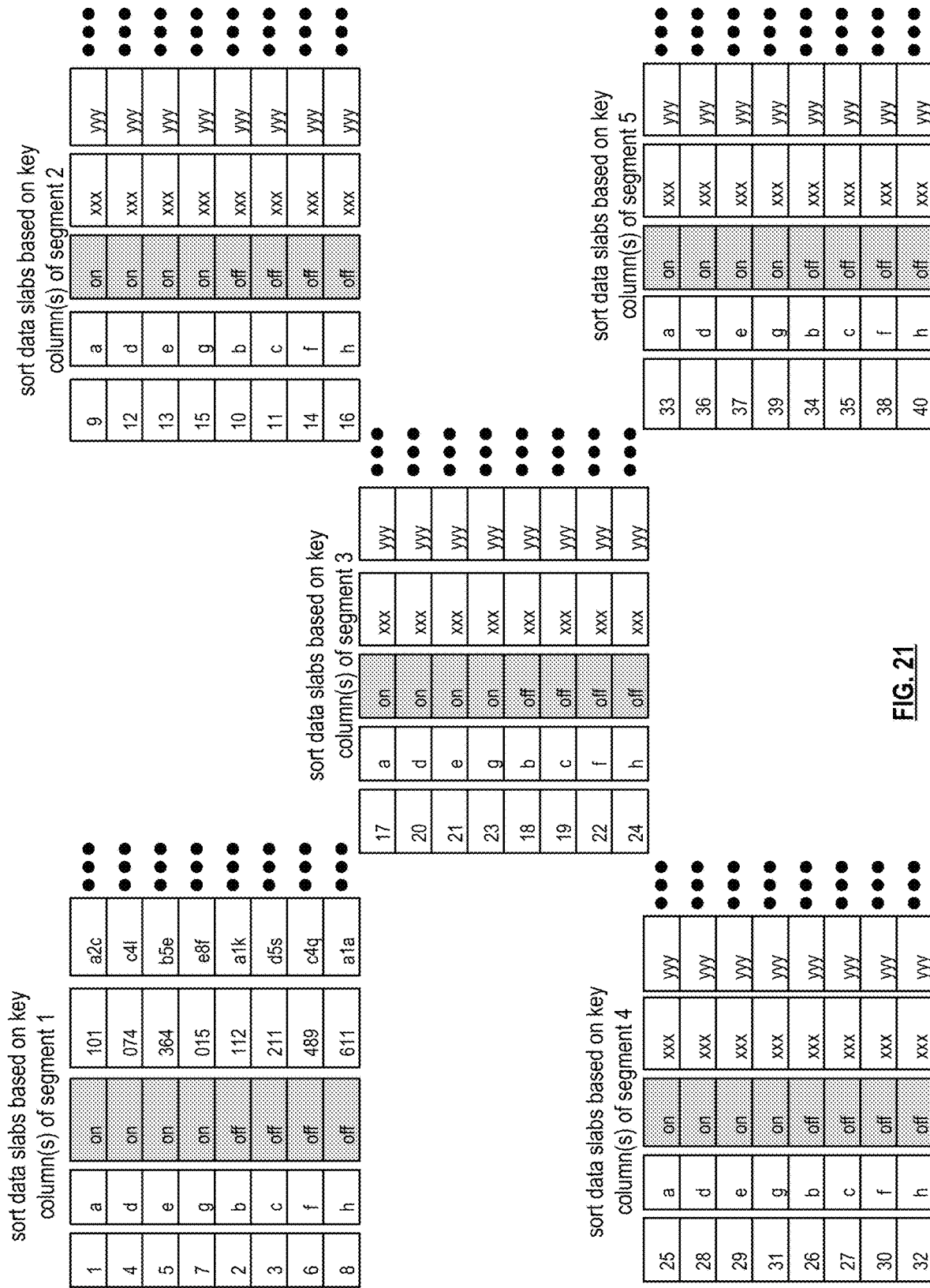

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
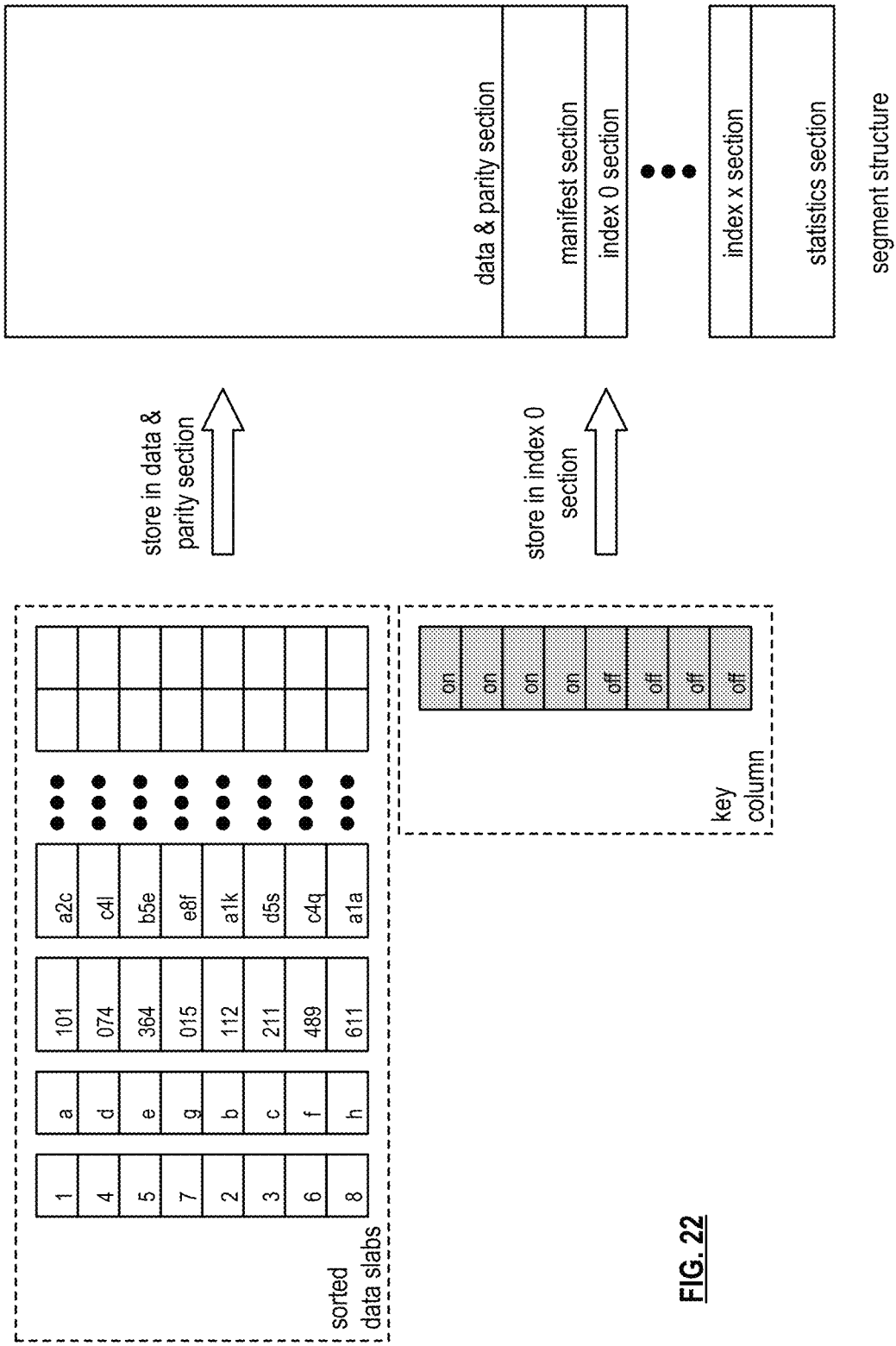

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
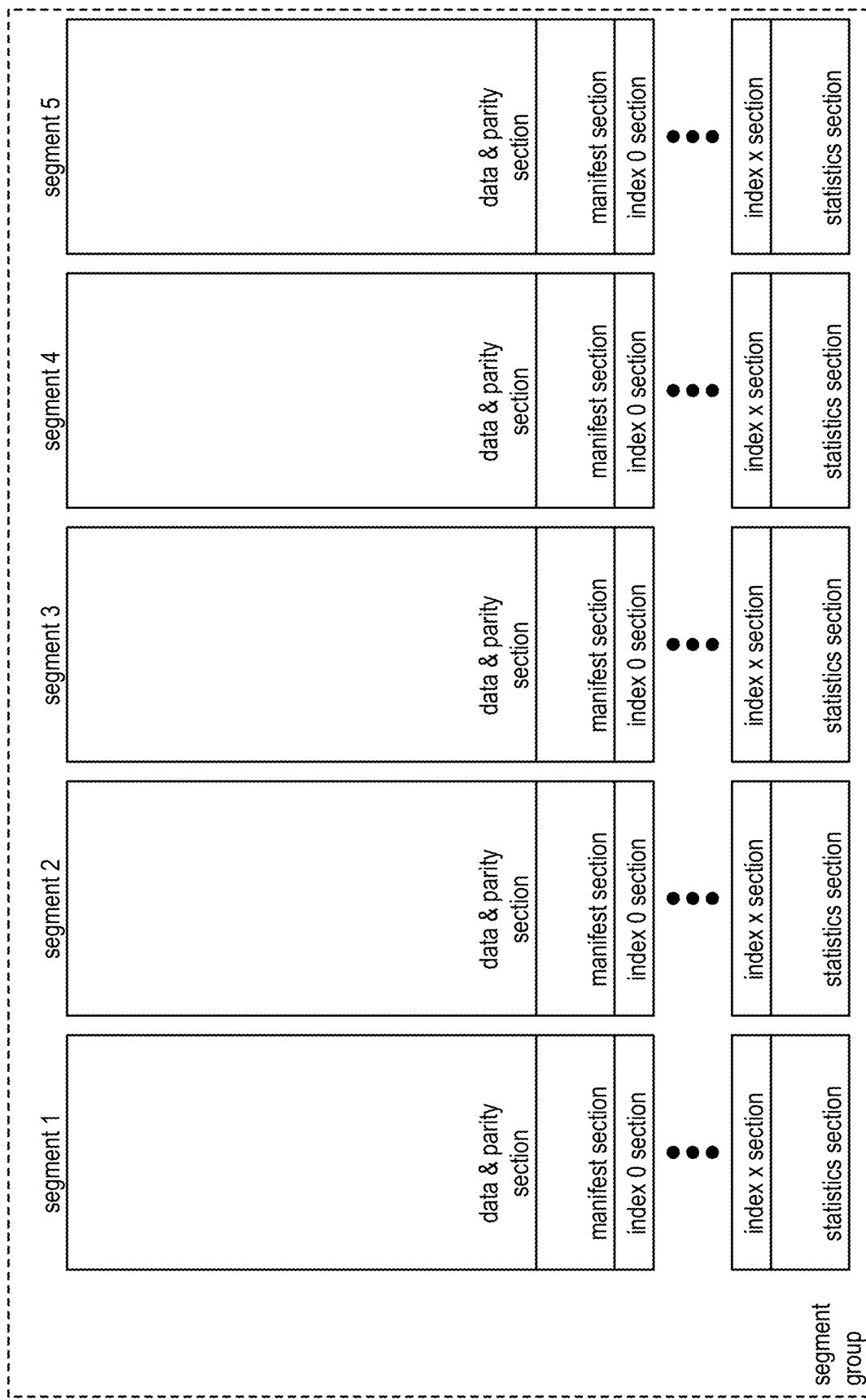

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
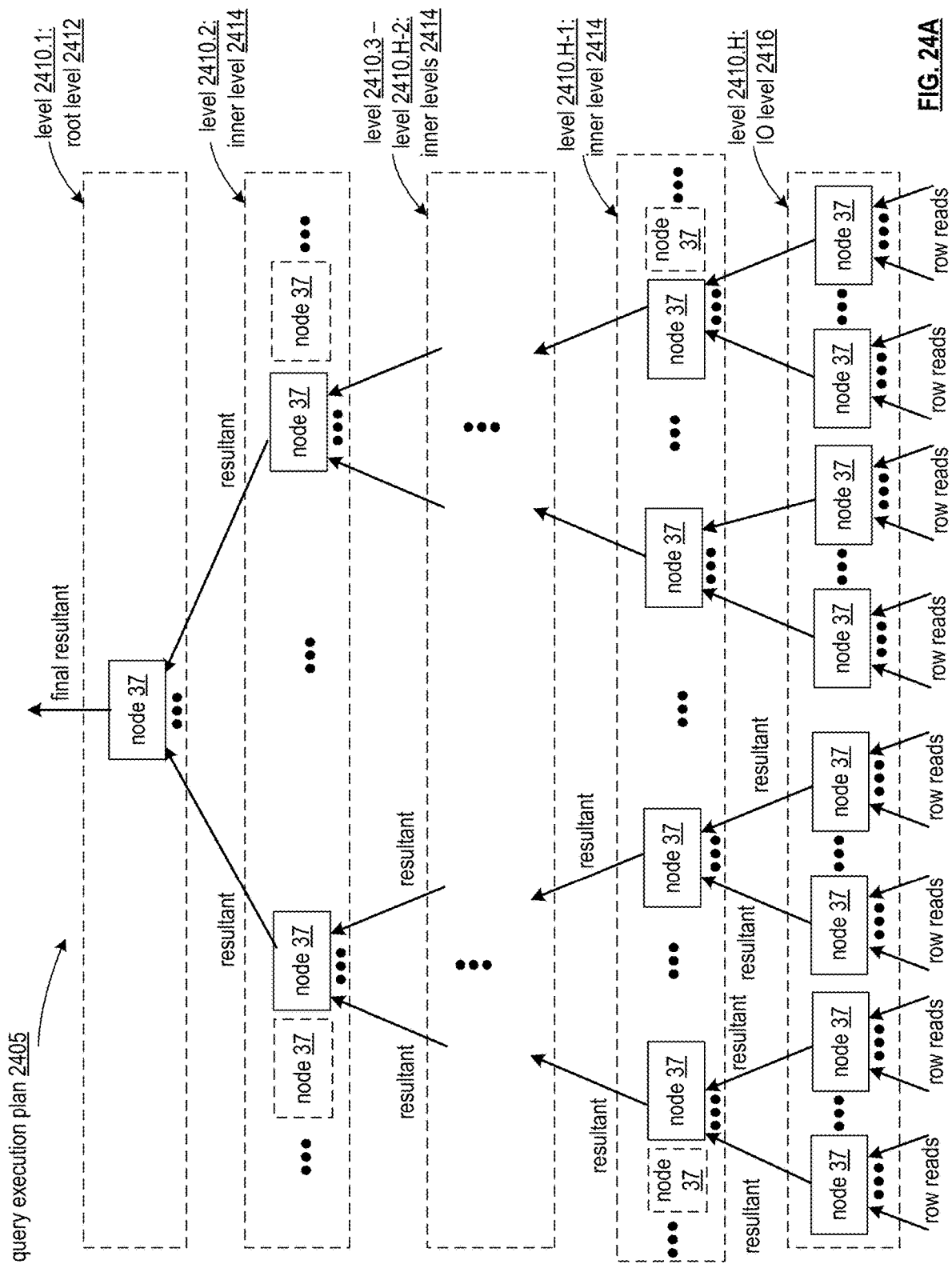
FIG. 24A is a schematic block diagram of a query execution plan in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412: a bottom. IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes: to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-2. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments: extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
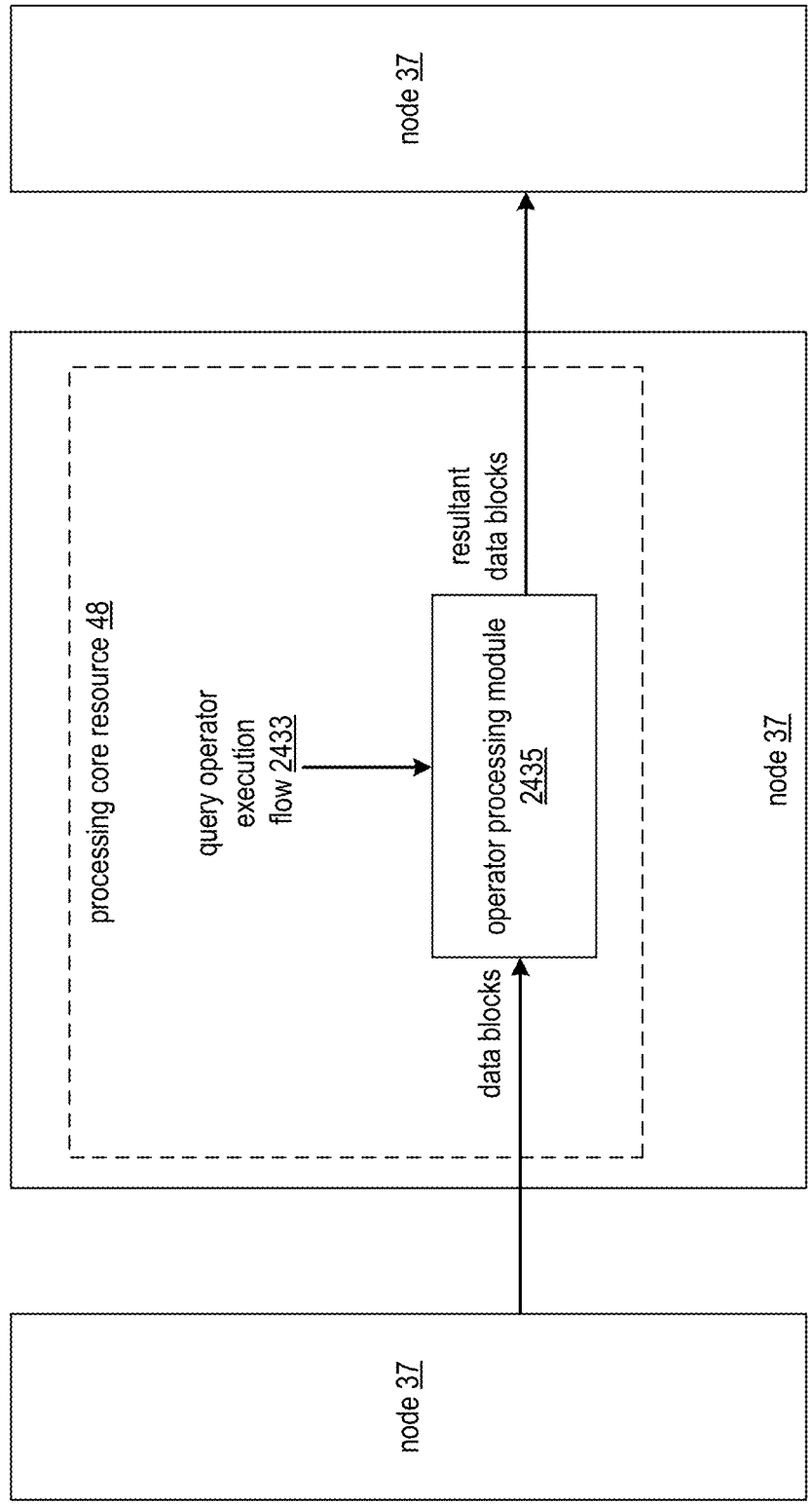
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing an operator processing module 2435. The operator processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes an operator processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2416 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2412 can be gathered into a final result of the query, for example, by the node 37 at root level 2412 if this inner level is the top-most inner level 2414 or the only inner level 2414. As another example, resultants generated by each of the plurality of nodes at this inner level 2412 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the operator processing module 2435 can be implemented by a single processing core resource 48 of the node 37, for example, by utilizing a corresponding processing module 44. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query. Alternatively, the operator processing module 2435 can be implemented via multiple processing core resources 48 and/or via one or more other processing modules of the node 37.

Figure 24C:
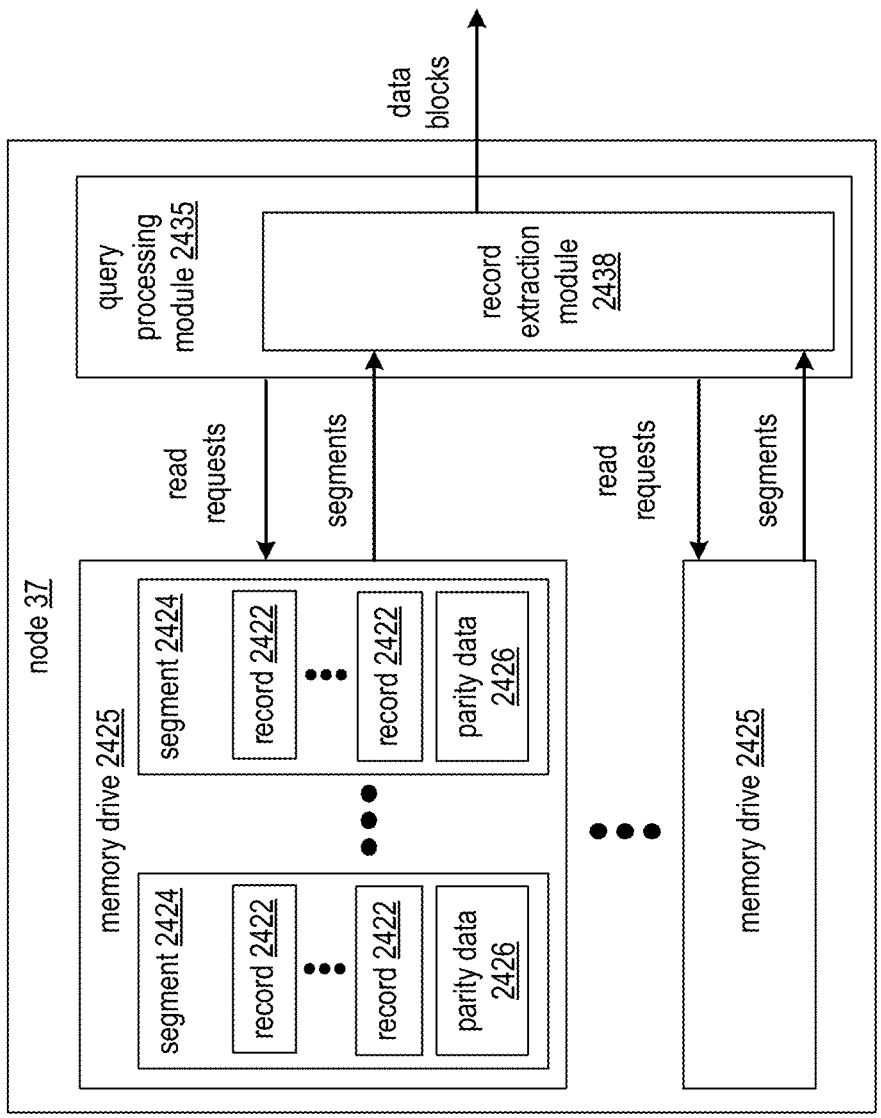

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24D:
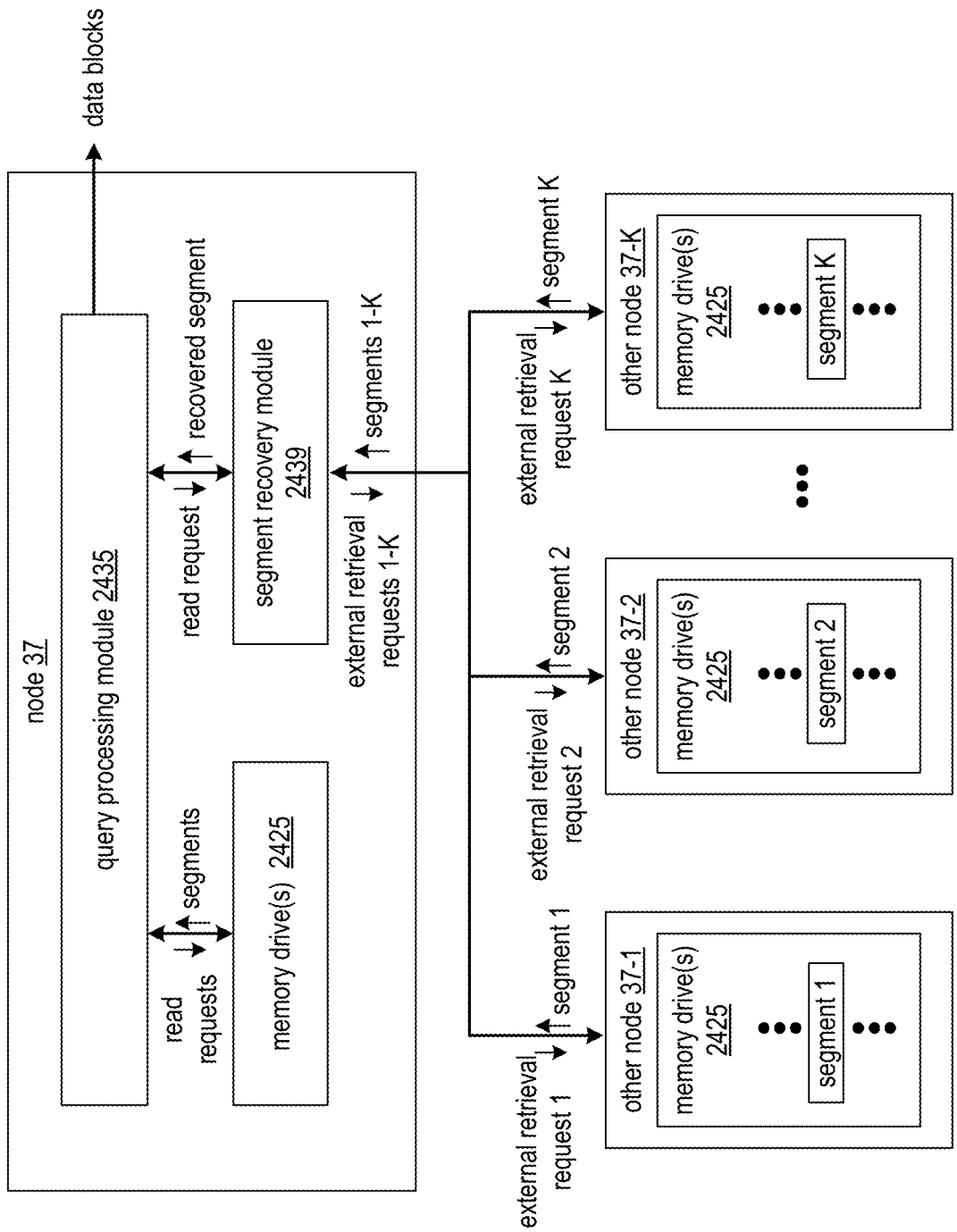

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
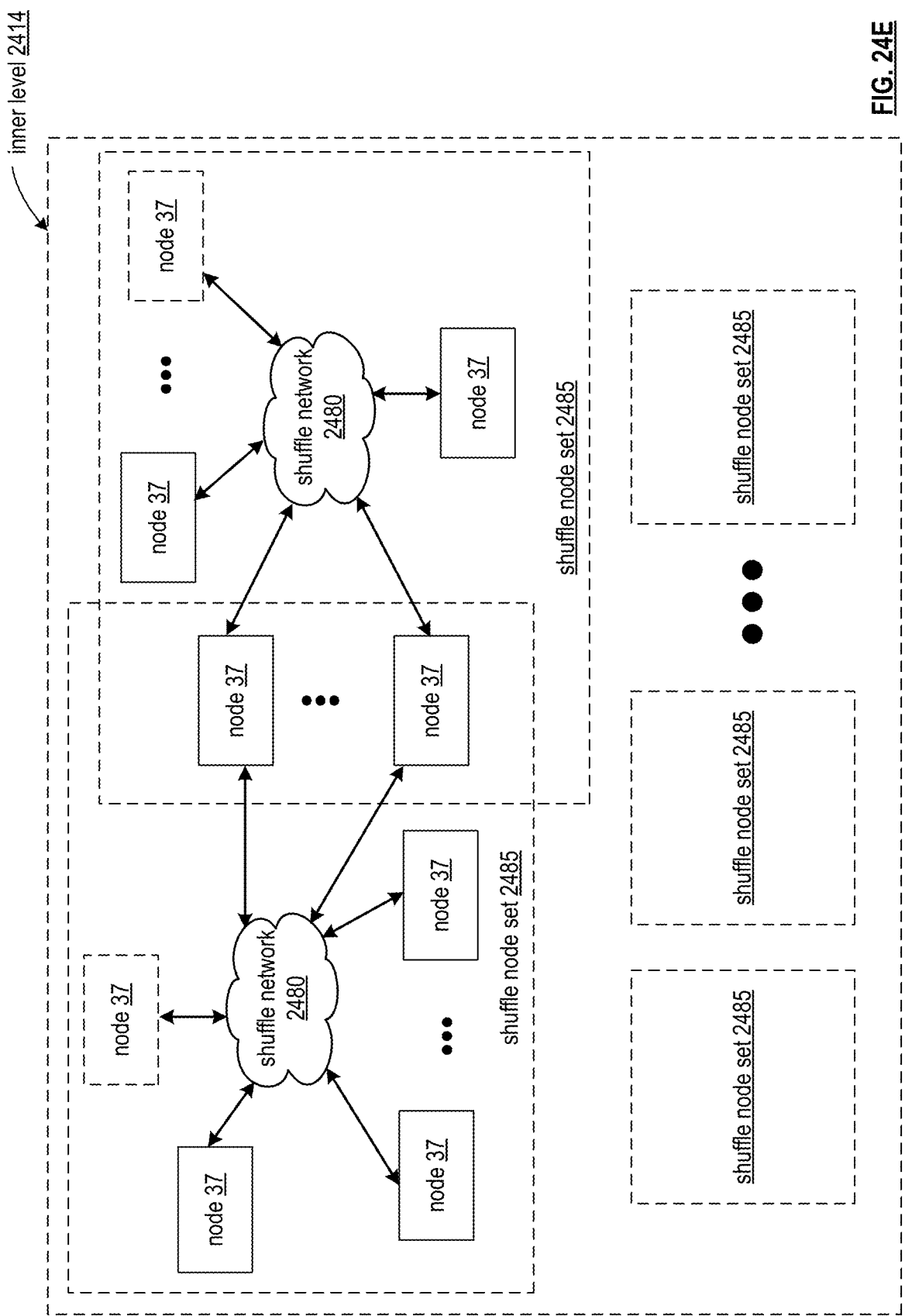
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Figure 24F:
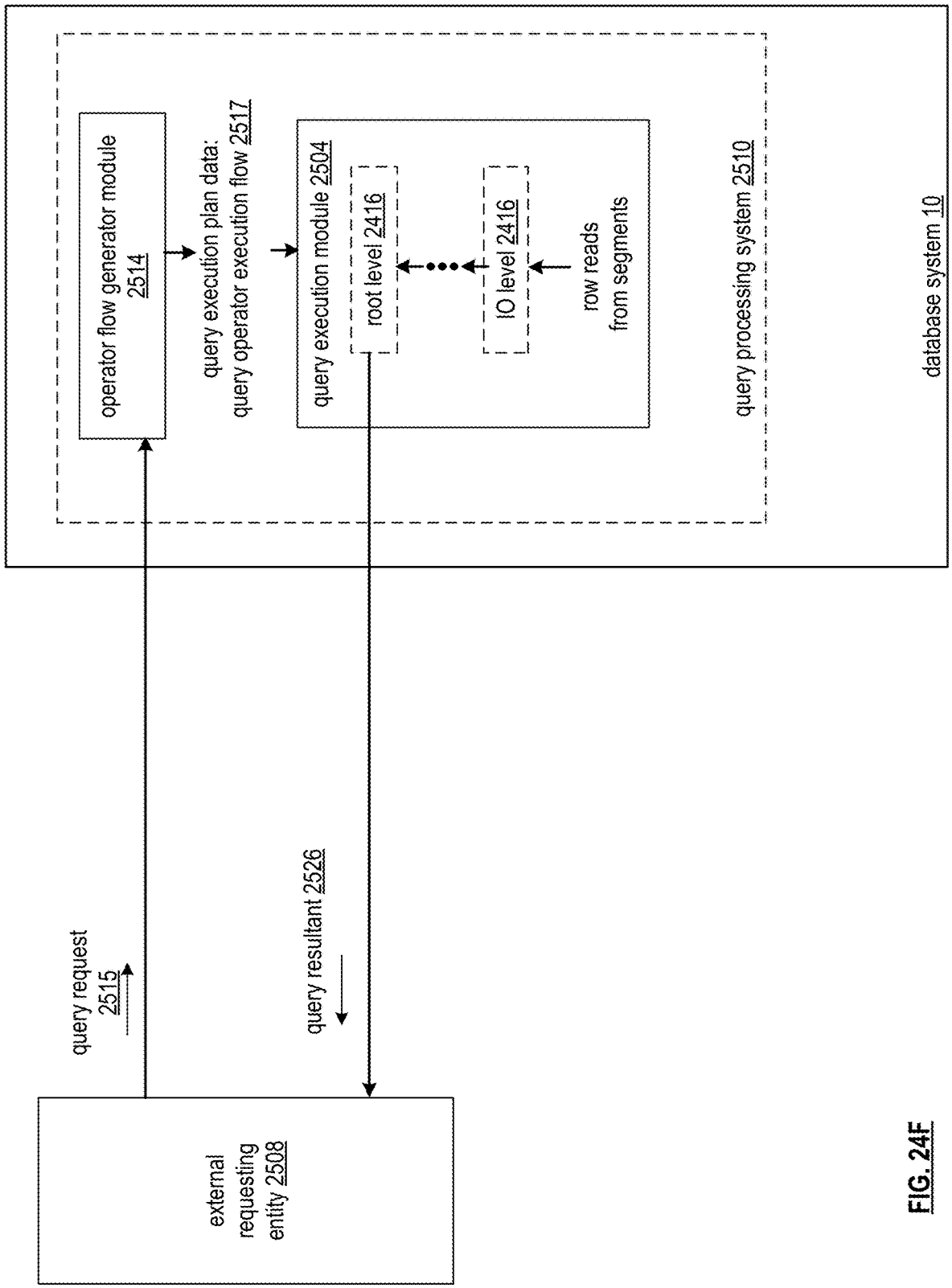
FIG. 24F is a schematic block diagram of a database system communicating with an external requesting entity in accordance with various embodiments.

FIG. 24F illustrates an embodiment of a database system that receives some or all query requests from one or more external requesting entities 2508. The external requesting entities 2508 can be implemented as a client device such as a personal computer and/or device, a server system, or other external system that generates and/or transmits query requests 2515. A query resultant 2526 can optionally be transmitted back to the same or different external requesting entity 2508. Some or all query requests processed by database system 10 as described herein can be received from external requesting entities 2508 and/or some or all query resultants generated via query executions described herein can be transmitted to external requesting entities 2508.

For example, a user types or otherwise indicates a query for execution via interaction with a computing device associated with and/or communicating with an external requesting entity. The computing device generates and transmits a corresponding query request 2515 for execution via the database system 10, where the corresponding query resultant 2526 is transmitted back to the computing device, for example, for storage by the computing device and/or for display to the corresponding user via a display device.

Figure 24G:
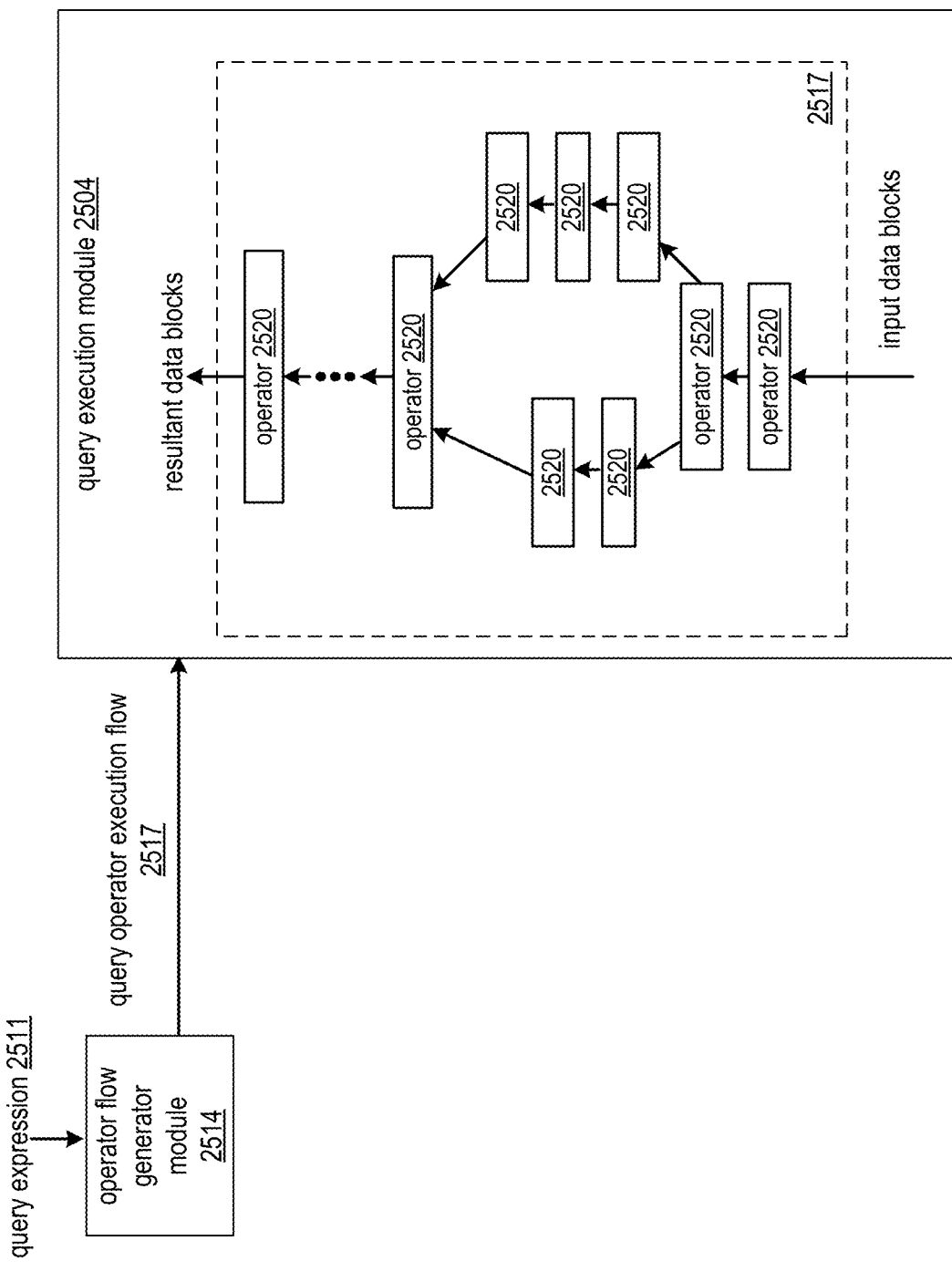
FIG. 24G is a schematic block diagram of a query processing system in accordance with various embodiments.

FIG. 24G illustrates an embodiment of a query processing system 2510 that generates a query operator execution flow 2517 from a query expression 2511 for execution via a query execution module 2504. The query processing system 2510 can be implemented utilizing, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14.

As illustrated in FIG. 24G, an operator flow generator module 2514 of the query processing system 2510 can be utilized to generate a query operator execution flow 2517 for the query indicated in a query expression 2511. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2510 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.*i* this common query operator execution flow 2433 can be sent to the one or more other nodes 37 in a same shuffle node set as input data blocks to be added to the input data set 2522 the next operator 2520.*i*+1, with respect to the serialized ordering of the query of this common query operator execution flow 2433 of the one or more other nodes 37. For example, the output generated via a node's execution of a particular operator 2520.*i* is added input data set 2522 the next operator 2520.*i*+1 of the same node's query operator execution flow 2433 based on being serially next in the sequential ordering and/or is alternatively or additionally added to the input data set 2522 of the next operator 2520.*i*+1 of the common query operator execution flow 2433 of the one or more other nodes in a same shuffle node set based on being serially next in the sequential ordering.

In some cases, in addition to a particular node sending this output generated via a node's execution of a particular operator 2520.*i* to one or more other nodes to be input data set 2522 the next operator 2520.*i*+1 in the common query operator execution flow 2433 of the one or more other nodes 37, the particular node also receives output generated via some or all of these one or more other nodes execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

As used herein, a child operator of a given operator corresponds to an operator immediately before the given operator serially in a corresponding query operator execution flow and/or an operator from which the given operator receives input data blocks for processing in generating its own output data blocks. A given operator can have a single child operator or multiple child operators. A given operator optionally has no child operators based on being an IO operator and/or otherwise being a bottommost and/or first operator in the corresponding serialized ordering of the query operator execution flow. A child operator can implement any operator 2520 described herein.

A given operator and one or more of the given operator's child operators can be executed by a same node 37 of a given node 37. Alternatively or in addition, one or more child operators can be executed by one or more different nodes 37 from a given node 37 executing the given operator, such as a child node of the given node in a corresponding query execution plan that is participating in a level below the given node in the query execution plan.

As used herein, a parent operator of a given operator corresponds to an operator immediately after the given operator serially in a corresponding query operator execution flow, and/or an operator from which the given operator receives input data blocks for processing in generating its own output data blocks. A given operator can have a single parent operator or multiple parent operators. A given operator optionally has no parent operators based on being a topmost and/or final operator in the corresponding serialized ordering of the query operator execution flow. If a first operator is a child operator of a second operator, the second operator is thus a parent operator of the first operator. A parent operator can implement any operator 2520 described herein.

A given operator and one or more of the given operator's parent operators can be executed by a same node 37 of a given node 37. Alternatively or in addition, one or more parent operators can be executed by one or more different nodes 37 from a given node 37 executing the given operator, such as a parent node of the given node in a corresponding query execution plan that is participating in a level above the given node in the query execution plan.

As used herein, a lateral network operator of a given operator corresponds to an operator parallel with the given operator in a corresponding query operator execution flow. The set of lateral operators can optionally communicate data blocks with each other, for example, in addition to sending data to parent operators and/or receiving data from child operators. For example, a set of lateral operators are implemented as one or more broadcast operators of a broadcast operation, and/or one or more shuffle operators of a shuffle operation. For example, a set of lateral operators are implemented via corresponding plurality of parallel processes 2550, for example, of a join process or other operation, to facilitate transfer of data such as right input rows received for processing between these operators. As another example, data is optionally transferred between lateral network operators via a corresponding shuffle and/or broadcast operation, for example, to communicate right input rows of a right input row set of a join operation to ensure all operators have a full set of right input rows.

A given operator and one or more lateral network operators lateral with the given operator can be executed by a same node 37 of a given node 37. Alternatively or in addition, one or lateral network operators can be executed by one or more different nodes 37 from a given node 37 executing the given operator lateral with the one or more lateral network operators. For example, different lateral network operators are executed via different nodes 37 in a same shuffle node set 37.

Figure 24I:
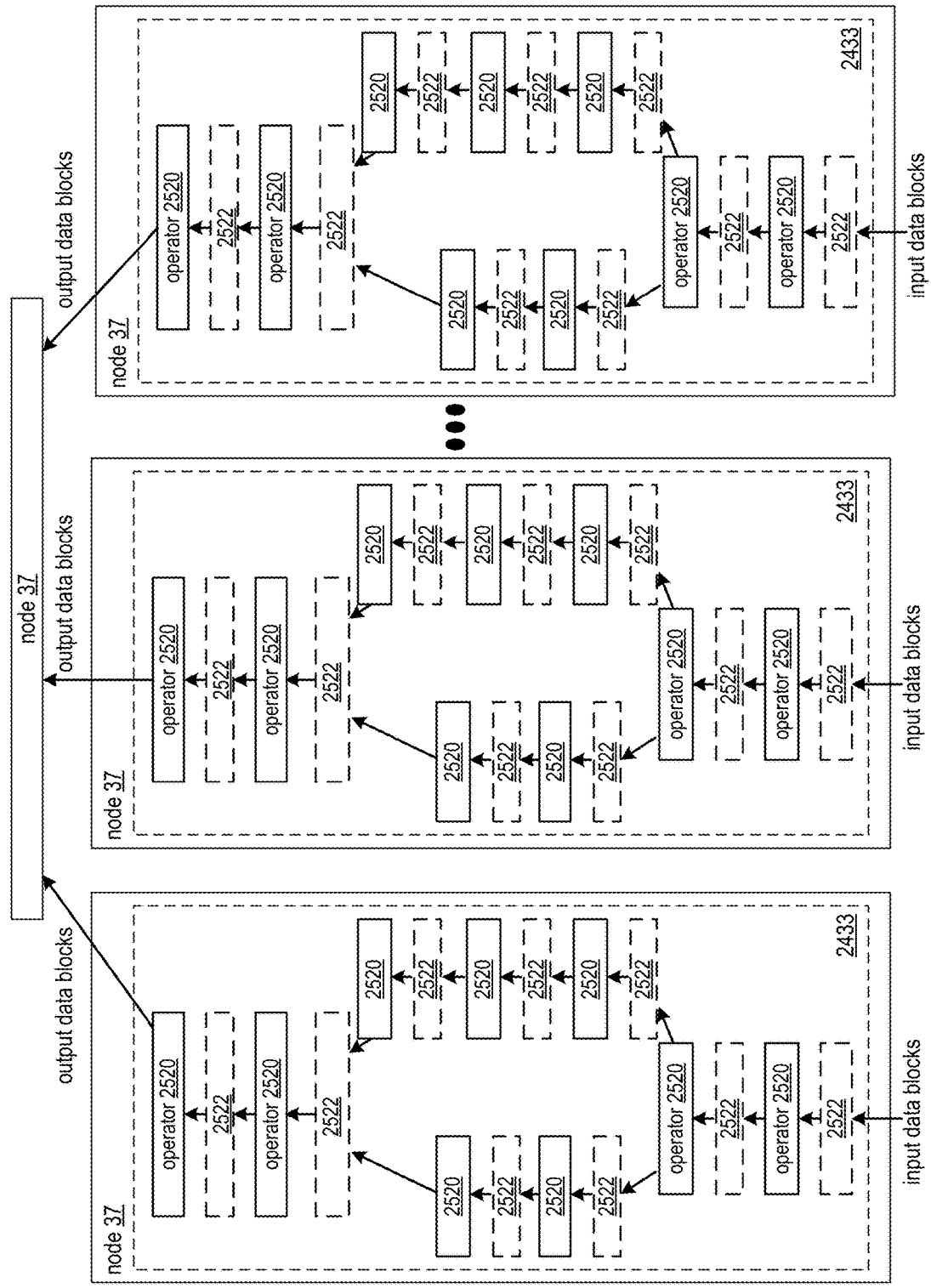
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Figure 24J:
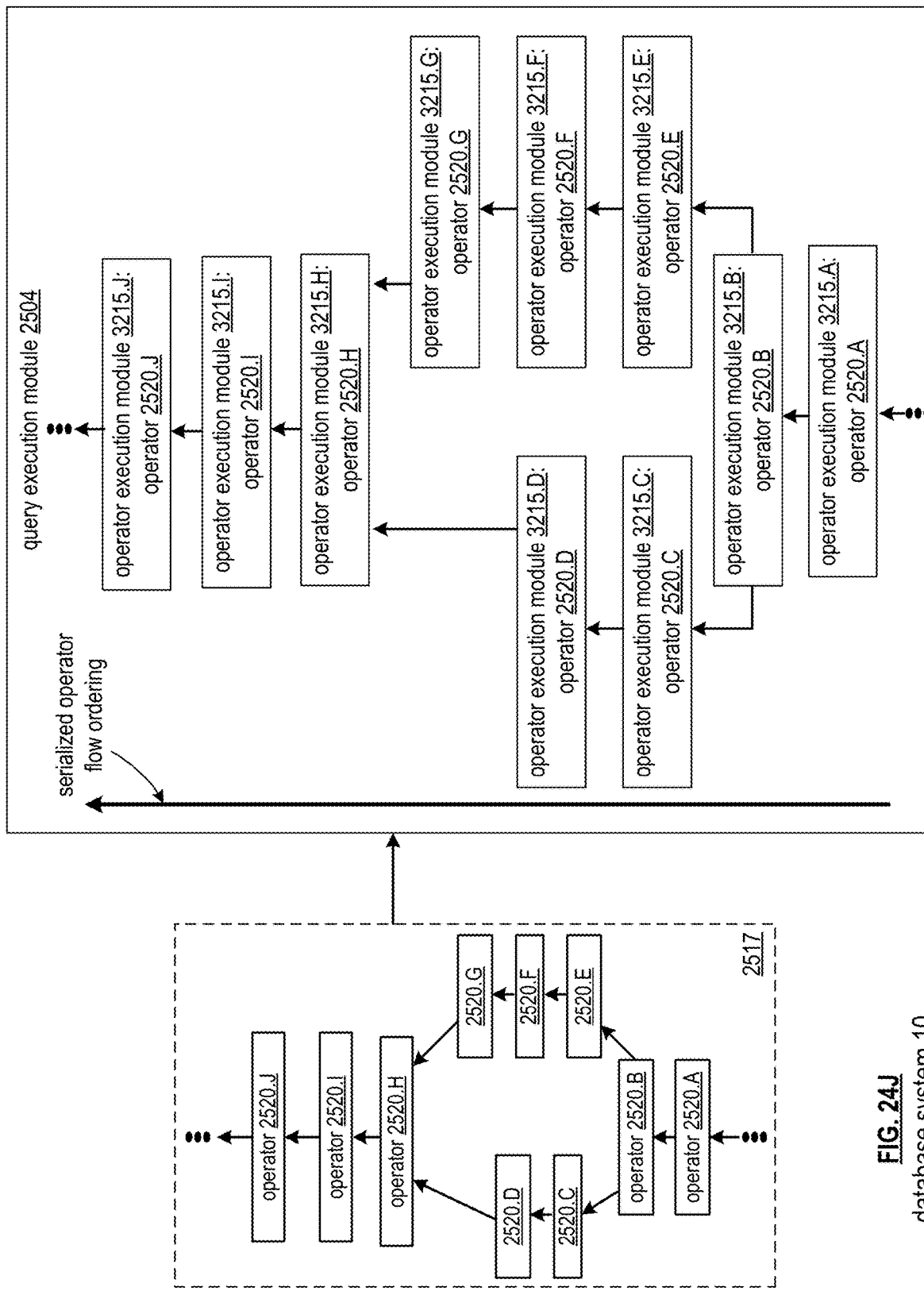
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
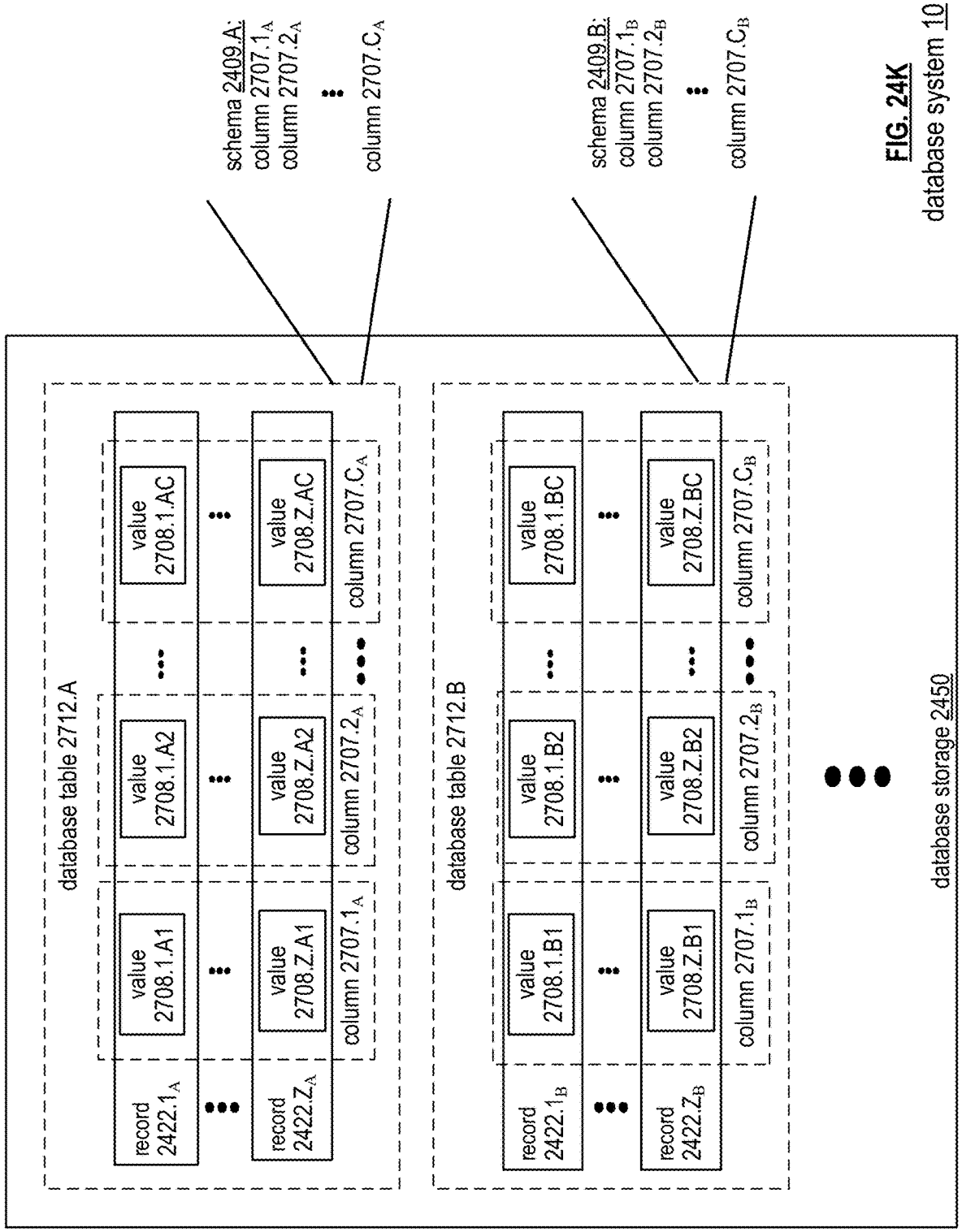
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be accordance with a schema 2409 defining columns of the database table, where records 2422 correspond to rows having values 2708 for some or all of these columns. Different database tables can have different numbers of columns and/or different datatypes for values stored in different columns. For example, the set of columns $2707.1_A$-$2707.C_A$ of schema 2709.A for database table 2712.A can have a different number of columns than and/or can have different datatypes for some or all columns of the set of columns $2707.1_8$-$2707.C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
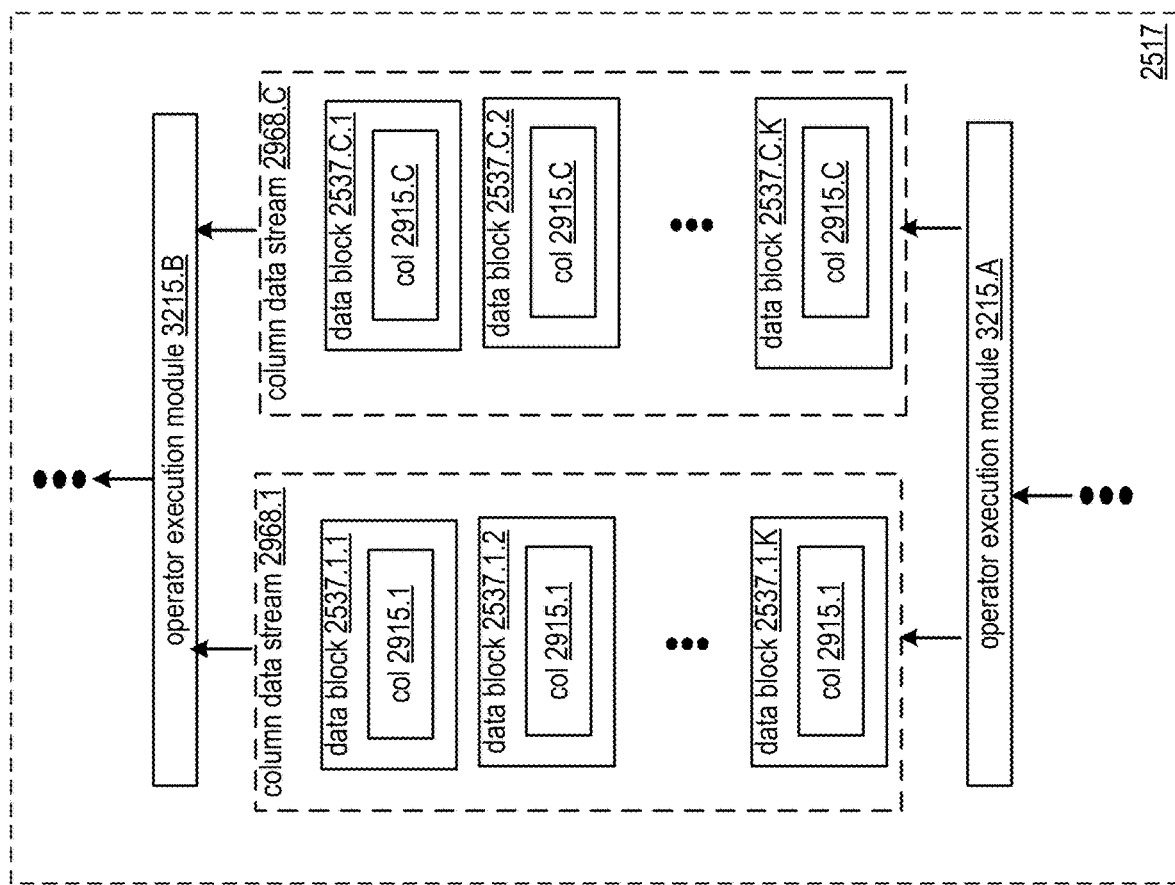
FIG. 24L is a schematic block diagram of a query execution module that implements a plurality of column data streams in accordance with various embodiments.
Figure 24M:
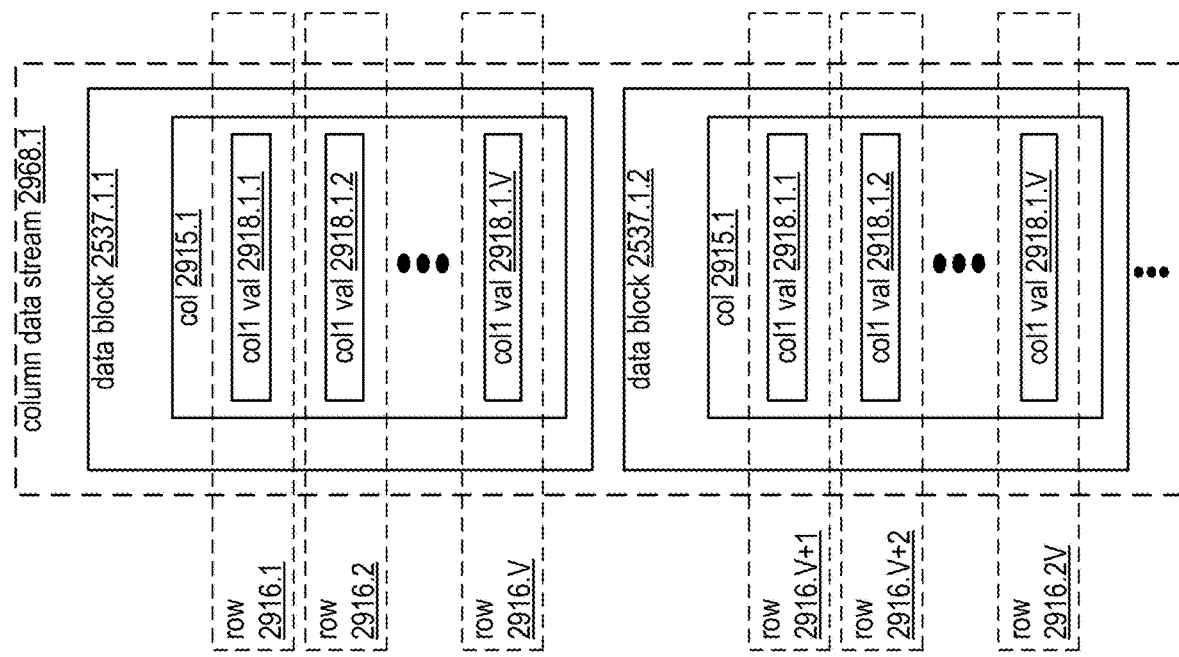
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same multi-column data stream.

Figure 24N:
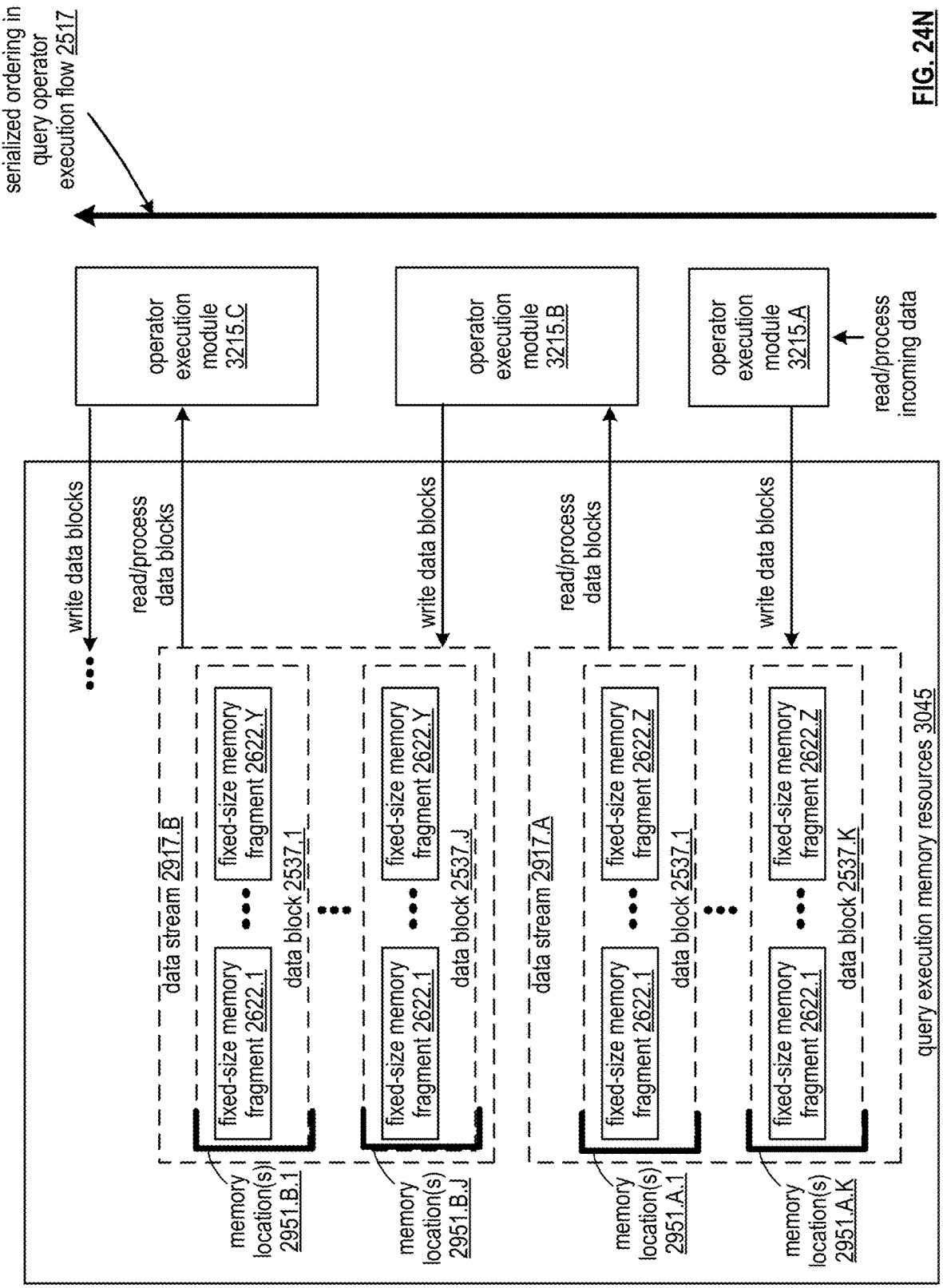
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24.M, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations to filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

FIGS. 25A-25F illustrate embodiments of a database system 10 operable to execute queries indicating join expressions based on implementing corresponding join processes via one or more join operators. Some or all features and/or functionality of FIGS. 25A-25F can be utilized to implement the database system 10 of FIGS. 24A-24N when executing queries indicating join expressions. Some or all features and/or functionality of FIGS. 25A-25F can be utilized to implement any embodiment of the database system 10 described herein.

Figure 25A:
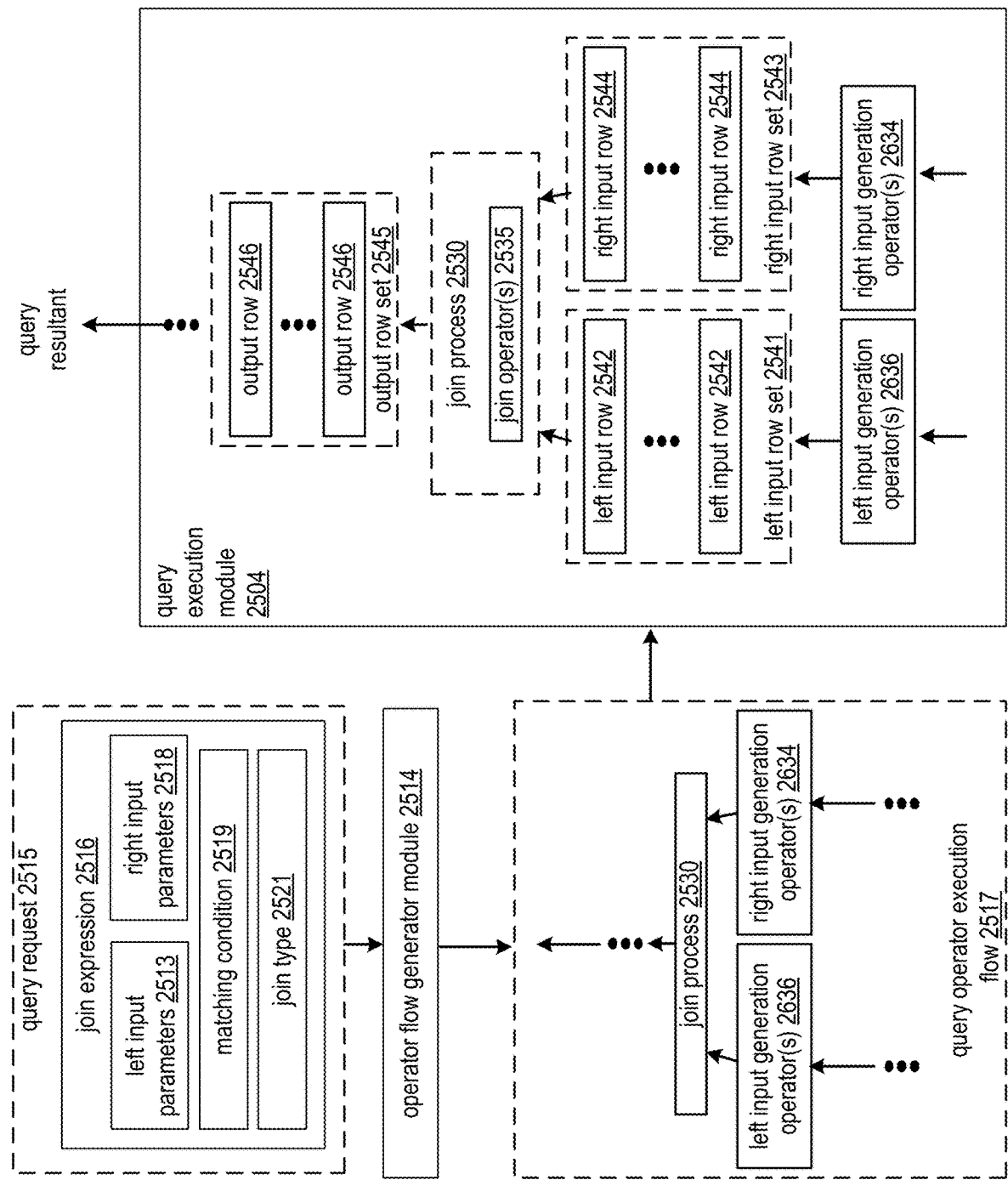
FIG. 25A is a schematic block diagram of a database system executing a join process based on a join expression of a query request in accordance with various embodiments.

FIG. 25A illustrates an example of processing a query request 2515 that indicates a join expression 2516. The join expression 2516 can indicate that columns from one or more tables, for example, indicated by left input parameters 2513 and/or right input parameters 2518, be combined into a new table based on particular criteria, such as matching condition 2519 and/or a join type 2521 of the join operation. For example, the join expression 2516 can be implemented as a SQL JOIN clause, or any other type of join operation in any query language.

The join expression 2516 can indicate left input parameters 2513 and/or right input parameters 2518, denoting how the left input rows and/or right input rows be selected and/or generated for processing, such as which columns of which tables be selected. The left input and right input are optionally not distinguished as left and right, for example, where the join expression 2516 simply denotes input values for two input row sets. The join expression can optionally indicate performance of a join across three or more sets of rows, and/or multiple join expressions can be indicated to denote performance of joins across three or more sets of rows. In the case of a self-join, the join expression can optionally indicate performance of a join across a single set of input rows.

The join expression 2516 can indicate a matching condition 2519 denoting what condition constitutes a left input row being matched with a right input row in generating output of the join operation, which can be based on characteristics of the left input row and/or the right input row, such as a function of values of one or more columns of the left input row and/or the right input row. For example, the matching condition 2519 requires equality between a value of a first column value of the left input rows and a second column value of the right input rows. The matching condition 2519 can indicate any conditional expression between values of the left input rows and right input rows, which can require equality between values, inequality between values, one value being less than another value, one value being greater than another value, one value being less than or equal to another value, one value being greater than or equal to another value, one value being a substring of another value, one value being an array element of an array, or other criteria. In some embodiments, the matching condition 2519 indicates all left input rows be matched with all right input rows. Two values and/or two corresponding rows can meet matching condition 2519 based on comparing favorably to one another and/or based on comparing favorably to the matching condition 2519.

The join expression 2516 can indicate a join type 2521 indicating the type of join to be performed to produce the output rows. For example, the join type 2521 can indicate the join be performed as a one of: a full outer join, a left outer join, a right outer join, an inner join, a cross join, a cartesian product, a self-join, an equi-join, a natural join, a hash join, or any other type of join, such as any SQL join type and/or any relational algebra join operation.

The query request 2515 can further indicate other portions of a corresponding query expression indicating performance of other operators, for example, to define the left input rows and/or the right input rows, and/or to further process output of the join expression.

The operator flow generator module 2514 can generate the query operator execution flow 2517 to indicate performance of a join process 2530 via one or more corresponding operators. The operators of the join process 2530 can be configured based on the matching condition 2519 and/or the join type 2521. The join process can be implemented via one or more serialized operators and/or multiple parallelized branches of operators 2520 configured to execute the corresponding join expression.

The operator flow generator module 2514 can generate the query operator execution flow 2517 to indicate performance of the join process 2530 upon output data blocks generated via one or more left input generation operators 2636 and one or more right input generation operators 2634. For example, the left input generation operators 2636 include one or more serialized operators and/or multiple parallelized branches of operators 2520 utilized to retrieve a set of rows from memory, for example, to perform IO operations, to filter the set of rows, to manipulate and/or transform values of the set of rows to generate new values of a new set of rows for performing the join, or otherwise retrieve and/or generate the left input rows, in accordance with the left input parameters 2513. Similarly, the right input generation operators 2634 include one or more serialized operators and/or multiple parallelized branches of operators utilized to retrieve a set of rows from memory, for example, via IO operators, to filter the set of rows, to manipulate and/or transform values of the set of rows to generate new values of a new set of rows for performing the join, or otherwise retrieve and/or generate the right input rows, in accordance with the right input parameters 2518. The left input generation operators 2636 and right input generation operators 2634 can optionally be distinct and performed in parallel to generate respective left and right input row sets separately. Alternatively, one or more of the left input generation operators 2636 and right input generation operators 2634 can optionally be shared operators between left input generation operators 2636 and right input generation operators 2634 to aid in generating both the left and right input row sets.

The query execution module 2504 can be implemented to execute the query operator execution flow 2517 to facilitate performance of the corresponding join expression 2516. This can include executing the left input generation operators 2636 to generate a left input row set 2541 that includes a plurality of left input rows 2542 determined in accordance with the left input parameters 2513, and/or executing the right input generation operators 2634 to generate a right input row set 2543 that includes a plurality of right input rows 2544 determined in accordance with the right input parameters 2518. The plurality of left input rows 2542 of the left input row set 2541 can be generated via the left input generation operators 2636 as a stream of data blocks sent to the join process 2530 for processing, and/or the plurality of right input rows 2544 of the right input row set 2543 can be generated via the right input generation operators 2634 as a stream of data blocks sent to the join process 2530 for processing.

The join process 2530 can implement one or more join operators 2535 to process the left input row set 2541 and the right input row set 2543 to generate an output row set 2545 that includes a plurality of output rows 2546. The one or more join operators 2535 can be implemented as one or more operators 2520 configured to execute some or all of the corresponding join process. The output rows 2546 of the output row set 2545 can be generated via the join process 2530 as a stream of data blocks emitted as a query resultant of the query request 2515 and/or sent to other operators serially after the join process 2530 for further processing.

Each output rows 2546 can be generated based on matching a given left input row 2542 with a given right input row 2544 based on the matching condition 2519 and/or the join type 2521, where one or more particular columns of this left input row are combined with one or more particular columns of this given right input row 2544 as specified in the left input parameters 2513 and/or the right input parameters 2518 of the join expression 2516. A given left input row 2542 can be included in no output rows based on matching with no right input rows 2544. A given left input row 2542 can be included in one or more output rows based on matching with one or more right input rows 2544 and/or being padded with null values as the right column values. A given right input row 2544 can be included in no output rows based on matching with no left input rows 2542. A given right input row 2544 can be included in one or more output rows based on matching with one or more left input rows 2542 and/or being padded with null values as the left column values.

The query execution module 2504 can execute the query operator execution flow 2517 via a plurality of nodes 37 of a query execution plan 2405, for example, in accordance with nodes 37 participating across different levels of the plan. For example, the left input generation operators 2636 and/or the right input generation operators 2634 are implemented via nodes at a first one or more levels of the query execution plan 2405, such as an IO level and/or one or more inner levels directly above the IO level.

The left input generation operators 2636 and the right input generation operators 2634 can be implemented via a common set of nodes at these one or more levels. Alternatively some or all of the left input generation operators 2636 are processed via a first set of nodes of these one or more levels, and the right input generation operators 2634 are processed via a second set of nodes that have a non-null difference with and/or that are mutually exclusive with the first set of nodes.

The join process 2530 can be implemented via a nodes at a second one or more levels of the query execution plan 2405, such as one or more inner levels directly above the first one or more levels, and/or the root level. For example, one or more nodes at the second one or more levels implementing the join process 2530 receive left input rows 2542 and/or right input rows 2544 for processing from child nodes implementing the left input generation operators 2636 and/or child nodes implementing the right input generation operators 2634. The one or more nodes implementing the join process 2530 at the second one or more levels can optionally belong to a same shuffle node set 2485, and can laterally exchange left input rows and/or right input rows with each other via one or more shuffle operators and/or broadcast operators via a corresponding shuffle network 2480.

Figure 25B:
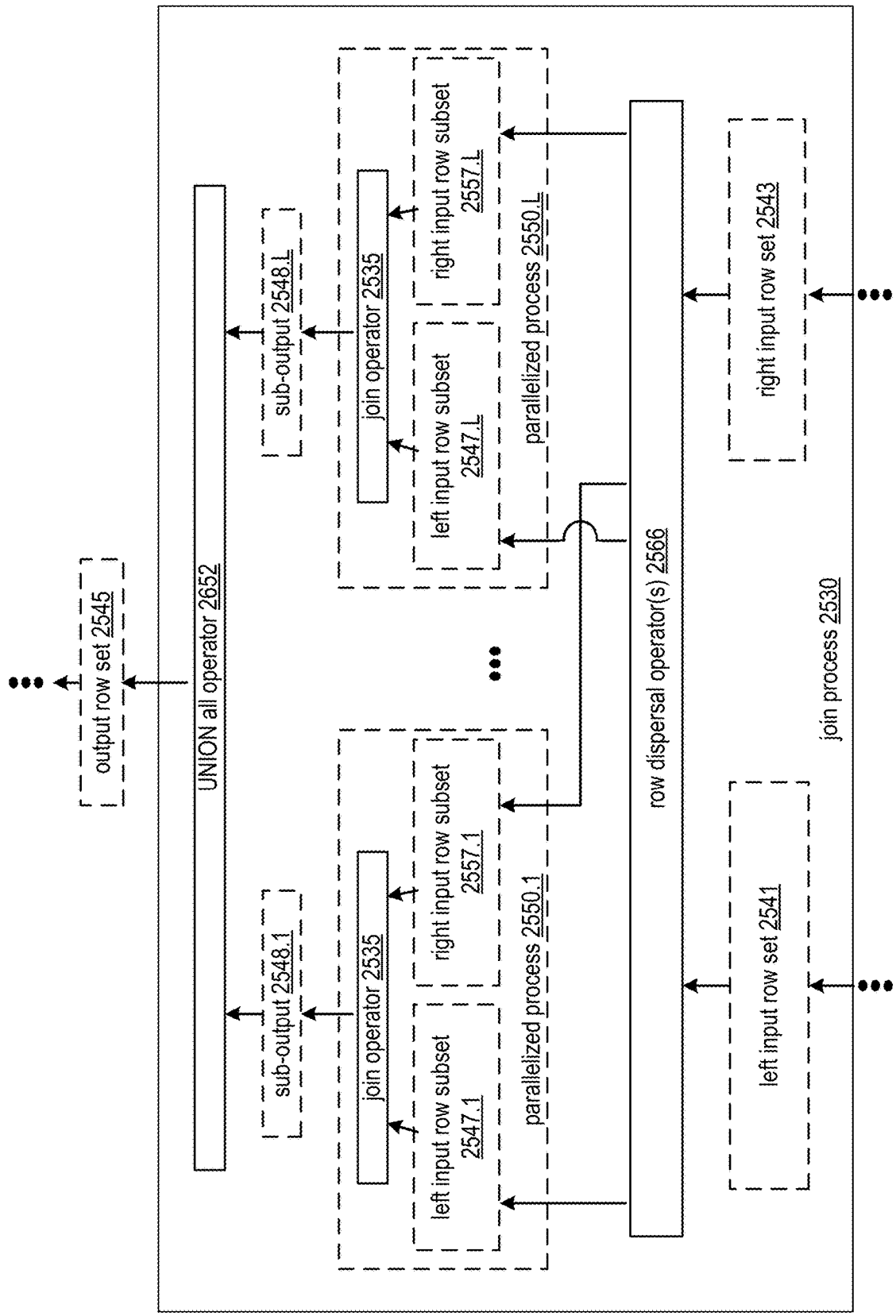
FIGS. 25B-25E are schematic block diagrams of example join processes executed via multiple parallel processes in accordance with various embodiments.

FIG. 25B illustrates an embodiment of a query execution module 2504 executing a join process 2530 via a plurality of parallelized processes 2550.1-2550.L Some or all features and/or functionality of the query execution module 2504 can be utilized to implement the query execution module 2504 of FIG. 25A, and/or any other embodiment of the query execution module 2504 described herein. In other embodiments, the query execution module 2504 of FIG. 25A implements the join process 2530 via a single join operator of a single processes rather than the plurality of parallelized processes 2550.

In some embodiments, the plurality of parallelized processes 2550.1-2550.L are implemented via a corresponding plurality of nodes 37.1-37.L of a same level, such as a given inner level, of a query execution plan 2405 executing the given query. In some embodiments, the plurality of parallelized processes 2550.1-2550.L are implemented via a corresponding plurality of processing core resources 48, such as multiple virtual machine cores, on a same given node 37 and/or across multiple parallelized nodes 37. In some embodiments, the plurality of parallelized processes 2550.1-2550.L can be implemented as a parallelized set of operator instances 2520 in parallel tracks of a given query operator execution flow 2517. The plurality of parallelized processes 2550.1-2550.L can be implemented as a set via any other set of parallelized and/or distinct memory and/or processing resources.

Each parallelized process 2550 can be responsible for generating its own sub-output 2548 based on processing a corresponding left input row subset 2547 of the left input row set 2541 and processing a corresponding right input row subset 2557. As discussed in further detail herein, each right input row subset 2557 can be a proper subset of the full right input row set 2543 and/or can include all of the right input row set 2543. Alternatively or in addition, each left input row subset 2547 can be a proper subset of the full left input row set 2541 and/or can include all of the left input row set 2541.

The dispersal of the left input row set 2543 into respective left input row subsets 2547.1-2547.L can be performed via one or more row dispersal operators 2566, such as one or more multiplexer operators, one or more tee operators, and/or one or more shuffle operators.

Figure 25C:
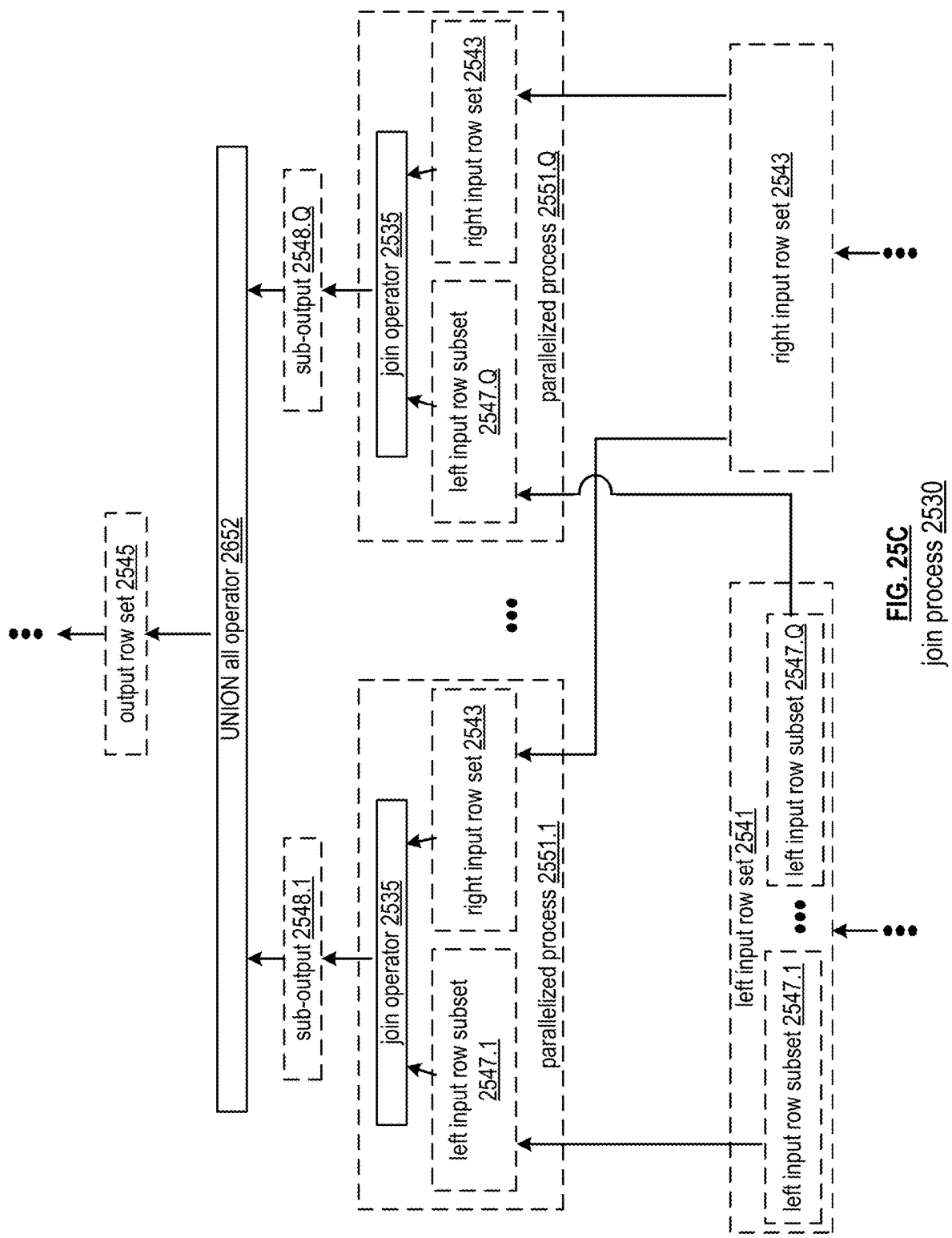

When implemented as a multiplexer operator, a row dispersal operator 2566 can be operable to emit different subsets of a set of incoming rows of an input row set, such as the right input row set 2543 and/or the left input row set 2541, to different parallelized processes for processing, for example, via respective parent operators. Each subset of rows sent to a given parallelized process 2550 can be is mutually exclusive from subsets of rows sent to other parallelized processes 2550, and/or the plurality of subsets of rows sent to the plurality of parallelized process 2550.1-2550.L are collectively exhaustive with respect to the input row set. This can be utilized to facilitate partitioning of a set of left input rows for processing across parallelized processes as illustrated in FIG. 25C.

When implemented as a tee operator, a row dispersal operator 2566 can be operable to emit all of a set of incoming rows of input row set to each different parallelized processes 2550 of the set of parallelized processes 2550.1-2550.L for processing, such as to respective parent operators. Each subset of rows sent to a given parallelized process 2550 is equivalent to that sent to other parallelized processes 2550, and/or the plurality of subsets of rows sent to the plurality of patent parallelized processes 2550 are equivalent to the input row set. This can be utilized to facilitate sharing of all of a same set of right input rows across all parallelized processes as illustrated in FIG. 25C.

When implemented as a set of shuffle operators, a respective set of row dispersal operators 2566 can be operable to share incoming rows with other operators to render all corresponding parallelized processes 2550 receiving all rows for processing, despite each shuffle operator receiving only one input set of rows itself. For example, each parallelized process implements its own shuffle operator to enable this sharing of rows. This can be utilized to facilitate sharing of all of a same set of right input rows across all parallelized processes as illustrated in FIG. 25C.

Each row in the left input row set 2541 can be included in exactly one of the respective left input row subsets 2547, can be included in more than one but less than all of the respective left input row subsets 2547, and/or can be included in every respective left input row subset 2547. Each row in the right input row set 2543 can be included in exactly one of the respective left input row subsets 2557, can be included in more than one but less than all of the respective left input row subsets 2557, and/or can be included in every respective left input row subset 2557. The dispersal and respective processing by the parallelized processing can guarantee that the union outputted via union operator 2652 does not include duplicate rows that should not be included in the output for query correctness and/or is not missing any rows that should be included in the output for query correctness.

FIG. 25C illustrates an embodiment of execution of a join process 2530 via a plurality of parallelized processes 2551.1-2551.Q. Some or all features and/or functionality of FIG. 25C can implement the join process 2530 of FIG. 25B. FIG. 25A, or any other embodiment of join process 2530 described herein.

The plurality of parallelized processes 2551.1-2551.Q can implement the plurality of parallel processes 2550.1-2550.L of FIG. 25B, where a given process 2551 of FIG. 25C implements some or all of a given process 2550 of FIG. 25B. Alternatively or in addition, a given plurality of parallelized processes 2551.1-2551.Q can be a plurality of inner, sub-processes of a given parallelized process 2550, where some or all of the plurality of parallel processes 2550.1-2550.L implement their own plurality of inner parallelized sub-processes 2551.1-2551.Q.

Each parallelized process 2551 can be responsible for generating its own sub-output 2548 based on processing a corresponding left input row subset 2547 of the left input row set 2541, and by further processing all of the right input row set. The full output row set 2545 can be generated by applying a UNION all operator 2652 implementing a union across all L sets of sub-output 2548, where all output rows 2546 of all sub-outputs 2548 are thus included in the output row set 2545. The output rows 2546 of a given sub-output 2548 can be generated via the join operator 2535 of the corresponding parallelized process 2555 as a stream of data blocks sent to the UNION all operator 2652.

In some embodiments, each parallelized process 2551 only receives the left input rows 2542 generated by its own one or more child nodes, where each of these child nodes only sends its output data blocks to one parent. The left input row set 2541 can otherwise be segregated into the set of left input row subsets 2547.1-2547.Q, each designated for a corresponding one of the set of parallelized processes 2551.1-2551.Q. The plurality of left input row subsets 2547.1-2547.Q can be mutually exclusive and collectively exhaustive with respect to the left input row set 2541, where each left input row 2542 is received and processed by exactly one parallelized process 2551.

In some embodiments, the right input row set 2543 is generated via another set of nodes that is the same as, overlapping with, and/or distinct from the set of nodes that generate the left input row subsets 2547.1-2547.L. For example, similar to the nodes generating left input row subsets 2547. Q different nodes and/or Q different subsets of nodes that each include multiple nodes generate a corresponding subset of right input rows, where these subsets are mutually exclusive and collectively exhaustive with respect to the right input row set 2543. Unlike the left input rows, all right input rows 2544 can be received by all parallelized processes 2551.1, for example, based on each node of this other set of nodes sending its output data blocks to all L nodes implementing the Q parallelized processes 2551, rather than a single parent. Alternatively, the right input rows 2544 generated by a given node can be sent by the node to one parent implementing a corresponding one of the plurality of parallelized processes 2551.1-2551.Q, where the Q nodes perform a shuffle and/or broadcast process to share received rows of the right input row set 2543 with one another via a shuffle network 2480 to facilitate all Q nodes receiving all of the right input rows 2544. Each right input row 2544 is otherwise received and processed by every parallelized process 2551.

This mechanism can be employed for correctly implementing inner joins and/or left outer joins. In some embodiments, further adaptation of this join process 2530 is required to facilitate performance of full outer joins and/or right outer joins, as a given parallel process cannot ascertain whether a given right row matches with a left row of some or the left input row subset, or should be padded with nulls based on not matching with any left rows.

In some embodiments, to implement a right outer join, the right and left input rows of a right outer join are designated in reverse, enabling the right outer join to be correctly generated based on instead segregating the right input rows of the right outer join across all parallelized processes 2551, and instead processing all left input rows of the right outer join by all parallelized processes 2551.

The left input row set that is segregated across all parallelized processes 2551 vs, the right input row set processed via every parallelized processes 2551 can be selected, for example, based on an optimization process performed when generating the query operator execution flow 2517. For example, for a join specified as being performed upon two sets of input rows, while the input row set segregated amongst different parallelized processes 2551 and the input row set processed via every parallelized processes 2551 could be interchangeably selected, an intelligent selection is employed to optimize processing via the parallelized processes. For example, the input row set that is estimated and/or known to require smaller memory space due to column value types and/or number of input rows meeting the respective parameters is optionally designated as the right input row set 2543, and the larger input row set that is estimated and/or known to require larger memory space is designated as the left input row set 2541, for example, to reduce the full set of right input rows required to be processed by a given parallelized process. In some cases, this optimization is performed even in the case of a left outer join or right outer join, where, if the right hand side designated in the query expression is in fact estimated to be larger than the left hand side, the "left" input row set 2541 that is segregated across all parallelized processes 2551 is selected to instead correspond to the right hand side designated by the query expression, and the "right" input row set 2543 that is segregated across all parallelized processes 2551 is selected to instead correspond to the left hand side designated by the query expression. In other embodiments, the vice versa scenario is applied, where the larger row set is designated as the right input row set 2543 processed by every parallelized process, and where the smaller row set is designated as the left input row set 2541 segregated into subsets each for processing by only one parallelized process.

Figure 25D:
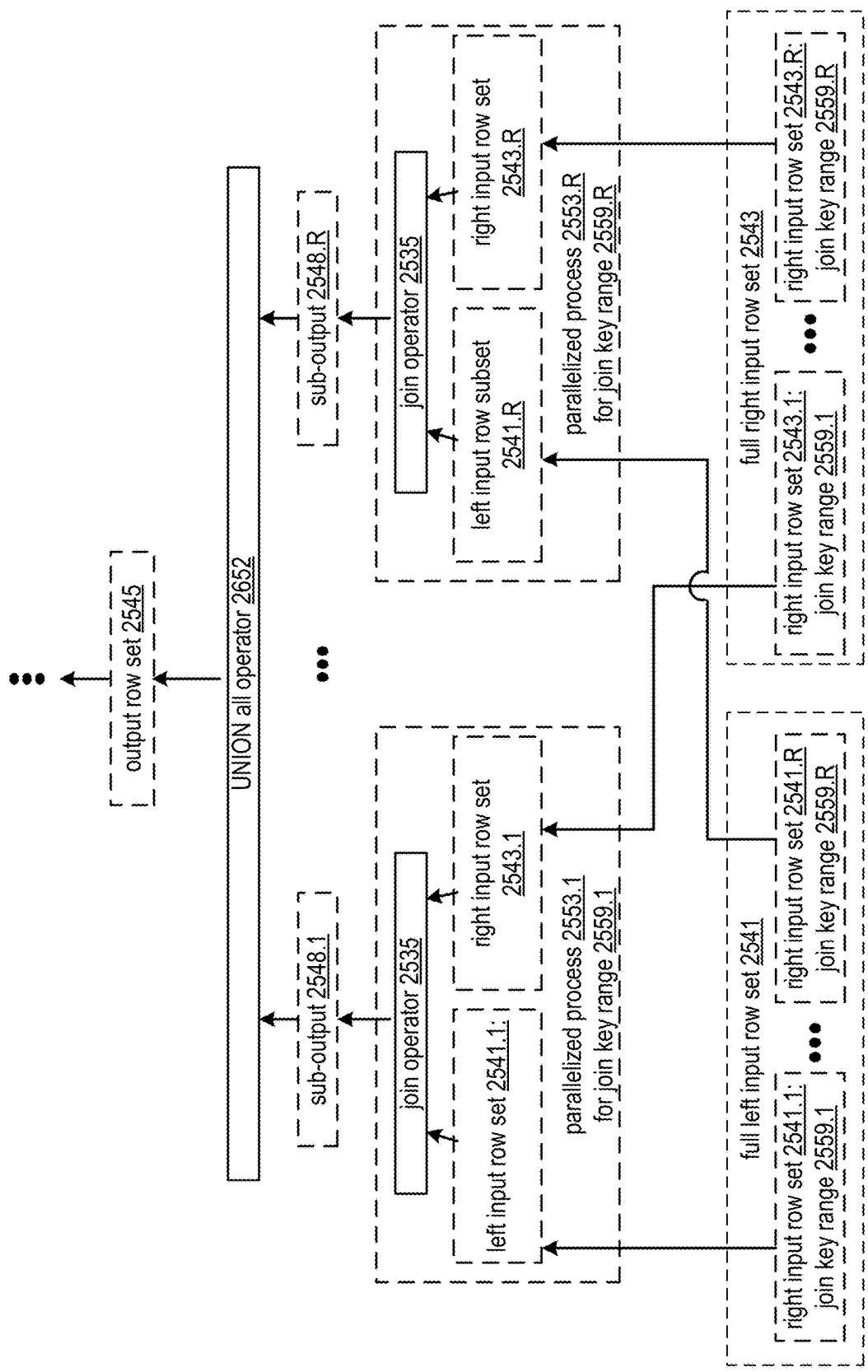

FIG. 25D illustrates an embodiment of execution of a join process 2530 via a plurality of parallelized processes 2553.1-2553.R. Some or all features and/or functionality of FIG. 25D can implement the join process 2530 of FIG. 25B. FIG. 25A, and/or any other embodiment of join process 2530 described herein.

The plurality of parallelized processes 2553.1-2553.R can implement the plurality of parallel processes 2550.1-2550.L of FIG. 25B, where a given process 2553 of FIG. 25D implements some or all of a given process 2550 of FIG. 25B. Alternatively or in addition, a given plurality of parallelized processes 2553.1-2553.R can be a plurality of inner, sub-processes of a given parallelized process 2550, where some or all of the plurality of parallel processes 2550.1-2550.L implement their own plurality of inner parallelized sub-processes 2553.1-2553.R.

Each parallelized process 2553 can be responsible for generating its own sub-output 2548 based on processing a corresponding one of the plurality of subsets of the full left input row set 2541, denoted as left input row sets 2541.1-2541.R, and by further processing a corresponding one of the plurality of subsets of the full right input row set 2543, denoted as right input row sets 2543.1-2543.R.

The left input row sets 2541.1-2541.R can be mutually exclusive and collectively exhaustive with respect to the full left input row set 2541, and can be partitioned by the join key of respective left input rows into a corresponding one of a set of join key ranges 2559.1-2559.R. For example, the join key of a left row is the value of one or more columns compared with values of right rows to determine whether the left row matches with any right rows. Thus, a given left input row sets 2541 from the full set is guaranteed to include all, and only, ones of the rows from the full set that fall within the respective join key range 2559.

Similarly, the right input row sets 2543.1-2543.R can be mutually exclusive and collectively exhaustive with respect to the full left input row set 2543, and also can be partitioned by the join key of respective right input rows into a corresponding one of a set of join key ranges 2559.1-2559.R, which can be identical ranges utilized to partition the left input rows into their respective sets 2541.1-2541.R. For example, the join key of a right row is the value of one or more columns compared with values of right rows to determine whether the left row matches with any right rows.

A given join key range 2559 can specify a single value, a set of continuous values, any set of multiple non-continuous values, and/or another portion of the domain of all possible join keys that is non-overlapping with other join key ranges.

Applying the same set of join key ranges 2559.1-2559.R to route both left and right incoming rows to a parallelized process processing all rows having join keys in the respective range guarantees that any two rows in a matching pair of rows to be identified via the join will be processed by the same parallelized process 2553, and will thus be identified in the join process correctly. Thus, each parallelized process 2553 is guaranteed not to be missing any potential matches, and the output emitted by the union ALL operator can be therefore guaranteed to be correct.

In some cases, the value of null is implemented via own join key range 2559, is included in a given join key range 2559 with other non-null values, or is not included any join key ranges 2559 based on being filtered out and/or assigned to parallelized processes in a different manner.

Figure 25E:
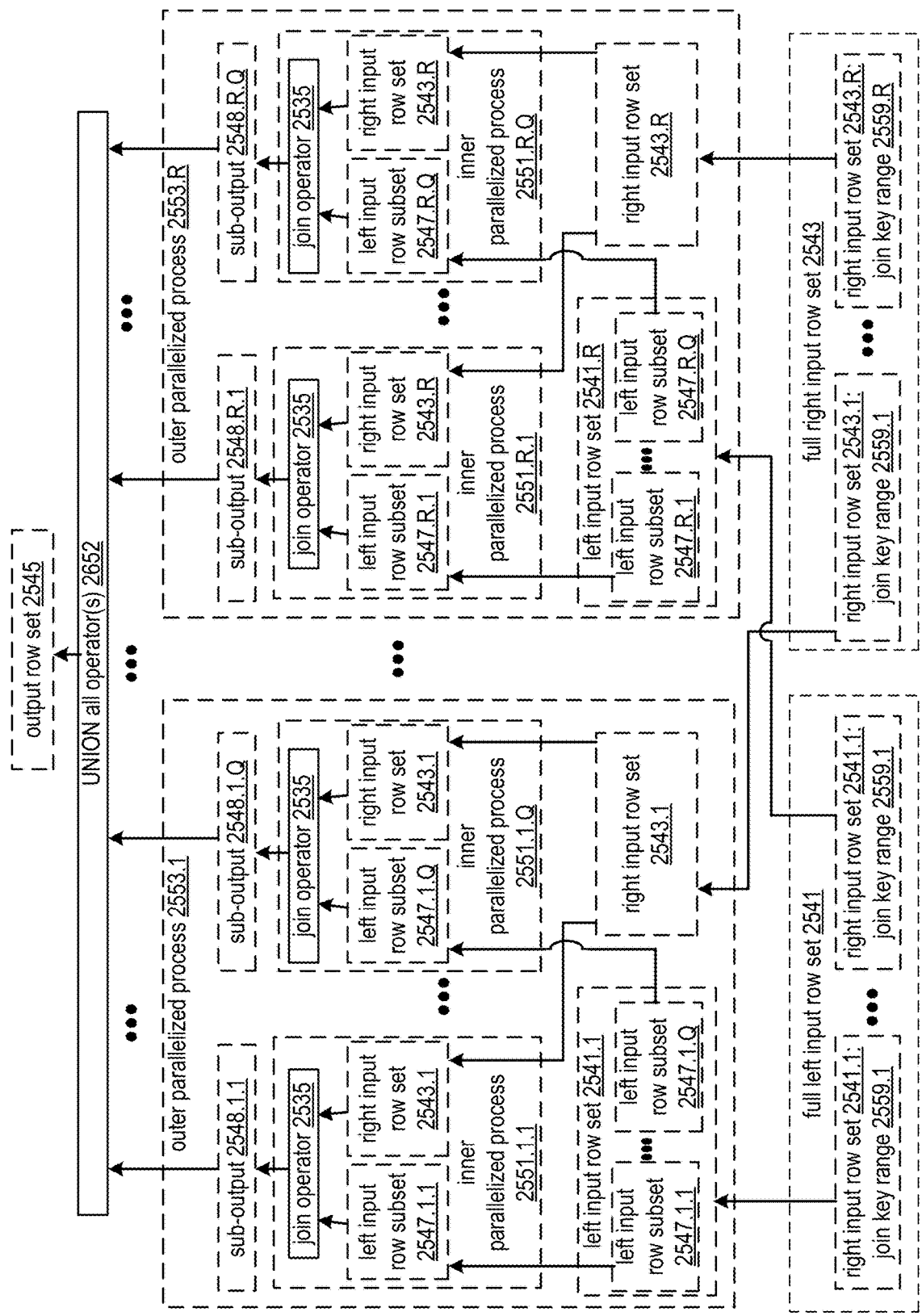

FIG. 25E illustrates an embodiment where the mechanisms of parallelization of both FIGS. 25C and 25D are combined to implement a join process. Some or all features and/or functionality of FIG. 25E can implement the join process 2530 of FIG. 25B. FIG. 25A, and/or any other embodiment of join process 2530 described herein.

The plurality of parallelized processes 2553.1-2553.R of FIG. 25D can be implemented as a plurality of outer parallelized processes, each performing its own set of inner parallelized processes implemented via the parallelized processes 2551.1-2551.Q of FIG. 25C. The number Q of inner parallelized processes 2551 implemented via a given outer parallelized process 2553 can be the same or different for different outer parallelized processes 2553.

The plurality of outer parallelized processes 2553.1-2553.R and/or the plurality of inner parallelized processes 2551.1-2551.Q across all of the plurality of outer parallelized processes s2553.1-2553.R can implement the plurality of parallel processes 2550.1-2550.L of FIG. 25B, where a given process 2553 and/or 2551 of FIG. 25E implements some or all of a given process 2550 of FIG. 25B. Alternatively or in addition, a given plurality of parallelized processes 2553.1-2553.R can be a plurality of inner, sub-processes of a given parallelized process 2550, where some or all of the plurality of parallel processes 2550.1-2550.L implement their own plurality of inner parallelized sub-processes 2553.1-2553.R, which each in turn implement their own plurality of parallelized processes 2551.1-2551.Q.

This embodiment can be preferred in reducing the size of hash map 2555 stored via each parallelized instance by leveraging partitioning via join key range, while further parallelization of the left input set of a given join key range further improves performance of implementing the join process for a given join key range 2559. Other embodiments only implement one of the forms of parallelization, or neither, in performing join processes 2530.

Figure 25F:
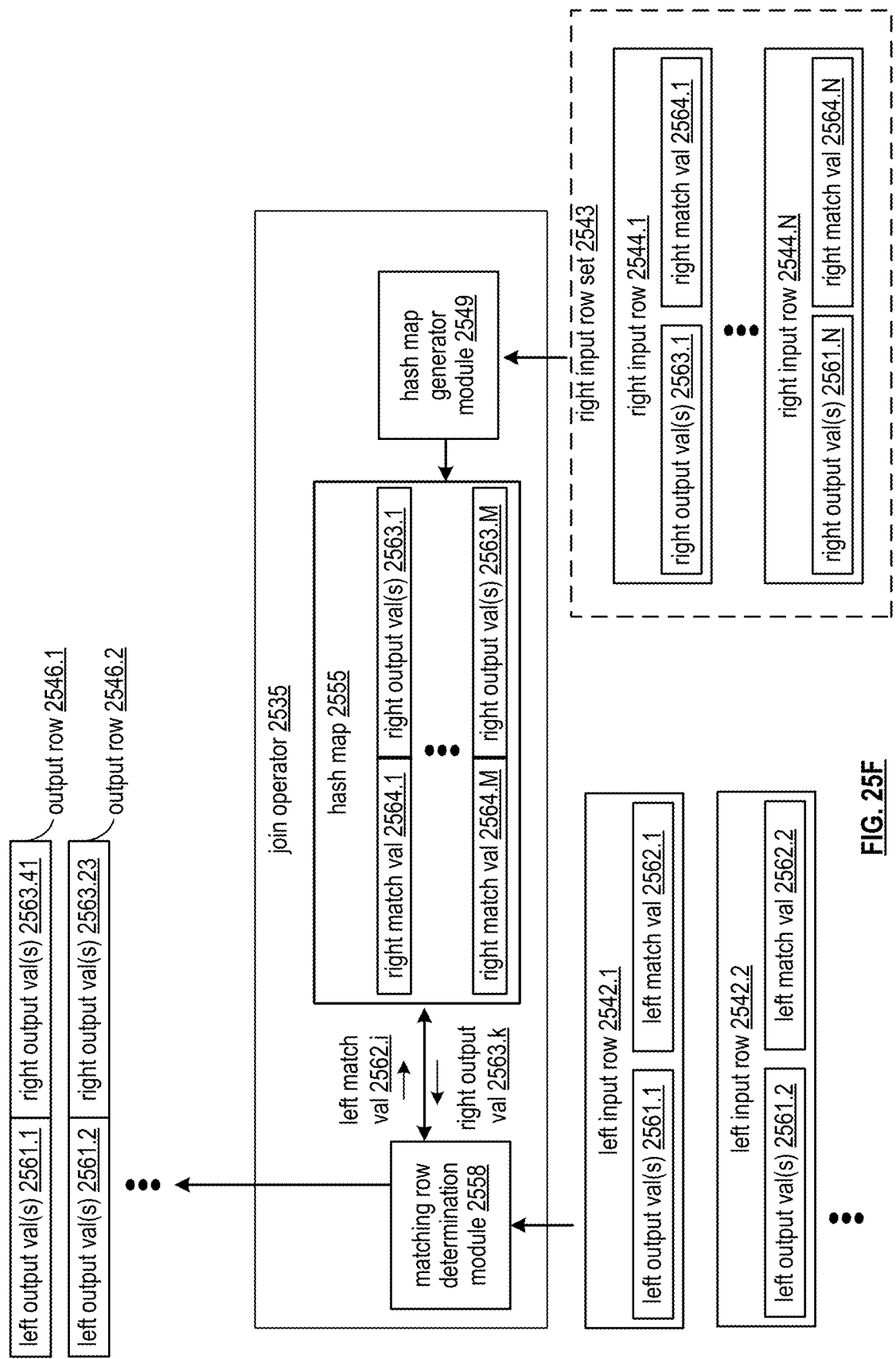
FIG. 25F is a schematic block diagram of a query execution module executing a join operator based on utilizing a hasp map generated from right input rows in accordance with various embodiments.

FIG. 25F illustrates an embodiment of a query execution module 2504 executing a join operator 2535. The embodiment of implementing the join operator 2535 of FIG. 25F can be utilized to implement the join process 2530 of FIG. 25A and/or can be utilized to implement the join operator 2535 executed via each of a set of parallelized processes 2550 of FIG. 25B, and/or via each of a set of parallelized processes 2551 and/or 2553 of FIG. 25D. 25D, and/or 25E.

The join operator can process all right input rows 2544.1-2544.N of a right input row set 2543, and can process some or all left input rows 2542, such as only left input rows of a corresponding left input row subset 2547. The right input rows 2544 and/or left input rows can be received as one or more streams of data blocks.

A plurality of left input rows 2542 can have a respective plurality of columns each having its own column value. One or more of these column values can be implemented as left output values 2561, designated for output in output rows 2546, where these left output values 2561, if outputted, are padded with nulls or combined with corresponding right rows when matching condition 2519 is met. One or more of these column values can be implemented as left match values 2562, designated for use in determining whether the given row matches with one or more right input rows. The left match values 2562 can implement the join keys discussed previously that are optionally utilized to partition incoming rows into distinct parallelized portions for processing as discussed in conjunction with FIGS. 25D and 25E. These left match values 2562 can be distinct columns from the columns that include left output values 2561, where these columns are utilized to identify matches only as required by the matching condition 2519, but are not to be emitted as output in output rows 2546. Alternatively, some or all of these left match values 2562 can same columns as one or more columns that include left output values 2561, where these columns are utilized to not only identify matches as required by the matching condition 2519, but are further emitted as output in output rows 2546.

In some cases, the left input rows 2542 utilize a single column whose values implement both the left output values 2561 and the left match values 2562. In other cases, the left input rows 2542 can utilize multiple columns, where a first subset of these columns implement one or more left output values 2561, where a second subset of these columns implement one or more left match values 2562, and where the first subset and the second subset are optionally equivalent, optionally have a non-null intersection and/or a non-null difference, and/or optionally are mutually exclusive. Different columns of the left input rows can optionally be received and processed in different column streams, for example, via a distinct set of processes operating in parallel with or without coordination.

Similarly to the left input rows, the plurality of right input rows 2544 can have a respective plurality of columns each having its own column value. One or more of these column values can be implemented as right output values 2563, designated for output in output rows 2546, where these left output values 2561, if outputted, are padded with nulls or combined with corresponding left rows when matching condition 2519 is met. One or more of these column values can be implemented as left match values 2564, designated for use in determining whether the given row matches with one or more left input rows. The right match values 2564 can implement the join keys discussed previously that are optionally utilized to partition incoming rows into distinct parallelized portions for processing as discussed in conjunction with FIGS. 25D and 25E. These right match values 2564 can be distinct columns from the columns that include right output values 2563, where these columns are utilized to identify matches only as required by the matching condition 2519, but are not to be emitted as output in output rows 2546. Alternatively, some or all of these right match values 2564 can be implemented via same columns as one or more columns that include left output values 2561, where these columns are utilized to not only identify matches as required by the matching condition 2519, but are further emitted as output in output rows 2546.

In some cases, the right input rows 2544 utilize a single column whose values implement both the left output values 2561 and the left match values 2564. In other cases, the right input rows 2544 can utilize multiple columns, where a first subset of these columns implement one or more right output values 2563, where a second subset of these columns implement one or more right match values 2564, and where the first subset and the second subset are optionally equivalent, optionally have a non-null intersection and/or a non-null difference, and/or optionally are mutually exclusive. Different columns of the right input rows can optionally be received and processed in different column streams, for example, via a distinct set of processes operating in parallel with or without coordination.

Some or all of the set of columns of the left input rows can be the same as or distinct from some or all of the set of columns of the right input rows. For example, the left input rows and right input rows come from different tables, and include different columns of different tables. As another example, the left input rows and right input rows come from different tables each having a column with shared information, such as a particular type of data relating the different tables, where this column in a first table from which the left input rows are retrieved is used as the left match value 2562, and where this column in a second table from which the right input rows are retrieved is used as the right match value 2564. As another example, the left input rows and right input rows come from a same table, for example, where the left input row set 2541 and right input row set 2543 are optionally equivalent sets of rows upon which a self-join is performed.

The join operator 2535 can utilize a hash map 2555 generated from the right input row set 2543, mapping right match values 2564 to respective right output values 2563. For example, the raw right match values 2564 and/or other values generated from, hashed from, and/or determined based on the raw right match values 2564, are stored as keys of the hash map. In the case where the right match value 2564 for a given right input row includes multiple values of multiple columns, the key can optionally be generated from and/or can otherwise denote the given set of values.

These keys can be implemented as, and/or can be generated as a deterministic function of such as a hash function of, join keys of incoming rows that utilized to identify whether the join's matching condition is satisfied. The join keys stored in a given hash map can correspond to join keys of a plurality of possible keys for the join, and/or only the join keys in the join key range 2559 that this hash map is generated for, where the given input row set 2541 utilized to generate the hash map 2555 is one of a plurality of distinct input row sets 2541.1-2541.R for a respective join key range 2559 of the plurality of distinct join key ranges 2559.1-2559.R.

The right match values 2564 in entries the hash map 2555 as corresponding keys of the hash map 2555 can each denote respective right output values 2563, for example, based on being mapped to row numbers and/or pointers to the respective row for the respective right output values 2563. Rather than the hash map storing the raw right output values 2563 themselves in its entries, these values can be denoted as row numbers and/or pointers mapped to a given key (e.g., given right match value 2564), denoting the storage location of the respective one or more right output values 2563 of a respective row, such as its ordering in a list of rows, an offset and/or other location information for this respective row in a corresponding column stream stored in query execution memory resources.

In some embodiments, the join operator 2535 be implemented as a hash join, and/or the join operator 2535 can utilize the hash map 2555 generated from the right input row set 2543 based on being implemented as a hash join.

The number of entries M of the hash map 2555 is optionally strictly less than the number of right input rows N based on one or more right input rows 2544 having a same right match value 2564 and/or otherwise mapping to the same key generated from their right match values. These right match values 2564 can thus be mapped to multiple corresponding right output values 2563 of multiple corresponding right input rows 2544. The number of entries M of the hash map 2555 is optionally equal to N in other cases based on no pairs of right input rows 2544 sharing a same right match value 2564 and/or otherwise not mapping to the same key generated from their right match values.

The join operator 2535 can generate this hash map 2555 from the right input row set 2543 via a hash map generator module 2549. Alternatively, the join operator can receive this hash map and/or access this hash map in memory. In embodiments where multiple parallelized processes 2550 are employed, each parallelized processes 2550 optionally generates its own hash map 2555 from the full set of right input rows 2544 of right input row set 2543. Alternatively, as the hash map 2555 is equivalent for all parallelized processes 2550, the hash map 2555 is generated once, and is then sent to all parallelized processes and/or is then stored in memory accessible by all parallelized processes.

The join operator 2535 can implement a matching row determination module 2558 to utilize this hash map 2555 to determine whether a given left input row 2542 matches with a given right input row 2543 as defined by matching condition 2519. For example, the matching condition 2519 requires equality of the column that includes left match values 2562 with the column that includes right match values 2564, or indicates another required relation between one or more columns that includes one or more corresponding left match values 2562 with one or more columns that include one or more right match values 2564. For a given incoming left input row 2542.i, the matching row determination module 2558 can access hash map 2555 to determine whether this given left input row's left match value 2562 matches with any of the right match values 2564, for example, based on the left match value being equal to and/or hashing to a given key and/or otherwise being determined to match with this key as required by matching condition 2519. In the case where a match is identified as a right input row 2544.k, the right output value 2563 is retrieved and/or otherwise determined based on the hash map 2555, and the respective output row 2546 is generated to include the new row generated to include both the one or more left output values 2561.i of the left input row 2542.i, as well as the right output values 2563.k of the identified matching right input row 2544.k.

In this example, a first output value includes left output value 2561.1 and right output value 2563.41 based on the left match value 2562.1 of left input row 2542.1 being determined to be equal to, or otherwise match with as defined by the matching condition 2519, the right match value 2564.41 of the right input row 2542.41. Similarly, a second output value includes left output value 2561.2 and right output value 2563.23 based on the left match value 2562.2 of left input row 2542.2 being determined to be equal to, or otherwise match with as defined by the matching condition 2519, the right match value 2564.23 of the right input row 2542.23.

While not illustrated, in some cases, one or left match values 2562 of one or more left input rows 2542 are determined match with no right match values 2564 of any right input rows 2544, for example, based on matching row determination module 2558 searching the hash map for these raw and/or processed left match values 2562 and determining no key is included in the hash map, or otherwise determining no right match value 2564 is equal to, or otherwise matches with as defined by the matching condition 2519, the given left match value 2562. The respective left output values of these left input rows 2542 can be padded with null values in output rows 2546, for example, in the case where the join type is a full outer join or a left outer join. Alternatively, the respective left output values of these left input rows 2542 are not emitted in respective output rows 2546, for example, in the case where the join type is an inner join or a right outer join.

While not illustrated, in some cases, one or left match values 2562 of one or more left input rows 2542 are determined match with right match values 2564 of multiple right input rows 2544, for example, based on matching row determination module 2558 searching the hash map for these raw and/or processed left match values 2562 and determining a key is included in the hash map 2555 that maps to multiple right output values 2563 of multiple right input rows 2544. The respective left output values of these left input rows 2542 can be emitted in multiple corresponding output rows 2546, where each of these multiple corresponding output rows 2546 includes the right output values 2563 of a given one of the multiple right input rows 2544. For example, if the left match values 2562 of a given left input rows 2542 matches with right match values 2564 of three right input rows 2544, the left match values 2562 is emitted in three output rows 2546, each including the respective one or more right output values of a given one of the three right input rows 2544.

While not illustrated, in some cases, after processing the left input rows, one or more or right match values 2562 of one or more right input rows 2544 are determined not to have matched with any left match values 2562 of any of the received left input rows 2542, for example, based on matching row determination module 2558 never accessing these entries having these keys in the hash map when identifying matches for the left input rows. For example, execution of the join operator 2535 implementing a full outer join or a right join includes tracking the right input rows 2544 having matches, and all other remaining rows of the hash map are determined to not have had matches, and thus never had their output values 2563 emitted. In the case of a full outer join or a right join, the output values 2563 of these remaining, unmatched rows can be emitted as output rows 2546 padded with null values.

FIGS. 26A-26E illustrate embodiments of a database system 10 operable to execute queries indicating join expressions and row output maximum limits based on executing limit-adapted join processes to generate limit-based output row sets. Some or all features and/or functionality of FIGS. 26A-26E can be utilized to implement the join processes of FIGS. 25A-25F and/or can be utilized to implement database system 10 of FIGS. 24A-24N when executing queries indicating join expressions. Some or all features and/or functionality of FIGS. 26A-26E can be utilized to implement any embodiment of the database system 10 described herein.

Hash joins, such as execution of join operators 2535 utilizing hash map 2555, can require that the right hand side, such as the right input row set 2543, must EOF or otherwise all be received before the join operator emits any output rows. For example, as the join requires emitting values matching left input rows using the hash map, the building of the hash map 2555 must be complete to guarantee all respective matches for a given left input row are identified and reflected in respective output. This induced limitation by nature of implementing a hash join can create a bottleneck in query execution and/or can render the corresponding join operator as not pipelining well.

Some queries processed by database system 10 can be implemented as limit queries and/or can otherwise impose a maximum limit on the number of output rows that are emitted. Once this maximum limit number of output rows is reached, the query can terminate.

Without adapting a join process based on such a limit, for such limit queries involving a join, such as a SQL query expression that includes "SELECT*FROM massiveTableA INNER JOIN massiveTableB ON . . . LIMIT 10" where a massiveTableA and massiveTableB are thus implemented as left input row set 2541 and right input row set 2543, lot of "extra" work can be required (e.g., building a hash map 2555 for all of massiveTableB) to ultimately output a tiny number of rows.

When a limit is implemented, for example, with a small limit value that is lower than a threshold limit value and/or smaller than a threshold percentage of the known and/or expected number of rows in the right input row set and/or the left input row set, a transformation can be applied to split a corresponding join into two separate joins that together will produce the same results as the original join. One join can be implemented to do significantly less work than the original join and can be expected to therefore output results much quicker, hopefully triggering the top limit quickly and allowing the query to finish. This processing of query expression by implementing a limit-adapted join process as presented in conjunction with FIGS. 26A-26E can improve the technology of database systems by improving efficiency of query executions that require performance of query expressions that include join expressions and impose an output maximum row limit.

FIG. 26A illustrates an embodiment of executing a query that indicates performance of a join expression 2516 and further indicates an output row maximum limit 2711, having a value of Y in this example. The performance of the join expression 2516 can include executing a limit-adapted join process 2730 via one or more join operators 2535. Some or all features and/or functionality of the implementation of the limit-adapted join process 2730 of FIG. 26A can be utilized to implement the join operator 2535 of FIG. 25C, and/or to implement any other embodiment of join operator 2535 and/or join process 2530 described herein.

The query operator execution flow 2517 can indicate performance of a limit-adapted join process 2730, which can be adapted from any embodiment of join process 2530 described herein. The output of the limit-adapted join process 2730 can be processed by a limit operator 2710.

Executing the query operator execution flow 2517 can include performing the limit-adapted join process 2730 via execution of one or more join operators 2535. The output rows 2546 emitted by the limit-adapted join process 2730 can be processed by limit operator 2710, which can emit these output rows 2546 accordingly until the output row max limit 2711 is reached, or until all output rows are generated and emitted by the limit-adapted join process 2730. For example, the limit operator 2710 emits a limit-based output row set 2745, which can be guaranteed to include less than or equal to Y rows. The limit-based output row set 2745 only includes less than Y rows when full execution of the limit-adapted join process 2730 emits less than Y rows, or when additional operators such as subsequent filtering limits the output rows to less than Y rows. Once the limit operator 2710 emits Y rows, no further rows are emitted, and/or the query execution can automatically terminate, even if limit-adapted join process 2730 has not finished processing and/or outputting all rows.

Figure 26B:
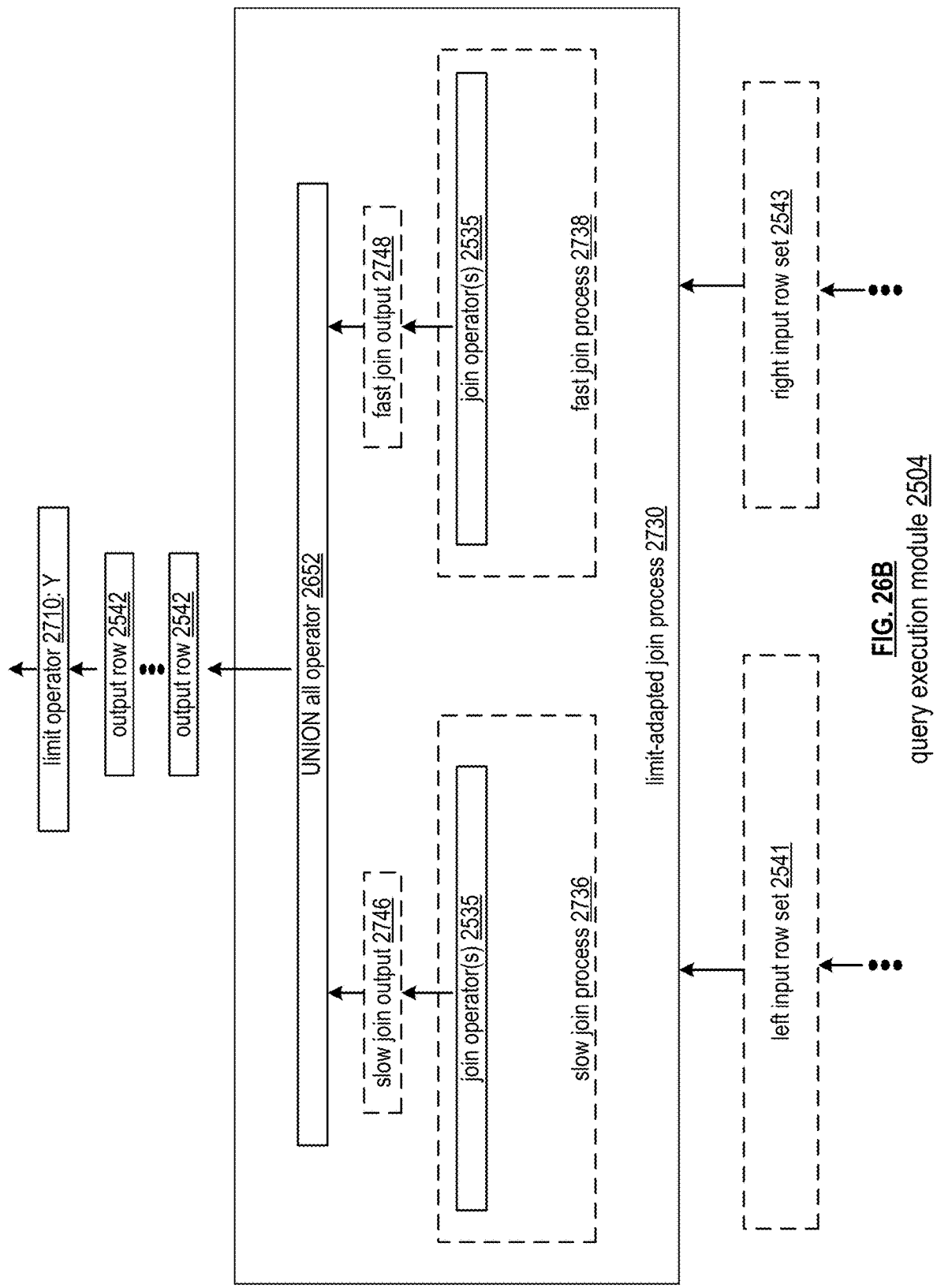
FIG. 26B is a schematic block diagram of a query execution module executing a limit-adapted join process that includes a slow join process executed in parallel with a fast join process in accordance with various embodiments.

FIG. 26B illustrates an embodiment of a limit-adapted join process 2730 that implements a corresponding join operation via a slow join process 2736 and a fast join process 2738 that each implement at least one join operator 2535. Some or all features and/or functionality of the limit-adapted join process 2730 can be utilized to implement the limit-adapted join process 2730 of FIG. 26A, any other embodiment of the limit-adapted join process described herein, and/or any embodiment of join process 2530 and/or join operator 2535 described herein. Slow join process 2736 and/or fast join process 2738 can be implemented via any features and/or functionality of a join process 2530 and/or of execution of one or more join operators 2535 described herein.

The fast join process can be implemented to emit some or all of its output rows of fast join output 2748 output more quickly than the slow join process emits output rows of its slow join output 2746. A UNION all operator 2652 can be applied to the slow join output 2746 and the fast join output 2748 to emit the corresponding output of the join process. In other embodiments, more than two join processes are implemented, for example, configured to generate output at three or more different respective speeds.

In particular, the slow join process 2736 and fast join process 2738 can be configured such that the union of the respective fast join output and the slow join output, if completed, is equivalent to that of a corresponding join process being implemented, despite the given join process being split into two processes. The union of the output of slow join process 2736 and fast join process 2738 can otherwise be configured and/or guaranteed to be semantically equivalent to the join expression 2516 of the given query.

In some embodiments, the slow join process 2736 is implemented via a first set of processing resources and the fast join process 2738 is implemented via a second set of processing resources distinct from the first set of processing resources. For example, the slow join process 2736 is implemented via a first set of one or more nodes 37 and/or a first set of parallel processes 2550, and the fast join process 2738 is implemented via a second set of one or more nodes 37 and/or a second set of parallel processes 2550, where the first set of one or more nodes 37 and second set of one or more nodes 37 are mutually exclusive, or where the first set of parallel processes 2550 and second set of parallel processes 2550 are mutually exclusive. Alternatively, some or all of the slow join process 2736 and the fast join process 2738 is implemented via shared resources, such as a same one or more nodes 37 and/or a same one or more parallelized processes 2550.

In some embodiments, the limit-adapted join process 2730 of FIG. 26B implements a given join operator 2535 executed via a given parallelized process 2550 and/or executed via a given node 37. For example, a given parallelized process 2550 implements the slow join process 2736, the fast join process 2738, and/or the UNION all operator 2652 upon its respective input, where the emitted output rows across multiple parallelized processes 2550 each implementing this limit-adapted join process for their respective input undergo a further UNION all operator 2652 as discussed in conjunction with FIG. 26B.

In some embodiments, placing the fast join process on the right hand side of the UNION all can be favorable based on a scheduler implemented by the query execution module 2504 generally avoid running operators for the "slow join" until the "fast join" finishes.

FIG. 26C illustrates an example embodiment of executing a limit-adapted join process of FIG. 26B where the limit operator 2710 emits limit-based output row set 2745 to include output emitted by only the fast join process 2738. Some or all features and/or functionality of the limit-adapted join process 2730 of FIG. 26C can be utilized to implement any other embodiment of the limit-adapted join process 2730, join process 2530, and/or join operator 2535 described herein.

In this example, the fast join process 2738 generates and emits at least Y output rows 2546 of the fast join output 2748 in a stream of data blocks before slow join process 2736 emits any output rows of slow join output 2746. Upon emitting the first Y output rows it receives 2542.1-2542. Y by the limit operator 2710 at a time ti after some time to that the limit-adapted join process 2730 was initiated, completion of the query is triggered, where all output rows of the limit-based output row set 2745 were emitted by the fast join process. This example illustrates how the query can be completed faster than if no limit-adapted join process 2730 were implemented, particular where performing a corresponding single join process would be as slow as, or slower than, the slow join process 2736.

In other cases, at least some of the limit-based output row set 2745 includes output rows of slow join output 2746, for example, based on the slow join process 2736 ultimately beginning to emit rows before the limit Y is reached. In such cases, the limit-based output row set 2745 can include more rows from the fast join output than from the slow join output, such as substantially more rows from the fast join output, based on the fast join output beginning to emit its output slower than the slow join process.

Figure 26D:
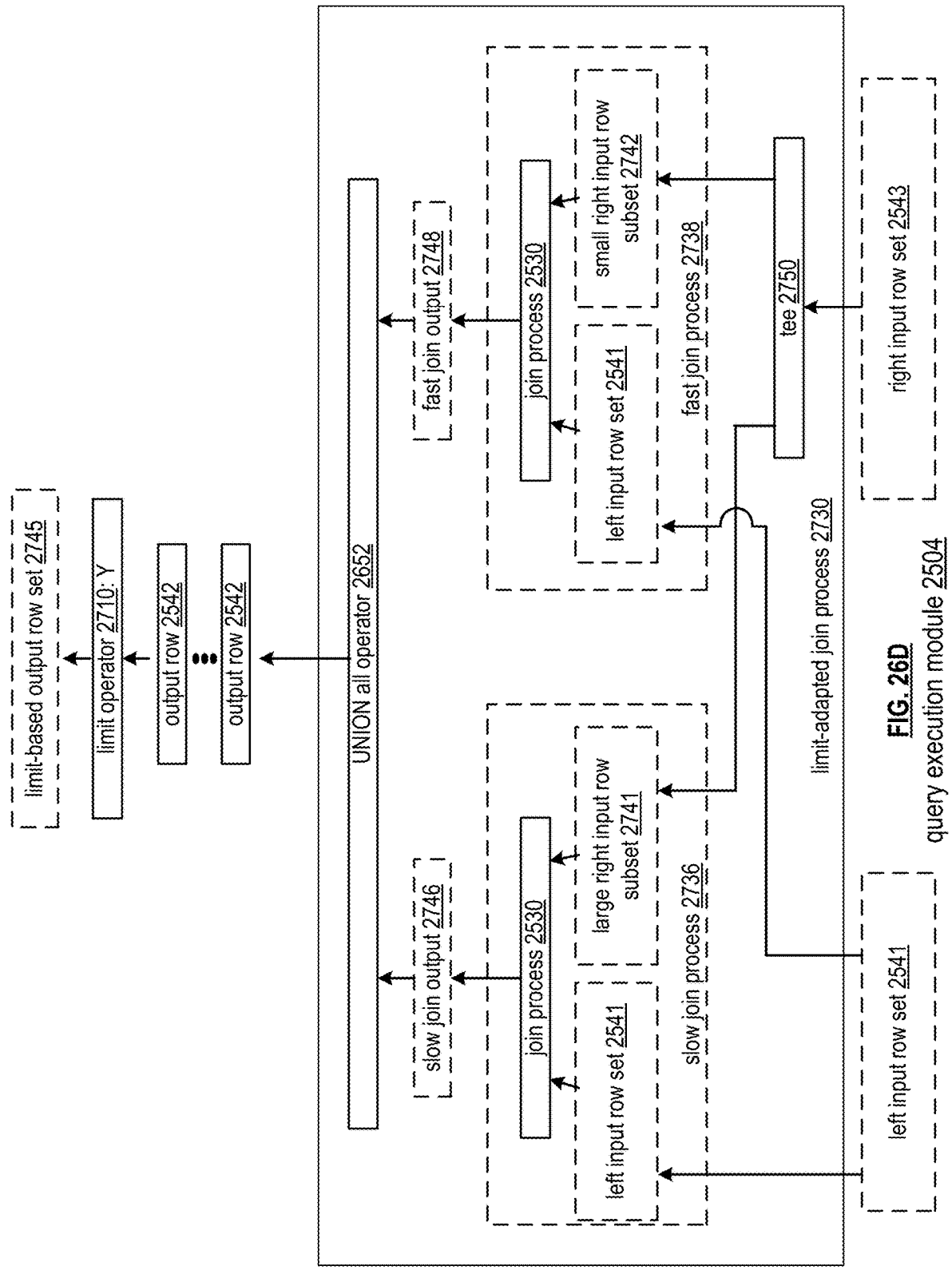
FIG. 26D is a schematic block diagram of a query execution module executing a limit-adapted join process that includes a slow join process performed upon a large right input row subset and a fast join process performed upon a small right input row subset in accordance with various embodiments.

FIG. 26D illustrates an example embodiment of implementing limit-adapted join process 2730. Some or all features and/or functionality of the limit-adapted join process 2730 of FIG. 26D can be utilized to implement the limit-adapted join process 2730 of FIG. 26B and/or any other embodiment of the limit-adapted join process 2730, join process 2530, and/or join operator 2535 described herein.

The limit-adapted join process 2730 can implement a tee 2750 to divide the right input row set 2543 into a small right input row subset 2742 and a large right input row subset 2741. The small right input row subset 2742 and the large right input row subset 2741 can be mutually exclusive and collectively exhaustive with respect to the right input row set 2543. A number and/or proportion of rows designated for the small right input row subset 2742 and a large right input row subset 2741 can be predetermined, selected as a function of Y, selected as a function of a known and/or expected size of the right input row set, selected as a function of a known and/or expected processing time for building a hash map 2555 from a given set of rows, and/or can be based on other factors. A number and/or proportion of rows designated for the small right input row subset 2742 and a large right input row subset 2741 can be the same or different for different queries and/or for different limit values.

The fast join process 2738 can perform its respective join process utilizing the small right input row subset 2742 and the full left input row set 2541. The slow join process 2736 can perform its respective join process utilizing the large right input row subset 2741 and this same full left input row set 2541. For example, the tee 2750 sends right input rows of large right input row subset 2741 for processing via the slow join process 2738, and/or the tee 2750 sends right input rows of small right input row subset 2742 for processing via the fast join process 2738. The left input row set 2541 can be sent for processing via both the slow join process 2738 and the fast join process 2738, for example, based on first being duplicated, for example, instead of utilizing a tee operator.

The fast join process 2738 can begin emitting output rows before the slow join process based on the small right input row subset 2742 including fewer rows than the large right input row subset 2741. For example, the fast join process 2738 can begin emitting output rows before the slow join process based on a first hash map 2555 being built from the small right input row subset 2742 being completed prior to a second hash map 2555 being built from the large right input row subset 2741, due to the small right input row subset 2742 including fewer rows than the large right input row subset 2741. In particular, fast join process 2738 can begin emitting output rows only once the building of the first hash map 2555 from the small right input row subset 2742 is completed, which can occur at a time before completion of building of the second hash map 2555 from the large right input row subset 2741, where the slow join process 2736 only begins emitting output rows once the building of this second hash map 2555 is completed, and thus begins emitting output rows after the fast join process 2738 begins emitting output rows.

In some embodiments, if the left input row set 2541 is non-deterministic, such as including an unknown number of rows, the operator flow generator module 2514 does not denote use of this limit-adapted join process 2730, and optionally instead denotes use of a single corresponding join process 2530.

Figure 26E:
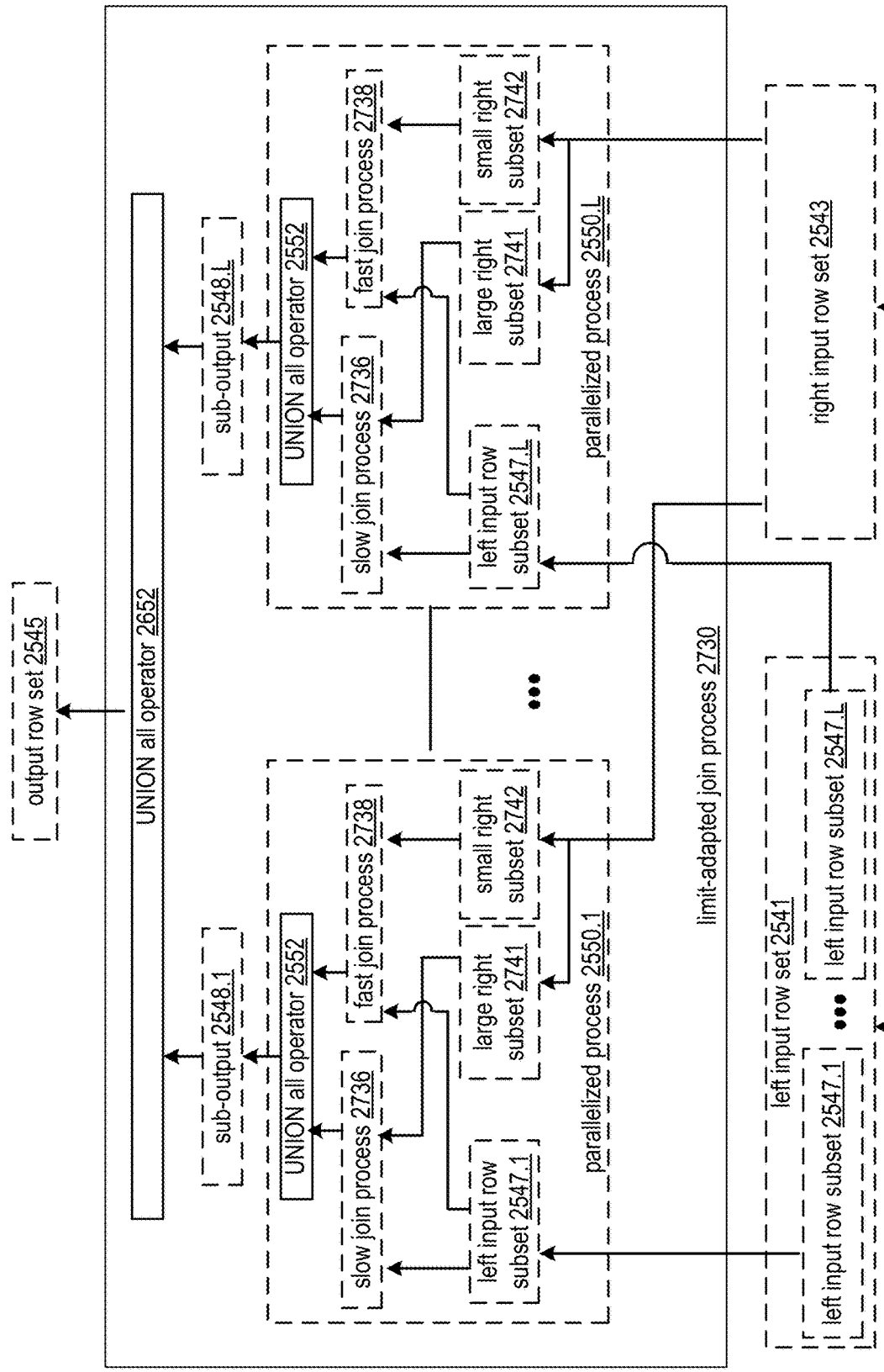
FIG. 26E is a schematic block diagram of a query execution module executing a limit-adapted join process via a plurality of parallelized processes in accordance with various embodiments.

FIG. 26E illustrates an embodiment where the limit-adapted join process 2730 is implemented via a plurality of parallelized processes 2550.1-2550.L. Some or all of the features and/or functionality of the parallelized processes 2550.1-2550.L of FIG. 26E can implement the parallelized processes 2550.1-2550.L of FIG. 25B. Some or all features and/or functionality of the limit-adapted join process 2730 of FIGS. 26B-26D can be implemented via a corresponding parallelized processes 2550, for example, utilizing its given left input row subset 2547 as discussed previously.

In other embodiments, rather than each parallelized processes 2550 implementing both the fast join process 2738 and the slow join process 2736 themselves, a first subset of the set of parallelized processes 2550 collectively implement the slow join process 2736 by each processing only the large right input row set 2741, and a second subset of the set of parallelized processes 2550 collectively implement the fast join process 2738 by each processing only the small right input row set 2742. The first subset of the set of parallelized processes can be configured to be larger than, smaller than, similar in size to, and or a same size as the second subset of the set of parallelized processes, for example, where relative sizes are configured to further optimize processing time of the query. Left input row subsets designated for parallel processes of the first subset of the set of parallelized processes can be configured to be larger than, smaller than, similar in size to, and or a same size as other left input row subsets designated for the second subset of the set of parallelized processes, for example, where relative sizes are configured to further optimize processing time of the query.

Figure 26F:
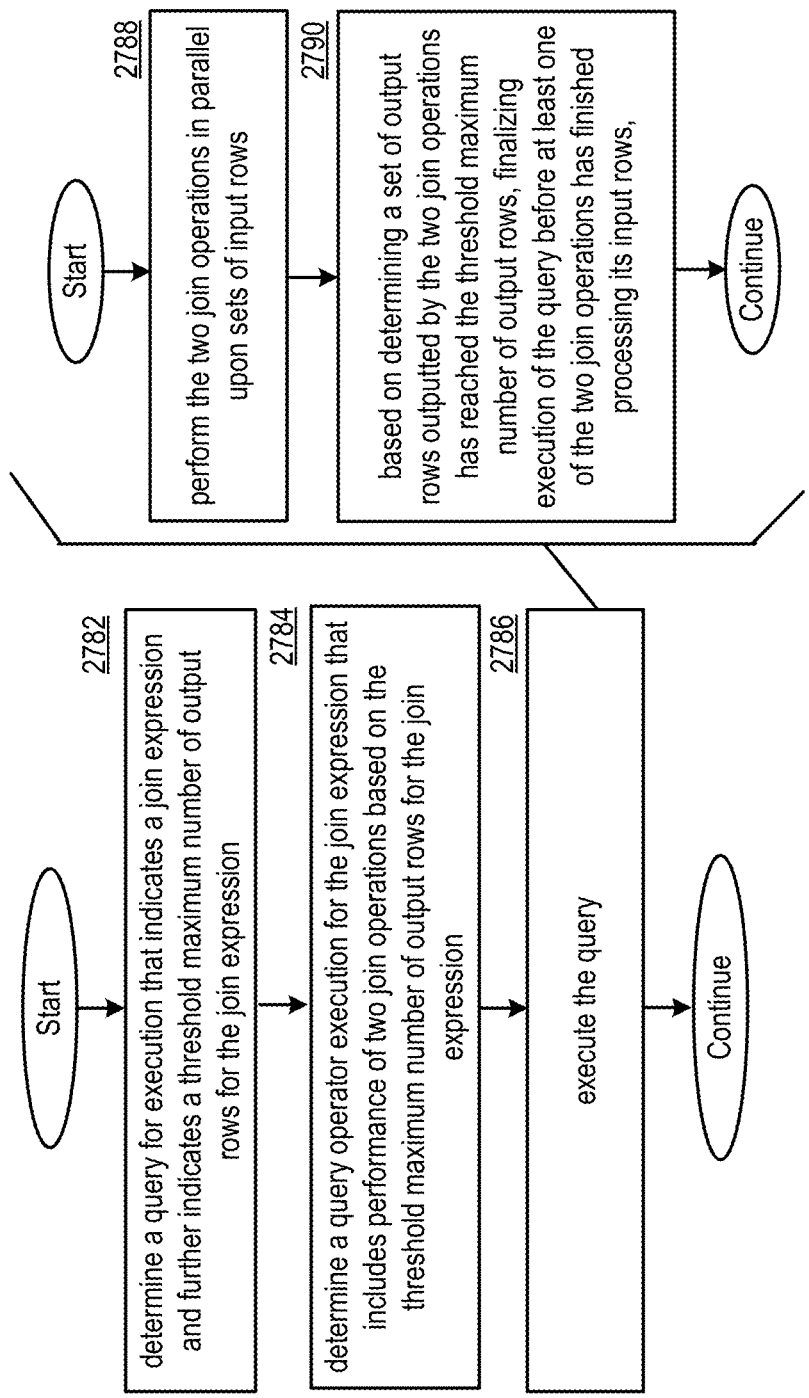
FIG. 26F is a logic diagram illustrating a method for execution in accordance with various embodiments.

FIG. 26F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26F. In particular, a node 37 can utilize the query processing module 2435 to execute some or all of the steps of FIG. 26F, where multiple nodes 37 implement their own query processing modules 2435 to independently execute the steps of FIG. 26F, for example, to facilitate execution of a query as participants in a query execution plan 2405. Some or all of the method of FIG. 26F can be performed by the query processing system 2510, for example, by utilizing an operator flow generator module 2514 and/or a query execution module 2504. In particular, some or all of the method of FIG. 26F can be performed via one or more operator executions of one or more limit operators 2710 and/or one or more join operators 2535 of at least one join process 2530, such as a limit-adapted join process 2730 and/or a fast join process 2738 and a slow join process 2736. Some or all of the steps of FIG. 26F can optionally be performed by any other processing module of the database system 10. Some or all of the steps of FIG. 26F can be performed to implement some or all of the functionality of the database system 10 as described in conjunction with FIGS. 25A-26E, for example, by implementing some or all of the functionality of the query processing system 2510 as described in conjunction with FIGS. 25A-25E. Some or all of the steps of FIG. 26F can be performed to implement some or all of the functionality regarding execution of a query via the plurality of nodes in the query execution plan 2405 as described in conjunction with some or all of FIGS. 24A-24I. Some or all steps of FIG. 26F can be performed by database system 10 in accordance with other embodiments of the database system 10 and/or nodes 37 discussed herein. Some or all steps of FIG. 26F can be performed in conjunction with one or more steps of FIG. 26G, and/or of any other method described herein.

Step 2782 includes determining a query for execution that indicates a join expression and further indicates a threshold maximum number of output rows, such as an output row max limit 2711, for the join expression. Step 2784 includes determining a query operator execution for the join expression that includes performance of two join operations based on the threshold maximum number of output rows for the join expression. Step 2786 includes executing the query.

Performing step 2786 can include performing one or more of steps 2788 and/or 2790. Step 2788 includes performing the two join operations in parallel upon sets of input rows. Step 2790 includes finalizing execution of the query before at least one of the two join operations has finished processing its input rows, for example, based on determining a set of output rows outputted by the two join operations has reached the threshold maximum number of output rows.

In various examples, finalizing execution of the query includes outputting a query resultant that includes the determined set of output rows.

In various examples, a second one of the two join operations is configured to emit output rows faster than a first one of the two join operations, and/or where all of the set of output rows are outputted by the second one of the two join operations based on the first one of the two join operations not yet outputting any rows when the execution of the query is finalized.

In various examples, the method includes sending all of a plurality of left input rows for the join expression to both of the two join operations for processing: sending a first proper subset of a plurality of right input rows of the join expression to the first one of the two join operations for processing in conjunction with all of the plurality of left input rows; and/or sending a second proper subset of the plurality of right input rows of the join expression to the second one of the two join operations for processing in conjunction with all of the plurality of left input rows. In various examples, the first proper subset and the second proper subset rows are mutually exclusive and collectively exhaustive with respect to the plurality of right input rows, and/or the second one of the two join operations is configured to emit output rows faster than the first one of the two join operations based on the first proper subset including a greater number of right input rows than the second proper subset. In various examples, a number of rows included in the second proper subset rows is based on the threshold maximum number of output rows indicated by the query.

In various examples, performance of the first one of the two join operations includes generating a first hash map from the first proper subset of the plurality of right input rows. In various examples, performance of the first one of the two join operations further includes, for each left input row of the plurality of left input rows processed by the first one of the two join operations: determining whether any of the first proper subset of the plurality of right input rows matches with the each left input row based on the first hash map. In various examples, when one of the first proper subset of the plurality of right input rows is identified as matching with the each left input row, the method can further include emitting a value of the one of the first proper subset of the plurality of right input rows in conjunction emitting the each left input row. In various examples, performance of the second one of the two join operations includes generating a second hash map from the second proper subset of the plurality of right input rows. In various examples, the method can further include, for each left input row of the plurality of left input rows processed by the second one of the two join operations, determining whether any of the second proper subset of the plurality of right input rows matches with the each left input row based on the second hash map; and/or, when one of the second proper subset of the plurality of right input rows is identified as matching with the each left input row, emitting a value of the one of the second proper subset of the plurality of right input rows in conjunction emitting the each left input row.

In various examples one node of a plurality of nodes of a query execution plan executes the join expression by performing both of the two join operations in parallel upon sets of input rows. In various examples, a same or different node of the plurality of nodes performs a limit operator to determine a set of output rows generated by performing the two join operations in parallel reaches the threshold maximum number of rows.

In various examples, a plurality of nodes of a query execution plan execute the query based on each performing at least one of the two join operations.

In various examples, a plurality of nodes of a query execution plan execute the query. In various examples, a first proper subset of the plurality of nodes perform the first one of the two join operations. In various examples, a second proper subset of the plurality of nodes perform the second one of the two join operations. In various examples, the first proper subset of the plurality of nodes and the second proper subset of the plurality of nodes are mutually exclusive. In various examples, the first proper subset of the plurality of nodes generate a first hash map for the first proper subset of the plurality of right input rows via a first shuffle operation amongst the first proper subset of the plurality of nodes. In various examples, the second proper subset of the plurality of nodes generate a second hash map for the second proper subset of the plurality of right input rows via a second shuffle operation amongst the second proper subset of the plurality of nodes.

In various examples, the threshold maximum number of output rows for the join expression is indicated by a limit expression for the join expression.

In various examples, the query operator execution flow for the join expression is generated to includes performance of two join operations based on determining a number of rows in a plurality of left input rows for the join expression is deterministic. In various examples, the method further includes determining a second query for execution that indicates a second join expression and further indicates another threshold maximum number of output rows for the second join expression; and/or determining a second query operator execution for the second join expression that includes performance of a single join operation instead of the two join operations based on the determining a number of rows in another plurality of left input rows for the second join expression is non-deterministic.

In various embodiments, any one of more of the various examples listed above are implemented in conjunction with performing some or all steps of FIG. 26F. In various embodiments, any set of the various examples listed above can implemented in tandem, for example, in conjunction with performing some or all steps of FIG. 26F.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 26F described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 26F, for example, in conjunction with further implementing any one or more of the various examples described above.

In various embodiments, the operational instructions, when executed by the at least one processor, cause the database system to: determine a query for execution that indicates a join expression and further indicates a threshold maximum number of output rows for the join expression: determining a query operator execution for the join expression that includes performance of two join operations based on the threshold maximum number of output rows for the join expression, where a union of output of the two join operations is semantically equivalent to an output of the join expression; and/or executing the query. The database system can execute the query based on: performing the two join operations in parallel upon sets of input rows; and/or finalizing execution of the query before at least one of the two join operations has finished processing its input rows based on determining a set of output rows outputted by the two join operations has reached the threshold maximum number of output rows.

FIGS. 27A-27H illustrate embodiments of a database system 10 operable to execute queries indicating join expressions and at least one other operation based on executing optimized join processes to generate output row sets. Some or all features and/or functionality of FIGS. 27A-27H can be utilized to implement the join processes of FIGS. 25A-25F, can be utilized to implement the limit-adapted join process of FIGS. 26A-26E, and/or can be utilized to implement database system 10 of FIGS. 24A-24N when executing queries indicating join expressions. Some or all features and/or functionality of FIGS. 27A-27H can be utilized to implement any embodiment of the database system 10 described herein.

As discussed in conjunction with FIGS. 26A-26E, a given join expression can be split into multiple, parallelizable steps that include separate join operations. This mechanism of splitting steps of a join into multiple join processes can result in optimizing the corresponding process, for example, when performing a limit-adapted join process based on the join being performed before a limit operation as discussed in conjunction with FIGS. 26A-26E. Alternatively or in addition, the mechanism of splitting steps of a join into multiple join processes can optimize query executions in other circumstances, even when under a limit operation. For example, this functionality can optimize execution of join operations in the case where the join is applied before an OFFSET operation, and/or other operation specifying a min or maximum number of rows to return, a number of rows to skip prior to returning rows, and/or other information denoting which rows satisfying the predicate be returned.

Additionally, as different types of joins can be applied, the optimization of a join expression can be different for different types of join, based on their respective differences in definition inducing different required functionality when producing output rows. In some embodiments, the query operator execution flow can select different types of flows to be applied depending on the join type of the given expression to optimize the performance of the join, for example, in the case where a limit is applied to the join and/or where an offset operation is applied to output of the join operation.

Figure 27A:
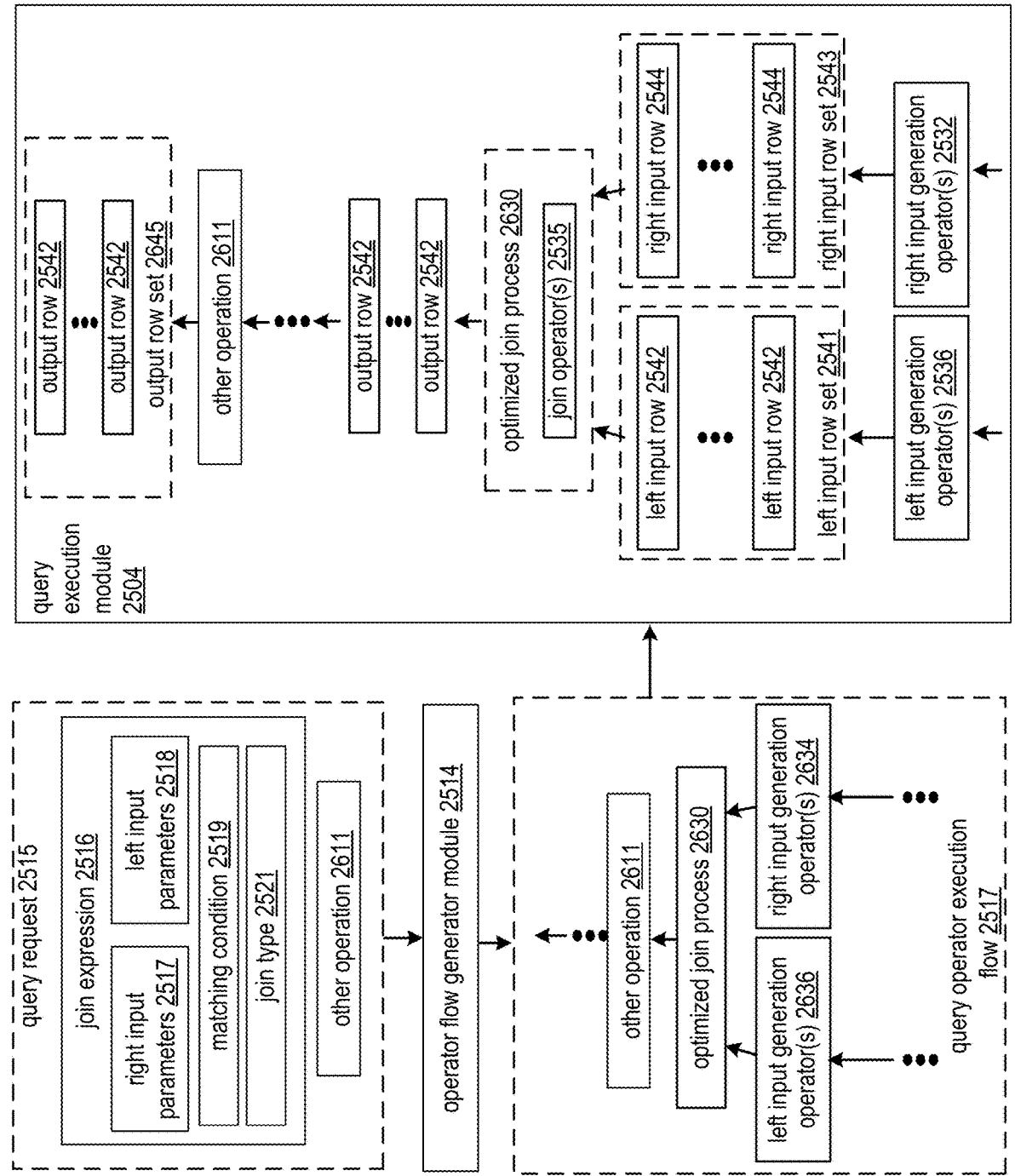
FIG. 27A is a schematic block diagram of a database system executing an optimized join process based on a join expression of a query request in accordance with various embodiments.

FIG. 27A illustrates an embodiment of executing a query that indicates performance of a join expression 2516 and further at least one other operation 2611 to be performed on corresponding output of the join expression. A corresponding optimized join process can be included in a query operator execution flow 2517 generated for the query, and this optimized join process 2630 can be executed via a query execution module 2504 in conjunction with executing the query. The output rows generated by the optimized join process can be applied as input to the other operation 2611. To generate an output row set. Some or all features and/or functionality of the implementation of optimized join process 2630 of FIG. 27A can be implemented via some or all features and/or functionality of the limit-adapted join process 2730 of FIG. 26A (e.g. where the other operation 2611 is a limit operator 2710 specifying the maximum number of rows Y and/or where the other operation 2611 is an offset operator specifying the number of rows Y as rows to be skipped), and/or via any other embodiment of join operator 2535 and/or join process 2530 described herein.

Figure 27B:
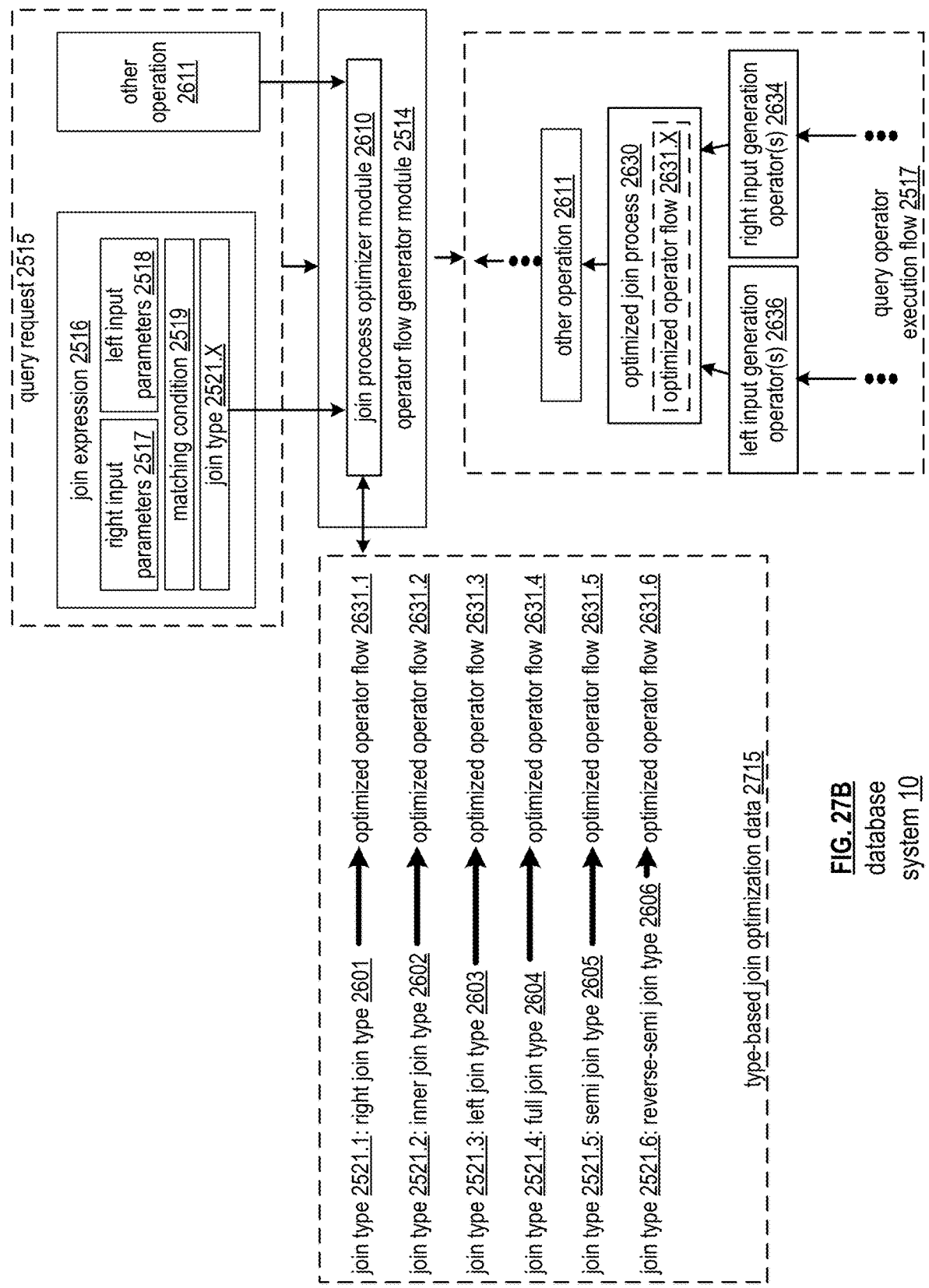
FIG. 27B is a schematic block diagram of an operator flow generator module that selects an optimized join process to be included in a query operator execution flow for execution based on a join type of a query request in accordance with various embodiments.

FIG. 27B illustrates an embodiment of an operator flow generator module that implements a join process optimizer module to select an optimized operator flow 2631 based on the join type 2521 of the join expression and/or based on the other operation (e.g., the optimized join process is configured based on the join type, and/or further based on the other operation being a limit of offset applied to the output).

Type-based join optimization data 2715 can include each of a plurality of optimized operator flows 2631 that be applied for each corresponding one of a plurality of join types, for example. The type-based join optimization data 2715 can be determined based on being received, being stored in memory resources, being automatically generated and/or learned over time, being configured via user input, for example, by a user requesting the query and/or an administrator of database system 10, and/or can otherwise be determined.

The type-based join optimization data 2715 can include different optimized operators flows 2631 for a set of join types that includes some or all of: a right join type 2601; an inner joint type 2602; a left join type 2603; a full join type 2604; a semi join type 2605; a reverse-semi join type 2606; and/or any other join type such as an outer join type, an anti-join type, and/or other join types described herein.

The operator flow generator module 2514 can configure the query operator execution flow 2517 to include a selected optimized operator flow 2631.X from a plurality of optimized operator flows 2631, for example, based on the given join type 25621.X. In particular, the optimized operator flow 2631.1 can be selected based on the join type 2521 in the query expression denoting the right join type 2601; the optimized operator flow 2631.2 can be selected based on the join type 2521 in the query expression denoting the inner join type 2602: etc. The selected operator flow 2631 can be implemented as some or all of the optimized join process 2630. The output of the selected operator flow 2631 can be semantically equivalent to the corresponding type of join as denoted in the join expression 2516, guaranteeing query correctness, while being likely and/or guaranteed to generate the correct output in a more optimal fashion (e.g., faster, with less memory resources, with less processing resources, etc.).

FIGS. 27C-27H illustrate example embodiments of optimized operator flows 2631 for different join types. Same and/or semantically equivalent optimized operator flows 2631 as the example optimized operator flows 2630 of FIGS. 27C-27H can be selected and executed via optimized join process 2630 in conjunction with executing a query expression of the given type.

The optimized operator flows 2631 can be implemented to generate output utilized as input to other operator 2611 in corresponding query operator execution flow 2517. The other operator 2611 can optionally be implemented as a limit operator denoting a maximum of N rows be emitted as depicted in the examples of FIGS. 27C-27H, where the 'Limit N' can be implemented as limit operator 2710, where N is the value of Y. In such cases, some or all features and/or functionality of the some or all optimized operator flows 2631 can implement embodiments of the limit-adapted join process 2730 of FIGS. 26A-26E, for example, when applying limits to corresponding types of joins. Other types of operators can implement the other operator 2611 in other embodiments.

Some or all of the parallelized joins of the optimized operator flows 2631 of FIGS. 27C-27H can be implemented as a set of outer parallelized processes 2553 and/or as a set of inner parallelized processes 2551. As a particular example, parallelized joins of a given optimized operator flows 2631 of FIGS. 27C-27H are implemented as a set of inner parallelized processes 2551, while the set of outer parallelized processes 2553 each implement their own parallelized portion of the optimized operator flows 2631 on the full right input row set 2543 and corresponding left input row subset 2547. Some or all of the two or more joins of the optimized operator flows 2631 of FIGS. 27C-27H can be implemented via at least one fast join process 2738 and at least one slow join process 2736. For example, other join processes discussed herein implemented via multiple join operators in series and/or in parallel can be implemented for a given join type via some or all features and/or functionality of an optimized operator flow 2631.

The 'RHS' of example optimized operator flows 2631 of FIGS. 27C-27H can be implemented as right input row set 2543. The 'LHS' of example optimized operator flows 2631 of FIGS. 27C-27H can be implemented as left input row set 2541, and/or a corresponding one of the plurality of left input row subsets 2547.1-2547.L. The 'UNION all' of example optimized operator flows 2631 of FIGS. 27C-27H can be implemented as UNION all operator 2652. The 'Tee' of example optimized operator flows 2631 of FIGS. 27C-27H can be implemented as Tee operator 2750. The 'Limit X' of example optimized operator flows 2631 of FIGS. 27C-27H can be implemented to generate a small right subset 2742 having X rows of the of the right input row set 2543 (e.g., the first X rows of the right input row set 2543 received, where X denotes the small number), and/or the 'Offset X' of example optimized operator flows 2631 of FIGS. 27C-27H can be implemented to generate a large right subset 2741 having the remaining rows of the right input row set 2543 (e.g., all rows of the of the right input row set 2543 after the first X rows received). Any embodiment of a 'JOIN' can be implemented via a join operator 2535 and/or join process 2535 of the corresponding type.

Figure 27C:
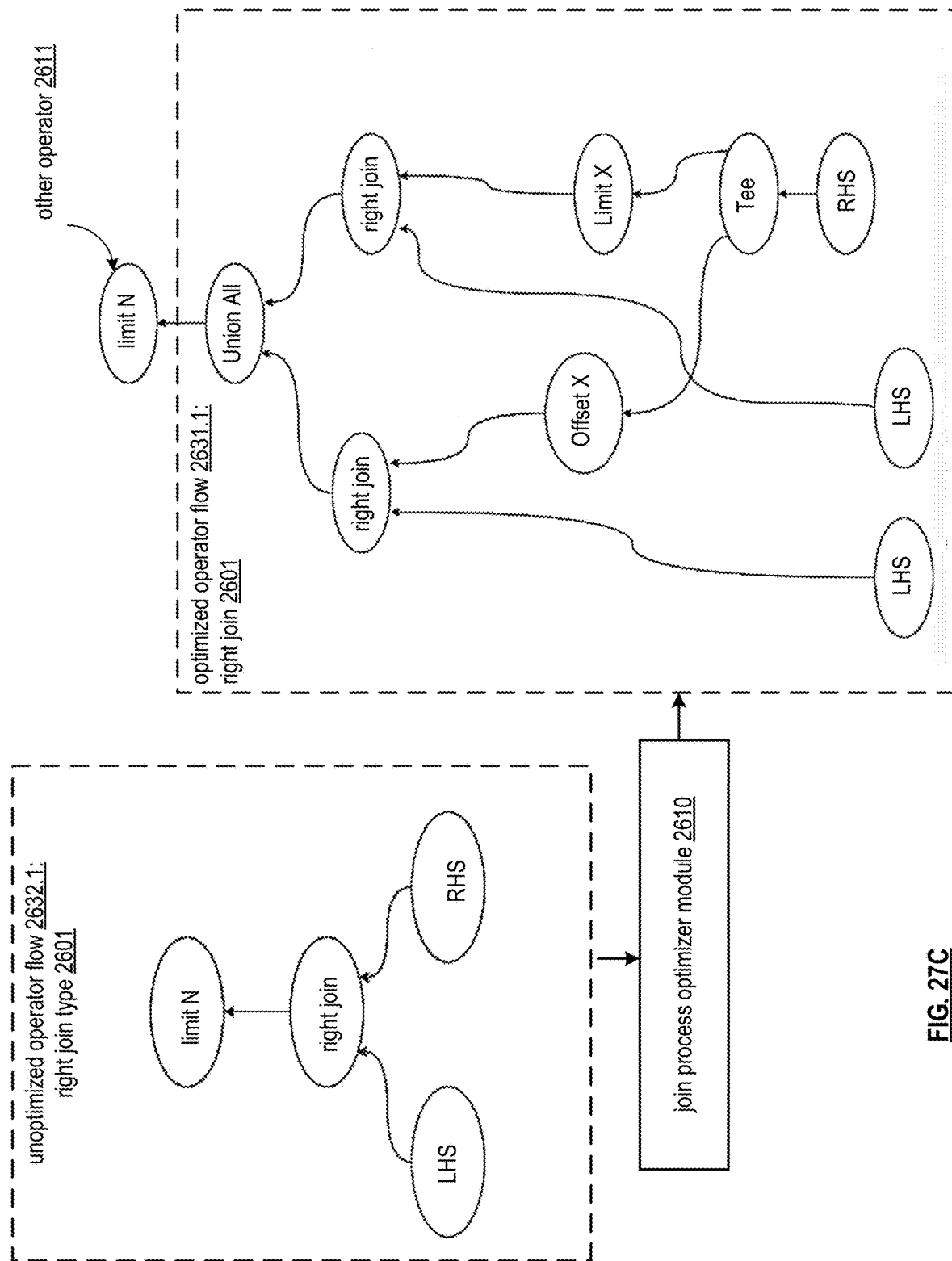
FIG. 27C illustrates an optimized operator flow generated via a join process optimizer module optimizing an unoptimized operator flow correspond to a right join type in accordance with various embodiments.

FIG. 27C illustrates an example optimized operator flow 2631.1 implementing a right join 2601. The optimized operator flow 2631.1 can be selected for execution as optimized join process 2630 to implement a corresponding unoptimized operator flow 2632.1 for the right join 2601 denoted by join expression 2516. The multiple joins can be implemented as right joins that output rows from their respective input in accordance with the requirements of a right join (e.g., return the inner join and also all rows from the right input that don't match with any left input). The optimized operator flow 2631.1 for the right join can be semantically equivalent to the unoptimized operator flow 2632.1 for the right join. The optimized operator flow 2631.1 for the right join can optionally implement the limit-adapted join process 2730 of FIG. 26D for a right join type, where each join process 2530 of FIG. 26D is implemented as a right join operator.

Figure 27D:
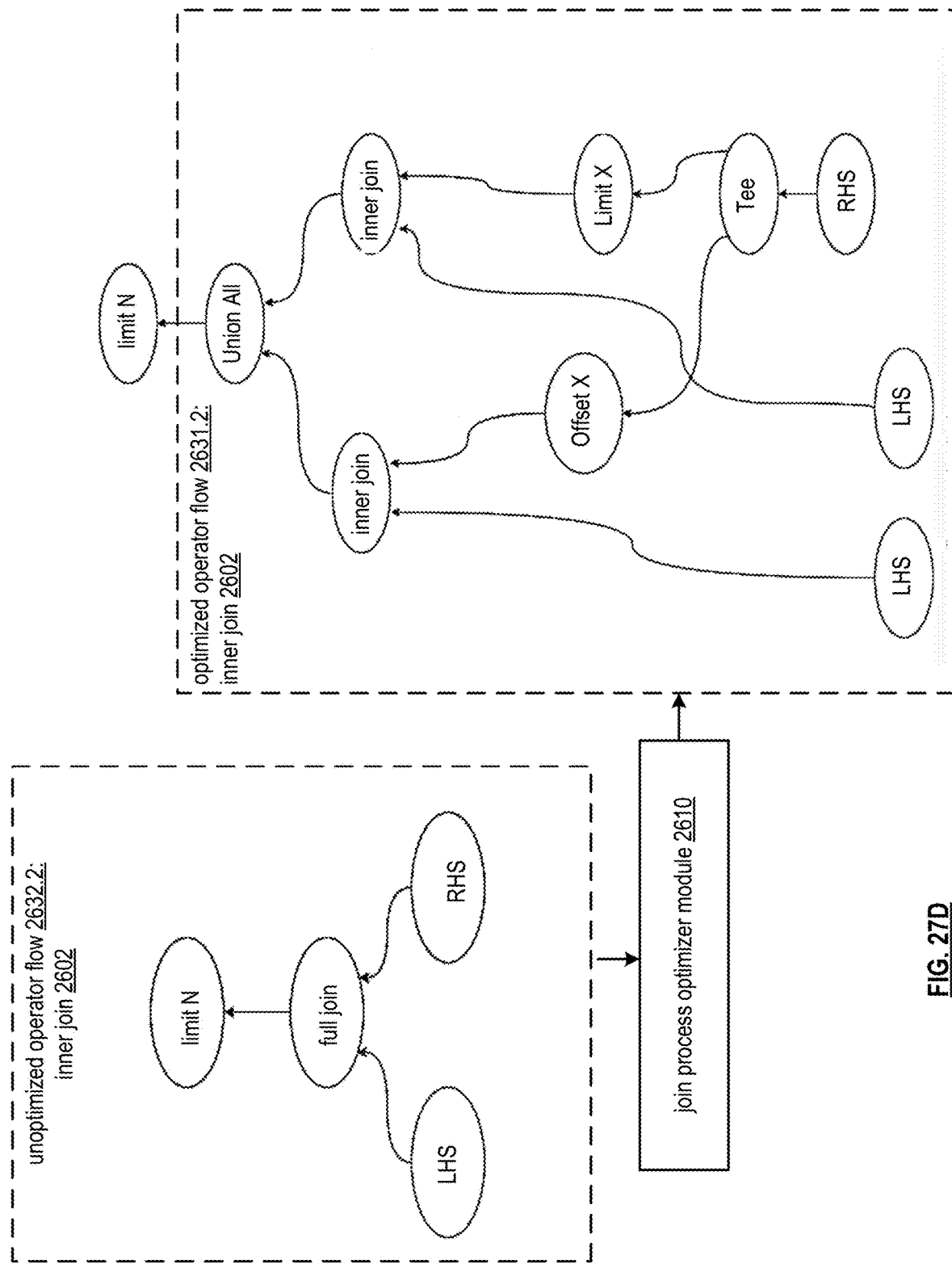
FIG. 27D illustrates an optimized operator flow generated via a join process optimizer module optimizing an unoptimized operator flow correspond to an inner join type in accordance with various embodiments.

FIG. 27D illustrates an example optimized operator flow 2631.2 implementing an inner join 2602. The optimized operator flow 2631.2 can be selected for execution as optimized join process 2630 to implement a corresponding unoptimized operator flow 2632.2 for the inner join 2602 denoted by join expression 2516. The multiple joins can be implemented as inner joins that output rows from their respective input in accordance with the requirements of an inner join (e.g., return only pairs from the right and left input that meet the matching condition). The optimized operator flow 2631.2 for the inner join can be semantically equivalent to the unoptimized operator flow 2632.2 for the inner join. The optimized operator flow 2631.2 for the inner join can optionally implement the limit-adapted join process 2730 of FIG. 26D for an inner join type, where each join process 2530 of FIG. 26D is implemented as an inner join operator.

Figure 27E:
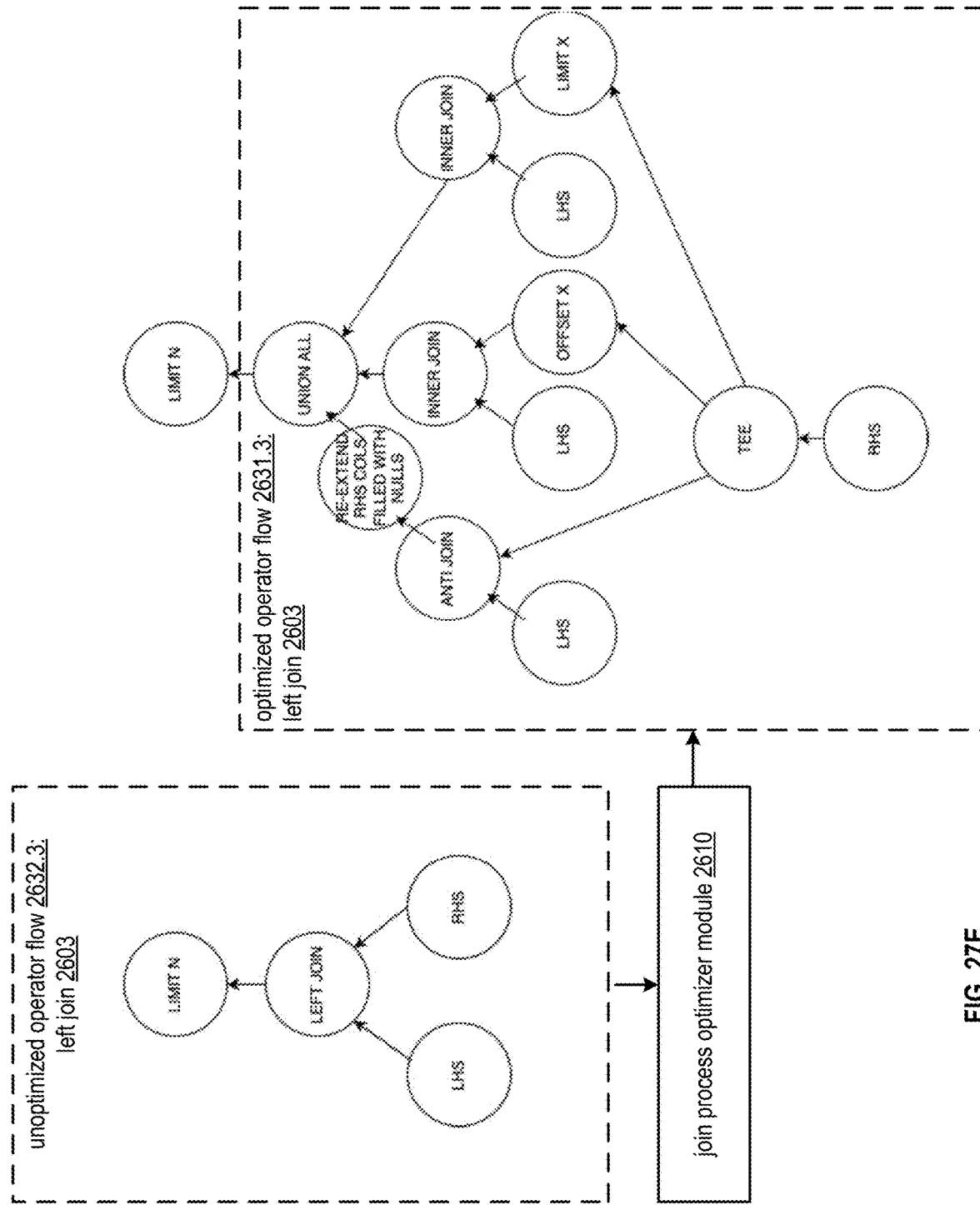
FIG. 27E illustrates an optimized operator flow generated via a join process optimizer module optimizing an unoptimized operator flow correspond to a left join type in accordance with various embodiments.

FIG. 27E illustrates an example optimized operator flow 2631.3 implementing a left join 2603. The optimized operator flow 2631.3 can be selected for execution as optimized join process 2630 to implement a corresponding unoptimized operator flow 2632.3 for the left join 2603 denoted by join expression 2516. The optimized operator flow 2631.3 for the left join can be semantically equivalent to the unoptimized operator flow 2632.3 for the left join. The optimized operator flow 2631.3 for the left join can be adapted from the limit-adapted join process 2730 of FIG. 26D to adapt to the requirements of the left join type, where the two join processes 2530 of FIG. 26D are implemented as inner joins, and where an additional parallel join process 2530 of FIG. 26D is implemented as an anti-join operator having its output re-extend right hand side columns filled with nulls.

In particular, like the RIGHT and INNER join optimizations, the optimization for the LEFT join case can also involve splitting the join into two joins. LEFT joins return matching INNER rows and left-hand side/LEFT rows that do not match. The split joins can be both type INNER as illustrated in FIG. 27E, and can thus both return the INNER matches. An extra ANTI join can execute in parallel to return all LHS rows that do not match. In other words, {{ANTI(lhs, rhs)=LEFT non-matches of LEFT(lhs, rhs)}}. Since ANTI joins throw out the RHS columns, a LEFT outer non-match result can be emulated via extending columns off the output of the ANTI join. These columns assume the names of the RHS columns and are filled with NULLs, effectively padding the ANTI join's output. The optimized plan 2531.3 can thus properly emulate a single LEFT join.

Figure 27F:
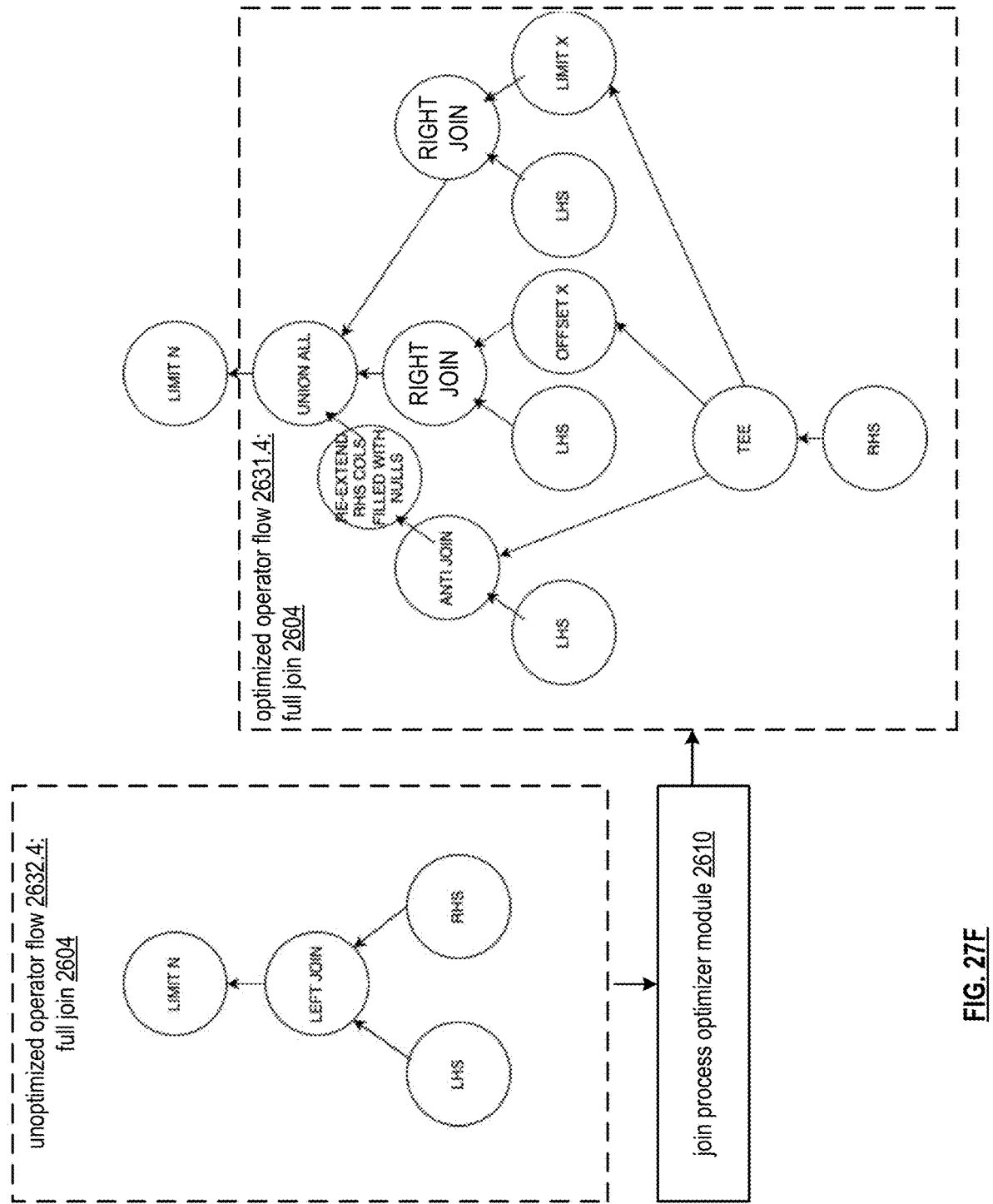
FIG. 27F illustrates an optimized operator flow generated via a join process optimizer module optimizing an unoptimized operator flow correspond to a full join type in accordance with various embodiments.

FIG. 27F illustrates an example optimized operator flow 2631.4 implementing a full join 2604. The optimized operator flow 2631.4 can be selected for execution as optimized join process 2630 to implement a corresponding unoptimized operator flow 2632.4 for the full join 2603 denoted by join expression 2516. The optimized operator flow 2631.4 for the full join can be semantically equivalent to the unoptimized operator flow 2632.4 for the full join. The optimized operator flow 2631.4 for the full join can be adapted from the limit-adapted join process 2730 of FIG. 26D to adapt to the requirements of the full join type, where the two join processes 2530 of FIG. 26D are implemented as right joins, and where an additional parallel join process 2530 of FIG. 26D is implemented as an anti-join operator having its output re-extend right hand side columns filled with nulls.

In particular, the FULL optimization can be implemented similarly to the LEFT optimization, where the joins that are split in two are instead of type RIGHT rather than type INNER. FULL joins return matching INNER rows, left-hand side/LEFT rows that do not match, and right-hand side/RIGHT rows that do not match. The split joins can be both of type RIGHT, and can thus return the INNER matches as well as the right-hand side/RIGHT rows that do not match. An extra ANTI join can execute in parallel in a same or similar fashion as the LEFT join's optimization. The optimized plan can properly emulate a single FULL join.

Figure 27G:
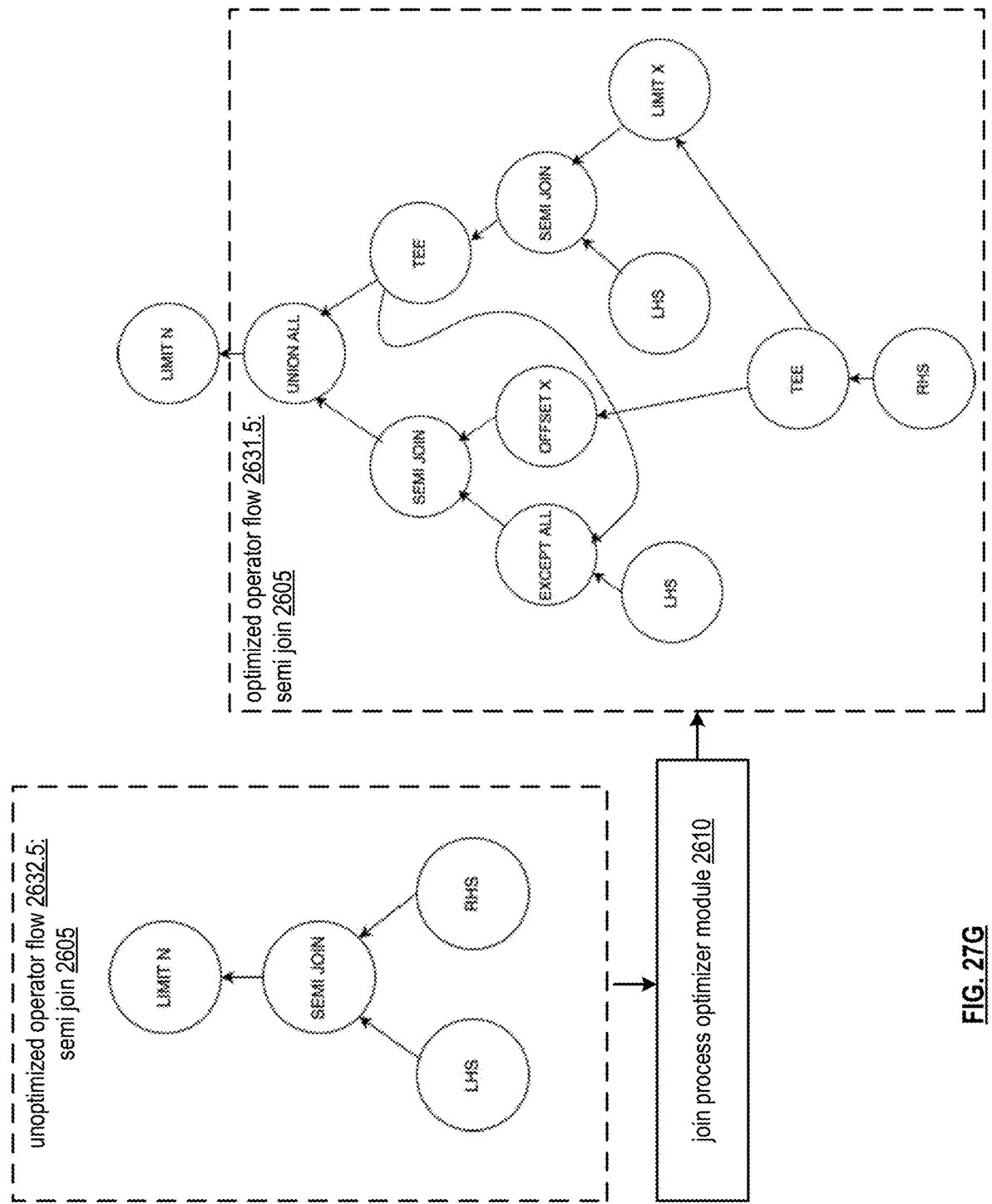
FIG. 27G illustrates an optimized operator flow generated via a join process optimizer module optimizing an unoptimized operator flow correspond to a semi join type in accordance with various embodiments.

FIG. 27G illustrates an example optimized operator flow 2631.5 implementing a semi join 2605. The optimized operator flow 2631.5 can be selected for execution as optimized join process 2630 to implement a corresponding unoptimized operator flow 2632.5 for the semi join 2605 denoted by join expression 2516. The optimized operator flow 2631.5 for the semi join can be semantically equivalent to the unoptimized operator flow 2632.5 for the semi join. The optimized operator flow 2631.5 for the semi join can be adapted from the limit-adapted join process 2730 of FIG. 26D to adapt to the requirements of the semi join type, where the two join processes 2530 of FIG. 26D are implemented as semi joins, and where an Except All operator is applied to the output of one (e.g., the faster) join process 2530 of FIG. 26D to generate the left input rows for the other (e.g., the slower) join process 2530 of FIG. 26D. Thus, this can induce serialization to the two join processes of FIG. 26D, as the slower join process cannot be performed until the faster join process is complete. In some cases, waiting to begin the second join process is not relevant, and does not induce slower processing, in cases where all required rows (e.g., the Y rows needed to satisfy the limit) are emitted in performing the faster join process.

In particular, the SEMI join can be split into two separate joins. The first SEMI join can behave in a similar fashion as in the INNER optimization. The second SEMI can be defined as: SEMI (LHS-limited SEMI rows), offsetted RHS). In other words, the limited SEMI is performed first. If that isn't enough rows to satisfy the limit, the second SEMI will look at all the LHS rows that haven't found a match so far with the rest of the RHS to try to find any remaining matches. This difference can be computed with an EXCEPT ALL operator.

In another example embodiment of the optimized operator flow 2631.5 for the semi join, the all of the SEMI joins of FIG. 2631.5 can be instead implemented as REVERSE SEMIs. The plan can be transformed as in the REVERSE SEMI case. This can be an optimal solution when the cardinality or data volume is about the same on both sides. If one side is much larger than the other, this option is optionally not selected.

In another example embodiment of the optimized operator flow 2631.5 for the semi join, a 'local shuffle' operator instance is created can split data on 1 node (e.g. 50/50 split into two parent streams). Like a shuffle, each stream can guarantee all equal values in its columns that are 'keys' must end up in the same stream. This new operator can split up the data instead of limiting/offsetting. With the guarantee that all of the same value show up in the same stream, the SEMIs can be split in two and the UNION ALL can be applied to their results to get the same result as the original SEMI, for example, in a same or similar fashion as in the INNER case.

In another example embodiment of the optimized operator flow 2631.5 for the semi join, a version of SEMI join can be created that outputs 2 streams: the first is for matches, the second is for non-matches. This can eliminate the need for an EXCEPT ALL of FIG. 27G. The no non-matches from the 1st, limited SEMI join can be fed directly into the 2nd SEMI join.

Figure 27H:
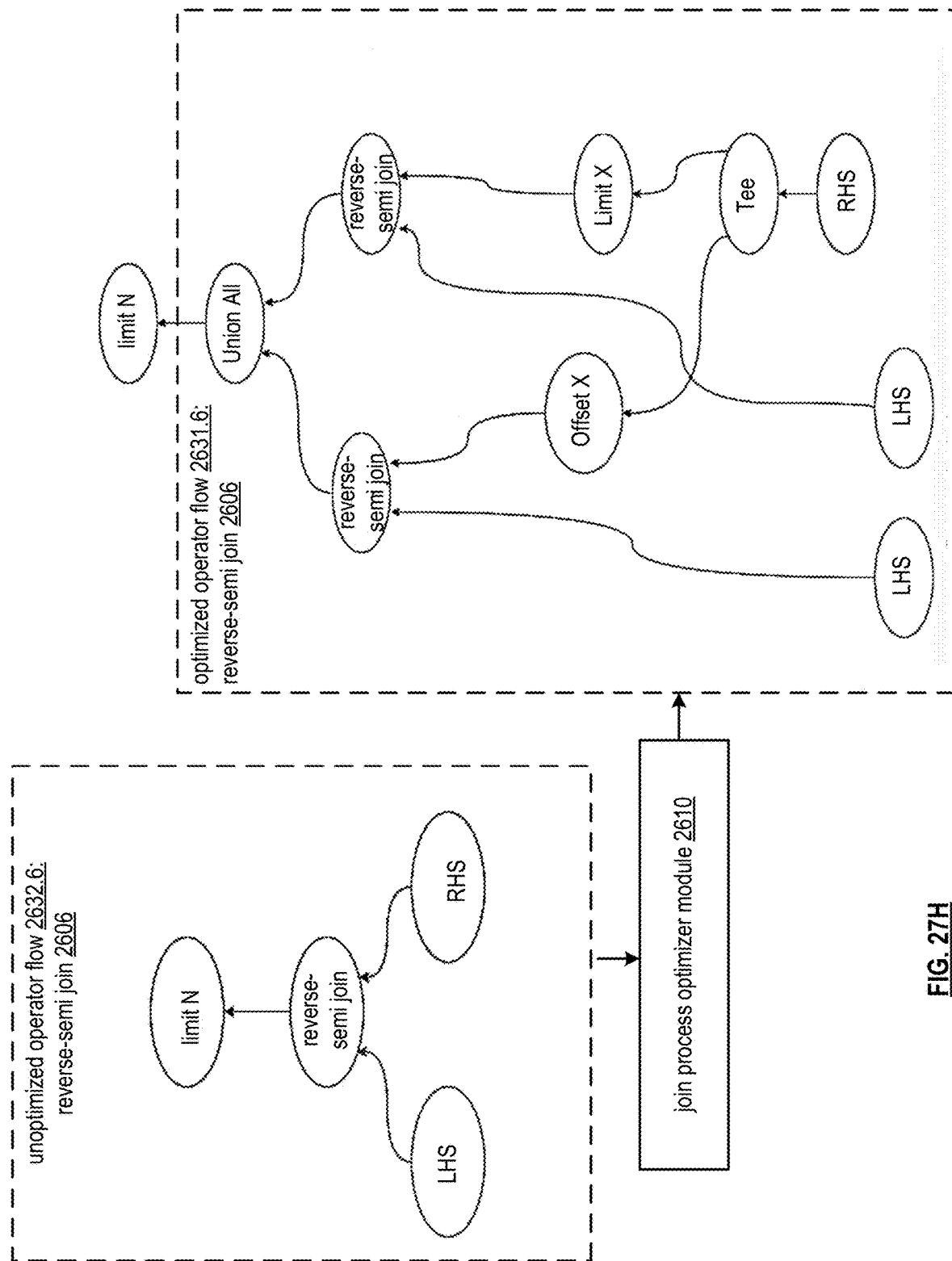
FIG. 27H illustrates an optimized operator flow generated via a join process optimizer module optimizing an unoptimized operator flow correspond to a reverse-semi join type in accordance with various embodiments.

FIG. 27H illustrates an example optimized operator flow 2631.6 implementing a reverse-semi join 2606. The optimized operator flow 2631.6 can be selected for execution as optimized join process 2630 to implement a corresponding unoptimized operator flow 2632.6 for the reverse-semi join 2606 denoted by join expression 2516.6. The multiple joins can be implemented as reverse semi joins that output rows from their respective input in accordance with the requirements of a reverse-semi join. The optimized operator flow 2631.6 for the reverse-semi join can be semantically equivalent to the unoptimized operator flow 2632.6 for the reverse-semi join. The optimized operator flow 2631.6 for the reverse-semi join can optionally implement the limit-adapted join process 2730 of FIG. 26D for a reverse-semi join type, where each join process 2530 of FIG. 26D is implemented as a reverse-semi join operator. This can implement the reverse-semi join functionality of behaving similarly to SEMI joins, but having ordering of the children flipped such that the right hand side contains the full set of rows to check for existence in the other (left) side.

In some embodiments, some or all of this functionality of FIGS. 27A-27H can be utilized in embodiments where a check is implemented that confirms that a query only needs the OUTER results of an OUTER join (e.g. LEFT, RIGHT. FULL) and the INNER results that match are completely discarded. In such cases, flows for LEFT and FULL described above can be adapted to only calculate OUTER results. For example, a LEFT join that does not use its INNER results could be fully replaced with the ANTI join and NULL padding extend as described in conjunction with performing the LEFT optimization.

Figure 27I:
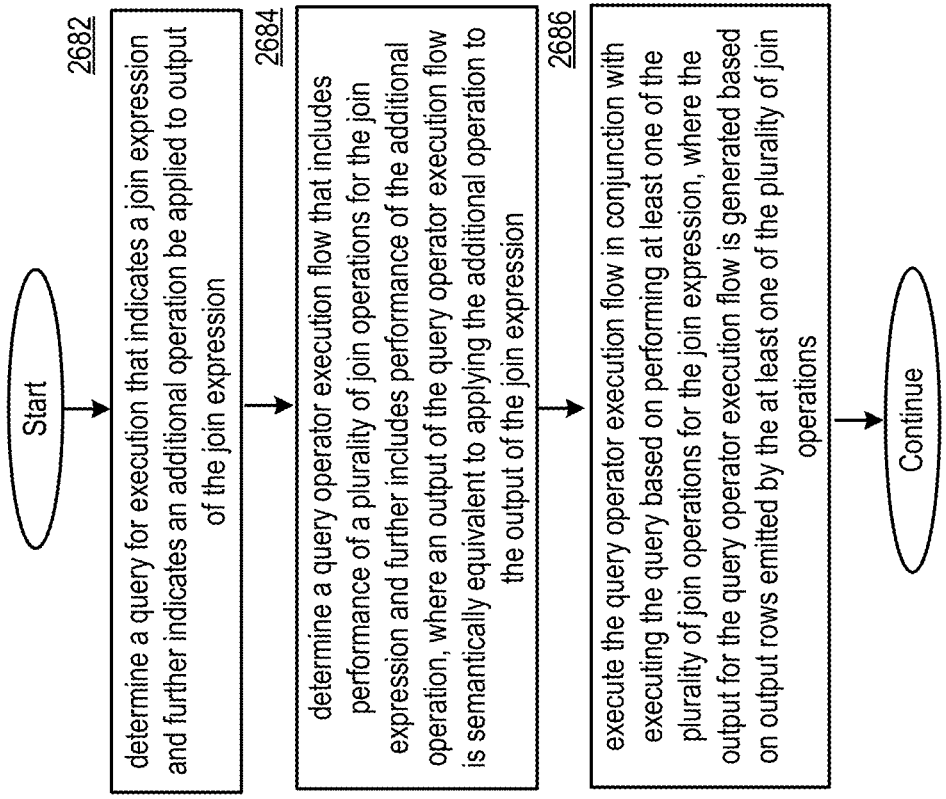
FIG. 27I is a logic diagram illustrating a method for execution in accordance with various embodiments.

FIG. 27I illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27I. In particular, a node 37 can utilize the query processing module 2435 to execute some or all of the steps of FIG. 27I, where multiple nodes 37 implement their own query processing modules 2435 to independently execute the steps of FIG. 27I, for example, to facilitate execution of a query as participants in a query execution plan 2405. Some or all of the method of FIG. 27I can be performed by the query processing system 2510, for example, by utilizing an operator flow generator module 2514 and/or a query execution module 2504. In particular, some or all of the method of FIG. 27I can be performed via one or more operator executions of one or more limit operators 2710 and/or one or more join operators 2535 of at least one join process 2530, such as a limit-adapted join process 2730. Some or all of the steps of FIG. 27I can optionally be performed by any other processing module of the database system 10. Some or all of the steps of FIG. 27I can be performed to implement some or all of the functionality of the database system 10 as described in conjunction with FIGS. 27A-27H, for example, by implementing some or all of the functionality of the query processing system 2510 as described in conjunction with FIGS. 25A-26F. Some or all of the steps of FIG. 27I can be performed to implement some or all of the functionality regarding execution of a query via the plurality of nodes in the query execution plan 2405 as described in conjunction with some or all of FIGS. 24A-24I. Some or all steps of FIG. 27I can be performed by database system 10 in accordance with other embodiments of the database system 10 and/or nodes 37 discussed herein. Some or all steps of FIG. 27I can be performed in conjunction with one or more steps of FIG. 26F, and/or of any other method described herein.

Step 2682 includes determining a query for execution that indicates a join expression and further indicates an additional operation be applied to output of the join expression. Step 2684 includes determining a query operator execution flow that includes performance of a plurality of join operations for the join expression and further includes performance of the additional operation. In various examples, an output of the query operator execution flow is semantically equivalent to applying the additional operation to the output of the join expression. Step 2688 includes executing the query operator execution flow in conjunction with executing the query based on performing at least one of the plurality of join operations for the join expression. In various examples, the output for the query operator execution flow is generated based on output rows emitted by the at least one of the plurality of join operations.

In various examples, the query operator execution flow that includes performance of the plurality of join operations is selected based on an optimization for performing the join expression and the additional operation.

In various examples, the query operator execution flow is selected based on selecting one optimization strategy from a plurality of optimizations strategies based on at least one of: a join type of the join expression, or a type of the additional operation.

In various examples, the query operator execution flow is selected based on selecting the one optimization strategy from the plurality of optimizations strategies based on the one optimization strategy corresponding to the join type of the join expression, wherein the type of the join expression is one of a plurality of join types, and wherein the plurality of optimizations strategies correspond to the plurality of join types.

In various examples, the plurality of join types includes at least two of: an inner join type: a right join type: a reverse-semi join type: a left join type: a full join type: or a semi join type. In various examples, the join type of the join expression is one of: the inner join type: the right join type: the reverse-semi join type: the left join type: the full join type: or the semi join type.

In various examples, the output for the query operator execution flow is generated based on the output rows emitted by only a proper subset of the plurality of join operations.

In various examples, the additional operation an offset operation applied to the output of the join expression.

In various examples, the additional operation is a limit applied to the output of the join expression. In various examples, the limit indicates a threshold maximum number of output rows for the join expression. In various examples, executing the query further includes finalizing execution of the query once the output rows emitted by the at least one of the plurality of join operations includes the threshold maximum number of output rows.

In various examples, the execution of the query is finalized before all of the plurality of join operations have finished processing their input rows based on the threshold maximum number of output rows for the join expression being reached prior to at least one of: one or more of the plurality of join operations finishing processing of all of its input rows: or one or more of the plurality of join operations beginning processing of any of its input rows.

In various examples, the join expression is a reverse semi join expression. In various examples, the plurality of join operations includes a first reverse semi join and a second reverse semi join based on the join expression being the reverse semi join expression. In various examples, the at least one of the plurality of join operations exactly one of, or both of: the first reverse semi join or the second reverse semi join.

In various examples, the join expression is a left join expression. In various examples, the plurality of join operations includes a first inner join, a second inner join, and an anti-join based on the join expression being the left join expression. In various examples, the at least one of the plurality of join operations includes exactly one of, exactly two of, or all of: the first inner join, the second inner join, or the anti-join.

In various examples, the join expression is a semi join expression. In various examples, the plurality of join operations includes a first semi join and a second semi join based on the join expression being the semi join expression. In various examples, the at least one of the plurality of join operations includes exactly one of, or both of: the first semi join or the second semi join.

In various examples executing the query operator execution flow is further based on: sending all of a plurality of left input rows for the join expression to all of the plurality of join operations for processing as left input rows by each of the plurality of join operations: segregating a plurality of right input rows of the join expression into a plurality of proper subsets of the plurality of right input rows, where the plurality of proper subsets are mutually exclusive and collectively exhaustive with respect to the plurality of right input rows, and/or where a number of proper subsets of the plurality of proper subsets is equal to a number of join operations in the plurality of join operations; and/or sending each plurality of proper subsets of the plurality of right input rows to a corresponding one of the plurality of join operations for processing as right input rows by the corresponding one of the plurality of join operations.

In various examples, one of the plurality of join operations is configured to emit output rows faster than other ones of the plurality of join operations based on the plurality of join operations being configured to be performed in parallel in the query operator execution flow, and/or further based on a first proper subset of the plurality of proper subsets processed by the one of the plurality of join operations being smaller than all other proper subsets of the plurality of proper subsets processed by other ones of the plurality of join operations.

In various examples, one of the plurality of join operations is configured to emit output rows faster than other ones of the plurality of join operations based on a first one of the plurality of join operations being configured to be completed before a second one of the plurality of join operations in in the query operator execution flow begins based on input to the second one of the plurality of join operations being based on output of the first one of the plurality of join operations. In various examples, one of: the second one of the plurality of join operations begins processing after the first one of the plurality of join operations based on the output of the query operator execution flow not yet being finalized when the first one of the plurality of join operations is completed; or the second one of the plurality of join operations is not processed based on the output of the query operator execution flow being finalized prior to the first one of the plurality of join operations being completed.

In various examples, the query operator execution flow is a sub-flow of a full query operator execution flow for the query that includes at least one of: at least one operator serially before the sub-flow that emits input rows for processing via the query operator execution flow: or at least one operator serially after the sub-flow that processes output rows emitted via the sub-flow.

In various embodiments, any one of more of the various examples listed above are implemented in conjunction with performing some or all steps of FIG. 27I. In various embodiments, any set of the various examples listed above can be implemented in tandem, for example, in conjunction with performing some or all steps of FIG. 27I.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27I described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27I, for example, in conjunction with further implementing any one or more of the various examples described above.

In various embodiments, the operational instructions, when executed by the at least one processor, cause the database system to: determine a query for execution that indicates a join expression and further indicates an additional operation be applied to output of the join expression: determine a query operator execution flow that includes performance of a plurality of join operations for the join expression and further includes performance of the additional operation, where an output of the query operator execution flow is semantically equivalent to applying the additional operation to the output of the join expression; and/or execute the query operator execution flow in conjunction with executing the query based on performing at least one of the plurality of join operations for the join expression, where the output for the query operator execution flow is generated based on output rows emitted by the at least one of the plurality of join operations.

FIGS. 28A-28E illustrate embodiments of a database system 10 operable to execute queries via implementing at least one row dispersal operator that disperses rows amongst a plurality of parallelized processes for execution by a corresponding set of load operators, for example, in accordance with performing load aware shuffle operations. Some or all features and/or functionality of FIGS. 28A-28E can be utilized to implement the join processes of some or all of FIGS. 25A-27H, and/or can be utilized to implement database system 10 of FIGS. 24A-24N when executing queries indicating parallelized processing of different portions of data (e.g., in accordance with a random dispersal) via any type of load operator. Some or all features and/or functionality of FIGS. 28A-28E can be utilized to implement any embodiment of the database system 10 described herein.

Row dispersal can be implemented via performing a random shuffle to send incoming blocks or incoming rows to a random and/or round-robin-ed peer in order to place a relatively equal amount of data/work on each corresponding parallelized process. A corresponding row dispersal operator 2566 can be perform this dispersal in corresponding query operator execution flows 2517, for example, via placement in the flow IO operators that read the corresponding full set of rows to be shuffled and/or below a parallelize serially before a set of load operators operable to process corresponding, random subsets of this full set of rows. For example, the row dispersal operator 2566 can be implemented as a shuffle operator as described herein, and/or can optionally implement any row and/or data shuffling via a shuffle node set 2485 via a shuffle network 2480. The set of parallelized load operators can be implemented as join operators, blocking operators, filtering operators, any operator 2520 described herein, and/or any other operator that processes a plurality of rows, for example, in a stream to generate a stream of output, and/or parallel with other processes to ultimately have their outputs UNION-ed together. In particular, union-ing the output of the set of parallelized load operators each processing a corresponding subset of rows from a full row set can be semantically equivalent to a single load operator processing the full row set, where this divided, parallelized processing is utilized to render higher processing efficiency, for example, based on each parallelized process needing to process fewer rows and/or based on different sets of parallelized resources implementing each load operator.

In some embodiments, the random shuffling implemented by row dispersal operator 2566 is implemented to evenly distribute data. In some embodiments, random shuffling is implemented after IO operators, for example, when estimated table row cardinality is low. Alternatively or in addition, random shuffling can be implemented before load operators, for example unconditionally, because the absence of partitioning does not necessarily indicate an absence of data skew)

However, this can add a significant networking penalty for queries where the total data volume is large. If each node has a relatively equal amount of data, which can be roughly equivalent to the total amount of work to do on a node, then optionally no data redistribution needs to occur. If random shuffle operators are able to detect this scenario and keep local data on the local node while still distributing data when an imbalance is detected, then load balancing across nodes can be achieved with minimal networking cost.

In some embodiments, each node and each shuffle operation within a node (e.g., operator execution module 3215 executing the corresponding node's row dispersal operator) has very limited knowledge of the state of every other node, and/or how much data is present on a given node. One embodiment of implementing load aware shuffles assumes that each peer has a roughly equal amount of local work to do (if it has any work at all), and will not distribute any data until a peer signals that it has no more local work by sending a corresponding signal/notification, such as an end of file (EOF) signal.

For each incoming block, the row dispersal operator 2566 can implement this load aware shuffle based on assigning a set of rows to a given peer (possibly itself) of a full set of peers (e.g. the set of nodes in a corresponding shuffle node set, and/or any set of parallelized processes 2550.1-2550.L implementing a corresponding set of load operators 2835) for processing by this given peer. Sending a given set of rows can include forwarding an entire block that includes a corresponding plurality of rows to a peer, or otherwise sending/assigning a corresponding one or more rows to the selected peer for processing via its load operator.

In some embodiments, the assigning of the set of rows to a given peer can be based on a weighted probability. The set of potential peers to which a given data block can be forwarded/assigned in accordance with a load aware random shuffle can corresponding to only the available peers (e.g. a set that corresponds to the union of itself, and all peers that have sent an eof signal or are otherwise determined to be available. As a particular example of computing the weighted probabilities, the probability of keeping a data block local (e.g. assignment to itself for processing) can be (total num peers-#peers that have sent an eof)/total num peers (e.g. the number of unavailable peers divided by the total number of peers). Alternatively or in addition, the probability of sending a block to any eof peer (e.g. any given available peer) can optionally be simply 1/total num peers. This weighting towards keeping data local can be favorable in preventing biasing data towards peers that have sent eofs, or have otherwise been deemed available.

For example, consider the case where there are 10 peers (e.g. L=10). Peer 1 has sent an eof signal, and each other peer processes 10 blocks. Each of the other 9 peers will keep 9/10 of their data blocks local while sending 1/10 to peer 0. This results in 9 blocks residing on all 10 peers with only 9/90 total blocks being sent across the network. With other embodiments where a round robin and/or uniformly random shuffle is utilized to disperse data blocks, there would still be 9 blocks on each peer, but 81/90 blocks would have been sent over the network.

Figure 28A:
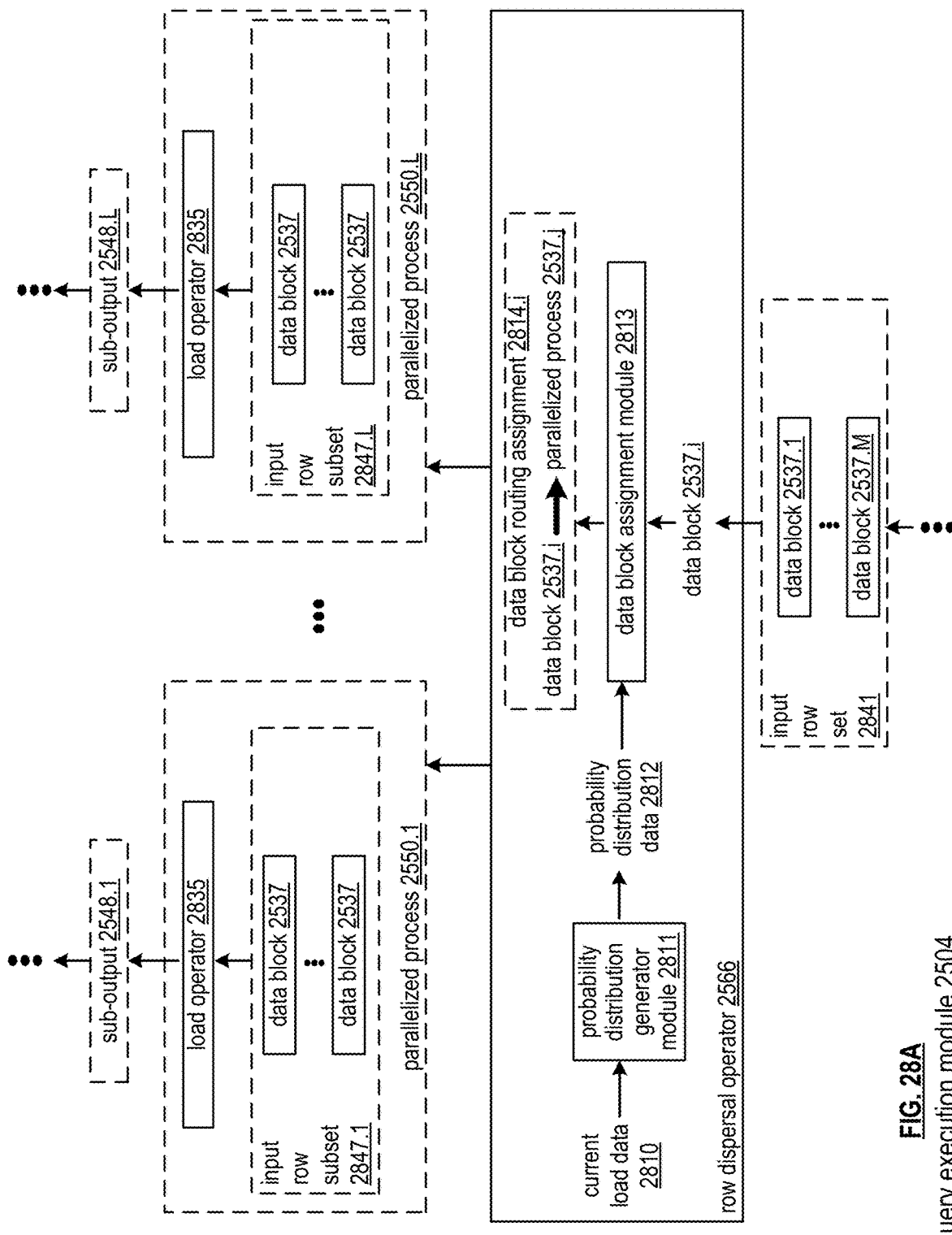
FIG. 28A is a schematic block diagram of a query execution module executing a row dispersal operator based on current load data in accordance with various embodiments.

FIG. 28A illustrates an embodiment of a row dispersal operator 2566 that selects generates a plurality of input row subsets 2847.1-2847.L to be processed via a plurality of parallelized processes 2550.1-2550.L. Some or all features and/or functionality of the row dispersal operator 2566 can implement the row dispersal operator 2566 of FIG. 25B and/or any embodiment of row dispersal and/or shuffling discussed herein.

Each of the plurality of input row subsets 2847.1-2847.L can include sets of rows in the form of one more of entire data blocks assigned for inclusion in the given input row subset 2847 for processing by the load operator of the corresponding parallelized process, where each data block includes one or more column values for each of a plurality of rows, such as column values for one or more columns. The data blocks 2537 of FIG. 28A can be implemented via some or all features and/or functionality of data blocks 2537 of one or more of FIGS. 24L-24N.

The plurality of input row subsets 2847.1-2847.L can be mutually exclusive and collectively exhaustive with respect to an input row set 2841. For example, each row, and/or each full data block 2537, can be sent to exactly one parallelized process for processing.

In some embodiments, the plurality of input row subsets 2847.1-2847.L can be implemented as the left input row subsets 2547.1-2547.L and/or right input row subsets 2557.1-2557.L sent to parallelized processes 2550 as discussed in conjunction with FIG. 25B, where the input row set 2841 includes left input row set 2541 and/or right input row set 2543, and/or where the load operator 2835 is implemented via join operator 2535. For example, the row dispersal operator 2566 and/or plurality of parallelized processes 2550.1-2550.L of FIG. 28A can optionally implement some or all of the features and/or functionality of performing joins via a plurality of parallelized processes 2550.1-2550.L, such as a plurality of outer parallelized processes 2553.1-2553.R in the case where the respective query operator execution flow of FIG. 28A implements some or all of a join process 2530.

Determining which parallelized process 2550.1-2550.L processes a given row can be based on implementing a data block random assignment module that selects a random and/or pseudorandom parallelized process 2537.j to process a given data block 2537.i in a corresponding data block routing assignment 2814.i.

In some embodiments, some or all functionality of row dispersal operator 2556 of FIG. 28A can be implemented via a corresponding operator execution module 3515 executing the row dispersal operator 2556, for example, as discussed in conjunction with FIG. 24J.

As discussed previously, while in some embodiments the data block routing assignment 2814.i can be generated by data block random assignment module 2813 in accordance with a round-robin and/or random selection in accordance with a uniform distribution to disperse the incoming rows evenly, in other embodiments as illustrated in conjunction with FIGS. 28A-28E, the data block random assignment module 2813 can generate data block routing assignment 2814 for each incoming data block 2537 by applying probability distribution data 2812, which may denote a non-uniform probability distribution where probabilities of assigning data block to different parallelized processes is optionally non-equal.

In particular, a probability distribution generator module 2611 can generate the probability distribution data based on current load data 2810, for example, denoting which parallelized processes are available to process data blocks (e.g.

where load operator has finished processing all of its their incoming data blocks or is otherwise available). The probability distribution data 2812 can be updated over time as the current load data 2810 is updated based on changing availability of load operators of various parallelized processes, where the probability distribution data 2812 is optionally different for some or all incoming data blocks 2537.

Figure 28B:
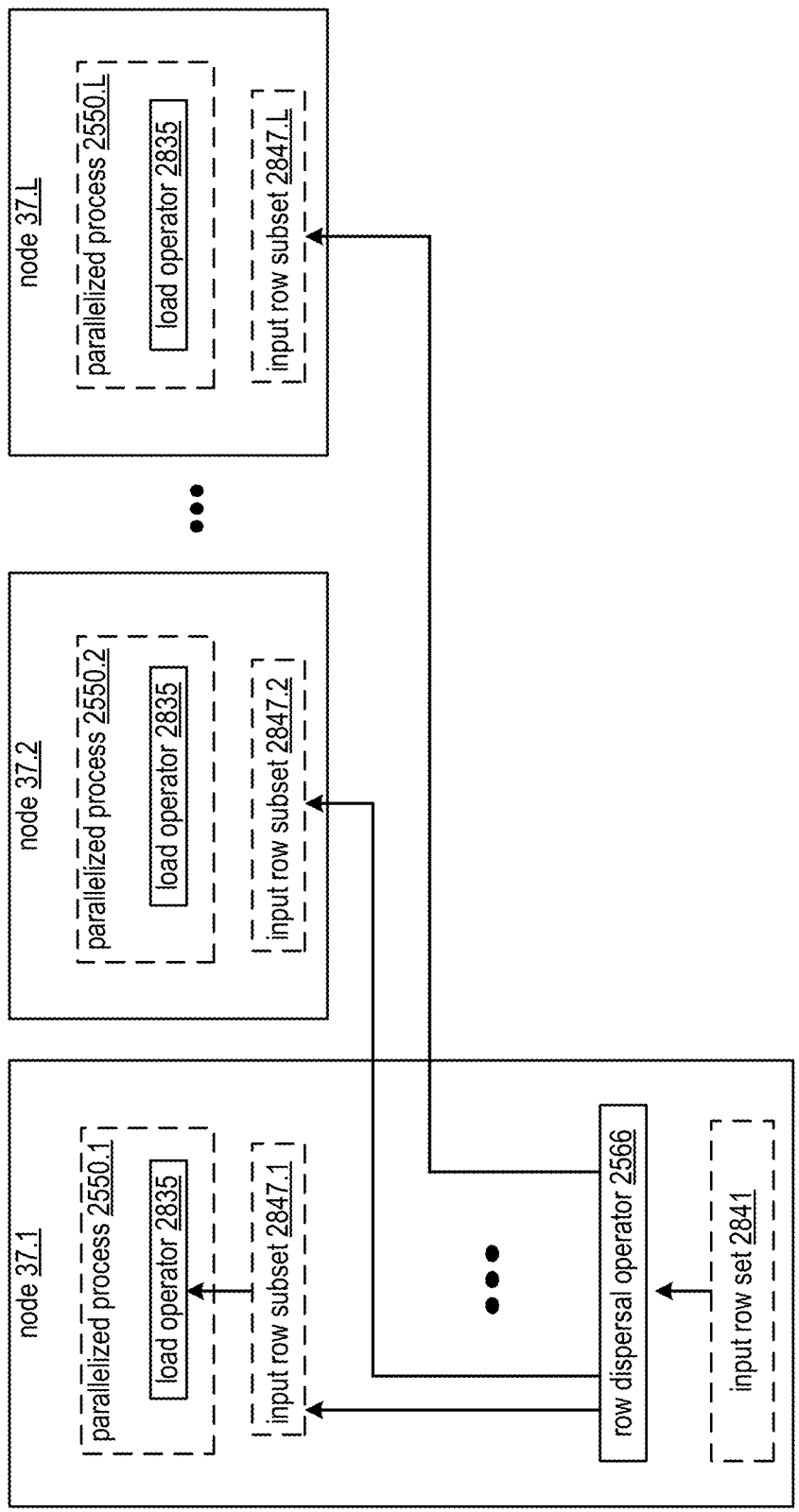
FIG. 28B is a schematic block diagram of a node dispersing data blocks across a set of nodes via a row dispersal operator in accordance with various embodiments.

FIG. 28B illustrates an embodiment where the plurality of parallelized processes implemented via a corresponding plurality of nodes 37.1-37.L. A given row dispersal operator 2566 can be implemented by a given one of these nodes 37.1 that implements parallelized process 2550.1 of the set of parallelized processes 2550.1-2550.L. Thus, the row dispersal operator 2566 of a given node 37.1 assigns some of its input row set 2841 for inclusion in the input row subset 2847.1 designated for processing by the parallelized process 2550.1 of this given node 37.1.

Some or all features and/or functionality of the row dispersal operator 2566 and/or parallelized processes 2550.1-2550.L of FIG. 28B can implement the row dispersal operator 2566 of FIG. 28A and/or any other embodiment of the row dispersal operator described herein.

As used herein, assignment of processing of a data block by "itself" or "self" or "locally" can correspond to this case where the same processing resources (e.g. the same node) are utilized to process this given data block (e.g. rather than sending it to another node for processing). As used herein, the given input row set 2841 dispersed by a row dispersal operator 2566 executed by a given node 37 can be "local" to the given node 37, for example, based on the given node accessing the data blocks in its own memory resources (e.g. its own memory drives 2425) and/or based on the given node receiving/being forwarded these data block (e.g. from child IO nodes of a corresponding query execution plan 2405).

The set of nodes 37.1-37.L can be implemented via some or all features and/or functionality of a shuffle node set 2485 of FIG. 24E, for example, where the forwarding/sending of data blocks from node 37.1 to other nodes 37.2-37.L to other nodes is via communication resources, processing resources, and/or memory resources of a shuffle network 2480 of FIG. 24E. Some or all features and/or functionality of the load aware shuffling performed via the implementation of row dispersal operator 2566 of FIGS. 28A-28E can implement any shuffle row sets 2485, any shuffle networks 2480, and/or any shuffling of rows described herein.

As described in further detail herein the input row subset 2847.1 generated by node 37.1 can be expected and/or guaranteed to be larger than other input row subsets 2847.2-2847.L designated for processing by the other nodes 37.2-37.L, for example, based on the weighted probability for assignment of a given data block to the node itself being guaranteed to be greater than or equal to assignment of the given data block to other nodes, for example, for all incoming data blocks.

Figure 28C:
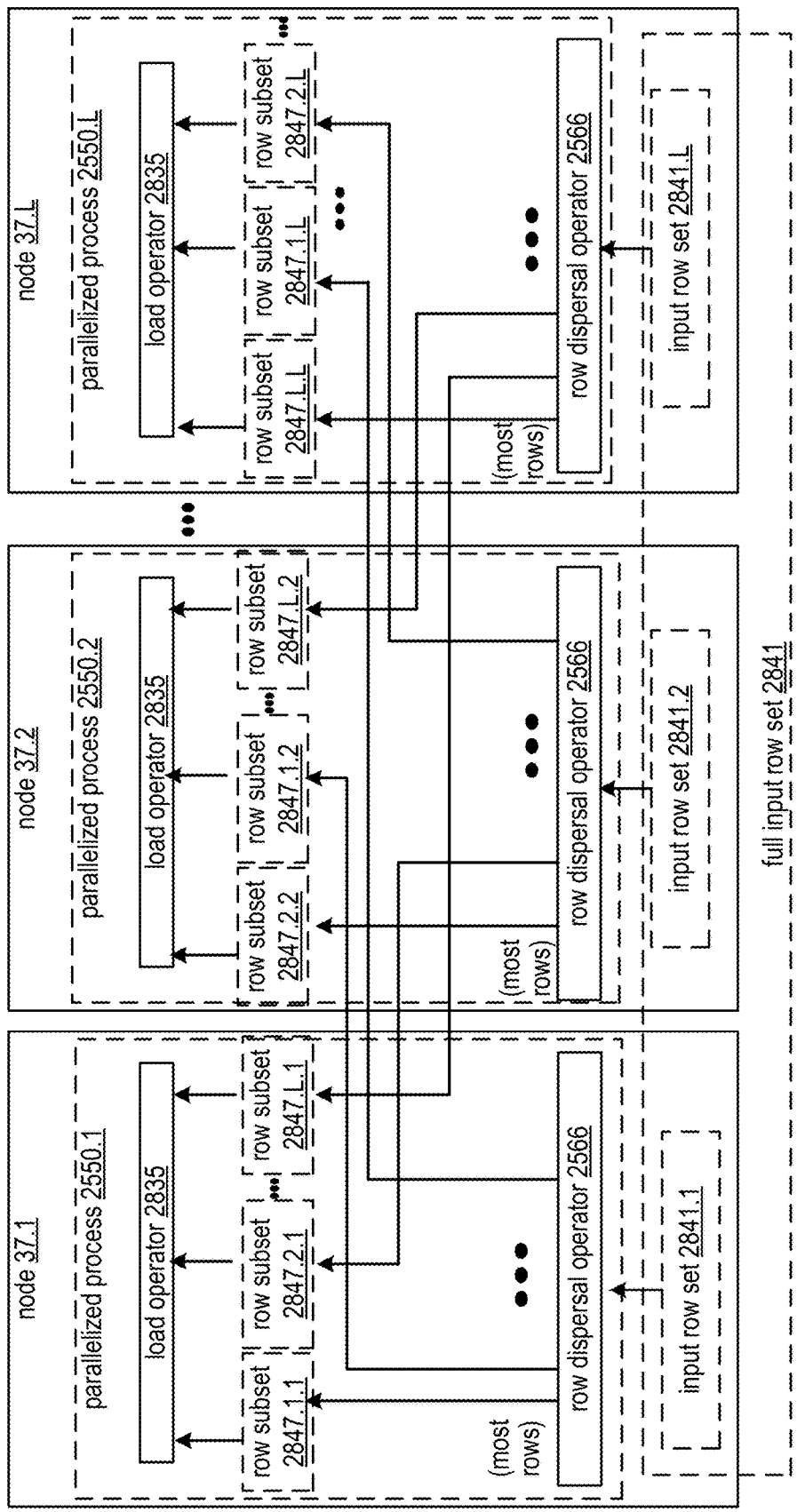
FIG. 28C is a schematic block diagram of a set of nodes node dispersing data blocks amongst each other via each implementing row dispersal operators in accordance with various embodiments.

FIG. 28C illustrates an embodiment where all nodes 37 in this set of nodes 37.1-37.L similarly implement this functionally themselves, for example, in accordance with all being members of a same shuffle node set collectively shuffling rows as discussed herein. Each node's row dispersal operator 2566 can process its own respective (e.g. local) one of a plurality of input row sets 2841.1-2841.L, which can be each be considered subset of a full input row set 2841 that collectively constitute this full input row set 2841, e.g. of a corresponding process such as a join process or other process that is divided across the parallelized processing resources 2550.1-2550.L via first performing a shuffle of inputs across these parallelized processing resources.

Some or all features and/or functionality of the set of nodes 37 of FIG. 28C can implement the row dispersal operator 2566 of FIG. 28B and/or any other embodiment of the row dispersal operator described herein.

The row subset generated by a given row dispersal operator 2566 designated for itself can be expected and/or guaranteed to be larger (e.g. have more rows/data blocks than) any other of its row subsets. This row subset generated by a given row dispersal operator 2566 designated for itself can thus be expected and/or guaranteed to constitute plurality of its input row set, and/or in some cases, optionally a majority of its input row set (e.g. have more rows/data blocks than all other row subsets combined)

As illustrated in FIG. 28C, as all nodes 37 collectively perform both the row dispersal and loading in parallel with other nodes, the parallelized processes 2550.1-2550.L of FIGS. 28A-28E and/or other parallelized processes described herein can optionally be considered to include both the performance of load operator 2835 and the row dispersal operator 2566 (e.g. despite the fact that the shuffling can thus introduce dependencies between the parallelized processes of the different nodes, rather than these parallelized processes being performed entirely independently of the parallelized processes of other nodes). For example, the row dispersal operator(s) of FIG. 25B can be implemented via such parallelized performance of row dispersal via a plurality of row dispersal operators executing upon different portions of the data as illustrated in conjunction with FIG. 28C.

Alternatively or in addition, the row dispersal operator 2566 of a given node 37 and/or corresponding load operator 2835 of a corresponding parallelized process 2550 of the given node 37 can be implemented as and/or considered a same operator optionally implemented via a same operator execution module 3515. Alternatively or in addition, the parallelized processes 2550.1-2550.L (and/or a corresponding set of operator execution modules 3515.1-3515.L, each implementing the corresponding load operator and/or optionally the corresponding row dispersal operator 2566 of the given node 37) can be considered lateral operators and/or peer operators, for example, based on collectively sharing/shuffling their data blocks as illustrated in FIG. 28C.

Figure 28D:
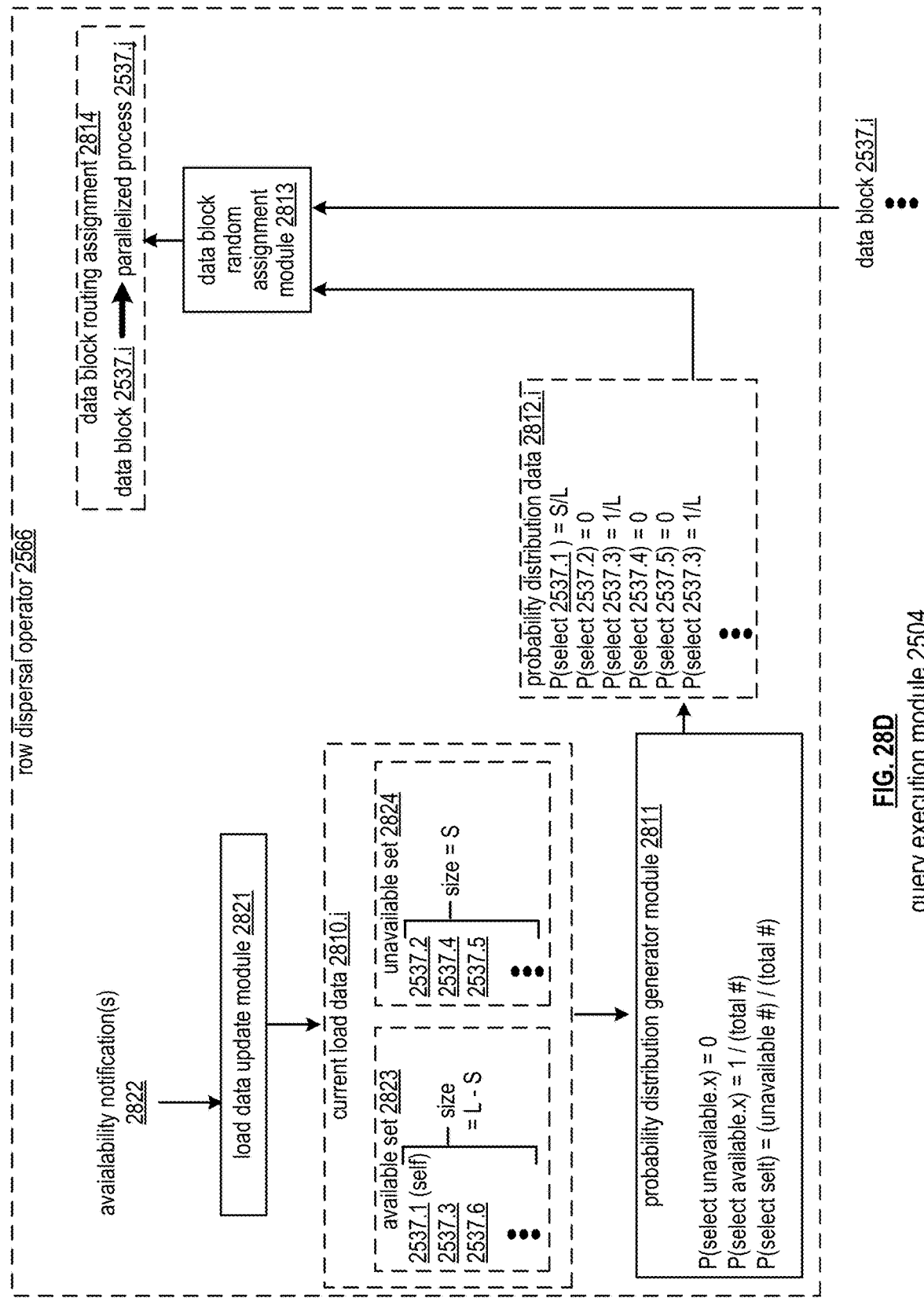
FIG. 28D is a schematic block diagram of a query execution module executing a row dispersal operator based on updating current load data in accordance with various embodiments.

FIG. 28D illustrates an embodiment of row dispersal operator 2566 implementing an example probability distribution generator module based on example current load data 2810.i (e.g. the most recent version of the current load data 2810 utilized to generate the corresponding data block). Some or all features and/or functionality of the row dispersal operator 2566 of FIG. 28D can implement the row dispersal operator 2566 of FIG. 28A and/or any other embodiment of the row dispersal operator described herein.

Current load data 2810 at a given time can indicate which parallelized processes 2537 (e.g. corresponding nodes 37) are available vs. unavailable. In some embodiments, the load data update module 2821 can update nodes as being unavailable to available based on receiving availability notifications 2822 from the respective parallelized processes 2537 (e.g. via corresponding operator execution modules 3515 via corresponding nodes 37, for example, via communication resources of shuffle network 2480 and/or other communication resources). The availability notifications 2822 can be implemented as EOF signals or other types of notifications denoting availability. In such cases, a given process can be presumed to be unavailable until availability notification 2822 is received. Alternatively, other information (e.g. rather than receiving data from the other processes directly) can be utilized to estimate/determine whether other processes 2537 are available (e.g. estimated load, estimated amount of time to process the load, prior measurements from other query processing, etc.).

In this example, unavailable set 2824 includes S processes that includes at least the set of processes 2537.2, 2537.4, and/or 2537.5, and the available set 2823 includes L-S processes that includes at least the set of processes 2537.1 (i.e. itself). 2537.3, and/or 2537.6.

Probability distribution generator module 2811 can denote a predetermined means of assigning probabilities/weights to different nodes in generating corresponding probability distribution data 2812 as a function of their availability denoted in current load data. In this example, the probability distribution generator module 2811 is configured to: assign a probability of selection with a value of zero for each unavailable process: assign a probability of selection with a value of 1/total #processes (e.g. l/L) for each available process; and/or assign a probability of selection with a value of (total ##processes-available #processes)/total #processes (e.g. S/L) to the given process itself.

Other schemes of assigning weights can be used in other embodiments. In some embodiments, the scheme can be selected based on: meeting network usage requirements (e.g. to minimize network usage induced by passing large numbers of rows between nodes); meeting data skew removal requirements (e.g. to ensure that sufficient shuffling is performed to remove data skew/handle low cardinality cases); and/or meeting even processing distribution requirements (e.g. to ensure that all nodes have relatively even load, and/or optionally uneven loads in the cases where some nodes process their data more quickly to ensure that nodes process their data in relatively similar amounts of time and/or are not waiting for data while other nodes are overloaded).

The data block random assignment module 2813 can select the parallelized process 2537.*j* based on applying the most recent probability distribution data 2812. This can include performing a weighted round robin process for multiple incoming data blocks, utilizing a random number generator and/or selecting the parallelized process 2537.*j* based on a randomly generated numeric value falling within a range assigned to the parallelized process 2537.*j* having a size proportional and/or as an increasing function of its assigned weight/probability, and/or other means of applying the probability distribution data 2812.

As the current load data updates over time, the probability distribution generator module 2811 can be utilized to process new versions of the current load data to update the probability distribution data accordingly, for example, in accordance with the predetermined scheme by which the probability distribution generator module 2811 is configured to assign these weights/probabilities.

While not illustrated in FIG. 28D, in some embodiments, the load update module 2821 can optionally further utilize the data block routing assignment data 2814 to designate parallelized processes to which data blocks are assigned as being unavailable (e.g. as they are now processing the given data block). In such cases, the data block is deemed unavailable until an availability notification 2822 is again received from the node denoting it is again available (e.g. that is has finished processing of the given data block) and/or until a predetermined time window corresponding to an estimated time to process the data block has elapsed.

Note that while the current load data is designated as 2810.*i* in the example of FIG. 28D, the current load data is optionally not updated for every incoming data block, where a same version of current load data is optionally utilized to generate data block routing assignment data for multiple consecutive data blocks, for example, based on the current load data not changing during this longer time window.

The examples embodiments of determining probability distributions and dispersing data blocks accordingly discussed in FIGS. 28A-28D assumes that each peer is accomplishing approximately the same amount of work in the same amount of time. However one peer is processing the same amount of data faster and the shuffle eofs earlier, this could result in memory being skewed towards that peer. In some embodiments, this may be acceptable if the peer continues to accomplish work faster, but may not be desirable if the goal is to evenly distribute memory rather than distributing the amount of work a node has to do at that point in the query. In other embodiments, to evenly distribute memory while handling this case, the nodes implementing row dispersal operators can be operable to periodically broadcast the number of blocks that have been sent to their local parent operator. In such embodiments, each node implementing row dispersal operators can recalculate the probability of selecting any target peer for incoming blocks based on the block counts broadcasted by its peers.

Figure 28E:
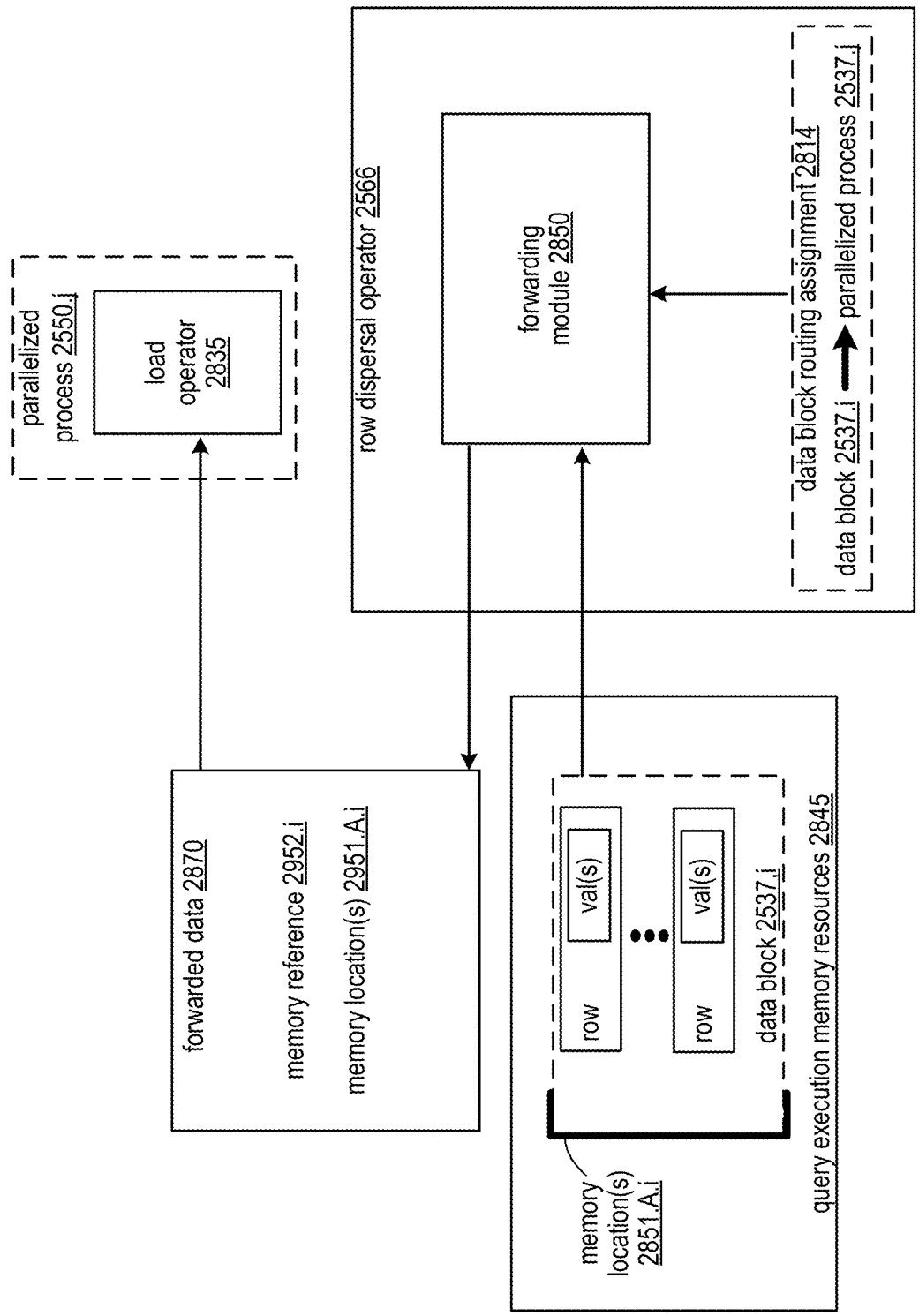
FIG. 28E is a schematic block diagram of a query execution module executing a row dispersal operator that implements a row forwarding module in accordance with various embodiments.

FIG. 28E illustrates an embodiment of a row dispersal operator that implements a forwarding module 2850 that assigns a given data block 2537.*i* to a given parallelized process 2550.*j* based on passing a memory reference 2952 denoting a memory location of the given data block 2537.*i* in query execution memory resources 2845 in forwarded data 2870 communicated to the parallelized process 2537.*j* (e.g. to implement "forwarding" the data block to the parallelized process 2537.*j*). Some or all features and/or functionality of FIG. 28E can implement the row dispersal operator 2566 of FIGS. 28A-28D and/or can implement any performance of shuffle operators and/or transfer/shuffling of data between operators described herein.

As discussed in conjunction with FIGS. 28A-28D, the row dispersal operator can assign entire data blocks, rather than individual rows, to processes 2537 for processing. This can be preferred over the case of sending/assigning each individual row to a given process 2537, even in cases where the shuffling is performed in accordance with a round-robin scheme/uniform distribution. In particular, rather than the row dispersal operator processing each row individually, which could require the expensive process of copying all input rows, the full data blocks containing a plurality of rows can be assigned to the processes 2537. This functionality can be particularly ideal by enabling the forwarding of a reference to the data (e.g. a pointer/memory location data to its storage location in memory resources), rather than copying it, which can be significantly faster and/or can require less processing and/or memory resources than copying all the rows. This solution can further be useful in cases where random and/or even shuffling of data blocks across different processes is required to handle data skew/low cardinality, for example, because the number of data blocks can be guaranteed and/or expected to be high enough (and the contents can be known and/or expected to be evenly distributed enough) that the weighted, load based assignment (or optionally the simple round robin based/uniform assignment) of such larger units suffices.

The given data block 2537.*i* can be stored in query execution memory resources 2845, for example, based on being stored in a corresponding column stream generated via retrieval and/or processing of relational database rows stored in memory as discussed in conjunction with some or all of FIGS. 24K-24N. The query execution memory resources 2845 storing the given data block 2537.*i* can correspond to memory resources of the given node processing this data block as input to its row dispersal operator 2566 and/or any memory resources utilized to execute queries that are optionally shared by/accessible by nodes in a same shuffle node set to enable other nodes to access the given memory location, given the memory reference, to process the respective column values as needed.

The forwarded data 2870 can be sent to/communicated to/accessible by the parallelized process 2550 for receipt/access by the parallelized process 2550, for example, based on being sent to the corresponding node via communication resources of shuffle network 2480 and/or based on being stored in memory resources accessible by the node.

In some embodiments, while not depicted in FIG. 28E, the forwarded data 2870 denoting memory reference 2952 can optionally be included in a new data block 2537 of same or different size. The new data block 2537 can optionally include multiple other memory references to other data blocks assigned to the load operator of the given parallelized process for processing. The new data block can be stored in the same or different query execution memory resources 2845 for access by the corresponding process 2537.$j$/the corresponding node, in a different location from the given data block 2537.$i$, for example, as a newly created output data block in a similar fashion as illustrated in FIG. 24N that included memory reference data rather than column values copied from the data block 2537.$i$. The new data block can alternatively be sent/communicated directly to the corresponding process 2537.$j$/the corresponding node via communication resources (e.g. shuffle network 2480).

Figure 28F:
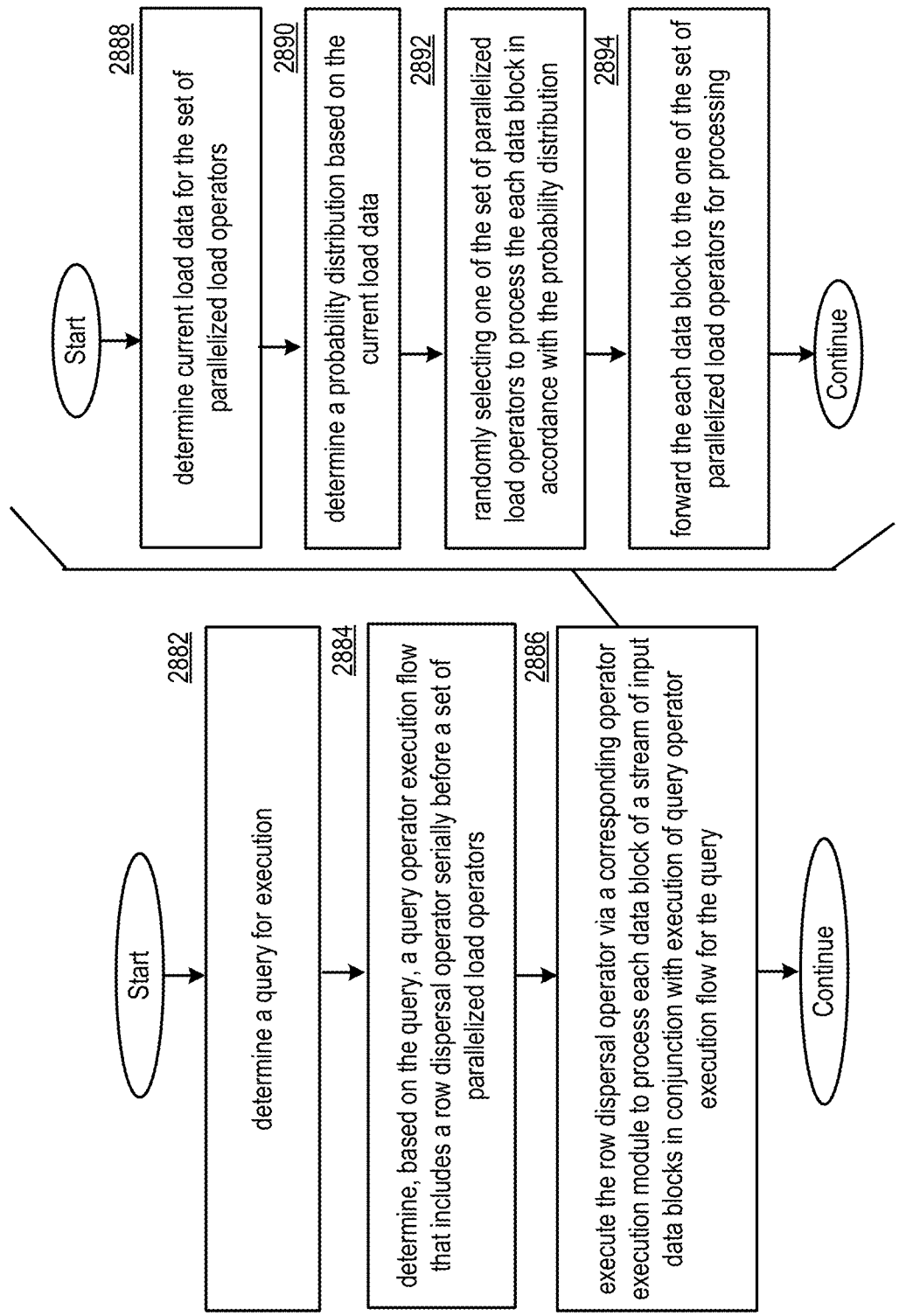
FIG. 28F is a logic diagram illustrating a method for execution in accordance with various embodiments.

FIG. 28F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28F. In particular, a node 37 can utilize the query processing module 2435 to execute some or all of the steps of FIG. 28F, where multiple nodes 37 implement their own query processing modules 2435 to independently execute the steps of FIG. 28F, for example, to facilitate execution of a query as participants in a query execution plan 2405. Some or all of the method of FIG. 28F can be performed by the query processing system 2510, for example, by utilizing an operator flow generator module 2514 and/or a query execution module 2504. In particular, some or all of the method of FIG. 28F can be performed via one or more operator executions of one or more row dispersal operators and/or one or more load operators 2535. Some or all of the steps of FIG. 28F can optionally be performed by any other processing module of the database system 10. Some or all of the steps of FIG. 28F can be performed to implement some or all of the functionality of the database system 10 as described in conjunction with FIGS. 28A-28E, for example, by implementing some or all of the functionality of row dispersal operators in queries executed by query processing system 2510 as described in conjunction with FIGS. 25A-27H. Some or all of the steps of FIG. 28F can be performed to implement some or all of the functionality regarding execution of a query via the plurality of nodes in the query execution plan 2405 as described in conjunction with some or all of FIGS. 24A-24I. Some or all steps of FIG. 28F can be performed by database system 10 in accordance with other embodiments of the database system 10 and/or nodes 37 discussed herein.

Some or all steps of FIG. 28F can be performed in conjunction with one or more steps of FIG. 26F, and/or of any other method described herein.

Step 2882 includes determining a query for execution. Step 2884 includes determining, based on the query, a query operator execution flow that includes a row dispersal operator serially before a set of parallelized load operators. Step 2886 includes executing the row dispersal operator via a corresponding operator execution module to process each data block of a stream of input data blocks s in conjunction with execution of query operator execution flow for the query based on, for each data block of the stream of input data blocks. In various examples, executing the row dispersal operator via the corresponding operator execution module renders dispersal of the stream of input data blocks to the set of parallelized load operators for processing by the set of parallelized load operators in conjunction with further execution of the query.

Performing step 2886 can include performing some or all of steps 2888-2894. In various example, some or all of steps 2888-2894 are performed for each data block in conjunction with processing each data block, and/or some or all of steps 2888-2894 can be repeated a plurality of times to process the full stream of input data blocks.

Step 2888 includes determining current load data for the set of parallelized load operators. Step 2890 includes determining a probability distribution based on the current load data. In various examples, the probability distribution indicates, for each of the set of parallelized load operators, a corresponding one of a set of probabilities of selection.

Step 2892 includes randomly selecting one of the set of parallelized load operators to process the each data block in accordance with the probability distribution. Step 2894 includes forwarding the each data block to the one of the set of parallelized load operators for processing.

In various examples, the query operator execution flow is executed via a plurality of nodes of a query execution plan. In various examples, the set of parallelized load operators are executed via a corresponding plurality of peer nodes of the query execution plan.

In various examples, the row dispersal operator is executed via a node of the plurality of nodes. In various examples, the node is one of the plurality of peer nodes of the query execution plan that executes a corresponding one of the set of parallelized load operators.

In various examples, for all data blocks of the stream of input data blocks, the corresponding one of the set of probabilities for the one of the set of parallelized load operators executed by the node is one of: greater than all other probabilities of the set of probabilities, or equal to all other probabilities of the set of probabilities.

In various examples, each other one of the plurality of peer nodes of the query execution plan further execute a corresponding row dispersal operator upon their own corresponding stream of input data blocks, and wherein the node executes the corresponding one of the set of parallelized load operators upon a first set of data blocks from the stream of input data blocks local to the node for which the row dispersal operator of the node selects the corresponding one of the set of parallelized load operators of the node for processing, and further upon a second set of data blocks non-local to the node, for which other corresponding row dispersal operators of other nodes select the corresponding one of the set of parallelized load operators of the node for processing.

In various examples, the probability distribution is a non-uniform distribution based at least one of the set of probabilities being different from at least one other one of the set of probabilities.

In various examples, the row dispersal operator is executed to process two consecutive data blocks in the stream of input data blocks based on processing a first data block in the two consecutive data blocks based on determining a first probability distribution based on first current load data. In various examples, a first one of the set of parallelized load operators is selected to process the first data block in accordance with the first probability distribution. In various examples, the row dispersal operator is executed to process the two consecutive data blocks in the stream of input data blocks further based on processing a second data block in the two consecutive data blocks based on determining a second probability distribution based on second current load data. In various examples, a second one of the set of parallelized load operators is selected to process the second data block in accordance with the second probability distribution. In various examples, a second set of probabilities of the second probability distribution is different from a first set of probabilities of the first probability distribution based on the second current load data being different from the first current load data.

In various examples, determining the current load data for the set of parallelized load operators is based on determining a subset of parallelized load operators of the set of parallelized load operators that have completed processing of previously received data blocks in the stream of input data blocks.

In various examples, determining the subset of parallelized load operators is based on receiving a signal, denoting the completed processing, sent by operator execution modules implementing the ones of the set of parallelized load operators.

In various examples, the set of probabilities of selection include probabilities of zero assigned to all of the parallelized load operators in a set difference between the set of parallelized load operators and the subset of parallelized load operators. In various examples, a subset of probabilities in the set of probabilities corresponding to the subset of parallelized load operators sum to one.

In various examples, the set of probabilities of selection include a first non-zero probability assigned to a first one of the subset of parallelized load operators. In various examples, the set of probabilities of selection include a second non-zero probability assigned to all remaining ones of the subset of parallelized load operators. In various examples, the second non-zero probability is less than or equal to the first non-zero probability.

In various examples, each data blocks includes a plurality of column values for a plurality of rows determined based on accessing a set of relational database rows of a relational database system via at least one IO operator of the query operator execution flow.

In various examples, the stream of input data blocks are stored in memory resources, and wherein the each data block is forwarded based on sending a reference to a location of the each data block in the column stream to the one of the set of parallelized load operators. In various examples, the one of the set of parallelized load operators processes the plurality of rows of the each data block based on accessing the plurality of column values for the plurality of rows in the location based on the reference. In various examples, the each data block is forwarded based on otherwise sending/ routing the plurality of column values for the plurality of rows to the one of the set of parallelized load operators.

In various embodiments, any one of more of the various examples listed above are implemented in conjunction with performing some or all steps of FIG. 28F. In various embodiments, any set of the various examples listed above can implemented in tandem, for example, in conjunction with performing some or all steps of FIG. 28F.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28F described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28F, for example, in conjunction with further implementing any one or more of the various examples described above.

In various embodiments, the operational instructions, when executed by the at least one processor, cause the database system to: determine a query for execution: determine, based on the query, a query operator execution flow that includes a row dispersal operator serially before a set of parallelized load operators; and/or execute the row dispersal operator via a corresponding operator execution module to processes a stream of input data blocks in conjunction with execution of query operator execution flow for the query. Executing the row dispersal operator via a corresponding operator execution module to processes the stream of input data blocks in conjunction with execution of query operator execution flow for the query can be based on for each data block of the stream of input data blocks: determining current load data for the set of parallelized load operators: determining a probability distribution based on the current load data indicating, for each of the set of parallelized load operators, a corresponding one of a set of probabilities of selection: randomly selecting one of the set of parallelized load operators to process the each data block in accordance with the probability distribution; and/or forwarding the each data block to the one of the set of parallelized load operators for processing.

In various embodiments, a node of a database system includes: at least one processor; and/or a memory that stores operational instructions that, when executed by the at least one processor, causes the node to: execute a row dispersal operator via a corresponding operator execution module to disperse a stream of input data blocks to a set of parallelized load operators in conjunction with execution of a corresponding query based on, for each data block of the stream of input data blocks: determining current load data for a set of parallelized load operators: determining a probability distribution based on the current load data indicating, for each of a set of parallelized load operators executed by a set of peer nodes, a corresponding one of a set of probabilities of selection: randomly selecting one of the set of parallelized load operators to process the each data block in accordance with the probability distribution; and/or forwarding the each data block to the one of the set of parallelized load operators for processing. In various examples, the set of peer nodes includes the node.

FIG. 29A-29E illustrate embodiments of a database system 10 that implements execution of a join process serially after another operation (e.g. a limit operator or a sort operator) based on the corresponding other operation being pushed before the join operator (e.g. in optimization), where query correctness is guaranteed, despite this push of the other operation before the join even when this operation is indicated to be applied to the output of the join, based on applying at least one adaptation to the execution of the query. Some or all features and/or functionality of the database system 10 of FIGS. 29A-29E can implement any embodiment of database system 10 described herein.

Figure 29A:
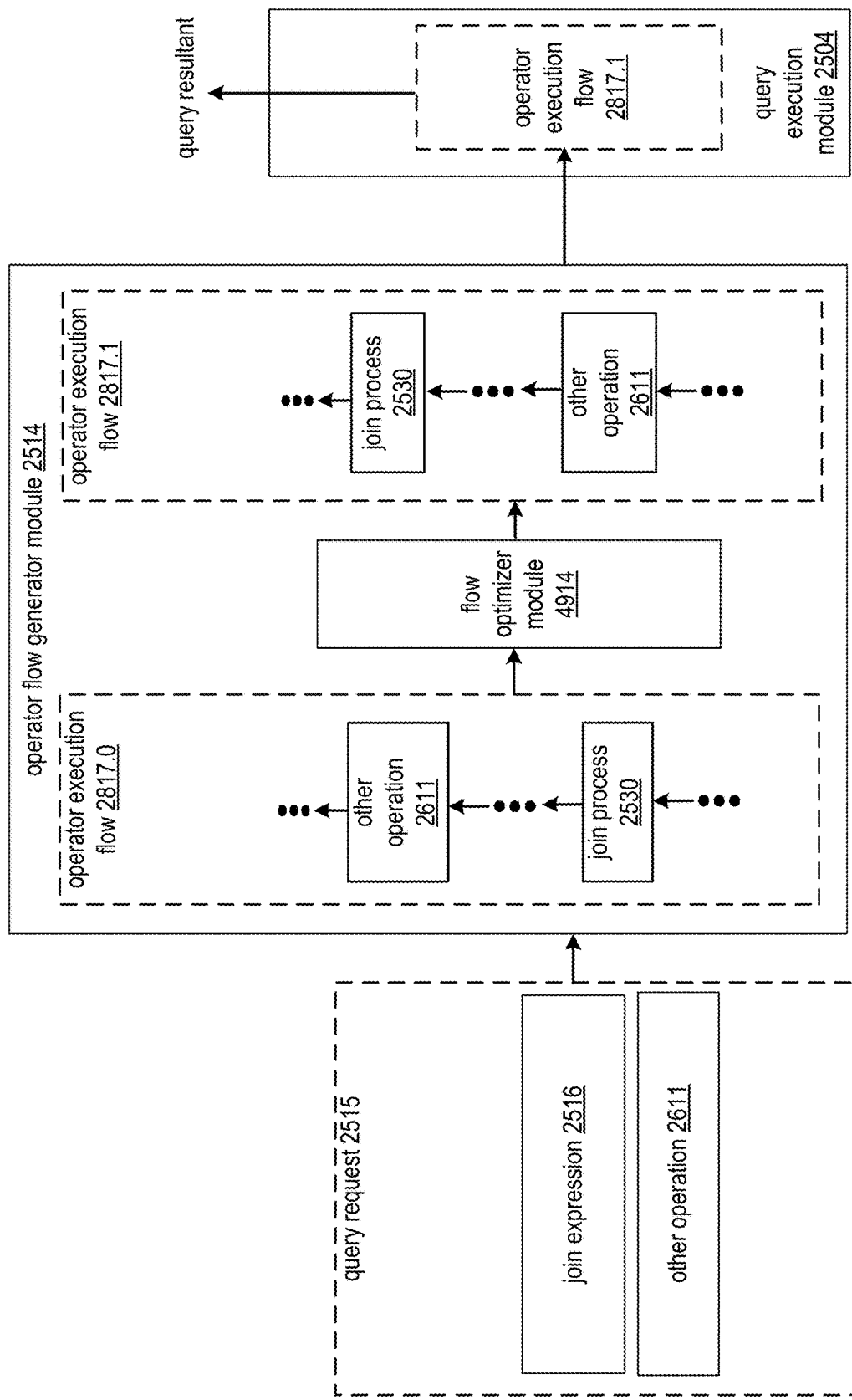
FIG. 29A is a schematic block diagram of an operator flow generator module that implements a flow optimizer module in accordance with various embodiments.

FIG. 29A illustrates an embodiment of a database system 10 that implements a flow optimizer module 4914 to generate an updated operator execution flow 2817.1 that is semantically equivalent with an initial operator execution flow 2817.0 generated from a query request 2515. In particular, the flow optimizer module 4914 can be implemented to push another operator 2611 from being serially after a join process 2530 (e.g. applied to output of the join process) to being applied serially before the join process 2530, while guaranteeing equivalent, correct query results. This can include adapting the operator execution flow 2817.1 to ensure the pushing of other operation 2611 before the join process 2530 to ensure query correctness.

The query request 2515 processed by operator flow generator module 2514 (e.g. based on being received/determined for execution) can indicate execution of the join process 2530 via a corresponding join expression 2516. Join expression 2516 can be implemented via any embodiment of join expression 2516 described herein. The query request 2515 can further execution of the join process 2530 via indication of another operation 2611, which can be indicated in query request 2515 to be applied to the output of join process 2530 (e.g. a limit operation applied to output of the join limiting the number of rows emitted by the join ultimately included/reflected in generating the query resultant: a sort operation applied to the output of the join sorting the rows emitted by the join by the same column by which the join was executed (e.g. by which the left input rows are matched with right input rows) or by a different column, such as any other column of the join).

The resulting operator execution flow 2817.1 can ultimately be executed via query execution module 2504 to render generation of a query resultant. While FIG. 29A illustrates a single update of an initial operator execution flow 2817.0, the flow optimizer module 4914 can update the operator execution flow 2817 over multiple iterations and/or can select the resulting operator execution flow 2817 that is ultimately executed from several semantically equivalent options. Operator execution flow 2817 of FIG. 29A can implement any embodiment of operator execution flow 2517 and/or 2433 described herein.

Figure 29B:
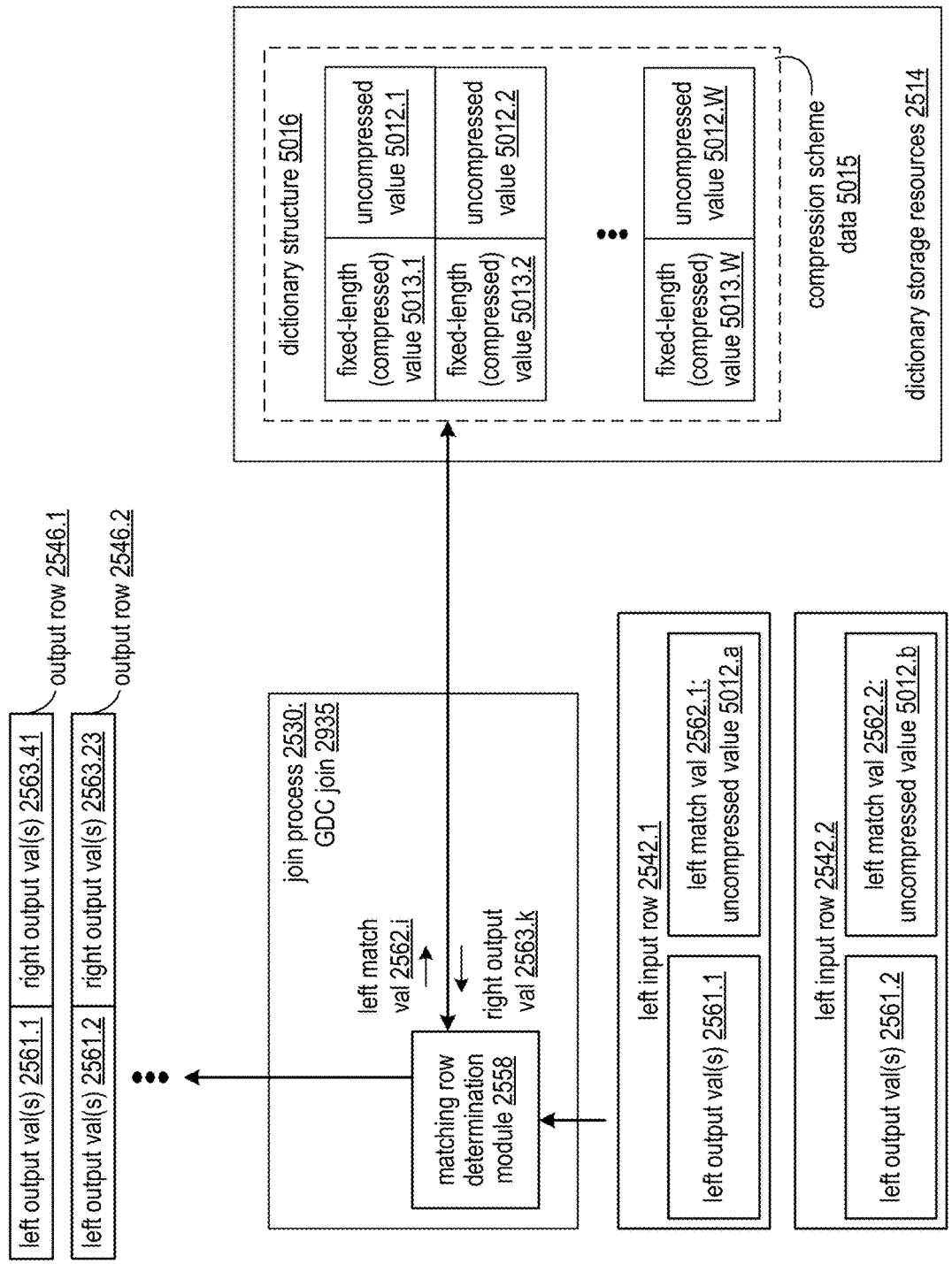
FIG. 29B is a schematic block diagram of a query execution module that implements a Global Dictionary Compression join via access to a dictionary structure in accordance with various embodiments.

FIG. 29B illustrates an embodiment of executing a join process 2530 that is implemented as a global dictionary compression (GDC) join. This can include applying matching row determination module 2558 via access to a dictionary structure 5016, for example, in a same or similar fashion as accessing the hash map 2555 as discussed in conjunction with FIG. 25F, where dictionary structure 5016 is implemented in a same or similar fashion as hash map 2555.

However, unlike hash map 2555 that is generated from right input rows by the operator in conjunction with executing the query, the dictionary structure 5016 can optionally be accessed based on being globally maintained, and thus being generated prior to execution of the corresponding query. In particular, the dictionary structure 5016 can be implemented in conjunction with compressing one or more columns, such as a variable length values stored in one or more variable length columns, by mapping these variable length, uncompressed values (e.g. strings, other large values of a given column) to corresponding fixed-length, compressed values 5013 (e.g. integers or other fixed length values).

This dictionary structure 5016 can be globally maintained (e.g. across some or all nodes, indicating fixed length values mapped across one or more segments stored in conjunction with storing one or more relational database tables) and can be updated overtime (e.g. as more data is added with new variable length values requiring mapping to fixed length values). For example, the dictionary structure 5016 is maintained/stored in state data that is mediated/accessible by some or all nodes 37 of the database system 10 via the dictionary structure 5016 being included in any embodiment of state data (e.g. state data 3150) described herein.

For example, segments can store the fixed length values to improve storage efficiency and/or queries can access and process these fixed length, where the uncompressed variable length values are only required via access to dictionary structure 5016 to emit an uncompressed value 5012 for a given fixed-length value 5013 of a given input row. This functionality can be achieved via performing a corresponding join as described herein, where the matching condition 2519 is implemented for a compressed column and indicates matching by the value of the compressed column, such as simply emitting the uncompressed value mapped to the compressed column as the right output value 2563 for a given input row, implemented as a left input row 2542 of a join operation.

In some embodiments, the dictionary structure 5016 can be generated, accessed, and/or otherwise implemented via some or all features and/or functionality of any embodiment of global dictionary compression, and/or corresponding dictionary 246 and/or corresponding joins applied to compressed values and/or uncompressed values, disclosed by U.S. Utility application Ser. No. 16/220,454, entitled "DATA SET COMPRESSION WITHIN A DATABASE SYSTEM", filed Dec. 14, 2018, issued as U.S. Pat. No. 11,256,696 on Feb. 22, 2022, which is hereby incorporated herein by reference in its entirety and made part of the present U.S. Utility Patent Application for all purposes.

Figure 29C:
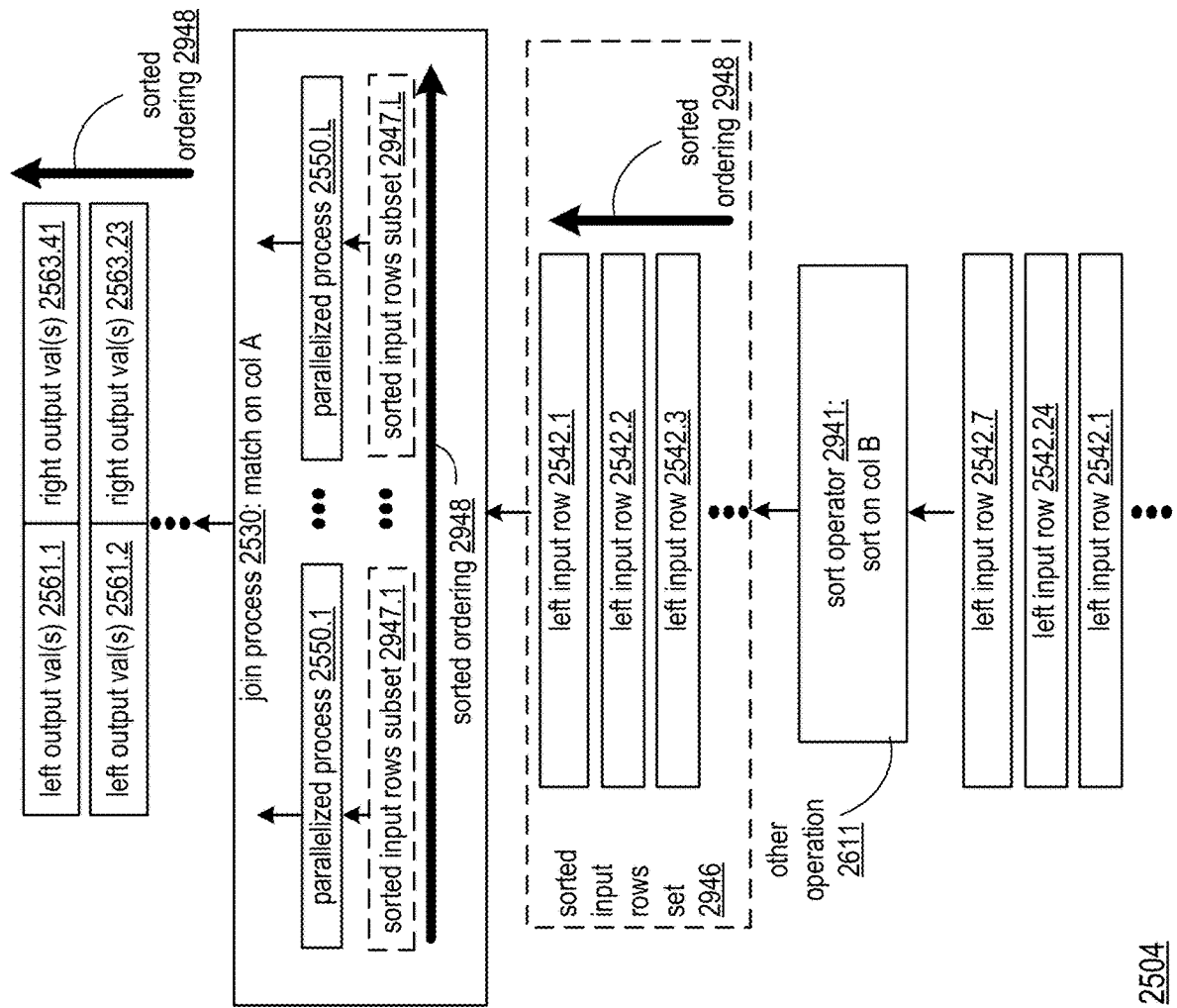
FIG. 29C is a schematic block diagram of a query execution module that implements execution of a sort operator serially before a join process in accordance with various embodiments.
Figure 29D:
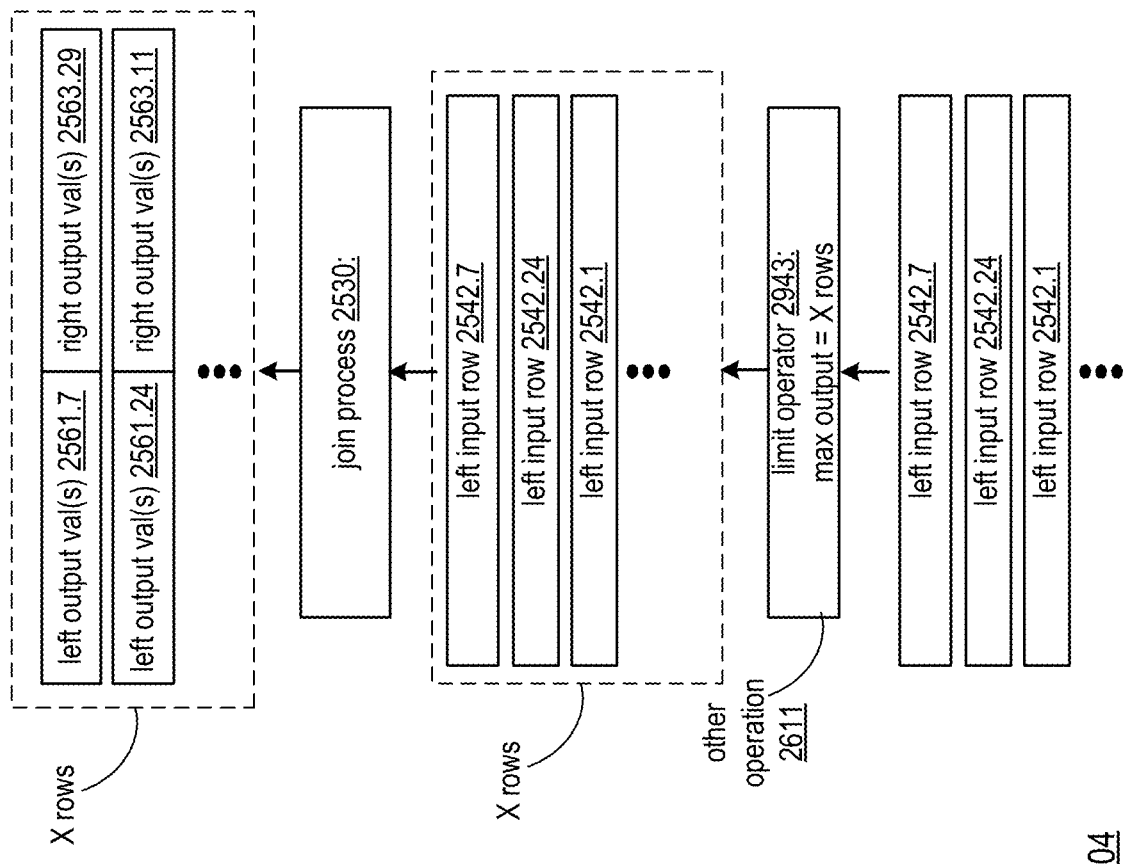
FIG. 29D is a schematic block diagram of a query execution module that implements execution of a limit operator serially before a join process in accordance with various embodiments.
Figure 29E:
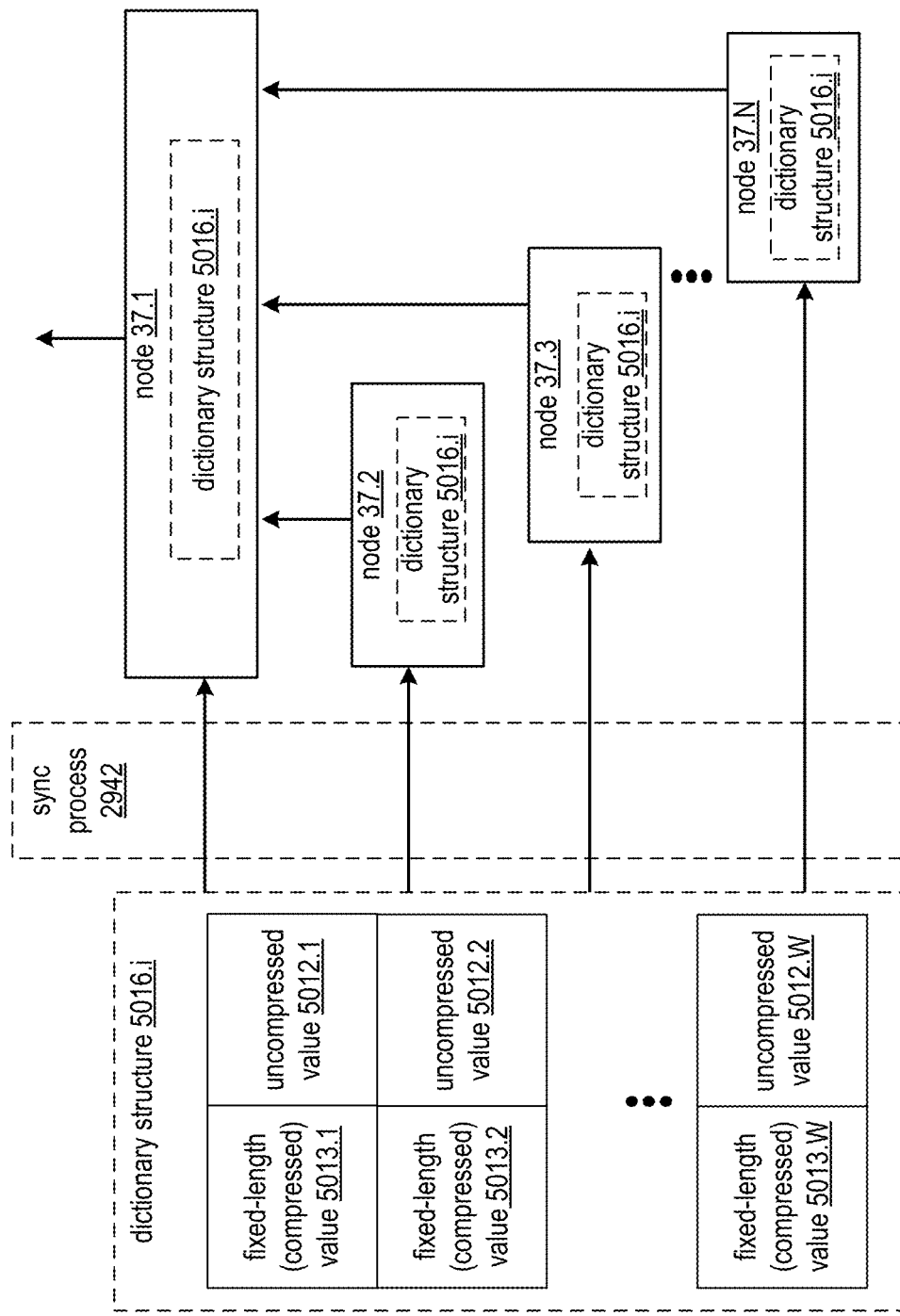
FIG. 29E is a schematic block diagram of a query execution module that implements a synchronization process via a plurality of nodes to synchronize to a same version of a dictionary structure in accordance with various embodiments.

Some or all features and/or functionality of executing the other operator 2611 serially after the join process 2530 of FIG. 29A and/or of FIGS. 29C-29E can be implemented based on the join process 2530 being a GDC join 2935 (e.g. the corresponding adaptations applied to guarantee query correctness can optionally be based on leveraging properties of the GDC join). In other embodiments, the features and/or functionality of executing the other operator 2611 serially after the join process 2530 of FIG. 29A and/or of FIGS. 29C-29E can be implemented based on the join process 2530 being a non-GDC join, such as any other type of join described herein where hash map 2555 is optionally not implemented as dictionary structure 5016.

In some embodiments, the motivation behind GDC is that variable length column data is significantly more expensive to process both computationally and in terms of memory footprint. For example, the optimizer (e.g. flow optimizer module 4914) can generally attempt to move GDC joins as late as possible in query. However, some other operations 2611 cannot easily be translated to apply to the compressed/ fixed length GDC keys, such as sorts and limits. Pushing limits below GDC joins can significantly more impactful if the limit can then be combined with another operator after it pushes below GDC joins, such as a limit pushed into a sort or an IO operator. Similarly, pushing sorts below GDC joins can significantly more impactful if the sort can then be applied before GDC joins.

FIG. 29C illustrates an embodiment of a sort operator 2941 applied serially before a join process 2530, for example, based on being implement as the other operator 2611 that was pushed for execution before the join process 2530 during optimization as discussed in conjunction with FIG. 29A. The sort operator 2941 can be operable to sort input rows 2542 (e.g. left input rows for the corresponding join process 2530) into sorted order by a corresponding one or more columns (e.g. a given column B). The rows can then be emitted in sorted order for processing by join process 2530 (e.g. that implements matching on a column A, such as a compressed column to which a GDC join is applied or any other column by which the corresponding join identifies matching right rows with left rows, which can be the same or different from the column B by which the rows were sorted).

The join process can process the input rows 2542 in sorted order and can be guaranteed to emit the output values in sorted order, even if a plurality of parallelized processes 2550 are implemented upon different input row subsets 2547, based on these different input row subsets 2947 being pre-sorted portions of the sorted input. In particular, each subset 2947 can be a sorted portion of sorted ordering, all subsets 2947.1-2947.L are different contiguous portions of the full sorted input row set 2946 in accordance with the sorted ordering 2948 (e.g. parallelized process 2550.1 processes the first 10 rows, in order: parallelized process 2550.2 processes second first 10 rows, in order: etc.). The respective outputs can be appended in accordance with the original sorted ordering 2948, where rows within each sub-output maintain their own ordering (e.g. the output of the join process includes, first, the output of parallelized process 2550.1 indicating output for the first 10 rows, in order: next the output of the join process includes, second, the output of parallelized process 2550.2, indicating output for the second 10 rows, in order: etc.)

In some embodiments, the join process 2530 of FIG. 29C is the GDC join 2935, for example, implemented via some or all functionality of FIG. 29B. For example, GDC joins can often be further optimized than a generic hash inner join because it can be guaranteed that the lookup table/right hand side of the join is relatively small. Because the right hand side (rhs) is small and the state of the global key/value map for a table is cached+replicated across all participating VM nodes (e.g. nodes 37) distributed state (e.g. in state data the rhs data of the join is again always replicated across each parallel operator instance that is executing the join. In some embodiments, the left hand side (lhs) of the join can then be randomly partitioned across each instance of the join operator. The same can apply when there are multiple compressed columns being joined to their key/value maps in a single operator instance. One approach to sorted data can involve partitioning the data into L row streams such that all data in stream 0 comes before all data in stream L in the sort order etc.

In some embodiments. GDC joins can output data that is sorted by any lhs columns other than any of their compressed keys. For example, if the input data on a node is composed of L sorted streams, then L GDC join operator instances can be created and implemented (e.g. via L parallelized process 2550.1-2550.L). In some embodiments, this result in lower parallelization than what would occur on an unsorted GDC join. For example, the optimizer can optionally be implemented based on assuming that that sorting before a GDC join is always faster.

In some embodiments, each GDC join instance can be required to process and emit all data from their lhs in the order it arrives, and then the output will retain its sort order. This can constrain how GDC joins can spill the lhs data to temporary disk, and/or can requires that sorted GDC joins process spilled blocks in order as well as waiting to process spilled blocks before processing any new data. In some embodiments, unsorted GDC joins do not have either of these constraints, and can be optimized to run on all cores available and will process data out of order when spilling occurs.

These constraints to allow join to maintain a sort order by a lhs column can be generalized to other types of join operations, such as hash or nested loop (product) inner joins. For example, hash joins have the option of multiplexing lhs+rhs data across nodes/threads to save memory and avoid replicating their rhs, which could destroy the sort order of any lhs data. The optimizer can adapt to this based on forcing the hash join to replicate its rhs across all nodes/cores to push it above a sort. In some embodiments, this is possibly much slower and memory intensive than sorting above a hash-multiplexed hash join, where the optimizer optionally selects a flow where the sort is applied serially after the join in such cases.

FIG. 29D illustrates an embodiment of a limit operator 2943 applied serially before a join process 2530, for example, based on being implement as the other operator 2611 that was pushed for execution before the join process 2530 during optimization as discussed in conjunction with FIG. 29A. The limit operator 2943 can be operable to emit up to a configured maximum X number of input rows 2542 (e.g. left input rows for the corresponding join process 2530). The up to X rows can then be emitted for processing by join process 2530, where the join process 2530 can be guaranteed to emit the same number of rows as inputted as output of the limit operator 2943 (e.g. exactly X rows, or a smaller number of rows if an only if there were less than X rows originally, where the limit operation thus emitted less that X rows based on less than X rows being processed by the limit operation).

In some embodiments, the join process 2530 of FIG. 29D is the GDC join 2935, for example, implemented via some or all functionality of FIG. 29B. For example, GDC joins are generally not guaranteed to have a match for each compressed row, which may produce incorrect results if a row limit is applied before a GDC join (e.g. if there are 100 GDC rows on disk, 99 rows have matches in the cached version of the global map, and a limit 10 is applied before the GDC join, the results may only contain 9 rows rather than 10, which would render incorrect query results). In some embodiments. GDC joins can have such mismatches that result in rows being dropped for two reasons: (1) the optimizer puts a filtering operation (or any other operation that discards rows) on the rhs of the GDC join, and some key/value pairs are dropped before reaching the join: or (2) race conditions occur between the state of global key/value map and the state of the compressed table data on disk, where The key/value map may be stale and not contain mappings for very recently loaded on-disk rows.

In some embodiments, the first reason (1) can be resolved by blocking plan transformations/optimizations that discard rows on the right hand side of a GDC join when it has pushed above a limit vice versa. In some embodiments, the optimizer optionally implements heuristics to choose which of these mutually exclusive plan transformations are more efficient. In some embodiments, the optimizer only pushes the limit operation below the join if there are no filtering operations applied between the limit operation and the join. In some embodiments, such a filtering is pushed applied before the limit.

In some embodiments, the second reason (2) can be resolved based on coordinating a synchronization of the GDC state (e.g. corresponding state data 3150) after the table data involved in a query has been finalized when a GDC map lookup operator (e.g. of join process 2530) is associated with a GDC join that has pushed over a limit and is required to match all lhs rows.

FIG. 29E illustrates an example embodiment of a plurality of nodes of a query execution module 2504 that execute a given query (e.g. via executing a flow 2817.1 where a limit operator 2943 is pushed below a join process 2530) based on a synchronization process 2942 being performed where all nodes participating in execution of the query (e.g. nodes of a corresponding query execution plan 2405) all load a same version i (e.g. the most recent version) of dictionary structure 5016 (e.g. locally storing the same, most recent version dictionary structure 5016).

In some embodiments, GDC map lookup operators (e.g. of join process 2530) associated with a GDC join that has pushed over a limit and is required to match all lhs rows can wait for a signal from the single root/sql node that is coordinating the query before updating to the latest global state of its map. This can require cluster wide coordination, for example, because the GDC join may run on a different node than the node where table data being joined was stored.

In some embodiments, a table's segments and/or pages that will be included in a query is not set until an ownership sequence number (OSN) is set in the case of segments (e.g. as discussed in conjunction with FIG. 33A-33E), and/or and not until all IO operators are instantiated in the case of pages. In some embodiments, a query may be executed over multiple, partially independent branches that are compiled at different times. Whenever plan compilation completes on plan branch with no further subplans to send to lower level nodes a corresponding virtual machine (vm) cluster, it can send a notification to its parent node/action that it has completed plan compilation. When the parent node/action receives the notification from each child branch/action/node it is connected to, it can forward the notification to its parent node/action. This signal can thus eventually reach the root of the plan tree on the sql node. At this point, it can be guaranteed that all table data that will be involved in the query across all branches and subplans has finished its loading process.

In some embodiments, if the plan contains any GDC lookup operators that are awaiting a signal, the root action will sync its local replication of the GDC map and send the version info to all downstream subplans/branches, which will forward the info to their downstream subplans/branches until it reaches the leaves of the plan tree. In such cases, any GDC lookup operators awaiting the signal can then request the map from their node's GDC cache using the minimum version info from the signal.

In some embodiments, pushing some or all other types of non-GDC joins over limits can be implemented for example, where the lhs is guaranteed to have exactly one match. This can optionally be implemented through a table-wide foreign key constraint or a user-provided hint in the query to specify that each lhs row will have a match.

Figure 29F:
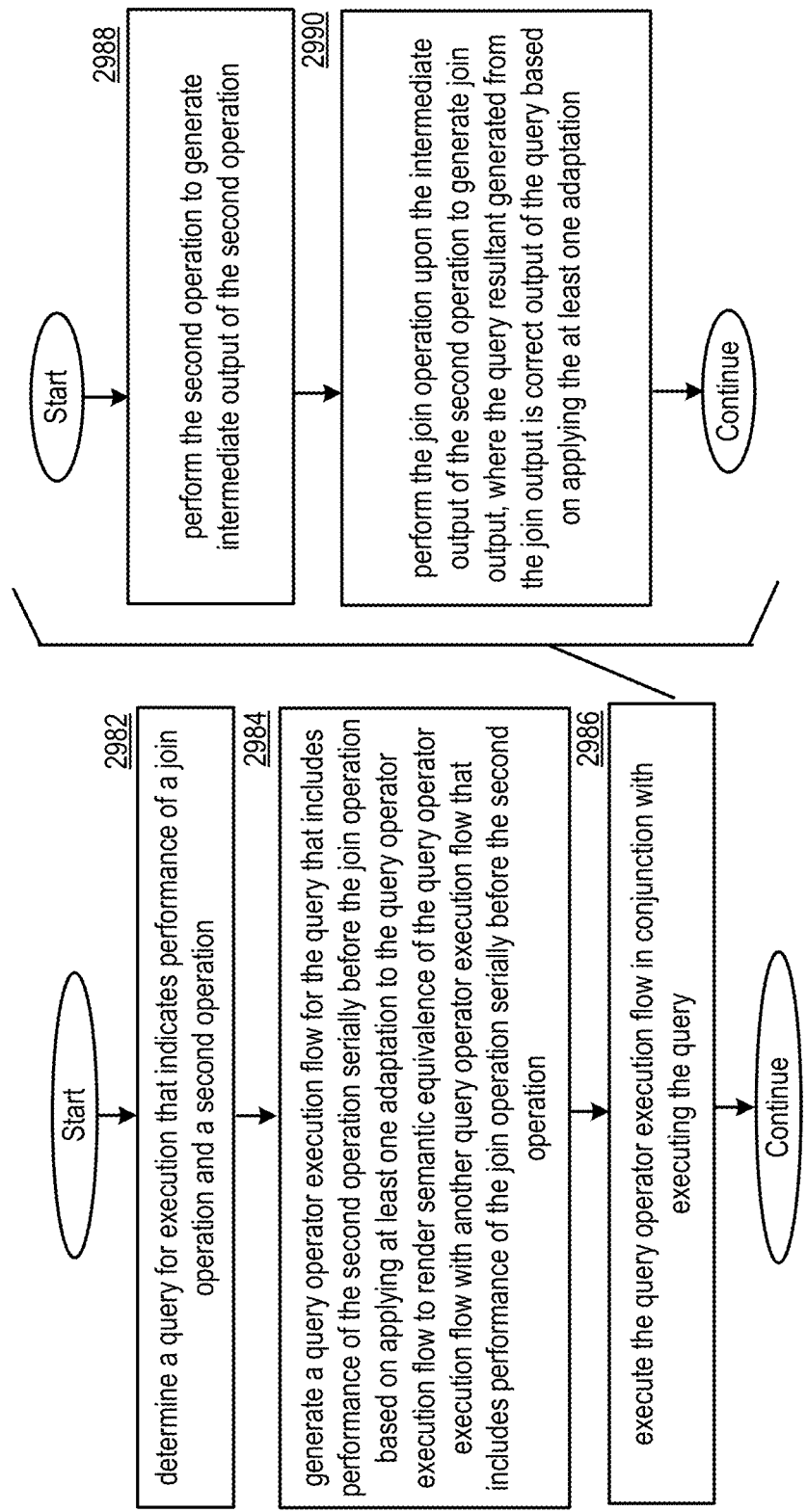
FIG. 29F is a logic diagram illustrating a method for execution in accordance with various embodiments.

FIG. 29F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29F. In particular, a node 37 can utilize the query processing module 2435 to execute some or all of the steps of FIG. 29F, for example, to facilitate execution of a query as participants in a query execution plan 2405. Some or all of the method of FIG. 29F can be performed by the query processing system 2510, for example, by utilizing an operator flow generator module 2514 and/or a query execution module 2504. Some or all of the steps of FIG. 29F can be performed to implement some or all of the functionality of the database system 10 as described in conjunction with FIGS. 29A-29E, for example, by implementing some or all of the functionality of the join process 2530 and/or execution of a corresponding execution flow with other operation 2611 pushed serially before the join process 2530. Some or all of the steps of FIG. 29F can be performed to implement some or all of the functionality regarding execution of a query via the plurality of nodes in the query execution plan 2405 as described in conjunction with some or all of FIGS. 24A-24I. Some or all steps of FIG. 29F can be performed by database system 10 in accordance with other embodiments of the database system 10 and/or nodes 37 discussed herein. Some or all steps of FIG. 29F can be performed in conjunction with one or more steps of any other method described herein.

Step 2982 includes determining a query for execution that indicates performance of a join operation and a second operation. Step 2984 includes generating a query operator execution flow for the query that includes performance of the second operation serially before the join operation based on applying at least one adaptation to the query operator execution flow to render semantic equivalence of the query operator execution flow with another query operator execution flow that includes performance of the join operation serially before the second operation. Step 2986 includes executing the query operator execution flow in conjunction with executing the query.

In various examples, performing step 2986 includes performing step 2988 and/or 2990. Step 2988 includes performing the second operation to generate intermediate output of the second operation. Step 2990 includes performing the join operation upon the intermediate output of the second operation to generate join output. In various examples, a query resultant generated from the join output (e.g. via full execution of the entire query operator execution flow) is correct output of the query based on applying the at least one adaptation.

In various examples, the join operation is a Global Dictionary Compression (GDC) join operation based on being performed upon a compressed column compressed via GDC, and wherein the generating the query operator execution flow includes positioning the second operation serially before the join operation based on the at least one adaptation to the query operator execution flow being applied based on at least one on characteristic of the GDC join operation.

In various examples, the method further includes: determining a second query for execution that indicate performance of a non-GDC join operation and the second operation: generating a second query operator execution flow for the second query that includes performance of the second operation serially after the non-GDC join operation based on the at least one adaptation not being available for implementing the non-GDC join operation; and/or executing the second query operator execution flow in conjunction with executing the second query.

In various examples, the compressed column is compressed via GDC based on each variable length value of a corresponding column mapping to a fixed-length key value in a corresponding dictionary structure, wherein the compressed column includes fixed-length key values mapping to corresponding variable length values of the corresponding column. In various examples, the GDC join operation includes joining, for a set of rows in the intermediate output of the second operation, the compressed column to the corresponding dictionary structure to emit the corresponding variable length value mapped to each given key value in the set of rows as the join output.

In various examples, the second operation is applied to at least one column of the set of rows includes the compressed column. In various examples, the second operation is applied to at least one column of the set of rows that is distinct from the compressed column.

In various examples, the second operation is a sort operation. In various examples, the intermediate output is generated to include a sorted plurality of rows in accordance with a sorted ordering. In various examples, the join output includes a subset of the sorted plurality of rows in accordance with the sorted ordering.

In various examples, the subset of the sorted plurality of rows includes all of the sorted plurality of rows. In various examples, the subset of the sorted plurality of rows is a proper subset of the sorted plurality of rows based on at least one of the sorted plurality of rows not having a match as indicated by a match condition of the join.

In various examples, applying the at least one adaptation includes segregating the sorted plurality of rows into a plurality of sorted subsets of the sorted plurality of rows. In various examples, the plurality of sorted subsets are mutually exclusive and collectively exhaustive with respect to the sorted plurality of rows. In various examples, each of the plurality of sorted subsets include a corresponding subset of rows sorted in accordance with the sorted ordering. In various examples, the corresponding subset of rows of the each of the plurality of sorted subsets is a corresponding contiguous portion of the sorted plurality of rows in accordance with the sorted ordering. In various examples, the each of the plurality of sorted subsets is further ordered relative to other ones of the plurality of sorted subsets in accordance with the sorted ordering based on an ordering of the corresponding contiguous portion of the sorted plurality of rows relative to other corresponding contiguous portions of the sorted plurality of rows of the other ones of the plurality of sorted subsets.

In various examples, applying the at least one adaptation includes processing each of the plurality of sorted subsets via a corresponding one of a plurality of parallelized join operator instances. In various examples, each join operator instances of the a plurality of parallelized join operator instances processes a corresponding sorted subset of the plurality of sorted subsets to generate corresponding sorted sub-output based on processing and emitting row data of the corresponding sorted subset in accordance with the sorted ordering. In various examples, the plurality of parallelized join operator instances collectively generate a plurality of corresponding sorted sub-output. In various examples, the join output is generated based on concatenating the plurality of corresponding sorted sub-output in accordance with the sorted ordering based on the ordering of the each of the plurality of sorted subsets relative to other ones of the plurality of sorted subsets in accordance with the sorted ordering.

In various examples, applying the at least one adaptation includes executing the join operation based on: emitting a first subset of the sorted plurality of rows in accordance with the sorted ordering during a first portion of execution of the join operation; after emitting the first subset of the sorted plurality of rows, determining to spill to disk during performing of the join operation based on determining a corresponding low memory condition is met: in response to determining to spill to disk, writing a second subset of the sorted plurality of rows to disk memory in accordance with maintaining the sorted ordering, where the second subset of the sorted plurality of rows are contiguously after the first subset of the sorted plurality of rows in the sorted ordering and are contiguously before a third subset of the sorted plurality of rows in the sorted ordering; and/or, after writing the second subset of the sorted plurality of rows to the disk memory, based on determining the corresponding low memory condition is no longer met, proceeding with a second portion of execution of the join operation based on receiving the third subset of the sorted plurality of rows in the sorted ordering for processing, foregoing processing of the third subset of the sorted plurality of rows until all of the second subset of the sorted plurality of rows are read and processed, emitting the second subset of the sorted plurality of rows in accordance with the sorted ordering based on accessing the disk memory, and/or, in response to emitting all of the second subset of the sorted plurality of rows, emitting the third subset of the sorted plurality of rows.

In various examples, the sort operation is applied to a first column of a set of columns corresponding to a plurality of rows to render the sorted plurality of rows. In various examples, the sorted ordering is in accordance with ordering of values of the first column. In various examples, performing the join operation is based on identifying output values matching with the first column of the plurality of rows. In various examples, performing the join operation is based on identifying output values matching with a second column of the plurality of rows, where the second column is different from the first column.

In various examples, the second operation is a limit operation indicating a maximum number of rows. In various examples, the intermediate output is generated to include a set of rows that does not exceed the maximum number of rows. In various examples, the join output includes all of the set of rows of the intermediate output based on the at least one adaptation being applied to guarantee that all of the set of rows have matches as required by a match condition of the join operation.

In various examples, the query operator execution flow is generated over a plurality of optimization iterations generating semantically equivalent updates to an arrangement of a plurality of operators in the query operator execution flow. In various examples, the query operator execution flow includes performance of the limit operation serially before the join operation based on one of the plurality of optimization iterations being applied to push the limit operation before the join operation based on the limit operation being serially after the join operation in a prior arrangement of the plurality of operators. In various examples, applying the at least one adaptation includes generating the query operator execution flow to block a transformation of the query operator execution flow includes not arranging the plurality of operators to include a filtering operator applied the intermediate output prior to the join operation based on determining applying the filtering operator to the intermediate output prior to the join operation is not semantically equivalent with the prior arrangement of the plurality of operators.

In various examples, the query operator execution flow is executed via a plurality of nodes. In various examples, the join operation is a Global Dictionary Compression (GDC) join operation based on being performed upon a compressed column compressed via GDC based on a dictionary structure storing a mapping of original variable length values to compressed fixed length values. In various examples, applying the at least one adaptation includes, after generating the query operator execution flow and prior to executing the query operator execution flow, performing a synchronization process across the plurality of nodes prior to executing respective portions of the query operator execution flow, wherein each of a set of nodes assigned to participate in the join operation update local replications of the dictionary structure to a most recent version of the dictionary structure based on performance of the synchronization process. In various examples, performing the join operation upon the intermediate output of the second operation to generate the join output includes the set of nodes of the plurality of nodes all applying the most recent version of the dictionary structure to generate the join output.

In various examples, performing the synchronization process is based on the each of the set of nodes updating the local replications of the dictionary structure to the most recent version of the dictionary structure in response to receiving a signal from a root node of the plurality of nodes that is coordinating the query.

In various examples, performing the synchronization process is based on: a root node of the plurality of nodes synchronizing a corresponding local replication of the dictionary structure to the most recent version of the dictionary structure; and/or the root node facilitating propagating of version information for the corresponding local replication across the plurality of nodes in accordance with a tree structure of a corresponding query execution plan based on the root node sending the version information for the corresponding local replication to child nodes of the root node in the tree structure, and based on each node of the plurality of nodes sending the corresponding local replication to any corresponding child nodes of the each node in the tree structure.

In various embodiments, any one of more of the various examples listed above are implemented in conjunction with performing some or all steps of FIG. 29F. In various embodiments, any set of the various examples listed above can be implemented in tandem, for example, in conjunction with performing some or all steps of FIG. 30C.

Figure 30A:
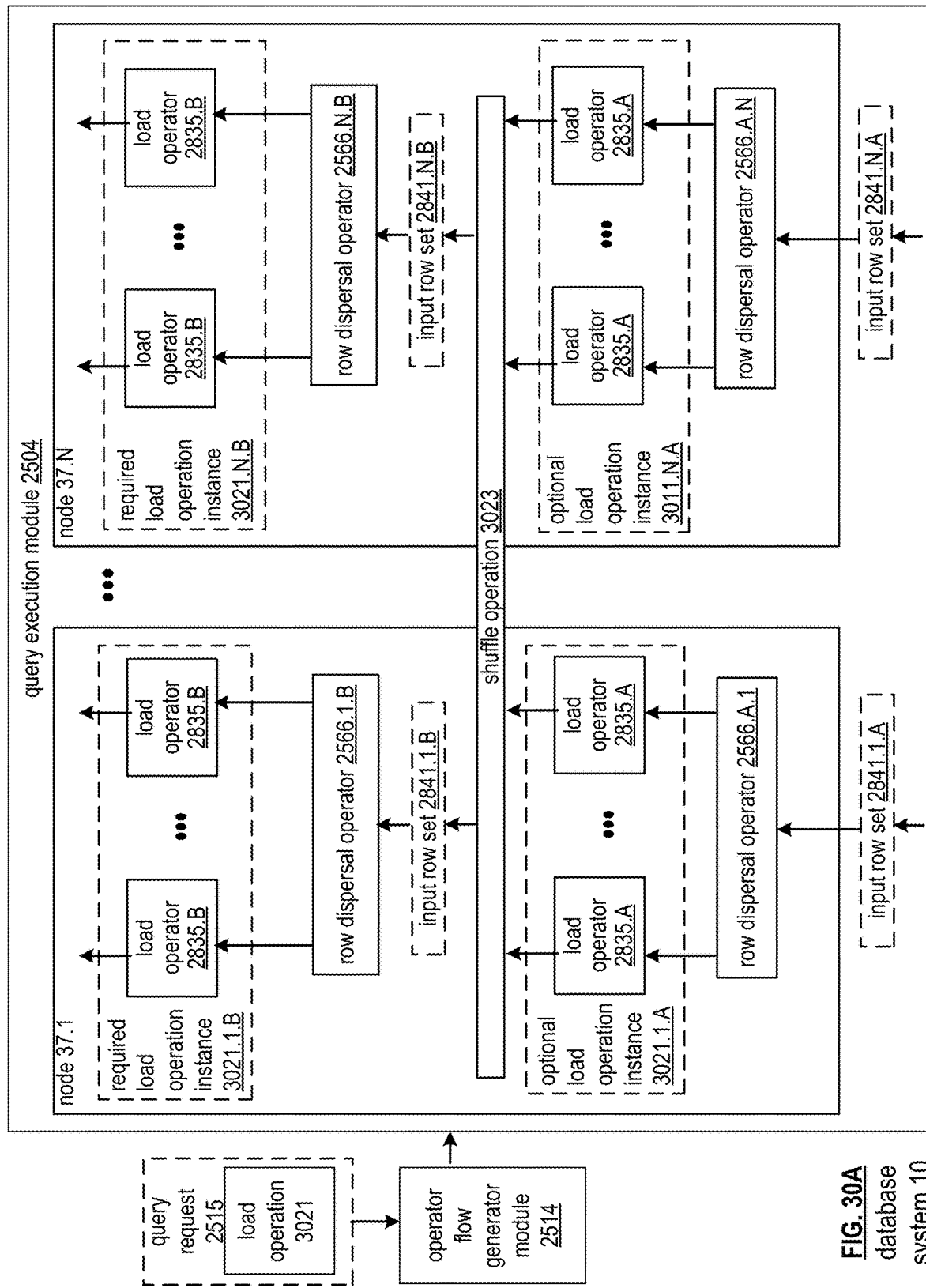
FIG. 30A is a schematic block diagram of a database system executing a load operation via two serialized instances of the load operation via a query execution module in accordance with various embodiments.
Figure 30B:
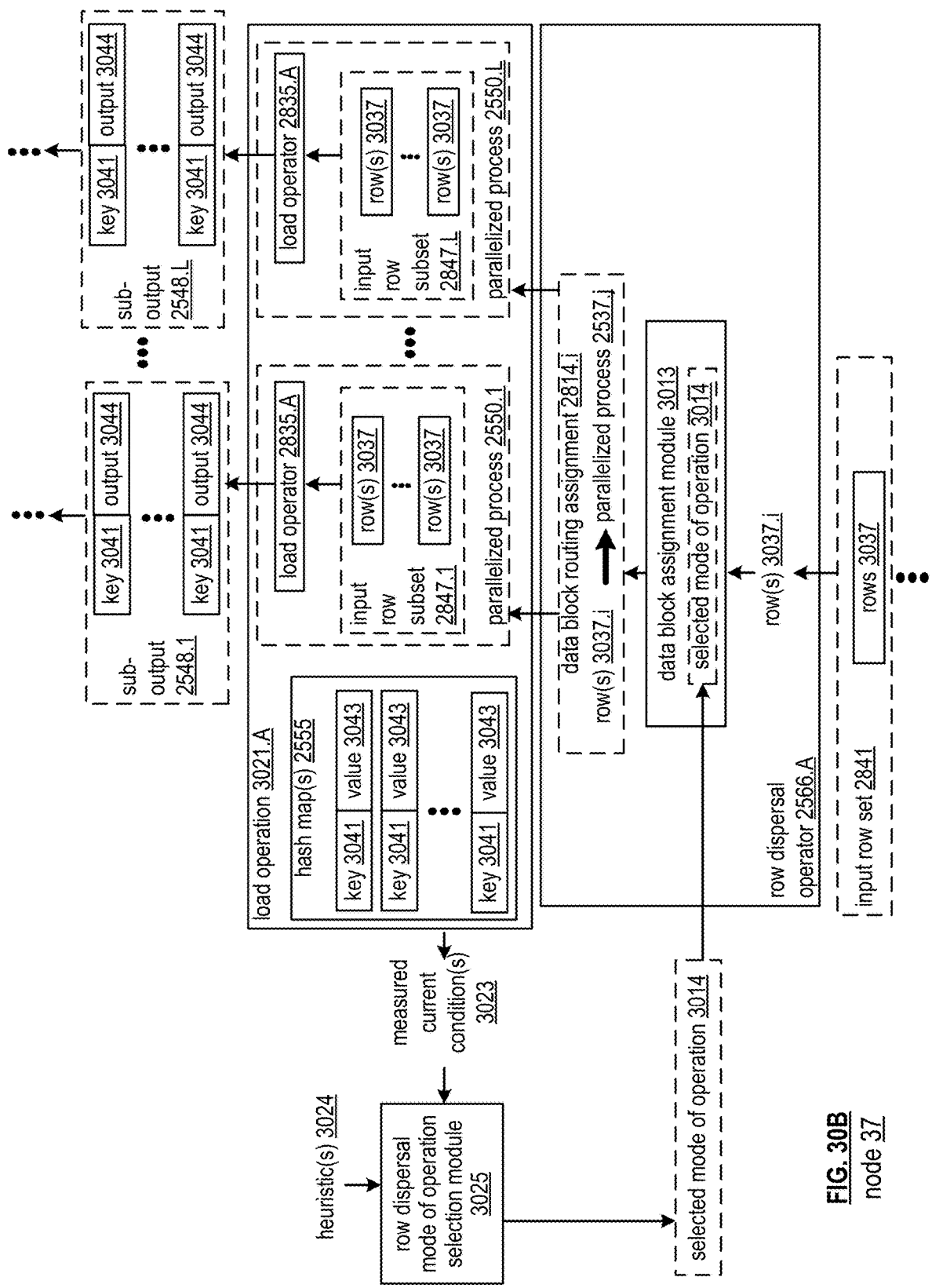
FIG. 30B is a schematic block diagram of executing a load operation that implements a row dispersal mode of operation selection module to configure mode of operation of a row dispersal operator in accordance with various embodiments.
Figure 30C:
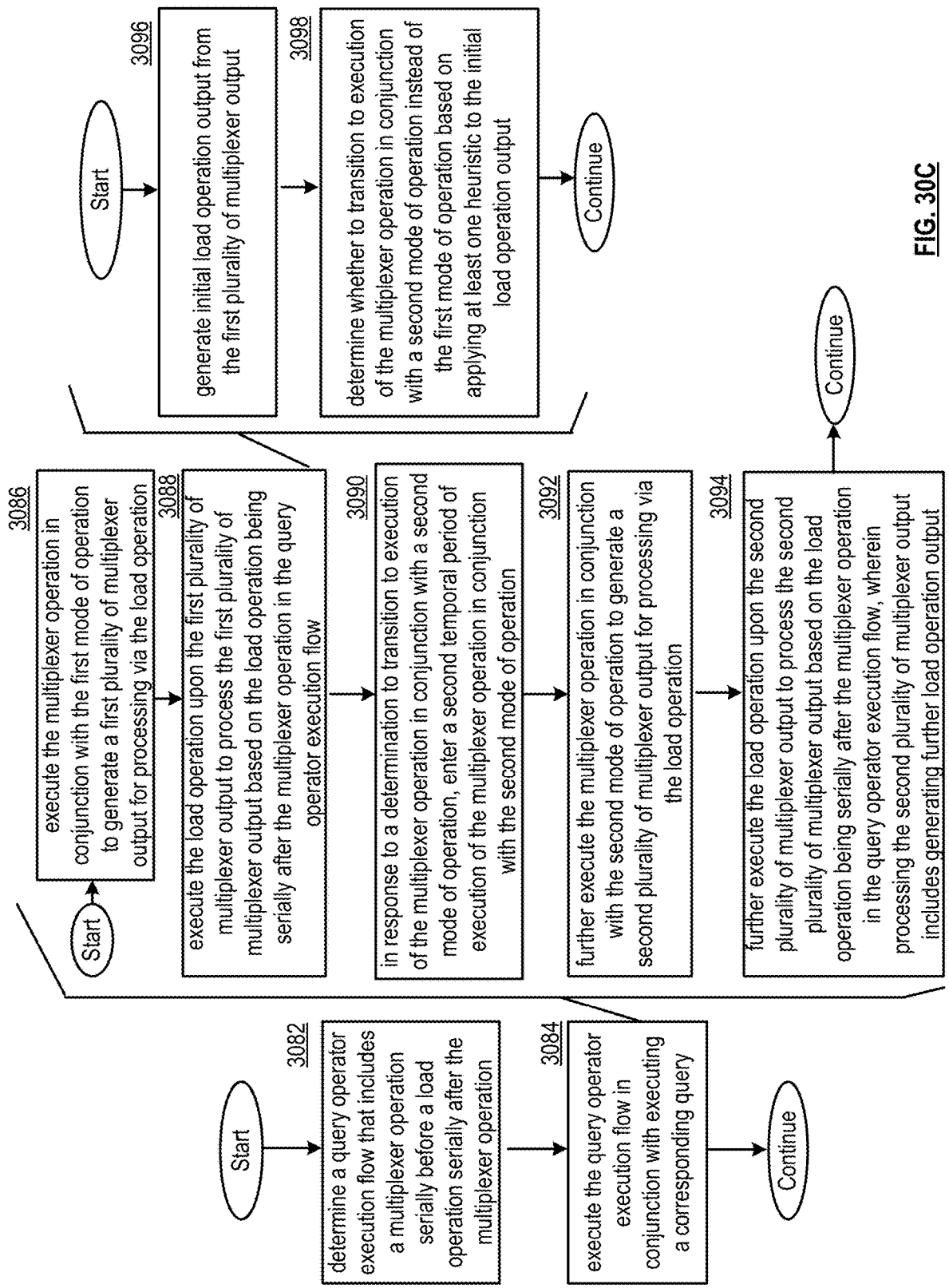
FIG. 30C is a logic diagram illustrating a method for execution in accordance with various embodiments.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30C described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 30C, for example, in conjunction with further implementing any one or more of the various examples described above.

In various embodiments, the operational instructions, when executed by the at least one processor, cause the database system to: determine a query for execution that indicates performance of a join operation and a second operation: generate a query operator execution flow for the query that includes performance of the second operation serially before the join operation based on applying at least one adaptation to the query operator execution flow to render semantic equivalence of the query operator execution flow with another query operator execution flow that includes performance of the join operation serially before the second operation; and/or execute the query operator execution flow in conjunction with executing the query based on performing the second operation to generate intermediate output of the second operation and/or based on performing the join operation upon the intermediate output of the second operation to generate join output, wherein a query resultant generated from the join output is correct output of the query based on applying the at least one adaptation.

FIGS. 30A-30B illustrate embodiments of a database system where a multiplexer operation can switch between modes of operation during query execution based on adapting to conditions not detectable until runtime. This can include switching between round robin row dispersal and hash key-based multiplexing, for example, based on a corresponding query operator execution flow being executing including a later, second instance of the multiplexing and a corresponding load operator that is implemented strictly via hash key-based multiplexing. Some or all features and/or functionality of the database system 10 of FIGS. 30A-30B can implement any embodiment of database system 10 described herein.

In some embodiments, grouped aggregations (aggs) can be correctly implemented multiple ways in a query plan. It can be difficult to predetermine which is best during optimization. Most of these approaches (e.g. assuming all aggregation calculations are commutative and associative can involve multiple agg operator instances where the aggs that appear lower in the plan/earlier in execution are not strictly needed for query correctness. For example, a first. "lower" grouped aggregation justance is placed serially before a shuffle on the keys of output of the grouped aggregation instance, which is setially before a hash-multiplexer on the keys of output of the shuffle, which is serially before a second. "higher" grouped aggregation instance. This plan can be distributed across a set of multiple nodes, such as 13 nodes. Each grouped aggregation can be further distributed across multiple cores on a single node.

FIG. 30A illustrates an example embodiment of such as plan, where the load operation instances 3021.A and 3021.B implement the first and second grouped aggregations, respectively. A shuffling operation 3023 can occur after the load operation instances 3021.A, for example, by implementing any features and/or functionality of the shuffling of FIG. 24E and/or any other embodiment of shuffling described herein. The row dispersal operator 2566 can be implemented via any embodiment of multiplexing and/or row dispersal operator 2566 described herein. The load operator 2835 can be implemented via any load operation such as an aggregation, a union distinct, a join, a blocking operation, and/or any other query operation performed in parallel based on rows first being dispersed across parallelized instances.

Continuing with the example of a grouped aggregation, the lower agg may speed up the query because it removes rows with duplicate grouping keys as it calculates its aggregation function, so there may be less data passing through the shuffle operator. These lower aggs are not needed, as the corresponding aggregation will be completed correctly by the higher instance after the hash-multiplexing is performed (e.g. via the required multiplexer operation 3011.B and the required load operation instance 3021.B). Because the lower aggs are not needed, they can be configured to include or skip a hash-based multiplexing step on the grouping keys to still ultimately render the correct query result. In particular, regardless of whether multiple instances of a key appear across multiple load operators 2835 due to proper hash-based multiplexing not occurring, the multiplexer operation 3011 will perform hash-key based multiplexing to multiple parallelized load operators of the required loaf operation instance, but exactly one aggregation per key is guaranteed to be generated based on key-based multiplexing being performed, rendering the correct query output.

Multiplexing is computationally quite expensive because it involves row-wise copies in addition to hashing the group key for each row. Skipping multiplexing can be computationally very inexpensive, but can result in significantly larger output sets from the not-needed agg because rows with matching grouping keys may not be processed on the same operator instance. For a not-needed agg distributed over n operators, skipping multiplexing may result in n times the memory usage and output result size. Similarly, a not needed agg with hash multiplexing may result in a poor distribution of work across agg operators/cores. It can be very difficult to estimate the cost of either of these choices because the number of groups present in the dataset is difficult to estimate during optimization.

The exact same plan and multiplexer considerations can apply to n-child union distinct operations where n is equal to one or greater than one. For example, such considerations can be similarly applicable to load operations 3021 implementing a union distinct, where exactly one row of a set of duplicate rows is emitted, and where emitting duplicate rows across multiple parallelized instances in the lower, optional union distinct via load operation 3021.A can be rectified via multiplexer operation 3011.B being implemented via hash-based multiplexing, where the union distinct of load operation 3021.B renders correct output.

It can be possible to alter the behavior of the multiplexer during a running query when a much more accurate estimate of the number of groups can be obtained from the current state of the agg operator's hash map as the hash map is being built. This runtime adaptive implementation of the multiplexer can improve the technology of database systems based on selectively configuring the multiplexer to perform optimally as information regarding cardinality of the dataset and/or memory conditions can be measured during execution of the corresponding load operators, rather than the alternative of guessing which mode of operation to utilize prior to the knowledge gained during query execution and statically maintaining this mode of operation during query execution without leveraging this knowledge available at runtime.

FIG. 30B illustrates an embodiment of this functionality where a node implements a row dispersal mode of operation selection module 3025 to select, at least once over the course of execution of the load operation 3021.A, a selected mode of operation 3014 of the row dispersal operator 2566 dispersing rows across the parallelized instances of load operator 2835 executed via parallelized processes 2550.1-2550.1 (e.g. L processing core resources 48 of the corresponding node 37) based on applying at least heuristic 3024 to measured current conditions 3023 corresponding to execution of the load operation, for example, based on attributes of a hash map 2555 being built by the load operation. A data block assignment module 3013 can be implemented to operate in accordance with the selected mode of operation 3014 configured by the row dispersal mode of operation selection module 3025. For example, the load operation 3021.A implements the row dispersal mode of operation selection module 3025 (e.g. based on a corresponding operator execution module 3215 implementing the load operation applying the heuristic to select the mode of operation, for example, based on a measured ratio of new keys to duplicate keys as indicated by the state of hash map 2555, where the operator execution module 3215 implementing the load operation sends a signal to at least one corresponding operator execution module 3215 implementing the row dispersal operator 2566 indicating the selected mode of operation 3014 at a given time). Alternatively or in addition, the row dispersal operator is also operable to select its own mode of operation based on measuring conditions (e.g. based on a corresponding operator execution module 3215 implementing the row dispersal operator applying at least one heuristic to select the mode of operation, for example, based on the measured amount of local memory).

This selected mode of operation can further change to other selections over the course of execution as measured current conditions 3023 change, based on the at least one heuristic indicating different modes of operation be selected based on these changes.

In some embodiments, the selected mode of operation is selected between a set of mode of operation options that include at least a hash-multiplexer mode of operation and a round robin mode of operation. For example, in the hash-multiplexer mode of operation, row dispersal is performed by key, which is utilized to build hash map 2555, where all rows with a given key are guaranteed to be sent to the same load operator of a same parallelized processed, and where sub-output generated if the row dispersal operator is exclusively operating in the hash-multiplexer mode of operation guarantees that a given key 3041 occurs in exactly one sub-output of one parallelized process. Meanwhile, in the round robin mode of operation, the row dispersal operator 2566 is operable to send individual rows or batches of rows in a same data block (e.g. copying entire blocks to assigned parallelized processes), via a uniform distribution, such as a turn based distribution, regardless of key value, where different rows with a same given key are not guaranteed to be sent to the same load operator, and where sub-output generated if the row dispersal operator is operating in the round robin mode of operation can render a given key 3041 occurs in multiple different sub-outputs of different parallelized processes (which will be combined later along with combining sub-outputs across multiple nodes after shuffling and further multiplexing is performed as illustrated in FIG. 30A).

The choice between a hash-multiplexer and a round-robin operator to evenly distribute data without row copies on load operators implemented as either grouped aggregation operators or union distinct (e.g. 1-child union distinct) operators can be implemented via at least one heuristic 3024, which can include local memory heuristic as well as a threshold on the number of duplicate groups observed in a not-needed agg or union distinct.

In some embodiments, every not-needed agg multiplexer (e.g. across all nodes 37.1-37.N) begins as a round-robin and will periodically sample the amount of memory available on its node. If the memory available is below a configurable threshold, the operator will switch to hash-multiplexing. This can be implemented as a permanent choice, or can be implemented to allow multiple switches between round robin and hash-multiplexing. In such embodiments, some or all of the row dispersal mode of operation selection module 3025 can be implemented via the row dispersal operator 2566 (e.g. a corresponding operator execution module 3215)

The agg group/union distinct operators attached to these multiplexers can periodically measure the ratio of new-groups to duplicate groups (e.g. total number of rows processes vs, number of entries in the hash map 255) to determine if they are removing a sufficient number of output rows. In such embodiments, some or all of the row dispersal mode of operation selection module 3025 can be implemented via the row dispersal operator 2566 (e.g. a corresponding operator execution module 3215). This can be based on the current state of hash map 2555.

In some embodiments, each parallelized process 2550 implements load operator 2835 via maintaining a hash map 2555 shared across all L parallelized instances. In some embodiments, each parallelized process 2550 implements load operator 2835 via maintaining its own hash map 2555, where different parallelized processes 2550 build and measure their own hash map to implement their own row dispersal mode of operation selection module 3025 to send a signal to row dispersal operator 2566.A when determining to change the mode of operation to a new selected mode of operation.

The heuristic used for this threshold can be implemented as a configured coefficient of the logarithm of the total number of rows in the current hash map, where the ratio can be compared to this configured coefficient to determine whether or not to switch mode of operation. This can be utilized because many more new groups can be expected at the beginning of the stream when the map is initially empty, so the check can become more strict over time. The ratio of new-groups to duplicate groups can be recalculated after an exponentially increasing number of input rows have been processed to reevaluate whether to which (where these checks are thus run with increasing intervals of time between each check).

When this unique row cardinality check repeatedly fails, the agg/union distinct operator can send a signal to its local children. This signal can be local to the silo (e.g. local to the node, or local to one of a set of independent silos within the node) that the aggregation is running on, so it is only sent to directly connected multiplexers (e.g. the row dispersal operator is optionally implemented as a plurality of parallelized row dispersal operator each multiplexing its own input rows across the parallelized instances of the load operator). Multiplexers on other nodes/silos may have differently distributed data and may instead continue round-robining blocks. Nodes can otherwise independently implement row dispersal mode of operation selection module 3025 to independently select which mode of operation to disperse rows under at a given time.

This signal used to swap execution (e.g. sent from the load operation to the row dispersal operation) can be sent to only sent to directly connected multiplexers, but the signaling mechanism can be configurable to allow similar events to be delivered to any operator in the plan, even if not directly connected.

In some embodiments, such runtime-adaptive choices can be made based on memory availability and/or observed data cardinality/distribution can be applied to a wider variety of query execution plan applications (e.g. to adapt other embodiments of query execution plan to improve efficiency while maintaining semantically equivalent query processing). This can include implementing other selections, such as reversible choices, that can be implemented using similar memory thresholds or signals based on data-sizes observed. This can include switching back from hash-multiplexing round robin if the hash-key data becomes very skewed. This can include converting from row copy block round robin in operators added to the plan for load balancing when observed cardinality is high/low enough, for example, to prefer better data distribution vs speed.

This can include generating/sending similar memory-based/cardinality based signaling to convert between query plans one or more times mid-execution, such as converting between different ones a set of semantically equivalent query plans (e.g. based on corresponding measured changes in observed group cardinality) that includes converting between at least two of, during execution of a corresponding query: a first plan implemented via a first grouped aggregation instance serially before a shuffle serially before a second grouped aggregation instance (e.g. agg→shuffle→agg): a second plan implemented via a single grouped aggregation instance serially after a shuffle operation (e.g. shuffle→agg): or a third plan implemented via a first grouped aggregation instance serially before a first gather operation serially before a second grouped aggregation instance serially before a second gather operation (E.g, agg→gather→agg→gather).

This can include generating/sending similar memory-based/cardinality based signaling to convert between query plans one or more times mid-execution in conjunction with execution of a join operation, for example, via any functionality of execution a join operation described herein. This can include converting between, during execution of a corresponding query, a first plan that includes hash-multiplexing by join key and then shuffling each join child, and a second plan that includes round-robinning. This can alternatively or additionally include converting to a plan that includes round-robinning the left join input and broadcasting the right join input based on the observed row cardinality+skew of the join. For example, this particularly include converting between, during execution of a corresponding query based on the observed row cardinality+skew of the join, first plan that includes hash-multiplexing by join key and then shuffling each join child, and a second plan that includes round-robinning the left join input and broadcasting the right join input.

FIG. 30C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30C. In particular, a node 37 can utilize the query processing module 2435 to execute some or all of the steps of FIG. 30C, for example, to facilitate execution of a query as participants in a query execution plan 2405. Some or all of the method of FIG. 30C can be performed by the query processing system 2510, for example, by utilizing an operator flow generator module 2514 and/or a query execution module 2504. Some or all of the steps of FIG. 30C can be performed to implement some or all of the functionality of the database system 10 as described in conjunction with FIGS. 30A-30B, for example, by implementing some or all of the functionality of the load operation 3021 or the row dispersal operator 2566. Some or all of the steps of FIG. 30C can be performed to implement some or all of the functionality regarding execution of a query via the plurality of nodes in the query execution plan 2405 as described in conjunction with some or all of FIGS. 24A-24I. Some or all steps of FIG. 30C can be performed by database system 10 in accordance with other embodiments of the database system 10 and/or nodes 37 discussed herein. Some or all steps of FIG. 30C can be performed in conjunction with one or more steps of any other method described herein.

Step 3082 includes determining a query operator execution flow that includes a multiplexer operation serially before a load operation serially after the multiplexer operation. Step 3084 includes executing the query operator execution flow in conjunction with executing a corresponding query.

Performing step 3084 can include performing some or all of steps 3086, 3088, 3090, 3092, and/or 3094. Step 3086 includes executing the multiplexer operation in conjunction with the first mode of operation to generate a first plurality of multiplexer output for processing via the load operation. Step 3088 includes executing the load operation upon the first plurality of multiplexer output to process the first plurality of multiplexer output based on the load operation being serially after the multiplexer operation in the query operator execution flow. Step 3090 includes, in response to a determination to transition to execution of the multiplexer operation in conjunction with a second mode of operation, entering a second temporal period of execution of the multiplexer operation in conjunction with the second mode of operation. Step 3092 includes further executing the multiplexer operation in conjunction with the second mode of operation to generate a second plurality of multiplexer output for processing via the load operation. Step 3094 includes further executing the load operation upon the second plurality of multiplexer output to process the second plurality of multiplexer output based on the load operation being serially after the multiplexer operation in the query operator execution flow, wherein processing the second plurality of multiplexer output includes generating further load operation output.

Performing step 3088 can include performing step 3096 and/or 3098. Step 3096 includes generating initial load operation output from the first plurality of multiplexer output. Step 3098 includes determining whether to transition to execution of the multiplexer operation in conjunction with a second mode of operation instead of the first mode of operation based on applying at least one heuristic to the initial load operation output.

In various embodiments, steps 3086 and 3088 are performed in a first temporal period corresponding to operating under the first mode of operation, and steps 3092 and 3094 are performed in a second temporal period after the first temporal period corresponding to operating under the first mode of operation. For example, transition to the first temporal period to the second temporal period is based on performing step 3090.

In various examples, the load operation is implemented via a plurality of parallelized instances of a load operator. In various examples, the multiplexer operation generates the first plurality of multiplexer output based on dispersing a corresponding first of input rows processed by multiplexer operation during the first temporal period across the plurality of parallelized instances of the load operator via a first mode of row dispersal in conjunction with operating under the first mode of operation during the first temporal period. In various examples, the multiplexer operation generates the second plurality of multiplexer output based on dispersing a corresponding second of input rows processed by multiplexer operation during the second temporal period across the plurality of parallelized instances of the load operator via a second mode of row dispersal in conjunction with operating under the second mode of operation during the second temporal period.

In various examples, the first mode of row dispersal is implemented as a round robin row dispersal mode, and wherein second mode of row dispersal is implemented via a hash key-based row dispersal mode. In various examples, the round robin row dispersal mode is based on copying row blocks of multiple input rows, while the hash key-based row dispersal mode is based on dispersing rows individually based on their corresponding hash key.

In various examples, rows of the first set of input rows and the second set of input rows each have a key of a plurality of keys utilized by the load operation. In various examples, the second mode of row dispersal guarantees that all rows having a same key of the plurality of keys are sent to a same parallelized load operator instance of the plurality of parallelized instances of the load operator based on dispersing rows based on the key of each row. In various examples, the first mode of operation does not guarantee that all rows having a same key of the plurality of keys are sent to a same parallelized load operator instance of the plurality of parallelized instances of the load operator based on dispersing rows independent of the key of the each row.

In various examples, the load operation is a grouped aggregation operation executed based on each parallelized load operator instance generating a plurality of aggregation values by key, wherein the key of the each row is based on a subset of column values of the each row by which the grouped aggregation operation groups rows for separate aggregation, wherein each of the plurality of aggregation values corresponds to a different one of the plurality of keys, and wherein at least two different parallelized load operator instances of the plurality of parallelized instances of the load operator generate aggregation values for the same key of the plurality of keys based on rows of the same key being sent to the at least two different parallelized load operator instances based on dispersing rows independent of the key of the each row during the first temporal period while operating in accordance with the first mode of operation.

In various examples, the grouped aggregation operation corresponds to a first instance of the grouped aggregation operation in the query operator execution flow and wherein the multiplexer operation corresponds to a first instance of the multiplexer operation in the query operator execution flow. In various examples, the query operator execution flow includes a second instance of the multiplexer operation serially after the first instance of the grouped aggregation operation. In various examples, the query operator execution flow includes a second instance of the grouped aggregation operation serially after the second instance of the multiplexer operation. In various examples, the multiplexer operation is executed upon the plurality of aggregation values strictly in accordance with the second mode of operation to further disperse the plurality of aggregation values generated by the grouped aggregation operation in conjunction with a set of pluralities of other aggregation values generated by a plurality of other parallelized instances of the grouped aggregation operation across a second plurality of parallelized instances of the load operator of the second instance of the grouped aggregation operation based on key of each aggregation value. In various examples, the second instance of the grouped aggregation operation generates exactly one aggregation value for each key of the plurality of keys based on each of the second plurality of parallelized instances of the load operator of the second instance of the grouped aggregation operation generating corresponding aggregation values for a corresponding set of keys based on all rows having a same key of the plurality of keys being sent to a same second parallelized load operator instance of the second plurality of parallelized instances.

In various examples, the load operation is a union distinct operation executed based on each parallelized load operator instance emitting a single row for duplicate rows having the same key, wherein the key of the each row is based on a set of column values of the each row. In various examples, at least two different parallelized load operator instances of the plurality of parallelized instances of the load operator emit identical rows having the same key of the plurality of keys based on rows of the same key being sent to the at least two different parallelized load operator instances based on dispersing rows independent of the key of the each row during the first temporal period while operating in accordance with the first mode of operation.

In various examples, the union distinct operation corresponds to a first instance of the union distinct operation in the query operator execution flow and wherein the multiplexer operation corresponds to a first instance of the multiplexer operation in the query operator execution flow, wherein the query operator execution flow includes a second instance of the multiplexer operation serially after the first instance of the union distinct operation. In various examples, the query operator execution flow includes a second instance of the union distinct operation serially after the second instance of the multiplexer operation. In various examples, the multiplexer operation is executed upon a plurality of rows emitted by the first instance of the union distinct operation strictly in accordance with the second mode of operation to further disperse the plurality of rows emitted by the union distinct operation in conjunction with a set of pluralities of other generated by a plurality of other parallelized instances of the union distinct operation across a second plurality of parallelized instances of the load operator of the second instance of the union distinct operation based on key of each row. In various examples, the second instance of the union distinct operation generates exactly one row for each key of the plurality of keys based on each of the second plurality of parallelized instances of the load operator of the second instance of the union distinct operation emitting corresponding rows for a corresponding set of keys based on all rows having a same key of the plurality of keys being sent to a same second parallelized load operator instance of the second plurality of parallelized instances.

In various examples, executing the load operation further includes, in response to determining to transition to determining to transition to execution of the multiplexer operation in conjunction with a second mode of operation, sending a signal indicating an instruction to transition to the second mode of operation to the multiplexer operation based on the multiplexer operation being a child operator of the load operation, and wherein the multiplexer operation transitions to operating in accordance with the second mode of operation based on receiving the signal from the load operation.

In various examples, the multiplexer operation includes a plurality of parallelized instances of a multiplexer operator. In various examples, the signal indicating the instruction to transition to the second mode of operation is sent to all of the plurality of parallelized instances of the multiplexer operator based on the parallelized instances of the multiplexer operator being child operators of the load operation. In various examples, the plurality of parallelized instances of the multiplexer operator collectively transition to operating in accordance with the second mode of operation based on receiving the signal from the load operation.

In various examples, the multiplexer operation and the load operation are each executed separately via a plurality of nodes in conjunction with executing a corresponding query. In various examples, the load operation executed via each node of the plurality of nodes is implemented via a corresponding plurality of parallelized instances of a load operator via a plurality of corresponding processing core resources of the each node based on the multiplexer operation of the each node dispersing corresponding rows across the plurality of parallelized instances of a load operator for processing at a given time in accordance with one of: the first mode of operation or the second mode of operation. In various examples, different nodes of the plurality of nodes independently determine whether to transition from the first mode of operation to the second mode of operation.

In various examples, a first node of the plurality of nodes executes the multiplexer operation in accordance with the first mode of operation during the first temporal period and executes multiplexer operation during the second temporal period based on the determination to transition from the first mode of operation to the second mode of operation being determined by the first node at a first corresponding time. In various examples, a second node of plurality of nodes executes the multiplexer operation in accordance with the first mode of operation during a third temporal period and executes multiplexer operation during a fourth temporal period based on the second node determining transition from the first mode of operation to the second mode of operation a second corresponding time. In various examples, the fourth temporal period overlaps with both the first temporal period and the second temporal period based on the second corresponding time being different from the first corresponding time based on the different nodes of the plurality of nodes independently determining whether to transition from the first mode of operation to the second mode of operation.

In various examples, the at least one heuristic includes a local memory heuristic for query execution memory resources utilized to execute the query operator execution flow. In various examples, the at least one heuristic includes a row cardinality heuristic for rows in the first plurality of multiplexer output.

In various examples, the determination to transition to execution of the multiplexer operation in conjunction with a second mode of operation is based on determining a measured amount of available memory of the query execution memory resources is below a memory threshold.

In various examples, the method further includes executing the load operation over a plurality of time slices to process rows received in corresponding multiplexer output. In various examples, the method further includes evaluating the at least one heuristic during each of the plurality of time slices based on the rows received in the corresponding multiplexer output. In various examples, the method further includes determining, based on evaluating the at least one heuristic during each of the plurality of time slices, whether to maintain a current mode of operation of the multiplexer operation or to transition to a different mode of operation of the multiplexer operation. In various examples, over the plurality of time slices, the multiplexer operation transitions from the first mode of operation to the second mode of operation at least one time. In various examples, the multiplexer operation further transitions from the second mode of operation back to the first mode of operation at least one time.

In various examples, output of the load operation is generated via executing based on grouping rows into a plurality of row groups. In various examples, evaluating the at least one heuristic during at least some of the plurality of time slices includes: measuring a ratio of non-duplicate groups of plurality of row groups to duplicate groups of plurality of row groups; and/or comparing the ratio to a configured threshold to determine whether to maintain a current mode of operation of the multiplexer operation or to transition to a different mode of operation of the multiplexer operation.

In various examples, grouping rows into a plurality of row groups to generate the output of the load operation via executing the load operation is based on maintaining a hash map indicating the plurality of row groups in accordance with the second mode of operation during the at least at some of the plurality of time slices based on operating under the second mode of operation during the at least some of the plurality of time slices. In various examples, new entries are added to the hash map over time based on new groups indicated in corresponding new multiplexer output over subsequent time slices of the plurality of time slices. In various examples, measuring the ratio of non-duplicate groups of plurality of row groups to duplicate groups of plurality of row groups during the at least some of the plurality of time slices based on operating under the second mode of operation during the at least some of the plurality of time slices to determine whether to transition back to the first mode of operation. In various examples, measuring the ratio of non-duplicate groups of plurality of row groups to duplicate groups of plurality of row groups for a given time slice of the at least some of the plurality of time slices is based on a set of entries in a current hash map at the given time slice. In various examples, the configured threshold changes over the at least some of the plurality of time slices as a configured coefficient of a logarithm of a total number of entries in the set of entries in the current hash map based on the total number of entries in the set of entries in the current hash map increasing over time.

In various examples, processing the first plurality of multiplexer output includes determining whether to transition to execution of the multiplexer operation in conjunction with the second mode of operation instead of the first mode of operation multiple times over multiple time slices based on applying at least one heuristic to the initial load operation output each of the multiple times during each of the multiple time slices. In various examples, for each of a first number of the multiple times of applying the at least one heuristic, a corresponding determination is made to not transition to execution of the multiplexer operation in conjunction with the second mode of operation and to maintain execution under the first mode of operation. In various examples, the determination to transition to execution of the multiplexer operation in conjunction with a second mode of operation is made after the first number of the multiple times of applying the at least one heuristic to ultimately determine to transition to the second mode of operation after previously determining not to transition to the second mode of operation each of the first number of multiple times.

In various examples, evaluating the at least one heuristic during the at least some of the plurality of time slices is based on determining when to reevaluate the at least one heuristic after a most recent evaluation of the at least one heuristic as an exponentially increasing function of a total number of rows received so far over all prior ones of the plurality of time slices. In various examples, a first amount of time between a first given evaluation of the at least one heuristic and a second given evaluation of the at least one heuristic corresponding to a next evaluation after the first given evaluation is less than a second amount of time between the second given evaluation of the at least one heuristic and a third given evaluation of the at least one heuristic corresponding to another next evaluation after the second given evaluation.

In various examples, the query operator execution flow includes duplicate instances of the load operation, wherein a first instance the load operation is serially before a second instance of the load operation. In various examples, the query operator execution flow is selected from a plurality of semantically equivalent query operator execution flow options, wherein another one of the plurality of semantically equivalent query operator execution flow options includes exactly one instance of the load operation based on the duplicate instances of the load operation applied in series being semantically equivalent with the exactly one instance of the load operation.

In various examples, a determination to transition from the current mode of operation of the multiplexer operation to a different mode of operation of the multiplexer operation during a given time slice of the plurality of time slices includes determining to transition from a hash key-based row dispersal mode to a round robin row dispersal mode based on determining hash-key data utilized to perform row dispersal under the hash key-based row dispersal mode being very skewed.

In various examples, a determination to transition from the current mode of operation of the multiplexer operation to a different mode of operation of the multiplexer operation during a given time slice of the plurality of time slices includes determining to transition from the round robin row dispersal mode to the hash key-based row dispersal mode based on a current row cardinality indicating key-based data distribution is more favorable than speed.

In various examples, a determination to transition from the current mode of operation of the multiplexer operation to a different mode of operation of the multiplexer operation during a given time slice of the plurality of time slices includes determining to convert from a first operator execution flow that includes a first aggregation operation instance serially before a shuffle operation serially before a second aggregation operation instance to a second operator execution flow that instead implements one of, in a semantically equivalent fashion: the shuffle operation serially before the second aggregation operation instance, removing the first aggregation operation instance: or the first aggregation operation instance serially before a first gather operation instance serially before the second aggregation operation instance serially before a second gather operation instance.

In various examples, a determination to transition from the current mode of operation of the multiplexer operation to a different mode of operation of the multiplexer operation during a given time slice of the plurality of time slices includes determining to convert from a first operator execution flow that includes a shuffle operation serially before an aggregation operation instance to a second operator execution flow that instead implements one of, in a semantically equivalent fashion: a first instance of the aggregation operation serially before the shuffle operation serially before the second aggregation operation instance; or the first aggregation operation instance serially before a first gather operation instance serially before the second aggregation operation instance serially before a second gather operation instance.

In various examples, a determination to transition from the current mode of operation of the multiplexer operation to a different mode of operation of the multiplexer operation during a given time slice of the plurality of time slices includes determining to convert from a first operator execution flow that includes a first aggregation operation instance serially before a first gather operation instance serially before a second aggregation operation instance serially before a second gather operation instance to a second operator execution flow that instead implements one of, in a semantically equivalent fashion: the first instance of the aggregation operation serially before the shuffle operation serially before the second aggregation operation instance: or the shuffle operation serially before the second aggregation operation instance, removing the first aggregation operation instance.

In various examples, a determination to transition from the current mode of operation of the multiplexer operation to a different mode of operation of the multiplexer operation during a given time slice of the plurality of time slices includes determining to convert from a first operator execution flow that includes a hash multiplexing operation serially before a join operation to a second operator execution flow that instead implements, in a semantically equivalent fashion, a shuffling operation serially before the join operation.

In various examples, a determination to transition from the current mode of operation of the multiplexer operation to a different mode of operation of the multiplexer operation during a given time slice of the plurality of time slices includes determining to convert from a first operator execution flow that includes a hash-multiplexing operation serially before a shuffling operation serially before a join operation (e.g. where the hash-multiplexing operation and the shuffling operation is performed upon each join child, such as both a right input set and a left input set) serially to a second operator execution flow that instead implements, in a semantically equivalent fashion, another type of row dispersal serially before the join operation, or vice versa.

In various examples, a determination to transition from the current mode of operation of the multiplexer operation to a different mode of operation of the multiplexer operation during a given time slice of the plurality of time slices includes determining to convert from a first operator execution flow that includes round-robin dispersal of left input rows and broadcasting of right input rows in conjunction with executing a join operation to a second operator execution flow that instead implements, in a semantically equivalent fashion, another type of row dispersal serially before the join operation, or vice versa.

In various examples, a determination to transition from the current mode of operation of the multiplexer operation to a different mode of operation of the multiplexer operation during a given time slice of the plurality of time slices includes determining to convert from a first operator execution flow that includes round-robin dispersal of left input rows and broadcasting of right input rows in conjunction with executing a join operation to a second operator execution flow that instead implements, in a semantically equivalent fashion, round-robin dispersal of the right input rows and broadcasting of the left input rows, or vice versa, for example, based on observed row cardinality and/or skew of the join operation.

In various examples, a determination to transition from the current mode of operation of the multiplexer operation to a different mode of operation of the multiplexer operation during a given time slice of the plurality of time slices includes determining to convert from a from a first operator execution flow that includes a hash-multiplexing operation serially before a shuffling operation serially before a join operation (e.g. where the hash-multiplexing operation and the shuffling operation is performed upon each join child, such as both a right input set and a left input set) to a second operator execution flow that instead implements, in a semantically equivalent fashion, round-robin dispersal of left input rows and broadcasting of right input rows serially before the join operation, for example, based on observed row cardinality and/or skew of the join operation.

In various examples, a determination to transition from the current mode of operation of the multiplexer operation to a different mode of operation of the multiplexer operation during a given time slice of the plurality of time slices includes determining to convert from a first operator execution flow that includes round-robin dispersal of left input rows and broadcasting of right input rows in conjunction with executing a join operation to a second operator execution flow that instead implements, in a semantically equivalent fashion, a hash-multiplexing operation serially before a shuffling operation serially before the join operation (e.g. where the hash-multiplexing operation and the shuffling operation is performed upon each join child, such as both a right input set and a left input set).

In various examples, a determination to transition from the current mode of operation of the multiplexer operation to a different mode of operation of the multiplexer operation during a given time slice of the plurality of time slices includes determining to convert from a first operator execution flow that includes round-robin dispersal of right input rows and broadcasting of left input rows in conjunction with executing a join operation to a second operator execution flow that instead implements, in a semantically equivalent fashion, round-robin dispersal of the left input rows and broadcasting of the right input rows, for example, based on observed row cardinality and/or skew of the join operation.

In various embodiments, any one of more of the various examples listed above are implemented in conjunction with performing some or all steps of FIG. 30C. In various embodiments, any set of the various examples listed above can be implemented in tandem, for example, in conjunction with performing some or all steps of FIG. 30C.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30C described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 30C, for example, in conjunction with further implementing any one or more of the various examples described above.

In various embodiments, the operational instructions, when executed by the at least one processor, cause the database system to: determine a query operator execution flow that includes a multiplexer operation serially before a load operation serially after the multiplexer operation; and/or execute the query operator execution flow in conjunction with executing a corresponding query. In various embodiments, executing the query operator execution flow in conjunction with executing a corresponding query is based on, during a first temporal period of execution of the multiplexer operation in conjunction with a first mode of operation: executing the multiplexer operation in conjunction with the first mode of operation to generate a first plurality of multiplexer output for processing via the load operation; and/or executing the load operation upon the first plurality of multiplexer output to process the first plurality of multiplexer output based on the load operation being serially after the multiplexer operation in the query operator execution flow, where processing the first plurality of multiplexer output includes generating initial load operation output from the first plurality of multiplexer output and/or determining whether to transition to execution of the multiplexer operation in conjunction with a second mode of operation instead of the first mode of operation based on applying at least one heuristic to the initial load operation output.

In various embodiments, executing the query operator execution flow in conjunction with executing a corresponding query is further based on, in response to a determination to transition to execution of the multiplexer operation in conjunction with a second mode of operation, entering a second temporal period of execution of the multiplexer operation in conjunction with the second mode of operation, various embodiments, executing the query operator execution flow in conjunction with executing a corresponding query is further based on, during the second temporal period: further executing the multiplexer operation in conjunction with the second mode of operation to generate a second plurality of multiplexer output for processing via the load operation; and/or further executing the load operation upon the second plurality of multiplexer output to process the second plurality of multiplexer output based on the load operation being serially after the multiplexer operation in the query operator execution flow, wherein processing the second plurality of multiplexer output includes generating further load operation output. In various examples, the output of the load operation generated via completing execution of the load operation is based on the initial load operation output and the further load operation output.

Figure 31A:
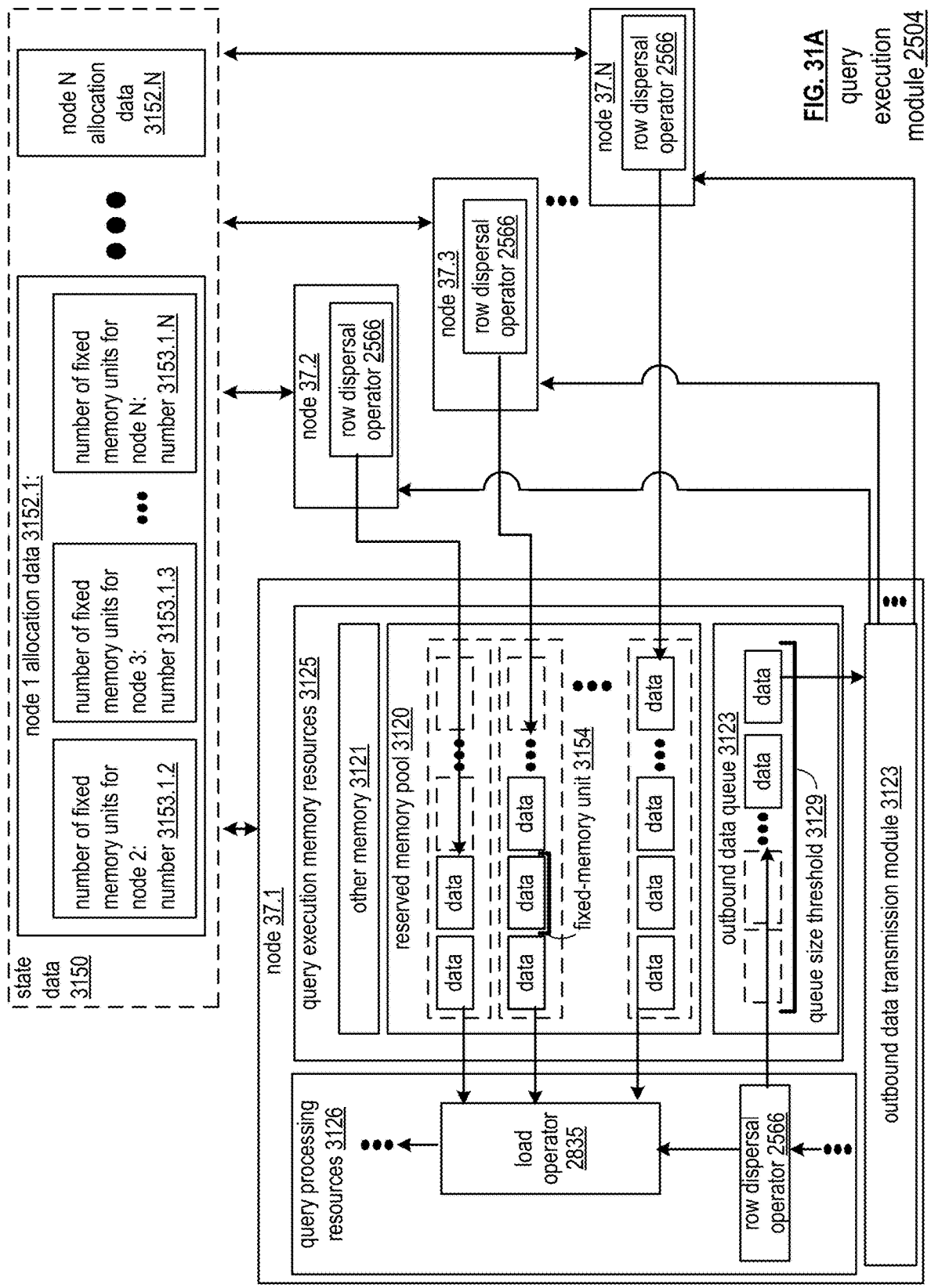
FIG. 31A is a schematic block diagram of a plurality of nodes of a database system that each implement a reserved memory pool and outbound data queue for communicating data in conjunction with query execution in accordance with various embodiments.
Figure 31B:
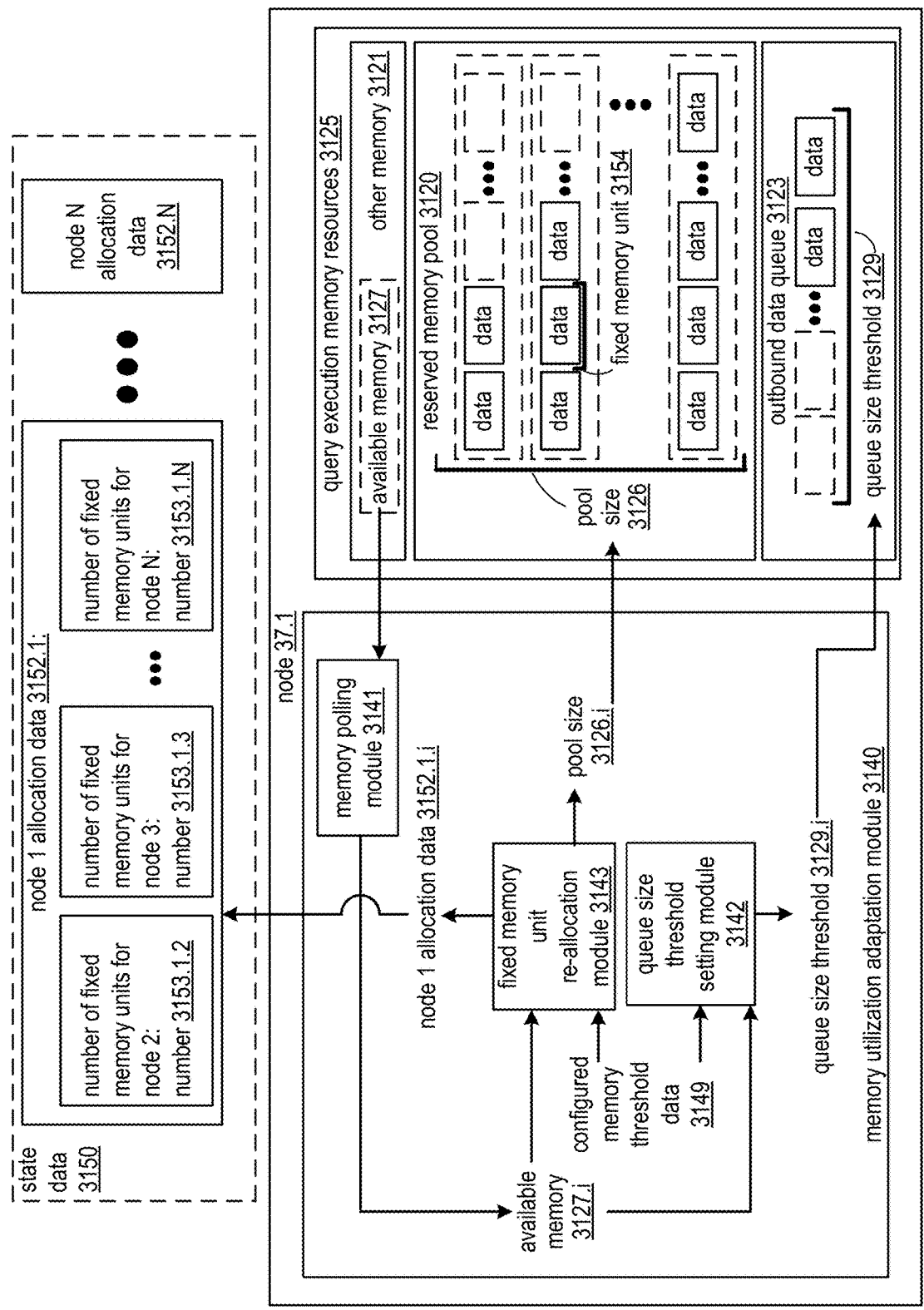
FIG. 31B is a schematic block diagram of a node that implements a memory utilization adaptation module to configure a queue size threshold, a pool size, and/or node allocation data in accordance with various embodiments.

FIGS. 31A-31B illustrate embodiments of a database system 10 that implements memory aware flow control for query networking via a plurality of nodes that adapt to current memory conditions in configuring memory-based functionality for communicating data with each other in accordance with executing row dispersal operators in executing at least one query. Some or all features and/or functionality of the database system 10 of FIGS. 31A-31B can implement any embodiments of database system 10 described herein.

In some embodiments, the virtual machine (e.g. implemented via nodes 37 of a query execution plan 2405 implementing the query execution module 2504) has to send and receive large amounts of data over the network as it shuffles/redistributes data during query execution (e.g. in accordance with executing a row dispersal operator, for example, in conjunction with executing a join operation via some or all features and/or functionality described herein). This traffic may be bursty or very skewed, and it can be impractical to handle memory allocation failures on the receiving side.

In some embodiments, application layer flow control for shuffled data can be implemented to rely upon negotiating a certain number of clear to sends (cts) between each participating peer as well as between each shuffle operator and the protocol (e.g. the node's implementing of networking via the application layer flow control optionally in accordance with a consensus protocol), where each cts corresponds to a certain amount of memory (e.g. a fixed memory unit 3154). In some embodiments, such negotiation is performed in conjunction with implementing a consensus protocol mediated via the plurality of nodes, such as a raft consensus protocol or any other consensus protocol.

In some embodiments Each peer maintains state containing how many cts they have allocated to each other peer and how many they have been allocated by that peer (e.g. based on maintaining/accessing/communicating corresponding state data 3150 in conjunction with the consensus protocol). When a peer has no remaining cts allocated, a control signal can be sent allocating more as soon as memory is available. Similarly, the protocol can delegate cts to each shuffle operator running in the VM (e.g. each of multiple shuffle operators of a plurality of concurrently executing queries). This delegating of cts to shuffle operators is optionally not based on query priority, where such delegation attempts to delegate more resources to more active operators and to higher priority operators within a single query. In some embodiments, query priority is also a factor in delegating of cts to shuffle operators, where such delegation attempts to delegate more resources to operators of higher priority queries.

This flow control can be implemented to accomplish two primary goals: preventing nodes from being overwhelmed and running out of memory as they receive large amounts of data; and adding scheduling back-pressure when operators are enqueuing network data faster than it can be sent. In some embodiments, if a node grants some number of cts to a peer, it must have enough memory available to receive at least that much data from the network. Reserving very large amounts of memory for data to potentially receive data from the network would adversely impact memory intensive queries running locally, but granting a small number of cts to each peer limits data throughput while the protocol is negotiating cts with its peers and local operators.

To aid in accomplishing these goals to improve flow control while adapting to memory conditions, the protocol can be implemented to reserve a large pool of memory that it can release quickly to be able to allocate a large number of cts while avoiding impacting local queries. The protocol (e.g. processing resources of a corresponding node) can frequently poll the amount of memory available on the node: if the total memory available is above a configured threshold, it can reserve memory up until it owns a configured total amount of memory (e.g. the configured amount of total memory must be available for other query processing, and additional memory past this threshold can be added to the pool). The protocol can then allocate cts to each peer based on the amount of memory present in this pool, for example, in addition to a base amount of cts associated with higher priority memory that is guaranteed to be available for the network (e.g. the pool will always have a base amount of memory, and additional memory is added as memory resources are available)

If the total memory available is below this configured threshold, the protocol optionally will not immediately release memory from this pool until all of its peer's allocated cts can be accounted for. If the protocol receives data from the peer, the peer's allocated cts will decrease and memory may be immediately released. If the protocol on peer A does not receive enough data in a cycle to immediately release the memory for each cts allocated to peer B, it will send a message to peer B signaling peer B to reset its cts to a certain number. Data may be in flight from peer B, so peer B must send a signal to peer acknowledging that it has reset its cts count. Only once peer A receives this signal does peer A then lower the cts of peer B and release the associated memory from the pool. If the memory-availability threshold of this pool is low enough, this signaling process to release memory can be fast enough to release reserved memory before impacting other components on the node.

In some embodiments, to reduce communication with the protocol while limiting the size of the total queue of outbound data, the each operator may enqueue data immediately if the queue size is below a certain threshold. This threshold can change based on the amount of memory the protocol has reserved for cts. If memory pressure is low it can be more acceptable to have a larger queue, and the protocol is expected to drain the queue more quickly if it has allocated more cts under the assumption that memory pressure is similar across all participating nodes. In some embodiments, the system does not consider query priority, but has minimal overhead and generally higher priority operators will be given more opportunities to enqueue data than lower priority queries.

In some embodiments, the queues for all in progress sends take no consideration of query priority, where it is possible for low priority queries that send large amounts of data to impact higher priority queries by overloading this shared queue. In some embodiments, to account for differences in query priority, data batches are sent over short periods of time and release every batch in decreasing priority order until a flow control limit is hit. This can limit the amount of low-priority data that is sent when large volumes of high priority data are being enqueued, but may decrease throughput while data is being batched.

In some embodiments, some or all functionality of such approaches of approach using a large pool of reserved memory can also be applied to query networking between parent/child nodes instead of or in addition to communications between peer nodes, such as implementing gather operators or other communication of data from child nodes to parent nodes and/or vice versa. For example, gather operators can be implemented via additional flow control logic to apply back-pressure when the node is receiving data faster than it can process it. The gather operator can be implemented to otherwise have similar performance/throughput issues due to conservative memory estimates, which can motivate the employing of such functionality to gather operators in a same or similar fashion as utilized in handling shuttle operators.

Some or all of this functionality can improve the technology of database systems by improving networking between nodes as well as memory allocation by individual nodes. Some or all of this functionality can be implemented via some or all features and/or functionality presented in conjunction with FIG. 31A and/or FIG. 31B.

FIG. 31A illustrates an embodiment of a plurality of nodes that communicate data in conjunction with implementing row dispersal operators 2566 (e.g. in conjunction with a shuffle operation, multiplexing operation, tee operation, for example, performing as part of a join operation or other query operation). Some or all features and/or functionality of row dispersal operator 2566 of FIG. 31A can implement any all features and/or functionality of row dispersal operator 2566 described herein. Some or all features and/or functionality of the communication between nodes 37.1-37.N of FIG. 31A can implement some or all features and/or functionality of a shuffle node set 2485 of a shuffle network 2480 described herein.

As illustrated in FIG. 31A, a given node 37.1 can implement query execution memory resources 3125 for use in query execution by query processing resources 3126 (e.g. where query execution memory resources 3125 and/or query processing resources 3126 implement operator processing module 2435 of the node 37 and/or implement one or more operator execution modules 3215). The query execution memory resources 3125 can include a reserved memory pool 3120 operable to store incoming data from other nodes in conjunction with these other nodes implementing row dispersal operators 2566 (e.g. data received in a shuffle for processing). The query execution memory resources 3125 can further include other memory 3121 for use in query processing and/or an outbound data queue, which can be configured in accordance with adhering to a queue size threshold 3129 (e.g. maximum number of entries/amount of data enqueued for transmission at a given time based on a max mount of memory allocated for use by the outbound data queue 3123). The node 37.1 can implement an outbound transmission module 3123 that sends data in the outbound data queue to other nodes.

For example, the node 37.1 receives data from other nodes for storage in reserved memory pool in conjunction with a collective shuffle process with the other nodes based on other nodes implementing row dispersal operators in conjunction with collective execution of a given query, where received data by node 37.1 is processed by a load operator 2835 (e.g. a join operator or any other load operator described herein) that accesses the received data in the reserved memory pool 3120 to enable the node to generate its own portion of query output/a corresponding sub-resultant, for example, to be sent to another, parent node for processing in conjunction with sub-resultants generated by other nodes 37 via executing their own load operators 2835 on received data, where other nodes receive data from node 37.1 based on the node sending data in conjunction with implementing its own row dispersal operator as well as from other nodes. In particular, while FIG. 31C focuses on functionality of a given node 37.1's interaction with other nodes, some or all other nodes 37.2-37.N can be implemented in a same or similar fashion to perform similar functionality to enable sending data to and/or receiving data from some or all of the N−1 other nodes in this set similarly in conjunction with a collective query execution that includes such a data exchange (e.g. in conjunction with a shuffle operation by a corresponding shuffle node set that includes the N nodes of FIG. 31A).

In some embodiments, a size of the reserved memory pool is configured in conjunction with configured node allocation data 3152.1 for node 37.1, indicating this node's allocation of numbers of fixed memory units 31534 for example, where a fixed memory unit 3154 corresponds to a clear to sends (cts) discussed previously based on having fixed memory size. The node 37.1 can allocate numbers 3153 of fixed memory units 3154 to other nodes 37.2-37.N (e.g. node 37.2 is allocated a number of fixed memory units 3154 equal to some number 3153.1.2; node 37.3 is allocated a number of fixed memory units 3154 equal to some number 3153.1.3; etc.). Different nodes can be allocated same or different numbers 3153 of fixed memory units 3154 by the given node 37.1.

This allocation data 3152.1 can be maintained/stored/accessible in state data 3150, which can be stored locally by the node 37.1, sent to the node 37.1 and/or received by the node 37.1, generated/updated/configured by the node 37.1, and/or otherwise accessible by the node 37.1.

The state data 3150 can further indicate node allocation data 3152 for some or all other nodes, which can indicate each other node's respective allocation of numbers 3153 of fixed memory units (e.g. numbers of cts) to other respective nodes similarly. Such node allocation data 3152 can be stored as part of same state data 3150 and/or separate data maintained/accessed by different nodes individually. The state data 3150 accessible by node 37.1 can further indicate how many fixed memory units 3154 are allocated to the node 37.1 by other nodes, for example, based on how the node allocation data 3152 is configured for other nodes (e.g. based on the value of 3153.2.1 indicating node 37.2's allocation of fixed memory units 3154 to node 37.1: the value of 3153.3.1 indicating node 37.3's allocation of fixed memory units 3154 to node 37.1; etc.), and/or based on this node allocation data 3152 of other nodes being included in/indicated by the state data 3150 accessible by node 37.1. This can be utilized by the node to determine how much data can be sent to other nodes (e.g. per time frame, within an amount of time, etc., where the number 3153 optionally denotes a corresponding data rate), where node 37.1 routes and transmits data via outbound data transmission module 3123 accordingly, adhering to its allocated numbers 3153 of fixed memory units 3154 by these other nodes.

Similarly, other nodes can thus determine their allocated number 3153 of fixed memory units by node 37.1, which can be utilized by the other nodes to route the appropriate amount of data to node 37.1 (e.g. via their own outbound data transmission modules 3123). As data is received from other nodes, it can be stored by node 37.1 in the reserved memory pool (e.g. based on the reserved memory pool being configured to store enough fixed memory units worth of data based on other nodes sending the appropriate amount of data as configured in the node 1 allocation data 3152.1, based on this node 1 allocation data 3152.1 being communicated to the other nodes. Other nodes 37 can similarly store data received from node 37.1, and other respective nodes, in their own reserved memory pool 3120 that is similarly configured by the respective other nodes to meet the needs of their own allocation data 3152.

While not illustrated, such communication between nodes 37.1-37.N during a given time frame can be performed in conjunction with executing multiple queries requiring data to be sent over the network in this fashion (e.g. multiple concurrently executing queries that all involve execution of row dispersal operators, such as multiple queries implementing join operations each requiring such row dispersal). The node allocation data 3152.1 for node 1 (and similarly for other respective nodes) can optionally indicate fixed memory units allocated per operator (e.g. per query) for each node (e.g. node 1 allocates a total number of fixed memory units to node 2, which specifies a first subset of this total number of fixed memory units allocated to a shuffle operator of query A: a first subset of this total number of fixed memory units allocated to another shuffle operator of query B; node 1 allocates another total number of fixed memory units to node 3, which specifies another first subset of this other total number of fixed memory units allocated to the shuffle operator of query A: another second subset of this total number of fixed memory units allocated to the shuffle operator of query B: etc.). Alternatively, node allocation data 3152.1 for node 1 (and similarly for other respective nodes) optionally does not indicate such fixed memory units allocated per operator/per query, where a given node (e.g. node 37.2) can distribute its allocated memory units (e.g. of the number of units 3153.1.2 for node 2) however it wishes (e.g. node 2 allocates its number of units 3153.1.2 across different queries involving sending of data to node 1 based on its own query scheduling of the concurrently executing queries).

In some embodiments, the state data 3150 can be shared across the nodes 37.1-37.N in conjunction with being mediated via a consensus protocol. In some embodiments, the state data 3150 can be updated via one or more nodes (e.g. a leader node) in conjunction with applying a consensus protocol.

Any embodiment of the consensus protocol described herein can be implemented via the raft consensus protocol, or any other consensus protocol. Any embodiment of the consensus protocol described herein can be based on distributing a state machine across a plurality of nodes, ensuring that each node in the cluster agrees upon the same series of state transitions and/or ensuring that each node operates in accordance with the currently agreed upon state transition. In some embodiments, the state data 3150 can be mediated via assignment of nodes as either leader nodes or follower nodes in conjunction with a corresponding protocol.

In some embodiments, the database system defines and/or implements methods, such as custom functions, for converting the state data implemented as a raft state into a system object, such as a protocol buffer object, and/or vice versa. For example, the state data 3150 is implemented as a protocol buffer object. This can enable nodes to update their own system configuration as data (e.g. system metadata) communicated via a corresponding protocol (e.g. metadata storage protocol), for example, by performing at least one corresponding conversion function.

In some embodiments, the state data is updated over time via a plurality of sequential updates (e.g. metadata updates). Each metadata update can have a corresponding metadata sequence number (MSN), which can be implemented as an atomically increasing integer that defines an order for a specific version of system configuration. For example, the system configuration data can correspond to system metadata and/or any other type of information regarding the state of database system 10.

In some embodiments, a system configuration data update processes can enable event driven metadata delivery via the consensus protocol, such as the raft consensus protocol or any other consensus protocol. In some embodiments, a system configuration data update process is implemented in accordance with a system configuration data storage protocol, for example, where the system configuration data storage protocol is implemented as a raft state of a raft consensus protocol. This system configuration data storage protocol can be implemented via a plurality of corresponding hash maps, such as raft hash maps of the raft consensus protocol, where hash maps are implemented for each member variable of a base system object, for example, of corresponding system metadata and/or system configuration. Using raft hash maps in this fashion, for example, instead of repeated protocol buffer elements, can allows for faster access time by identifier.

In some embodiments, the state data 3150 can be generated/updated/communicated to nodes via any features and/or functionality of any embodiment of the system state data 3502 mediated via consensus protocol 3500, and/or any other embodiment of implementing a consensus protocol, disclosed by U.S. Utility application Ser. No. 18/310,262, entitled "GENERATING A SEGMENT REBUILD PLAN VIA A NODE OF A DATABASE", filed May 1, 2023, which is hereby incorporated herein by reference in its entirety and made part of the present U.S. Utility Patent Application for all purposes.

FIG. 31B illustrates an embodiment where node 37.1 implements a memory utilization adaptation module 3140 to configure pool size 3126 of the reserved memory pool 3120, corresponding node allocation data 3152, and/or the queue size threshold 3129 of outbound data queue 3123. Some or all features and/or functionality of node 37.1 of FIG. 31B can implement the node 37.1 of FIG. 31A, can further implement functionality of some or all other nodes 37.2-37.N of FIG. 31A, and/or can implement any embodiment of node 37 described herein.

For example, the node 37.1 adapts to changing memory conditions, where memory availability 3127 at a given time is polled via a memory polling module 3141 (e.g. in response to a predetermination, in accordance with a schedule, in fixed intervals such as per cycle where an operator is scheduled for execution or per a number of multiple such cycles, in response to receiving a command or instruction, or otherwise in multiple instances over time, within the life of a given query execution and/or across multiple query executions). In this example, the available memory 3127.i at some time/polling instance i is determined and processed by the memory utilization adaptation module 3140 accordingly.

This processing of available memory 3127.i can include applying a fixed memory unit re-allocation module 3143 that is operable to update the pool size 3126 of the reserved memory pool 3120 in response to available memory 3127.i (e.g. either increase or decrease the amount of memory allocated to the pool for receiving data from other nodes, or optionally keep the size pool unchanged if no change is necessary). For example, the fixed memory unit re-allocation module 3143 compares the available memory 3127.i to configured memory threshold data 3149. For example, the configured memory threshold data 3149 indicates a threshold minimum amount of available memory of other memory 3121 or otherwise indicating requirements for available memory 3127.i, utilized to indicate whether: more available memory is required for query execution/other processing by the node, where at least some memory resources of the reserved memory pool 3120 should be re-allocated as more available memory 3127 to render a corresponding decrease in pool size 3126 (e.g. the available memory 3127.i is below the minimum threshold indicated by configured memory threshold data 3149, and an amount of memory that renders increasing available memory 3127.i up to this the minimum threshold, such as the computed difference in amount of memory between current available memory 3127.i and the minimum threshold for the available memory, is designated to be unallocated from the reserved memory pool 3120 for allocation as additional other memory 3120 to increase the amount of available memory 3127 accordingly): or there is enough/plenty of available memory where some of this available memory can be allocated to the reserved memory pool to render a corresponding increase in pool size 3126 (e.g. the available memory 3127.i is above the minimum threshold indicated by configured memory threshold data 3149, and an amount of memory that renders decreasing available memory 3127.i up to this the minimum threshold, such as the computed difference in amount of memory between current available memory 3127.i and the minimum threshold for the available memory, is designated to be allocated as additional resources of the reserved memory pool 3120 to decrease the amount of available memory 3127 accordingly). The reserved memory pool 3120 optionally has a required base amount of memory that is maintained regardless of available memory, where pool size 3126 optionally never falls below this base memory amount.

The node can update node allocation data accordingly based on ensuring the total number of fixed memory units 3154 that can be accommodated by the reserved memory pool 3120 are allocated accordingly. This can include allocating additional fixed memory units 3154 across nodes when pool size increases 3126 (e.g. uniformly or non-uniformly across the other nodes, as determined by the node 37.1) and/or can include allocating fewer fixed memory units 3154 across nodes when pool size increases 3126 (e.g. uniformly or non-uniformly across the other nodes, as determined by the node 37.1). This can include updating the state data 3150 accordingly to indicate updated numbers 3153.1.2, 3153.1.3, etc. for the N−1 other nodes to reflect any changes (e.g. one of more numbers 3153 are configured increase or decrease).

These changes to state data 3152 can be communicated to the other nodes accordingly to ensure they update how much data they send (e.g. increase or decrease their rate of transmission to the node based on whether their allocated number 3153 increased or decreased). For example, the other nodes determine these changes have been made based on the state data being mediated via a consensus protocol, where the state data is shared across all nodes and/or changes are communicated in accordance with the consensus protocol to ensure all node's copy/version of the state data is up to date. Alternatively or in addition, the other nodes determine these changes have been made based on: the state data 3152 being stored in memory accessible by the other nodes: the changes to the state data 3152 being sent to the other nodes: or the changes to the state data 3152 otherwise being communicated to the other nodes. For example, nodes 37.1-37.N each determine/consult the state data 3152 periodically, such as prior to transmitting of data to other nodes and/or per cycle of query operator execution, to ensure the correct amount of data is being sent, to account for the fact that various nodes may adaptively change the allocated numbers 3153 to other nodes over time in this fashion (e.g. node 37.1 consults its number 3153.2.1 allocated to node 1 by node 2 prior to sending data to node 2 to send the correct amount of data that node 2 has allocated resources to store).

In some embodiments, to handle the case where another node 37.2 may be currently already transmitting an amount of data in accordance with a current number 3153 of allocated fixed memory units to the node 37.1 that is being decreased, the node 37.1 optionally maintains corresponding reserved memory in the pool until this expected amount data is received from the node to ensure the appropriate number of memory resources are available For example, the reserved memory is unallocated in stages as respective data from other nodes is received and processed. In the case where the expected data is not received within a threshold amount of time (e.g. a cycle since the last operator execution), but could still be in flight, the node can send a message directly to the other node 37.2 to instruct the node of this change, and can wait until receiving an acknowledgement message from the node 37.2 (which could optionally arrive after data that was already sent) before updating the reserved memory pool, based on confirming the node will transmit the appropriate amount of data. In some cases, such direct messages to notify a node of a change are only sent in response to not receiving the expected amount of data from that node within a threshold period of time.

A further changes to available memory 3127 occur over time, the node 37.1 can continue to adapt the pool size 3126 and/or its corresponding allocation data 3152.1 accordingly, where the pool size and some or all numbers 3153 of allocation data 3152.1 can increase and decrease over time with changing condition (e.g. number of queries being executed, amount of memory required to internally execute other operators of these queries, etc.).

Alternatively or in addition to changing the size of the reserved memory pool and updating allocated numbers of fixed memory units worth of data that can be sent by other nodes to node 37.1 via implementing the fixed memory unit re-allocation module 3143, the given node 37.1 can adapt to changing memory conditions based on implementing a queue size threshold setting module 3142 of memory utilization adaptation module. This can include updating the queue size threshold 3129 based on available memory 3127.i at the given time/polling instance i. For example, the queue size threshold is increased when available memory 3127.i is greater than a threshold (e.g. the same or different minimum threshold applied by the fixed memory unit re-allocation module 3143) to accommodate more enqueued data for transmission, and/or the queue size threshold is decreased when available memory 3127.i is less than the threshold (e.g. the same or different minimum threshold applied by the fixed memory unit re-allocation module 3143).

The node can be operable to only add data to the outbound data queue 3123 up to the queue size threshold 3129 at a given time. For example, an operator, such a row dispersal operator 2566 that would result in data being transmitted, is optionally only executed if there is room in the outbound data queue for the corresponding result of the execution (e.g. this operator is only "currently executable" when the outbound data queue has room for the resulting data). As another example, output data generated via operator executions are added to the queue only when there is room in the queue, and are stored in other temporary memory resources in the meantime.

A further changes to available memory 3127 occur over time, the node 37.1 can continue to adapt the queue size threshold 3129 accordingly, where the queue size threshold 3129 can increase and decrease over time with changing condition (e.g. number of queries being executed, amount of memory required to internally execute other operators of these queries, etc.).

Figure 31C:
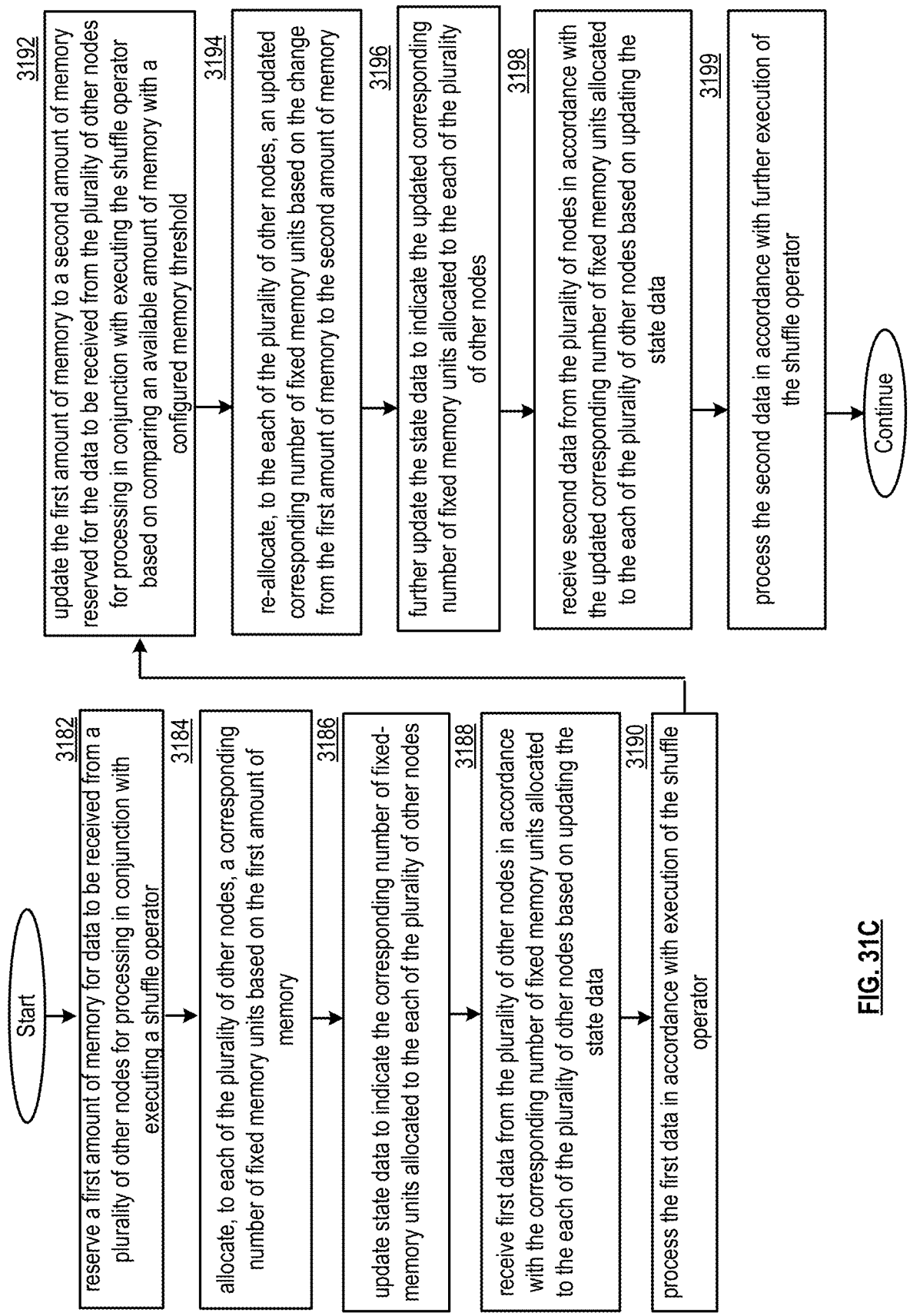
FIG. 31C is a logic diagram illustrating a method for execution in accordance with various embodiments.

FIG. 31C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 31C. In particular, a node 37 can utilize the query processing module 2435 to execute some or all of the steps of FIG. 31C, for example, via their own query scheduling module 4215 and/or their own query selection module 2950 where multiple nodes 37 implement their own query processing modules 2435 to independently execute the steps of FIG. 31C, for example, to facilitate execution of a query as participants in a query execution plan 2405. Some or all of the method of FIG. 31C can be performed by the query processing system 2510, for example, by utilizing an operator flow generator module 2514 and/or a query execution module 2504. Some or all of the steps of FIG. 31C can be performed to implement some or all of the functionality of the database system 10 as described in conjunction with FIGS. 31A-31B, for example, by implementing some or all of the functionality of the query scheduling module 4215 and/or their own query selection module 2950. Some or all of the steps of FIG. 31C can be performed to implement some or all of the functionality regarding execution of a query via the plurality of nodes in the query execution plan 2405 as described in conjunction with some or all of FIGS. 24A-24I. Some or all steps of FIG. 31C can be performed by database system 10 in accordance with other embodiments of the database system 10 and/or nodes 37 discussed herein. Some or all steps of FIG. 31C can be performed in conjunction with one or more steps of any other method described herein.

Step 3182 includes reserving a first amount of memory for data to be received from the plurality of other nodes for processing in conjunction with executing the shuffle operator. Step 3184 includes allocating, to each of the plurality of other nodes, a corresponding number of fixed memory units based on the first amount of memory. Step 3186 includes updating state data to indicate the corresponding number of fixed memory units allocated to the each of the plurality of other nodes. Step 3188 includes receiving first data from the plurality of other nodes in accordance with the corresponding number of fixed memory units allocated to the each of the plurality of other nodes based on updating the state data. Step 3190 includes processing the first data in accordance with execution of the shuffle operator. Step 3192 includes updating the first amount of memory to a second amount of memory reserved for the data to be received from the plurality of other nodes for processing in conjunction with executing the shuffle operator based on comparing an available amount of memory with a configured memory threshold. Step 3194 includes re-allocating, to the each of the plurality of other nodes, an updated corresponding number of fixed memory units based on the change from the first amount of memory to the second amount of memory. Step 3196 includes further updating the state data to indicate the updated corresponding number of fixed memory units allocated to the each of the plurality of other nodes. Step 3198 includes receiving second data from the plurality of other nodes in accordance with the updated corresponding number of fixed memory units allocated to the each of the plurality of other nodes based on updating the state data, step 3199 includes processing the second data in accordance with further execution of the shuffle operator.

In various examples, steps 3182-3190 are performed during a first temporal period, while steps 3192-3199 are performed during a second temporal period after the first temporal period. In various examples, steps 3192-3199 are repeated multiple times in accordance with further updating the amount of memory reserved for the data to be received from the plurality of other nodes for processing based on further changes to the available amount of memory.

In various examples, some or all steps of FIG. 31C are performed as part executing the shuffle operator in conjunction with executing a corresponding query collectively with a plurality of other nodes of the database system, for example, based on determining the shuffle operator and/or corresponding query for execution. In various examples, the shuffle operator is implemented as a row dispersal operator 2566. In various examples, the shuffle operation is performed in conjunction with executing a join operation of the query.

In various examples, the second amount of memory reserved for the data is decreased from the first amount of memory based on the available amount of memory being less than the configured memory threshold. In various examples, the updated corresponding number of fixed memory units re-allocated to the each of the plurality of other nodes in the second temporal period is decreased from the corresponding number of fixed memory units allocated to the each of the plurality of other nodes in the first temporal period based on the second amount of memory reserved for the data being decreased from the first amount of memory.

In various examples, the second amount of memory reserved for the data is increased from the first amount of memory based on the available amount of memory being greater than the configured memory threshold. In various examples, the updated corresponding number of fixed memory units re-allocated to the each of the plurality of other nodes in the second temporal period is increased from the corresponding number of fixed memory units allocated to the each of the plurality of other nodes in the first temporal period based on the second amount of memory reserved for the data being increased from the first amount of memory.

In various examples, a magnitude of difference between the second amount of memory and the first amount of memory is an increasing function of a magnitude of difference between the available amount of memory and the configured memory threshold. In various examples, a magnitude of difference in the updated corresponding number of fixed memory units re-allocated to the each of the plurality of other nodes in the second temporal period from the corresponding number of fixed memory units allocated to the each of the plurality of other nodes in the first temporal period is an increasing function of the magnitude of difference between the second amount of memory and the first amount of memory.

In various examples, the second amount of memory reserved for the data is decreased from the first amount of memory based on the available amount of memory being less than the configured memory threshold. In various examples, re-allocating the updated corresponding number of fixed memory units based on the change from the first amount of memory to the second amount of memory includes: receiving a set of data from a first node of the plurality of other nodes corresponding to at least one fixed memory unit: releasing a portion of memory from the first amount of reserved memory corresponding to the at least one fixed memory unit in response to receiving the set of data from the first node corresponding to at least one fixed memory unit; and/or updating the state data to indicate a corresponding updated number of fixed memory units re-allocated to the first node in response to receiving the set of data from the first node corresponding to at least one fixed memory unit.

In various examples, re-allocating the updated corresponding number of fixed memory units based on the change from the first amount of memory to the second amount of memory further includes: determining a first corresponding updated number of fixed memory units to be re-allocated to the first node as a first decrease from a first currently-allocated number of fixed memory units allocated to the first node by a first corresponding number of fixed memory units; and/or determining a second corresponding updated number of fixed memory units to be re-allocated to a second node of the plurality of other nodes as a second decrease from a second currently-allocated number of fixed memory units allocated to second node by a first corresponding number of fixed memory units. In various examples, the first corresponding number of fixed memory units by which the first currently-allocated number of fixed memory units allocated to the first node is to be decreased and the second corresponding number of fixed memory units by which the second currently-allocated number of fixed memory units allocated to the second node is to be decreased are based on a magnitude in decrease from the first amount of memory to the second amount of memory. In various examples, a first magnitude of the first decrease is different from a second magnitude of the second decrease. In various examples, the first corresponding updated number of fixed memory units re-allocated to the first node is different from the second corresponding updated number of fixed memory units re-allocated to the second node.

In various examples, re-allocating the updated corresponding number of fixed memory units based on the change from the first amount of memory to the second amount of memory further includes: receiving the set of data from the first node of the plurality of other nodes corresponding to at least one fixed memory unit within a predetermined time window, wherein the portion of memory from the first amount of reserved memory corresponding to the at least one fixed memory unit is released in response to receiving the set of data from the first corresponding to at least one fixed memory unit within the predetermined time window, and further in response to a first amount of data included in the set of data being greater than equal to a first magnitude of the first decrease: determining an amount of data received from the second node within the predetermined time window is less than a second magnitude of the second decrease: sending a message to the second node indicating the second corresponding updated number of fixed memory units in response to determining the amount of data received from the second node within the predetermined time window is less than the second magnitude of the second decrease: receiving a response from the second node acknowledging the message; and/or only once the response from the second node is received, releasing a second portion of memory from the first amount of reserved memory corresponding to second magnitude of the second decrease in response to receiving the response from the second node and/or updating the state data to indicate the second corresponding updated number of fixed memory units re-allocated to the second node in response to receiving the response from the second node.

In various examples, executing the shuffle operator in conjunction with executing the query collectively with a plurality of other nodes of the database system is further based on: determining a set of numbers of fixed memory units allocated to the node, wherein each of the set of numbers of fixed memory units is allocated to node by a corresponding one of the plurality of other nodes: generating outbound data in accordance with the shuffle operation; and/or dispersing the outbound data to the plurality of other nodes, wherein data of the outbound data is sent to each of the plurality of other nodes in accordance with a corresponding one of the set of numbers of fixed memory units allocated to node by the each one of the plurality of other nodes.

In various examples, executing the shuffle operator in conjunction with executing the query collectively with the plurality of other nodes of the database system is further based on, during a third temporal period: determining a first number of fixed memory units allocated to the node by a first node of the plurality of other nodes; and/or sending data of first outbound data generated during the third temporal period to the first node in accordance with the first number of fixed memory units allocated to the node by the first node. In various examples, executing the shuffle operator in conjunction with executing the query collectively with the plurality of other nodes of the database system is further based on, during a fourth temporal period after the third temporal period: determining a second number of fixed memory units allocated to the node by a first node of the plurality of other nodes updated from the first number of fixed memory units; and/or sending data of second outbound data generated during the fourth temporal period to the first node in accordance with the second number of fixed memory units allocated to the node by the first node.

In various examples, dispersing the outbound data to the plurality of other nodes includes sending data included in an outbound data queue to corresponding nodes in the plurality of other nodes. In various examples, the method further includes, during the first temporal period: setting an outbound data queue size threshold of an outbound data queue as a first outbound data queue size threshold for the shuffle operator; and/or enqueuing first data generated during the first temporal period in conjunction with executing the shuffle operator based on maintaining the outbound data queue in accordance with the first outbound data queue size threshold. In various examples, the method further includes, during the second temporal period: updating the outbound data queue size threshold from the first outbound data queue size threshold to a second outbound data queue size threshold based on comparing the available amount of memory with the configured memory threshold, and/or enqueuing second data generated during the second temporal period in conjunction with executing the shuffle operator based on maintaining the outbound data queue in accordance with the second outbound data queue size threshold.

In various examples, the second outbound data queue size threshold is decreased from the first outbound data queue size threshold based on the available amount of memory being less than the configured memory threshold. In various examples, the second outbound data queue size threshold is increased from the first outbound data queue size threshold based on the available amount of memory being greater than the configured memory threshold.

In various examples, the method further includes generating a plurality of outbound data for a plurality of concurrently executing queries that includes the query being executing collectively with the plurality of other nodes of the database system. In various examples, data of the plurality of outbound data for different ones of the plurality of concurrently executing queries is enqueued to the outbound data queue. In various examples, the method further includes dispersing the plurality of outbound data to the plurality of other nodes, wherein data of the plurality of outbound data is sent to each of the plurality of other nodes in accordance with the corresponding one of the set of numbers of fixed memory units allocated to node by the each one of the plurality of other nodes.

In various examples, the plurality of concurrently executing queries have a corresponding plurality of query priorities, and wherein the plurality of outbound data is dispersed in an ordering based on corresponding plurality of query priorities.

In various examples, data of the plurality of outbound data is generated based on implementing a gather operator of a corresponding one of the plurality of concurrently executing queries.

In various examples, the state data is updated in accordance with a consensus protocol mediated across a set of nodes that includes the node and the plurality of other nodes. In various examples, the each of the plurality of other nodes send corresponding data of the first data in accordance with the corresponding number of fixed memory units allocated to the each of the plurality of other nodes based on the each of the plurality of other nodes determining the state data in accordance with the consensus protocol. In various examples, the each of the plurality of other nodes send corresponding data of the second data in accordance with the updated corresponding number of fixed memory units allocated to the each of the plurality of other nodes based on the each of the plurality of other nodes further determining the updated state data in accordance with the consensus protocol. In various examples, the consensus protocol is a raft consensus protocol.

In various examples, the method further includes polling the available amount of memory in memory resources of the node via a plurality of polls over time, wherein the available amount of memory is determined during the second temporal period in response to one of a plurality of polls, wherein other ones of the plurality of polls are performed at other times, further comprising, in response to each of the plurality of polls. In various examples, the method further includes determining whether to update a current amount of memory to an updated amount of memory reserved for the data to be received from the plurality of other nodes for processing in conjunction with executing at least one query based on comparing the available amount of memory with the configured memory threshold. In various examples, the method further includes, when determining to update the current amount of memory to the updated amount of memory: re-allocating, to the each of the plurality of other nodes, a corresponding updated corresponding number of fixed memory units based on the change from the current amount of memory to the updated amount of memory: further updating the state data to indicate the corresponding updated corresponding number of fixed memory units allocated to the each of the plurality of other nodes: receiving further data from the plurality of other nodes in accordance with the corresponding updated corresponding number of fixed memory units allocated to the each of the plurality of other nodes based on further updating the state data; and/or processing the further data in accordance with execution of the at least one query.

In various embodiments, any one of more of the various examples listed above are implemented in conjunction with performing some or all steps of FIG. 31C. In various embodiments, any set of the various examples listed above can be implemented in tandem, for example, in conjunction with performing some or all steps of FIG. 31C.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 31C described above, for example, in conjunction with further implementing any one or more of the various examples described above.

In various embodiments, a node of a database system includes at least one processor and at least one memory that stores operational instructions. In various embodiments, the operational instructions, when executed by the at least one processor, cause the node to perform some or all steps of FIG. 31C, for example, in conjunction with further implementing any one or more of the various examples described above.

In various embodiments, the operational instructions, when executed by the at least one processor, cause the node to determine a query for execution that includes a shuffle operator and/or executing the shuffle operator in conjunction with executing the query collectively with a plurality of other nodes of the database system. In various embodiments, the operational instructions, when executed by the at least one processor, further cause the node to execute the shuffle operator in conjunction with executing the query collectively with a plurality of other nodes of the database system is based on, during a first temporal period: reserving a first amount of memory for data to be received from the plurality of other nodes for processing in conjunction with executing the shuffle operator: allocating, to each of the plurality of other nodes, a corresponding number of fixed memory units based on the first amount of memory: updating state data to indicate the corresponding number of fixed memory units allocated to the each of the plurality of other nodes: receiving first data from the plurality of other nodes in accordance with the corresponding number of fixed memory units allocated to the each of the plurality of other nodes based on updating the state data; and/or processing the first data in accordance with execution of the shuffle operator. In various embodiments, the operational instructions, when executed by the at least one processor, further cause the node to execute the shuffle operator in conjunction with executing the query collectively with a plurality of other nodes of the database system is based on, during a second temporal period after the first temporal period, updating the first amount of memory to a second amount of memory reserved for the data to be received from the plurality of other nodes for processing in conjunction with executing the shuffle operator based on comparing an available amount of memory with a configured memory threshold: re-allocating, to the each of the plurality of other nodes, an updated corresponding number of fixed memory units based on the change from the first amount of memory to the second amount of memory: further updating the state data to indicate the updated corresponding number of fixed memory units allocated to the each of the plurality of other nodes; receiving second data from the plurality of other nodes in accordance with the updated corresponding number of fixed memory units allocated to the each of the plurality of other nodes based on updating the state data; and/or processing the second data in accordance with further execution of the shuffle operator.

FIGS. 32A-32E present embodiments of database system 10 that schedule schedules execution of queries over time in accordance with concurrently executing multiple queries based on grouping queries by priority. Some or all features and/or functionality of FIGS. 32A-32E can implement some or all features and/or functionality of operator scheduling module 2815 of FIGS. 33A-33E. Some or all features and/or functionality of FIGS. 32A-32E can implement any embodiment of database system 10 described herein.

FIG. 32A illustrates an embodiment of a database system 10 that executes plurality of query operator execution flows 2517.1-2517.R concurrently (e.g. in overlapping time spans) in conjunction with concurrently executing a plurality of queries 1-R based on scheduling a plurality of execution scheduling 4217 over time for each query, for example, to induce execution of respective operators, as scheduled in corresponding query scheduling data 4216. Some or all features and/or functionality of executing each query operator execution flows 2517 in conjunction with also concurrently executing other query operator execution flows 2517 based on scheduling data 4216 can implement any embodiment of query execution module 2504 described herein and/or any query execution by database system 10 described herein. Some or all features and/or functionality of executing multiple query operator execution flows 2517 can implement a given execution of multiple operator flows of FIG. 33C, where one or more processing modules 48 of one or more nodes 37 each implement the functionality of FIG. 32A, and/or where a plurality of processing modules 48 of a plurality of nodes 37 collectively implement the functionality of FIG. 32A.

The query scheduling data 4216 can be generated based on priorities assigned to each of the R queries, for example, where a proportion of workflow cycles, proportion of operator executions, and/or proportion of time/resources dedicated to execution of a given query is based on their respective priority value 2942 (e.g. is an increasing function of their priority value 2942 with respect to other priority values 2942 for other queries). As used in the example embodiments herein, a higher numeric value of a priority value can dictate a higher/more favorable corresponding priority (e.g. more time/resources will be spent to process the query) than a priority value having a lower numeric value. Note that the scheme can optionally be inverted in other embodiments and/or other schemes can be utilized to dictate priority of queries relative to each other.

These priority values 2942 can be based on corresponding query requests. For example, query priorities are configured via user input in conjunction with a corresponding query expression for execution by a requesting entity. As another example, different query priorities can be assigned to different requesting entities, where queries received from some requesting entities have higher priority than queries received from other requesting entities. Query priorities 2942 for different queries can be: received, configured via user input, accessed in memory resources, automatically generated in accordance with an automated process, and/or otherwise determined.

In some embodiments, these priority values are static. In other embodiments, these priority values can optionally change over time, for example, based on being generated and updated by one or more dynamic priority update modules implemented by database system 10, where the priority value 2942 of a given query can change over time based on a dynamic priority update module generating, for some or all queries, a plurality of priority updates indicating updates to their respective priority values 2942 over time.

In some embodiments, the query execution module 2504 (e.g. a corresponding virtual machine, optionally on a per node 37 and/or per processing core resource 48 basis) uses a cooperative multitasking scheduling approach to manage concurrent queries as well as concurrent operators within a query, for example, implemented via query scheduling module 4215. To determine which queries to give run cycles to, the scheduler (e.g. query scheduling module 4215) can utilize user-defined priorities associated with each query. Each cycle, the scheduler can run the highest priority query that is capable of doing work (i.e. is "runnable", which intentionally may starve lower priority queries.

Figure 33A:
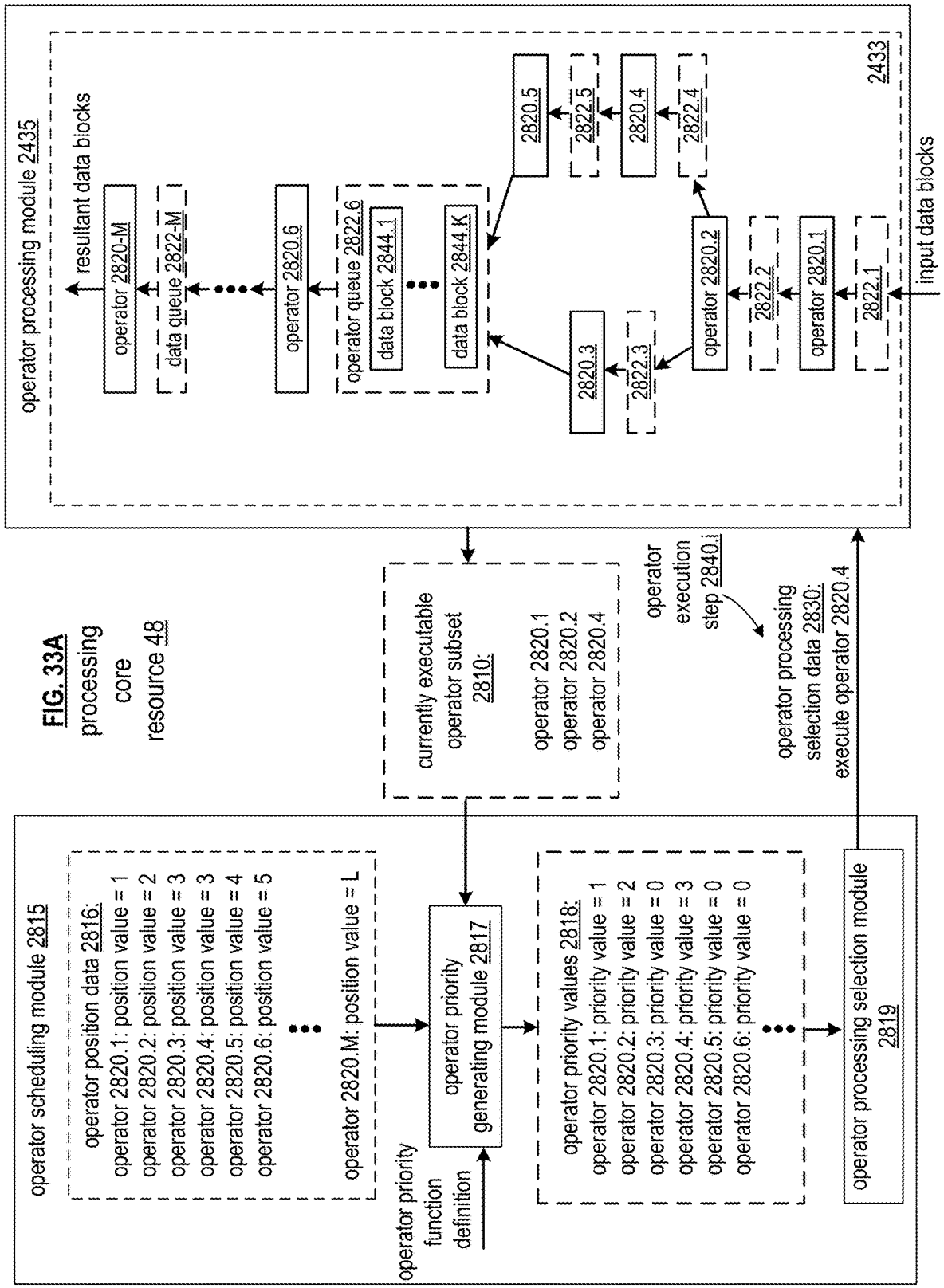
FIG. 33A is a schematic block diagram of a processing core resource that implements an operator scheduling module and an operator processing module in accordance with various embodiments of the present invention.

As used herein, a query is runnable if it is capable of doing work, for example, based on having at least one operator that can be executed (e.g. at least on operator has pending data blocks: a blocking operator has all pending data blocks required for execution, etc.), for example, as indicated by a set of operators of the query determined to be currently executable operators identified via some or all features and/or functionality discussed in conjunction with FIGS. 33A and/or 33B. As used herein, a query is runnable if it not capable of doing work, for example, based on having no operators that can be executed (e.g. no operators have pending data blocks: all blocking operators are awaiting some or all required data blocks for execution, etc.), for example, as indicated by no operators of the query being determined to be currently executable operators.

In some embodiments, given a list of queries Q sorted by query priority descending, a scheduling algorithm can be implemented based on implementing instructions indicated by executing the code and/or implementing corresponding logic as the first example pseudocode below:

for each query in Q:
    if query is runnable:
    run query
    break

By construction, this first example has a strong scheduling bias towards queries that appear earlier in Q. For example, if Q=[a (priority=2), b(priority=2)], the scheduler will be unfairly biased towards query a.

In some embodiments of the scheduler, fairness is maintained for the highest priority queries by recording the index of the previous query that had run in order to round robin cycles across the highest priority queries with minimal bookkeeping overhead. Such functionality can be implemented based on implementing instructions indicated by executing the code and/or implementing corresponding logic as the second example pseudocode below:

if Q[query Idx], priority<Q [query Idx-1].priority:
    query Idx=0
for i in [0 . . . |Q|]:
    if Q [query Idx mod |Q|] is runnable:
        run Q [query Idx mod |Q|]
        query Idx+=1
        break
    query Idx+=1

In this second example pseudocode, the "| |" operation can return a size of the corresponding data construct (e.g. number of elements included in the construct), queryIdx can be a variable recording the index of the previous query that had run, where Q [query Idx] denotes the query at the corresponding index in a corresponding structure Q (e.g. sorted list of all queries by decreasing priority). The "priority" variable for a given query can denote the priority value of the corresponding query. Note that this means of incrementing queryIdx can render a value greater than the number queries in Q, where a modulo operation (i.e. "mod" in this example) can be implemented to maintain the turn-based functionality as query Idx continues to increment (e.g. based on not being reset to zero if the first condition of priority not decreasing is not met), where Q[query Idx mod |Q|] thus ensures that Q is indexed via an index that is between O and Q-1 (e.g. in a zero-indexed implementation of Q).

In implementing logic illustrated by the second example pseudocode, fair round-robin behavior is achieved across a single set of tied priority queries, but is unfair when multiple priorities are present at each priority. For example, if Q=[a (priority=2), b (priority=2), c (priority=1). (priority=1)], the scheduler will be unfairly biased towards both b and c: The bias towards c exists similar to the first example algorithm because c appears before d in Q and the scheduler will always begin a cycle at either a or b. A bias towards b exists because the scheduler may run lower priority queries c or d even when a is runnable if it first tries b and b is not runnable, but c or d will never run when b is runnable.

To further improve fairness in scheduling to handle such cases, the corresponding scheduling algorithm can be implemented to be fair (e.g. at least in terms of ruin-attempts) across all queries at tied priorities. This can be based on: storing the position of the last scheduled query within each group of queries with the same (e.g. tied) priorities: attempting to run each query within that group beginning with the query immediately after the previously scheduled query; and/or attempts to run each group in decreasing priority order. Such functionality can be implemented based on implementing instructions indicated by executing the code and/or implementing corresponding logic as the third example pseudocode below:

for each group in G:
    for i in [0 . . . |group.Q|):
        if group.Q[group.query Idx mod|group.Q|] is runnable:
            run group. Q[group.query Idx mod|group.Q|]
            group.query Idx+=1
            break
        group.query Idx+=1

In this third example pseudocode, a given "group" can correspond to a list of queries Q with an equal scheduling priority, where each group has its own maintained queryIdx (e.g. group, query Idx indicates the tracked index value for that query group, utilized to track the last executed query in that group. "G" can be a list of such groups ordered by scheduling priority descending, where the first group in G corresponds to queries with a same priority that is the highest priority across all queries, where the second group in G corresponds to queries with a same priority that is the second-highest priority across all queries, etc., where the last group in G corresponds to queries with a same priority that is the lowest priority across all queries. Some groups optionally contain a single query if only one query has that corresponding priority.

Note that this means of incrementing query Idx for each group can render a value greater than the number queries in the corresponding list Q for that group, where a modulo operation (i.e. "mod" in this example) can be implemented to maintain the turn-based functionality within a given group as query Idx for that group continues to increment (e.g. where the query Idx is never reset to zero and/or is only reset to zero once it hits a predetermined maximum value), where group. Q[query Idx mod |Q|] thus ensures that that groups Q is indexed via an index that is between O and Q-1 (e.g. in a zero-indexed implementation of Q).

This hierarchy of grouping queries by priority can be implemented to render minimal overhead on the scheduler, allowing round-robin scheduling within each priority as well as exhausting the queries of each higher priority group before attempting a lower priority group. Furthermore, the ordering of queries within each group is no longer relevant as long as it does not change because the group is exhaustively round-robin scheduled before any lower priority queries. Adding queries to the group is accomplished by simply appending them to the end of the list without the need to re-sort. Examples of applying the logic of this third example are illustrated and discussed in conjunction with FIGS. 32B-32D. Implementing this functionality can improve the technology of database systems based on improving fairness and ensuring query priority is adhered to in executing queries, while also rendering low memory usage.

Figure 32B:
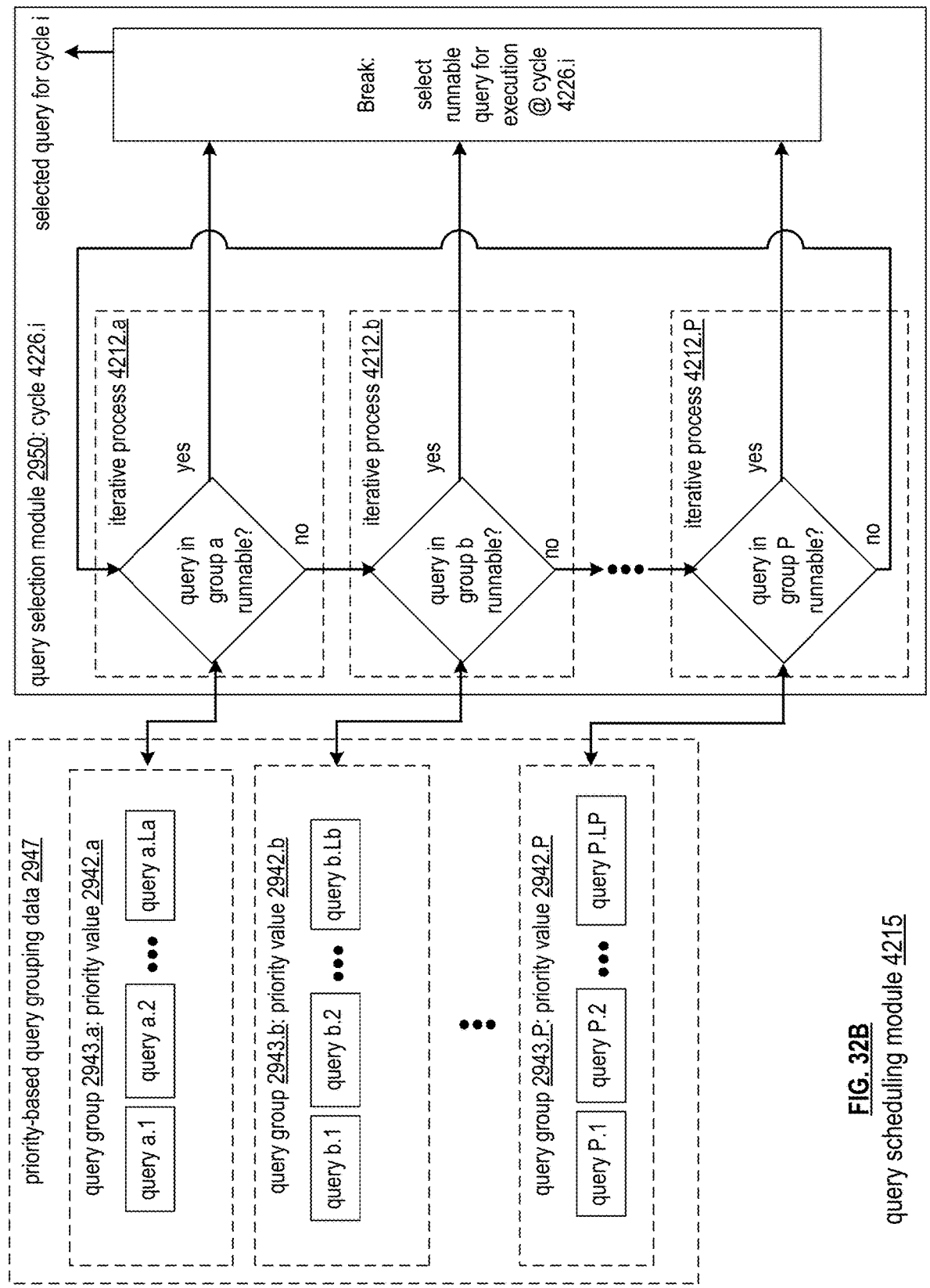
FIG. 32B is a schematic block diagram of a query scheduling module that selects queries for execution based on priority-based query groups in accordance with various embodiments.

FIG. 32B illustrates an embodiment of a query scheduling module 4215 implementing a query selection module 2950 that selects a query in each cycle 4226.*i* of a plurality of cycles based on performing one or more iterative processes by query groups of a plurality of priority-based query groups 2943.*a*-2943.P indicated in priority-based grouping data 2947 where each query group includes one or more queries having a same corresponding priority value 2942, where query group 2943.*a* has one or more queries with a same priority value 2942.*a* corresponding to a highest-priority (e.g. highest numerical value in cases where higher priority values indicate higher priority) of pending queries, where query group 2943.b has one or more queries with a same priority value 2942.b corresponding to a second-highest-priority of pending queries, and so on.

The priority-based grouping data 2947 can indicate pending queries grouped by priority in a plurality of query groups. The priority-based grouping data 2947 can be stored in memory resources accessible by the query scheduling module 4215 (e.g. memory resources included in/accessible by a given node 37 and/or given processing core resource 48). This can include maintaining a corresponding data structure (e.g. and array and/or list) indicating the set of queries included in a corresponding query group 2943. The priority-based grouping data 2947 can implement query set 2950 of FIG. 33C, where query data 2941 is indicated (e.g. stored in, mapped to) a corresponding entry for a query indicated in a corresponding priority-based query group 2943. The query priority value 2942 is optionally not indicated per query in query data in entries of a data structure, for example based on being inherent by the query being assigned to a corresponding group mapped to the given query priority value 2942.

For a given selection of a query for execution, the query selection module 2950 first determines whether any queries in highest-priority group 2943.a are runnable, and will select a query from group 2943.a if there is a runnable query in this group. The particular query that is selected can be in accordance with a per-group round-robin process (e.g. select the next query in sequence from group 2943.a after a most recently executed query from this group, if runnable). This per-group round-robin process can include performing an iterative process 4212.a to iterate over the set of queries in group 2943.a, and breaking once a query is identified that is runnable (e.g. check each query one at a time in accordance with an ordering, for example, implementing a per-group round-robin process, and ceasing checking of any remaining queries once a query is identified, and selecting this query accordingly, where determining that no queries in the group are runnable can include checking every query in accordance with the ordering). This can include iterating over some or all L queries in a given group, where the value of L can be the same or different for different groups based on distribution of various priorities (e.g. group 4243.a has La queries, group 4243.b has Lb queries, and so on), until a runnable query is identified (where all L queries of a given group are thus checked only in the cases where either none of the queries are runnable, or where only the last-checked query is runnable).

If no queries in in highest-priority group 2943.a are runnable, the process proceeds to the second-highest priority group 2943.b, where a similar iterative process 4212.b can repeat for this next group 2943.b to identify whether any queries are runnable, and select a query from this group if any queries are runnable. Such iterative processes 4212 can be performed per group in order of decreasing priority until a runnable query is identified. Thus, iterative process 4212.c will only be performed for a third-highest priority group 2943.c if the iterative processes 4212.a and 4212.b are completed and render no identification of runnable queries in these groups, and/or where subsequent iterative processes are not performed for lower priority groups if a runnable query is identified via iterative process 4212.c.

Once a query is selected for a given cycle 4226.i, the corresponding query can be executed in the given cycle via query execution module 2405 (e.g. via an operator processing module 2435 of a corresponding node 37 and/or corresponding processing core resource 48 implementing the query scheduling module 4215). This can include performing a partial query execution of the corresponding query, such as executing a selected operator 2520 of the query upon any pending data blocks of the operator to render generation of output data blocks, for example, applied as pending data blocks to a parent operator for execution in another cycle, once this query is selected again. Thus, a given query scheduled for execution and indicated in a priority-based query group 2943 remains in this group until its execution is completed, for example, over many selected cycles via such partial query executions over time.

Selection of the query to be performed in the next cycle 4226.i+1 can then be selected in this fashion, again starting with checking of the first-highest priority group 2943.a regardless of which group the query selected for cycle 4226.i belonged within. This ensures that queries are executed in accordance with priorities first, and that a round-robin nature is then applied on a per-priority basis.

This mechanism of selecting queries for execution per-cycle can be performed independently by various parallelized resources executing their own respective queries and/or their own respective portion of a given query (e.g. based on their assigned rows/segments to process and/or based on their level assignment in query execution plan 2405). Thus, a plurality of query scheduling modules 4215 can be implemented across a plurality of nodes 37 and/or across a plurality of processing core resources 48 implemented via a given node and/or across multiple nodes. The plurality of query scheduling modules 4215 can each be implemented in accordance with the functionality of FIG. 32B, for example, upon queries/portions of queries assigned to the respective parallelized resource for processing in conjunction with parallelized processing of queries across parallelized resources as described herein.

Figure 32C:
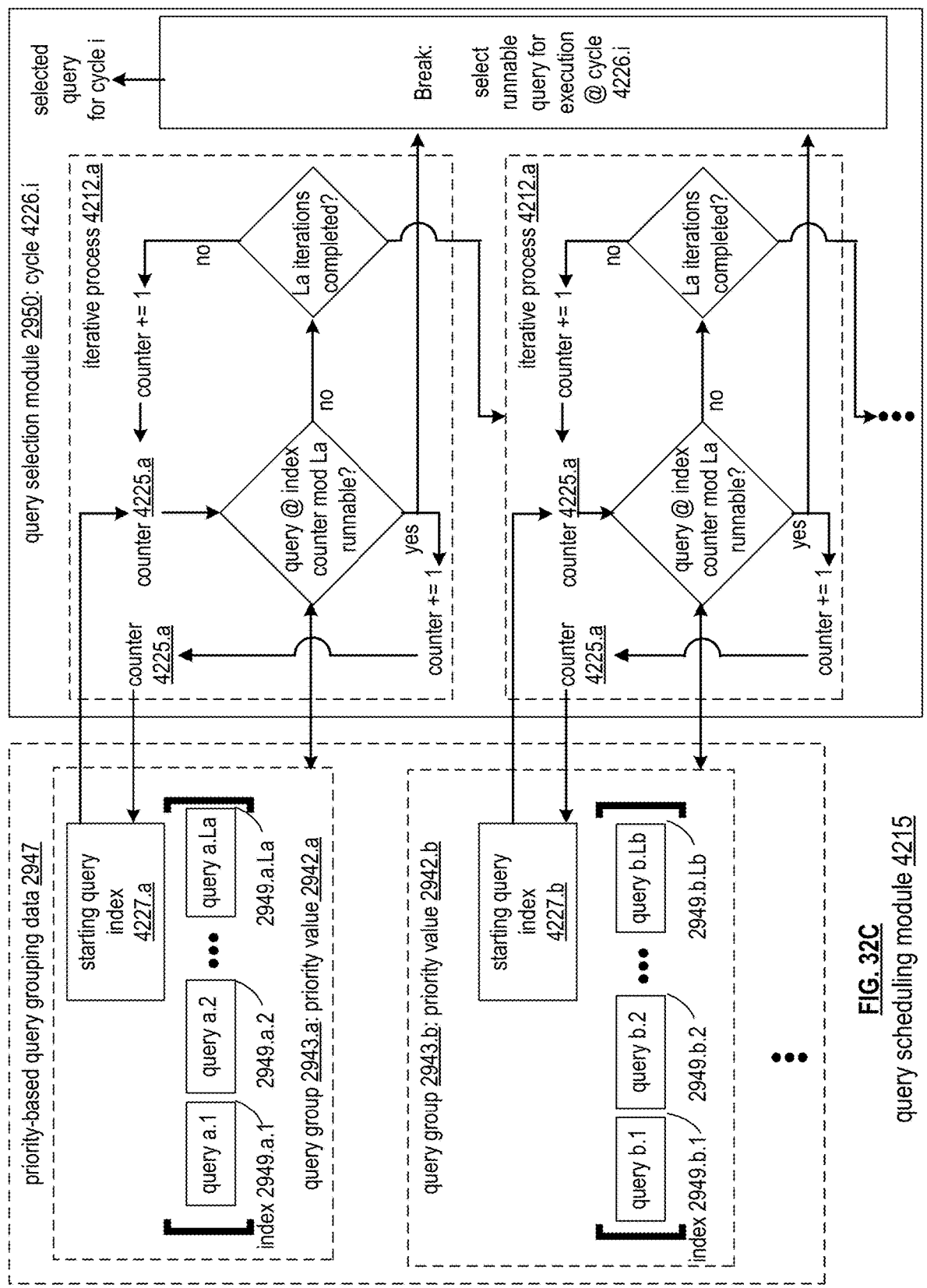
FIG. 32C is a schematic block diagram of a query scheduling module that selects queries for execution based on incrementing index values for ordered lists for priority-based query groups in accordance with various embodiments.

FIG. 32C illustrates an embodiment of performing iterative processes 4212 for each group as illustrated in FIG. 32B based on accessing a starting query index 4227 maintained for a given query group 4243. For example, the priority-based grouping data 2947 further stores a starting query index 4227 for each query group in addition to storing the set of queries, for example, as an ordered list (E.g, in an array and/or list structure, where each entry is mapped to/accessible via indication of a corresponding index, and/or where the starting query index 4227 indicates the index for the query of the query group that should be checked first in the next iterative process 4212, for example, based on being immediately after the most recently executed query in the list and based on iterating over the list in order via iterative process 4212.

Tracking of the last executed query index 4227 can be utilized to enable the per-priority-group round-robin selection of queries over cycles over time. In particular, each iterative process 4212 for a given cycle can start with the starting query index 4227, and checking starting with this starting query index 4227. The starting query index 4227 is not necessarily the index for the first entry in the list.

For example a list of 10 queries for a given query group 4243 are indexed via the index values 0-9. The starting query index 4227 indicates index value 5, based on the query at index value 4 being that last query from this group that was executed (e.g. in an immediately prior cycle, or multiple cycles ago based on none of the queries in this group being runnable over multiple of the most recent cycles or based on this query list not being checked in the multiple of the most recent cycles based on higher priority queries in higher priority groups having been runnable and thus selected for execution in these cycles). The iterative process 4212 thus checks for runnable queries starting with the query at index value 5, then at index value 6, and so on, until a runnable query is identified. Once reaching the end of the list at index value 9, if a runnable query has not been identified, the iterative process 4212 continues from wrapping to the beginning of the list, next checking the query at index value 0, then at index value 1, and so on, until a runnable query is identified or until finishing with checking index value 4 and thus exhausting checking of all 10 queries in the list (e.g. the query at index value 5 is not re-checked for this cycle, as it was already checked as the first query checked).

If no queries are identified via a given iterative process 4212, the next iterative process 4212 for the next-highest-priority group is performed similarly, starting from the starting query index 4227 for that given group (e.g. regardless of the starting query indexes 4227 of other groups). This process can continue for each group until a runnable query is identified, where the checking of queries for each group starts with the starting query index 4227 for each given group.

If a query is identified as runnable in the given group and is thus selected for execution in the given cycle, the starting query index 4227 for that given group can be updated accordingly, rendering appropriate tracking of which query to start the processes with next time this query group is checked in a subsequent cycle. Continuing with the above example of a list of 10 queries with a starting query index 4227 indicating checking of index 5 first, suppose queries at indexes 5, 6, and 7 are not runnable, but the query at index 8 is runnable. Query at index 8 is thus selected, and the starting query index 4227 is updated to indicate index 9, where the iterative process 4212 for this query group will thus start at index 9 in the next cycle where this query group is checked (which is not necessarily the immediately subsequent cycle if higher priority queries are runnable and thus selected in one or more immediately subsequent cycles).

In some embodiments, each iterative process 4212 is performed based on maintaining a counter, starting with the starting index value 4227 for the respective group. The counter is incremented after checking each index, where the counter thus denotes the next index value to check. To handle the case of wrapping to the start of the list, a modulo operation (e.g. "mod") can be applied to determine a corresponding index value within range for the given list while still strictly incrementing the counter 4225. Returning to the example of a list of 10 queries indexed from 0-9, suppose the starting query index has an index value of 5, and counter 4225 is thus applied as 5 at the first iteration, incrementing upwards to 6, 7, and so on. After checking the query at index 9 and determining it is not runnable, the counter 4225 can be incremented to 10. Applying the modulo function to determine the index of the query can enable such incrementing past the range of the list, as the value of counter mod 10 would return the value of zero, where the query at index 0 is thus accessed, where 10 is applied as the divisor of the modulo function based on the size of the list being 10 (e.g. based on L being equal to 10 and/or the list having 10 entries indicating 10 queries). Even if the value of the counter is in range (e.g. counter 4225.*a* has a value of 5), applying the modulo operation in this fashion renders the corresponding value.

If L changes over time for a given list, the modulo function can be applied with the current value of L (e.g. current size of the list as identified by a size function/size attribute of a corresponding data structure). For example, two new queries are added to the example list (e.g. appended to the end of the list, in indexes 10 and 11 accordingly in this example) to render 12 total queries in the list, and the divisor of the modulo function is thus 12 in these cases. Later, a query finishes execution and is removed from the list to render only 11 queries in the list, and the divisor of the modulo function is thus 12 in these cases (e.g. where other queries shifting "up" in the list to account for the empty space, for example, where this query was indexed at index 7 prior to removal, and where index 7 now indexes the query that was immediately after this removed query in the list based on all queries in the list shifting, rendering a reduction in size of this list, where the final query in the list is moved from being indexed at 11 to being indexed at 10).

Alternatively to strictly incrementing each counter and applying the modulo function in this fashion, the counter 4225 can reset to zero (or one, if the list is one-indexed) once it reaches a value not valid as an index value (e.g. the counter increments up to 9, and is reset to zero rather than incrementing to 10 based on the size of the list being 10 and 9 being the last valid index for the list).

The starting query index can be set as the counter value, which can render starting query index 4227 similarly incrementing over time. In the example where starting query index 4227 indicates the index of 5 in a list of 10 queries, the starting query index 4227 is optionally equal to a larger value x where x mod 10=5, where the starting query index 4227 has a value of 105, of 1124345, etc. Alternatively, the starting query index 4227 can be maintained as a valid index value (e.g. based on applying the modulo function to the current value of the counter: for example, if the counter=13 when a runnable query is identified at index 3 based on L being equal to 10, rather than updating the starting query index as 14 by incrementing 13, the starting query index can be set as 4 by incrementing 13 to 14, and by then setting the starting query index as the value of 14 mod 10.

In some cases where the starting query index strictly increases, the starting query index can be adjusted when the size of the list changes to ensure the appropriate "next" query in accordance with the round-robin nature of the selection is accessed (e.g. the value of starting query index has a value of 105 indicating the query at index 5 in the case where L is equal to 10; based on adding a new query to render L=11, the starting query index value of 105 no longer maps to index 5, and is updated to a value x where x mod 11 equals 5, such as by being reset to 5 or a different value. In other embodiments, the round-robin nature briefly slips in these cases where the size changes, still resulting in mostly fair selection of queries.

In some embodiments, rather than maintaining a separate counter 4225 and updating the starting query index 4227 after the query is selected, the counter 4225 is implemented as the starting query index 4227 itself, where the maintained starting query index 4227 is thus incremented as counter 4225. This can render equivalent logical functionality: as the starting query index 4227 as counter 4225 to check each entry, the corresponding incrementing of the starting query index 4227 will either: end with a final incrementing after a runnable query is identified, thus indicating the index after the selected query and being updated appropriately; or end with a final incrementing after checking L entries where either the last query is runnable or no queries are runnable and thus incrementing by L, indicating the same starting query index 4227 appropriately, as either the query indexed immediately prior to this index was run or no queries were run and the starting query index 4227 should remain unchanged. The maintaining of starting query index 4227 as the counters 4225 being updated over iterative processes 4212 in this fashion can include strictly incrementing the starting query index 4227 and/or optionally setting starting query index 4227 as the output of a modulo function using L as the divisor in some or all incrementing of the starting query index 4227.

In embodiments where query priorities 2942 are not static and are instead dynamically adjusted during query execution, queries can be rearranged within groups over time due to their changing query priority. For example, a query is moved from group 2943.a to group 2943.b after its execution has begun (e.g. after being selected for at least one cycle of execution via selection from group 2943.a) based on its priority being dynamically changed, automatically via processing resources of database system 10, from priority 2942.a to 2942.b. For example, the query is added to the end of the ordered list for group 2943.b, and or is removed from the ordered list for group 2943.a based on all other queries shifting "up" in the list to account for the empty space (e.g. the index that previously indexed this query in the list for group 2943.a now indexes the query that was immediately after this query in the list based on all queries in the list shifting, rendering a reduction in size of this list).

Figure 32D:
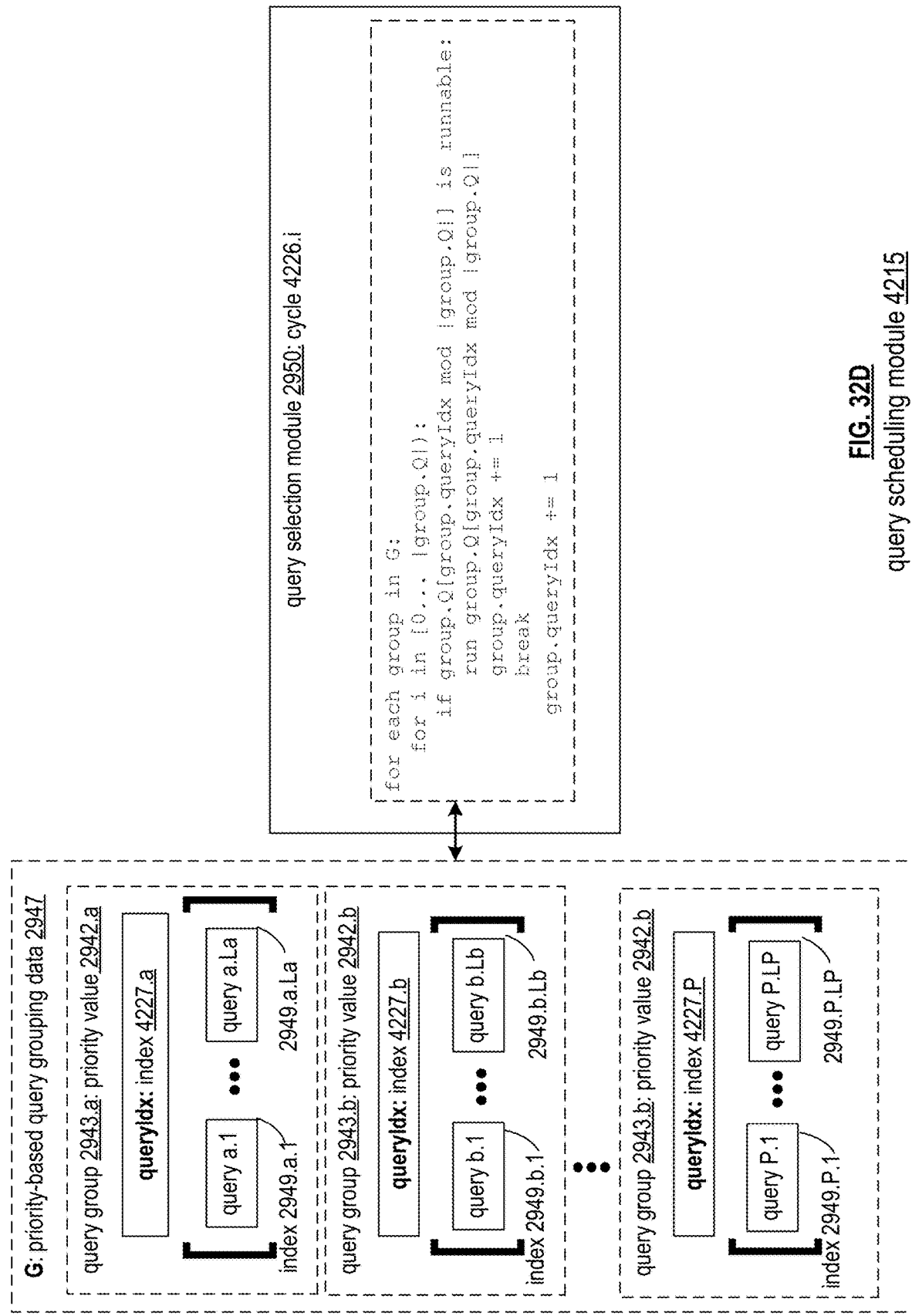
FIG. 32D is a schematic block diagram of a query scheduling module that selects queries for execution based on applying example instructions in accordance with various embodiments.

FIG. 32D illustrates an example embodiment of implementing the functionality of FIG. 32C based on performing corresponding code and/or implementing logically equivalent functionality, illustrating implementation of the third example pseudocode discussed previously. In this example, a starting query index 4227 is updated based on being implemented as corresponding counter within the iterative process, and is thus incremented in each iteration of checking queries in a corresponding group, where the value of starting query index 4227 still indicates an appropriate index value based on applying the modulo function using the size of the corresponding list Q (e.g. the value of L) as the divisor. Other embodiments of query selection module 2950 can implement other means of tracking starting query index 4227 and/or other means of performing round-robin selection within each priority-based group in a same or similar fashion.

Figure 32E:
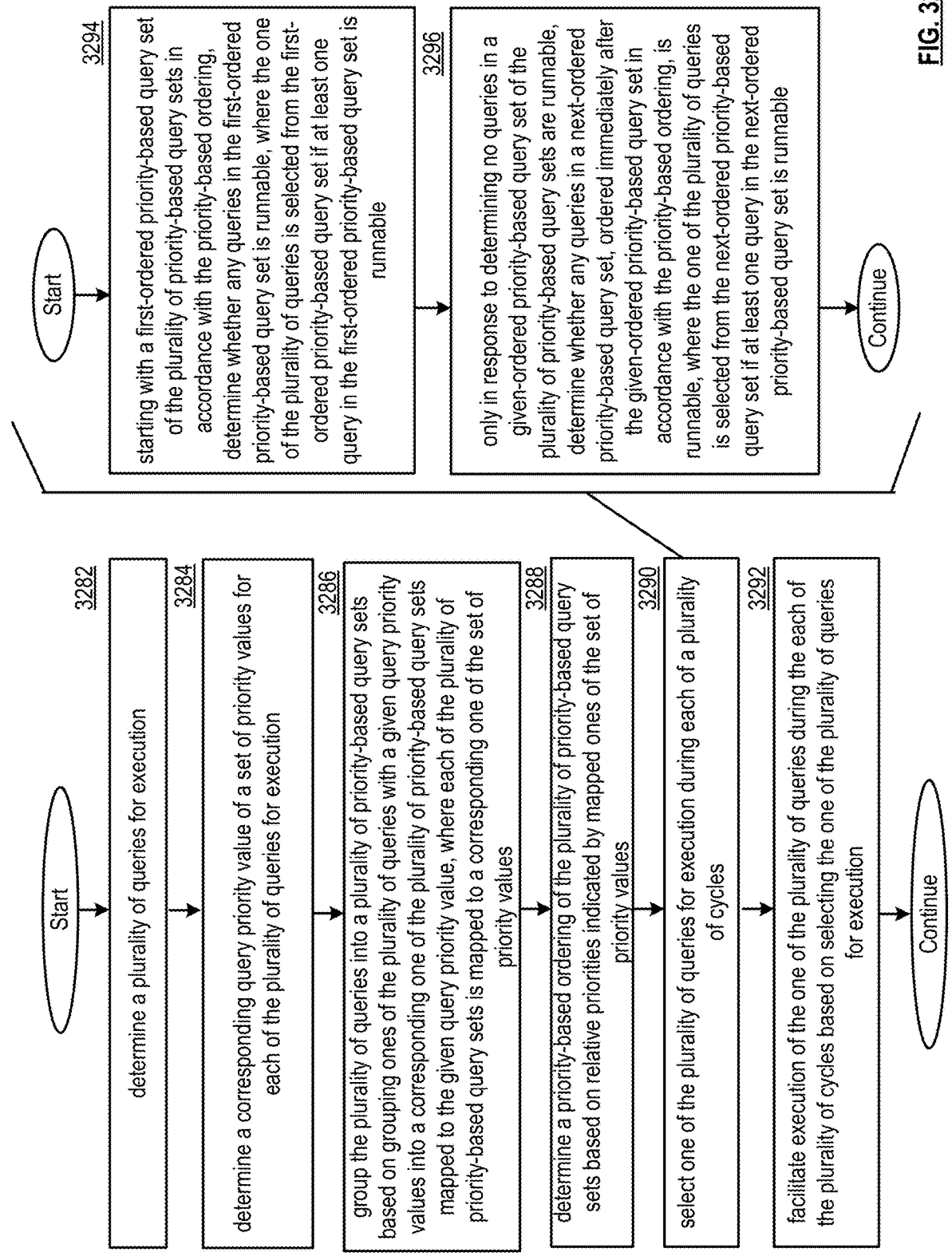
FIG. 32E is a logic diagram illustrating a method for execution in accordance with various embodiments.

FIG. 32E illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 32E. In particular, a node 37 can utilize the query processing module 2435 to execute some or all of the steps of FIG. 32E, for example, via their own query scheduling module 4215 and/or their own query selection module 2950 where multiple nodes 37 implement their own query processing modules 2435 to independently execute the steps of FIG. 32E, for example, to facilitate execution of a query as participants in a query execution plan 2405. Some or all of the method of FIG. 32E can be performed by the query processing system 2510, for example, by utilizing an operator flow generator module 2514 and/or a query execution module 2504. Some or all of the steps of FIG. 27I can be performed to implement some or all of the functionality of the database system 10 as described in conjunction with FIGS. 32A-32D, for example, by implementing some or all of the functionality of the query scheduling module 4215 and/or their own query selection module 2950. Some or all of the steps of FIG. 32E can be performed to implement some or all of the functionality regarding execution of a query via the plurality of nodes in the query execution plan 2405 as described in conjunction with some or all of FIGS. 24A-24I. Some or all steps of FIG. 32E can be performed by database system 10 in accordance with other embodiments of the database system 10 and/or nodes 37 discussed herein. Some or all steps of FIG. 32E can be performed in conjunction with one or more steps of any other method described herein.

Step 3282 includes determining a plurality of queries for execution. Step 3284 includes determining a corresponding query priority value of a set of priority values for each of the plurality of queries for execution. Step 3286 includes grouping the plurality of queries into a plurality of priority-based query sets based on grouping ones of the plurality of queries with a given query priority values into a corresponding one of the plurality of priority-based query sets mapped to the given query priority value, where each of the plurality of priority-based query sets is mapped to a corresponding one of the set of priority values. Step 3288 includes determining a priority-based ordering of the plurality of priority-based query sets based on relative priorities indicated by mapped ones of the set of priority values. Step 3290 includes, for each of a plurality of cycles, selecting one of the plurality of queries for execution during the each of a plurality of cycles. Step 3292 includes facilitating execution of the one of the plurality of queries during the each of the plurality of cycles based on selecting the one of the plurality of queries for execution.

Performing step 3290 can include performing step 3294 and/or step 3296 for each of the plurality of cycles. Step 3292 includes, starting with a first-ordered priority-based query set of the plurality of priority-based query sets in accordance with the priority-based ordering, determining whether any queries in the first-ordered priority-based query set is runnable. In various examples, the one of the plurality of queries is selected from the first-ordered priority-based query set if at least one query in the first-ordered priority-based query set is runnable. Step 3294 includes, only in response to determining no queries in a given-ordered priority-based query set of the plurality of priority-based query sets are runnable, determining whether any queries in a next-ordered priority-based query set, ordered immediately after the given-ordered priority-based query set in accordance with the priority-based ordering, is runnable. In various examples, the one of the plurality of queries is selected from the next-ordered priority-based query set if at least one query in the next-ordered priority-based query set is runnable.

In various examples, the first-ordered priority-based query set of the plurality of priority-based query sets is mapped to a corresponding priority value indicating a highest priority of the set of priority values. In various examples, the corresponding priority value indicates the highest priority of the set of priority values based on having a highest numeric priority value of the set of priority values and based on the set of priority values being numerically ordered in accordance with increasing priority. In various examples, the corresponding priority value indicates the highest priority of the set of priority value based on having a lowest numeric priority value of the set of priority values and based on of the set of priority values being numerically ordered in accordance with decreasing priority.

In various examples, the one of the plurality of queries is selected from a corresponding priority-based query set from multiple queries included in the corresponding priority-based query set having a same priority value with the one of the plurality of queries. In various examples, the one of the plurality of queries is selected from a corresponding priority-based query set from the plurality of queries included in the corresponding priority-based query set in accordance with a round-robin approach.

In various examples, the plurality of priority-based query sets are each maintained as a corresponding ordered list. In various examples, the one of the plurality of queries is selected from the corresponding priority-based query set based on iterating over at least a portion of the corresponding ordered list for the corresponding priority-based query set. In various examples, the ordered list is ordered by when the queries were received/determined for execution, where a first query in the list corresponds to an oldest determined query for execution of the corresponding priority value that is not completed executing and where a last query in the list corresponds to a newest determined query for execution of the corresponding priority value that is not completed executing.

In various examples, the first-ordered priority-based query set is maintained as an ordered list of highest-priority queries indexed by a set of corresponding index values. In various examples, determining whether any queries in the first-ordered priority-based query set is runnable is based on determining a starting index value of the set of corresponding index values based on a corresponding index value of a previously selected query of a previously cycle of the plurality of cycles . . . . In various examples, determining whether any queries in the first-ordered priority-based query set is runnable is further based on iterating over the ordered list of highest-priority queries by index values in accordance with an ordering of the set of corresponding index values, starting with the starting index value and, to evaluate whether each given query in the ordered list of highest-priority queries is runnable: until one of: the each given query is determined to be runnable, wherein the each given query is selected as the one of the plurality of queries: or all queries in the ordered list of highest-priority queries have been evaluated and none of the queries in the ordered list of highest-priority queries are runnable.

In various examples, the set of corresponding index values for the ordered list of highest-priority queries includes a first index value for a first position in the ordered list of highest-priority queries and further includes a last index value for a last position in the ordered list of highest-priority queries. In various examples, the starting index value is different from the first index value.

In various examples, iterating over the ordered list of highest-priority queries includes iterating over a first sequential set of queries in the first-ordered priority-based query set by index values in accordance with an ordering of the set of corresponding index values, starting from the starting index value and ending with the last index value, until one of: the each given query is determined to be runnable, where the each given query is selected as the one of the plurality of queries: or all queries in the first sequential set of queries have been evaluated and none of the queries in the first sequential set of queries are runnable. In various examples, iterating over the ordered list of highest-priority queries includes, based on none of the queries in the first sequential set of queries in the first-ordered priority-based query set being runnable, next iterating over a second sequential set of queries by index values in accordance with the ordering of the set of corresponding index values, starting from the first index value and ending with an index value immediately prior to the starting index value, by restarting from the first index value and continuing until one of: the each given query is determined to be runnable, wherein the each given query is selected as the one of the plurality of queries; or all queries in the second sequential set of queries have been evaluated and none of the queries in the second sequential set of queries are runnable. In various examples, the method further includes, only in response to determining no queries in the first-ordered priority-based query set of the plurality of priority-based query sets are runnable, determining whether any queries in a second-ordered priority-based query set, ordered immediately after the first-ordered priority-based query set in the ordering, is runnable.

In various examples, iterating over the first sequential set of queries and then the second sequential set of queries is based on: determining the starting index value based on accessing a stored value of a counter: first evaluating a first-evaluated query in the ordered list of highest-priority queries having a position in the ordered list of highest-priority queries indicated by a modulo operation applied to the counter as a dividend of the modulo operation and further applied to a size of the ordered list of highest-priority queries as a divisor of the modulo operation; and/or strictly incrementing the value of the counter in response to having evaluated whether the each given query in the ordered list of highest-priority queries is runnable. In various examples, evaluating whether the each given query in the ordered list of highest-priority queries is runnable is based on the each given query having a corresponding position in the ordered list of highest-priority queries indicated by the modulo operation applied to the counter as the dividend of the modulo operation and further applied to the size of the ordered list of highest-priority queries as the divisor of the modulo operation. In various examples, the stored value of the counter is updated to indicate a resulting value of the counter generated from incrementing the value of the counter, and where the stored value of the counter is further accessed to determine the starting index value for a subsequent cycle in the plurality of cycles.

In various examples, the counter corresponds to the first-ordered priority-based query set. In various examples, determining whether any queries in the second-ordered priority-based query set is runnable is based on: determining a second starting index value for the second ordered list of second-highest-priority queries based on accessing a stored value of a second counter corresponding to the second-ordered priority-based query set: first evaluating a first-evaluated query in the second ordered list of second-highest-priority queries having a position in the second ordered list of second highest-priority queries indicated by the modulo operation applied to the second counter as the dividend of the modulo operation and further applied to a second size of the ordered list of second-highest-priority queries as the divisor of the modulo operation; and/or strictly incrementing the value of the second counter in response to having evaluated whether the each given query in the second ordered list of second-highest-priority queries is runnable. In various examples, evaluating whether the each given query in the second ordered list of second-highest-priority queries is runnable is based on the each given query in the second ordered list of second-highest-priority queries having a corresponding position in the second ordered list of second-highest-priority queries indicated by the modulo operation applied to the counter as the dividend of the modulo operation and further applied to the size of the second ordered list of second-highest-priority queries as the divisor of the modulo operation. In various examples, the stored value of the second counter is updated to indicate a resulting value of the second counter generated from incrementing the value of the second counter. In various examples, the stored value of the second counter is further accessed to determine the second starting index value for a subsequent cycle in the plurality of cycles (e.g. the immediately subsequent cycle, or a later cycle based on a highest-priority query being selected in the immediately subsequent cycle and the second-ordered priority-based query set thus not being iterated over in the immediately subsequent cycle).

In various examples, the method further includes: determining a new query for execution: determining a corresponding query priority value for the new query; and/or adding the new query to a corresponding priority-based query set mapped to the corresponding query priority value for the new query based on appending the new query to an end of a corresponding ordered list of queries for the corresponding priority-based query set. In various examples, a size of the corresponding ordered list of queries increases to an increased size based on the new query being added. In various examples, queries in the corresponding ordered list of queries are evaluated for at least one subsequent cycle of the plurality of cycles based on being indicated by the modulo operation applied to the counter as the dividend of the modulo operation and further applied to the increased size of the corresponding ordered list of queries. In various examples, the corresponding ordered list of queries is ordered by age of the corresponding query (e.g. in order of queries being determined/received and thus added to the list).

In various embodiments, the method further includes storing a plurality of counters corresponding to the plurality of priority-based query sets in memory resources, wherein each counter indicates a next index immediately after an index for a most-recently executed query from the corresponding ordered list for a corresponding one of the plurality of priority-based query sets in a previous cycle of the plurality of cycles, and wherein iterating over the at least a portion of the corresponding ordered list for the corresponding priority-based query set to select the one of the plurality of queries from the corresponding priority-based query set is based on starting iteration from the next index indicated by a corresponding counter for the corresponding priority-based query set based on accessing the corresponding counter in the memory resources.

In various examples, the corresponding query priority value of the set of priority values for the each of the plurality of queries for execution is based on user-configuration of query priority values for the plurality of queries. In various examples, the each of the plurality of queries is received in a corresponding query request. In various examples, the corresponding query priority value of the set of priority values for the each of the plurality of queries for execution is based on being indicated in the corresponding query request.

In various examples, determining whether each query in the given-ordered priority-based query set of the plurality of priority-based query sets is runnable is based on determining whether an operator execution can be performed for the each query during the each of the plurality of cycles.

In various examples, another query in the given-ordered priority-based query set of the plurality of priority-based query sets is determined to not be based on at least one of: at least one operator (e.g. all operators except for blocking operators) of the another query having no pending data blocks to be executed upon: or a set of pending data blocks of a blocking operator of the another query not yet including all required data blocks for execution (e.g. all blocking operators not being ready for execution and also no non-blocking operators not having any pending data block). In various examples, this another query is later runnable in a subsequent cycle based on at least one of: the blocking operator of the another query including all required data blocks, or the at least one operator of the another query having at least one pending data blocks to be executed upon. For example, the data blocks to be processed are received from a child node in the query execution plan and once received, render a corresponding operator to be currently executable, and thus render the corresponding query to be runnable.

In various examples, facilitating execution of the one of the plurality of queries during the each of the plurality of cycles includes facilitating a partial execution of the one of the plurality of queries, and wherein full execution of the one of the plurality of queries is performed over a corresponding temporal period that spans multiple cycles of the plurality of cycles based on being fully executed via a plurality of partial executions during a plurality of corresponding cycles of the plurality of cycles based on being selected for execution for each of the plurality of corresponding cycles.

In various examples, multiple ones of the plurality of queries are executed over overlapping temporal periods based on a consecutive set of cycles in the plurality of cycles being applied to perform concurrent execution of the multiple ones of the plurality of queries based on different ones of the multiple ones of the plurality of queries being selected for execution during different consecutive ones of a consecutive set of cycles. In various examples, a plurality of corresponding cycles during which the one of the plurality of queries is executed includes non-consecutive cycles within the consecutive set of cycles based on at least one other query being executed during at least one other cycle of the plurality of cycles occurring after a first one of the plurality of corresponding cycles and prior to a final one of the plurality of cycles (e.g. query A is executed in cycle 1, query B is executed in cycle 2, query A is executed in cycle 3, query C is executed in cycle. 4, query A is executed in cycle 5, query B is executed in cycle 6, and so on).

In various examples, the one of the plurality of queries selected for execution during the each of the plurality of cycles includes a plurality of operators for execution. In various examples, the method further includes selecting one of the plurality of operators of the one of the plurality of queries for execution during the each of the plurality of cycles based on selecting the one of the plurality of queries for execution during the each of the plurality of cycles. In various examples, selection of a particular operator for execution is performed via some or all features and/or functionality of FIGS. 33A-33E.

In various embodiments, any one of more of the various examples listed above are implemented in conjunction with performing some or all steps of FIG. 32E. In various embodiments, any set of the various examples listed above can be implemented in tandem, for example, in conjunction with performing some or all steps of FIG. 32E.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 32E described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 32E, for example, in conjunction with further implementing any one or more of the various examples described above.

In various embodiments, the operational instructions, when executed by the at least one processor, cause the database system to: determine a plurality of queries for execution; determine a corresponding query priority value of a set of priority values for each of the plurality of queries for execution: group the plurality of queries into a plurality of priority-based query sets based on grouping ones of the plurality of queries with a given query priority values into a corresponding one of the plurality of priority-based query sets mapped to the given query priority value, where each of the plurality of priority-based query sets is mapped to a corresponding one of the set of priority values: determine a priority-based ordering of the plurality of priority-based query sets based on relative priorities indicated by mapped ones of the set of priority values: for each of a plurality of cycles, select one of the plurality of queries for execution during the each of a plurality of cycles; and/or facilitate execution of the one of the plurality of queries during the each of the plurality of cycles based on selecting the one of the plurality of queries for execution. In various examples, selecting the one of the plurality of queries for execution during the each of a plurality of cycles includes, for the each of the plurality of cycles, starting with a first-ordered priority-based query set of the plurality of priority-based query sets in accordance with the priority-based ordering, determining whether any queries in the first-ordered priority-based query set is runnable, wherein the one of the plurality of queries is selected from the first-ordered priority-based query set if at least one query in the first-ordered priority-based query set is runnable; and/or, only in response to determining no queries in a given-ordered priority-based query set of the plurality of priority-based query sets are runnable, determining whether any queries in a next-ordered priority-based query set, ordered immediately after the given-ordered priority-based query set in accordance with the priority-based ordering, is runnable, where the one of the plurality of queries is selected from the next-ordered priority-based query set if at least one query in the next-ordered priority-based query set is runnable.

FIGS. 33A-33E present embodiments of database system 10 that schedule operator executions in conjunction with scheduling execution of a corresponding query over time (e.g. per-node 37, and/or per processing core resource 48 per node) based on query priority values for the queries, and/or other information such as estimated runtime. Some or all features and/or functionality of scheduling queries (e.g. selecting which given query of a plurality of concurrently executing queries be executed at a given time; and/or selecting which operator of this selected given query be executed at a given time) can implement the query scheduling module 4215 of FIGS. 32A-32G and/or the operator scheduling module 2815 of FIG. 32F. Some or all features and/or functionality of the use of priority values to schedule query executions of FIGS. 33A-33E can be based on selecting which query be executed in accordance with priority-based query groups and/or tracking indexes for each group accordingly as discussed in conjunction with FIGS. 32A-32E.

Figure 33B:
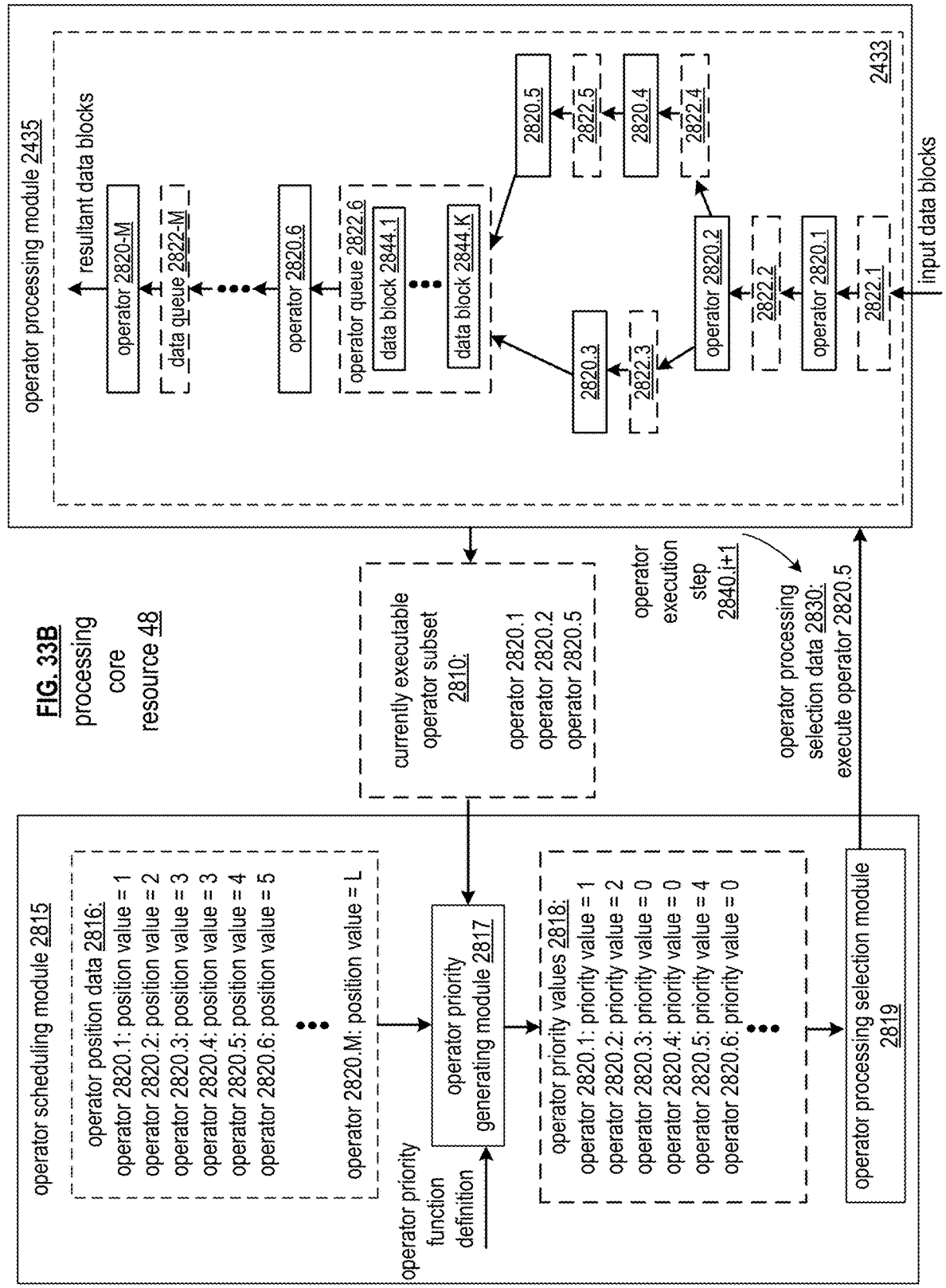
FIG. 33B is a schematic block diagram of a processing core resource that implements an operator scheduling module and an operator processing module in accordance with various embodiments of the present invention.

FIGS. 33A-33B illustrate an example embodiment of a processing core resource 48 of a node 37 that implements an operator scheduling module 2815 to select an operator of a given query's query operator execution flow 2433 that will be executed at a given time. For example, a node's execution of a query, for example, via a single processing core resource 48 of its set of processing core resources 48-1-48-$n$, can be accomplished via a plurality of operator executions of operators 2820 of its query operator execution flow 2433 in a corresponding plurality of sequential operator execution steps. Each operator execution step 2840 of the plurality of sequential operator execution steps corresponds to execution of a particular operator 2820 of a plurality of operators 2820-1-2820-M of a query operator execution flow 2433. The particular one of the plurality of operators of the query operator execution flow 2433 that will be executed for a given one of the plurality of sequential operator execution steps is selected by the operator scheduling module 2815 in generation of operator processing selection data 2830 for the given one of the plurality of sequential operator execution steps. The operator scheduling module 2815 is operable to generate operator processing selection data 2830 for each one of the plurality of sequential operator execution steps indicating which operator will be executed in each operator execution steps.

The operator processing selection data 2830 generated by the operator scheduling module 2815 for each one of the plurality of sequential operator execution steps is utilized by the operator processing module 2435 to perform a corresponding operator execution by executing the selected one of the plurality of operators of the query operator execution flow 2433. As used herein, an operator execution corresponds to executing one operator 2820 of the query operator execution flow 2433 on one or more queued data blocks 2844 in an operator queue 2822 of the operator 2820. The operator queue 2822 of a particular operator 2820 includes data blocks that were outputted by execution of one or more other operators 2820 that are immediately below the particular operator in a serial ordering of the plurality of operators of the query operator execution flow 2433. In particular, the data blocks 2844 in the operator queue 2822 were outputted by the one or more other operators 2820 that are immediately below the particular operator via one or more corresponding operator executions of one or more previous operator execution steps in the plurality of sequential operator execution steps. Data blocks 2844 of an operator queue 2822 can be ordered based on an ordering in which the data blocks 2844 are received by the operator queue 2822. Alternatively, an operator queue 2822 is implemented as an unordered set of data blocks 2844.

If the particular operator 2820 is selected to be executed for a given one of the plurality of sequential operator execution steps, some or all of the data blocks 2844 in this particular operator 2820's operator queue 2822 are processed by the particular operator 2820 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2820 has performed an execution upon a given data block 2844 to generate one or more output data blocks, this data block is removed from the operator's operator queue 2822. In some cases, an operator selected for execution is automatically executed upon all data blocks 2844 in its operator queue 2822 for the corresponding operator execution step. In this case, an operator queue 2822 of a particular operator 2820 is therefore empty immediately after the particular operator 2820 is executed. The data blocks outputted by the executed data block are appended to an operator queue 2822 of an immediately next operator 2820 in the serial ordering of the plurality of operators of the query operator execution flow 2433, where this immediately next operator 2820 will be executed upon its queued data blocks once selected for execution in a subsequent one of the plurality of sequential operator execution steps 2840.

Operator 2820.1 can correspond to a bottom-most operator 2820 in the serial ordering of the plurality of operators 2820.1-2820.M. As depicted in FIG. 33A, operator 2820.1 has an operator queue 2822.1 that is populated by data blocks received from another node as discussed in conjunction with FIG. 24A, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator queue 2822.1 may only include a proper subset of the full set of input data blocks required for execution of the query at a particular time due to not all of the input data blocks having been read and/or received, and/or due to some data blocks having already been processed via execution of operator 2820.1. In other cases, these input data blocks are read and/or retrieved by performing a read operator or other retrieval operation indicated by operator 2820.

Note that in the plurality of sequential operator execution steps utilized to execute a particular query, some or all operators will be executed multiple times, in multiple corresponding ones of the plurality of sequential operator execution steps. In particular, each of the multiple times a particular operator 2820 is executed, this operator is executed on set of data blocks 2844 that are currently in their operator queue 2822, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2820 has an operator queue 2822 that includes at least one data block 2844. At this given time, one more other ones of the plurality of operators 2820 can have operator queues 2822 that are empty. For example, a given operator's operator queue 2822 can be empty as a result of one or more immediately prior operators 2820 in the serial ordering not having been executed yet, and/or as a result of the one or more immediately prior operators 2820 not having been executed since a most recent execution of the given operator.

FIG. 33A presents the state of the query operator execution flow 2433 at a particular time after an (i−1)th one of the plurality of sequential operator execution steps 2840, illustrating the operator scheduling module's selection of the operator for execution in the ith one of the plurality of sequential operator execution steps 2840, denoted as operator execution steps 2840-$i$. While the operator 2820-1-2820-M of the query operator execution flow 2433 are illustrated to have corresponding operator queues 2822-1-2822-M, some of these operator queues 2822 may be empty, where these empty operator queues 2822 include no data blocks 2844. At least one operator queue 2822 is non-empty, where a non-empty operator queue 2822 includes at least one data block 2844. For example, as illustrated, operator queue 2822.6 of operator 2820.6 includes a plurality of data blocks 2844.1-2844.K. A first subset of the plurality of data blocks 2844.1-2844.K was outputted by operator 2820.3 based on a prior execution of operator 2820.3 upon data blocks previously in its data block queue 2822.3 at the time it was selected for execution. A second subset of the plurality of data blocks 2844.1-2844.K was outputted by operator 2820.5 based on a prior execution of operator 2820.5 upon data blocks previously in its data block queue 2822.5 at the time it was selected for execution. While not illustrated, other operator queues can also be non-empty. In particular, in the presented state of the query operator execution flow 2433 at after the (i−1)th one of the plurality of sequential operator execution steps 2840, consider an example where at least operators 2820.1, 2820.2, and 2820.5 are non-empty.

The operator scheduling module 2815 can be operable to intelligently select operators for execution for efficient query execution by the node. This can include employing a mechanism that aims to prevent operator queues from filling up as their corresponding operators wait to be selected for execution. In particular, the operator scheduling module 2815 is operable to prioritize and/or otherwise select operators for execution based on whether or not they are available to be executed at the current state, and further based on the operator's position in query operator execution flow 2433.

For each operator execution step 2840, the operator scheduling module 2815 can implement an operator priority generating module 2817, for example, that performs an operator priority function to generate priority values for some or all operators 2820.1-2820-M of the query operator execution flow 2433 of a given query selected for execution by the processing core resource 48. The operator priority function can be performed in accordance with an operator priority function definition that is received by the operator scheduling module 2815, that is stored in memory accessible by the operator scheduling module 2815, and/or that is otherwise determined by the operator scheduling module.

The operator priority function performed by the operator priority generating module 2817 can be a function of operator position data 2816 as well as a currently executable operator subset 2810. The operator position data 2816 can indicate position values for each of the plurality of operators 2820.1-2820.M. The operator position data 2816 of a given query can be fixed for the duration of the query's execution, as the serial ordering of these operators in the corresponding query operator execution flow 2433 does not change during the query's execution. This fixed operator position data 2816 can be generated or otherwise determined by the operator scheduling module 2815 when the query operator execution flow 2433 is generated, for example, by the execution flow generating module 2525 and/or can otherwise be determined based on the query operator execution flow 2433 being received and/or utilized to execute the corresponding query by the operator processing module 2435. The operator position data 2816 can be stored in memory of the operator scheduling module 2815, for example, for the duration of the corresponding query's execution.

The operator position data 2816 can indicate each operator's position value based on its position from the bottom of the query operator execution flow 2433 as a number of serially executed operators away from the first one of the plurality of operators in the ordering. The bottom-most operator 2820.1 is assigned a value of 1 in this example to indicate it is the first operator, where subsequently higher operators in the serial ordering have their values incremented accordingly. Note that both operator 2820.3 and operator 2820.4 are assigned a position value of 3, as they are both the third operator from the bottom after operators 2820.1 and 2820.2. Also note that operators that receive data blocks from multiple parallelized sub-flows are assigned a value based on their furthest path from the bottom, where operator 2820.6 is assigned position value of 5 based on being serially after the four operators in series 2820.1, 2820.2, 2820.4, and 2820.5. Other schemes of assigning values indicating the relative position of operators can be utilized in other embodiments.

The currently executable operator subset 2810 can indicate the set of operators, at the current state, that are ready to be executed and/or currently able to be executed. For example, any operator 2820 with an empty operator queue 2822 at a given state will not be included in the currently executable operator subset 2810 for the given state, as they have no data blocks to be executed upon via the operator 2820 and thus are not currently executable. Thus, all operators 2820 included in the currently executable operator subset have at least one data block in their operator queue 2822.

In some embodiments, a given query (e.g. of a set of queries scheduled for concurrent execution) with a null currently executable operator subset 2810, or otherwise indicating no operators are currently executable, can be determined to be non-runnable (e.g. will not be selected for execution), while a given query with a non-null currently executable operator subset 2810, or otherwise indicating at least one operator is currently executable, can be determined to be runnable (e.g. can be selected for execution).

Whether or not an operator is currently executable can further be based on the type of operator. For some types of operators such as SELECT operators. TEE operators, or UNION operators, the operator can be performed on any data blocks as they are received, and do not have a threshold amount of data blocks required to be executed. As used herein, types of operators that can be executed on any number of rows of incoming data blocks, such as the SELECT operators. TEE operators, or UNION operators, are denoted as "non-blocking operators." Any non-blocking operator can be included in the currently executable operator subset 2810 at a given state and/or can otherwise be determined to be currently executable at the given state if their corresponding operator queue is non-empty.

However, other types of operators, such as JOIN operators or aggregating operators such as SUM. AVERAGE. MAXIMUM, or MINIMUM operators, require knowledge of the full set of rows that will be received as output from previous operators to correctly generate their output. As used herein, such operators 2820 that must be performed on a particular number of data blocks, such as all data blocks that will be outputted by one or more immediately prior operators in the serial ordering of operators in the query operator execution flow 2433 to execute the query, are denoted as "blocking operators." Blocking operators are only determined to be included in the currently executable operator subset 2810 at a given state if their corresponding operator queue includes all of the required data blocks to be executed. For example, some or all blocking operators are determined to be included in the currently executable operator subset 2810 at a given state only if all prior operators in the serial ordering of the plurality of operators in the query operator execution flow 2433 have had all of their necessary executions completed for execution of the query, where none of these prior operators will be further executed in accordance with executing the query. If less than all of the required data blocks are included in the operator queue 2822 of a blocking operator 2820 at a given state, the blocking operator is not currently executable, and is thus determined not to be included in the currently executable operator subset 2810 for the given state.

The currently executable operator subset 2810 can be received from the operator processing module 2435, where the currently executable operator subset 2810 is generated by or otherwise determined by the operator processing module 2435. This information can be alternatively determined by another processing module monitoring and/or able to access the state of the query operator execution flow 2433, such as whether each operator queue 2822 is empty, the size of each operator queue 2822, and/or other information regarding whether each operator is available for execution. Alternatively the operator scheduling module 2815 can track its prior operator processing selection data to determine which operators have pending data blocks in their operator queues based on an immediately prior operator having been scheduled for execution in operator processing selection data 2830 generated for a previous operator execution step 2840. The operator scheduling module 2815 can otherwise determine and/or estimate which ones of the plurality of operators 2820.1-2820.M are currently able to be executed as the currently executable operator subset 2810.

At the state presented in FIG. 33A, the currently executable operator subset 2810 includes operator 2820.1, operator 2820.2, and operator 2820.4. Thus, each of the operator queues 2822.1, 2822.2, and 2822.4 are non-empty. Other operators with non-empty operator queues, such as operator 2820.6 with its K data blocks, are not included in the currently executable operator subset, for example, because they are blocking operators.

The operator priority generating module 2817 generates a plurality of priority values for the plurality of operators and/or otherwise indicates a highest priority operator. In this example, all operators that cannot be executed, determined by not being included in the currently executable operator subset 2810 or otherwise determined to not be available for execution, are assigned a lowest priority value or otherwise least favorable priority value. In this particular example of the operator priority function, all non-executable operators are assigned a priority value of zero, regardless of their position value. Only the operators in the currently executable operator subset 2810 are assigned positive values, where higher priority values in this example correspond to more favorable priority values. In other embodiments, the non-executable operators can otherwise be assigned the same or different value that is less favorable than priority values assigned to all executable operators in the currently executable operator subset 2810.

The priority value can further be a function of the position value for operators in the currently executable operator subset 2810. In this example, the priority value is set equal to the determined position value of the operator position data 2816. In other embodiments, the relative ordering of operators with respect to the bottom of the query operator execution flow 2433 can be indicated in a different fashion. In particular, the operator in the currently executable operator subset 2810 that is the furthest from the bottom of the query operator execution flow, and/or that otherwise requires data blocks to be flowed via the greatest number of operators of operators in the currently executable operator subset 2810, is assigned the most favorable priority value of the operators in the plurality of operators 2820.1-2820.M. In this case, operator 2820.4 has a position value indicating a furthest position from the bottom of the query operator execution flow of the operators in the currently executable operator subset 2810, and is assigned a priority value of 3, based on its position value being equal to 3 and based on being included in the currently executable operator subset 2810. In this example, higher priority values correspond to more favorable priorities, and operator 2820.4 is thus assigned the most favorable priority value.

The operator processing selection module 2819 can select the operator with the most favorable priority value indicated in the operator priority values 2818 to generate operator processing selection data 2830 that indicates this selected operator for execution in the next operator execution step 2840 of the plurality of sequential operator execution steps. In the given state illustrated in FIG. 33A, operator 2820.4 is selected by the operator processing selection module 2819 because it is determined to have the most favorable priority value at this given state, and is indicated in the operator processing selection data 2830 for execution in operator execution step 2840.$i$.

In response to the operator processing selection data 2830 indicating operator 2820.4, the operator processing module 2435 performs operator execution step 2840.$i$ by executing operator 2820.4 upon some or all of its queued data blocks 2844 in its operator queue 2822.4. This results in at least one output data block 2844 that is appended to operator queue 2822.5. This changes the state of the query operator execution flow 2433 to a next state resulting from performance of operator execution step 2840.$i$, where operator queue 2822.5 now includes the data blocks outputted via execution of operator 2820.4 upon its own operator queue 2820.4, and where operator queue 2822.4 is empty or otherwise does not include the data blocks that were processed by the operator 2820.4 in operator execution step 2840.$i$ to generate the output data blocks added to operator queue 2822.5.

Because operator 2820.5 was not executable in the state of FIG. 33A immediately prior to execution of operator execution step 2840.$i$ in this example, if operator 2820.5 is a non-blocking operator, operator queue 2822.5 included no data blocks 2844 immediately prior to execution of operator execution step 2840.$i$. In the case where operator 2820.5 is a non-blocking operator, operator queue 2822.5 only includes the at least one data block 2844 outputted via execution of operator 2820.4 upon its own operator queue 2820.4 in operator execution step 2840.$i$. In the case where operator 2820.5 is a blocking operator, operator queue 2822.5 may have included data blocks 2844 immediately prior to execution of operator execution step 2840.$i$ that were previously outputted by operator 2820.4 in one or more prior operator execution steps before operator execution step 2840.$i$. However, any data blocks included in operator queue 2822.5 immediately prior to execution of operator execution step 2840.$i$ did not constitute all required data blocks for execution of operator 2820.5 in this example, as operator 2820.5 was not executable at this state.

FIG. 33B illustrates how this updated state of the example query operator execution flow 2433 can cause changed in priority values generated by the operator scheduling module 2815 for operators 2820.1-2820.M, and how this influences the selection of the next operator for execution at operator execution step 2840.$i$+1. Because operator 2820.4 was executed upon data blocks in its operator queue at operator execution step 2840.$i$, operator queue 2820.4 became empty. As no other operator execution steps 2840 have since been performed upon operator 2820.2 to populate operator queue 2822.4 with new data blocks, operator queue is still empty at this state, rendering operator 2820.4 as non-executable. As illustrated in this example, the currently executable operator subset 2810 for the state after operator execution step 2840.$i$ is performed does not include operator 2820.4 because it is not executable at this state. However, operator 2820.5 is executable as a result of the data blocks outputted by operator 2820.4's execution in operator execution step 2840.$i$ being added to its operator queue 2822.5, and the currently executable operator subset 2810 for this state therefore includes operator 2820.5. Operators 2820.1 and 2820.2 are included in the currently executable operator subset 2810 for this state as well based on having been included in the currently executable operator subset 2810 for the previous state as illustrated in FIG. 33A, and based on not having been executed in operator execution step 2840.$i$, therefore rendering their operator queues 2820.1 and 2820.2 un-emptied.

The change from non-executability to executability of operator 2820.5 at this state can be due to operator queue 2822.5 changing from being empty to non-empty due to the addition of the data blocks outputted by operator 2820.4 if operator 2820.5 is a non-blocking operator. The change from non-executability to executability of operator 2820.5 at this state can be due to operator queue 2822.5 changing from including less than the required number of data blocks to including all of the required data blocks due to the addition of the data blocks outputted by operator 2820.4 if operator 2820.5 is a blocking operator. However, in some embodiments, a blocking operator is only executable if no lower-positioned operators that stream data blocks in the query operator execution flow 2433 to the blocking operator are executable, as this would indicate that additional data blocks could still be streamed up the flow to the blocking operator from these executable operators to generate additional required data blocks for execution of the blocking operator. In this case, operator 2820.5 may not be a blocking operator due to operators 2020.1 and 2820.2 being executable as well, and thus further data blocks could be processed up the flow and into operator queue 2822.5.

As illustrated in FIG. 33B, the priority data generated for this state reflects that only operators 2820.1, 2820.2, and 2820.5 are currently executable, based on the currently executable operator subset 2810 determined for this state. Because operator 2820.5 is the highest operator in the query operator execution flow from the bottom, its priority value is assigned as the most favorable priority with a highest value of 4. In this example, the same example operator priority function is utilized to assign executable operators non-zero values reflecting their position value. The operator processing selection module 2819 selects operator 2820.5 based on having the highest priority value in the operator processing selection data 2830 for operator execution step 2840.$i$+1. The operator processing module 2435 executes operator 2820.5 on its operator queue 2822.5 to perform operator execution step 2840.$i$+1 based on the operator processing selection data 2830 indicating operator 2820.5. While the next state of the query operator execution flow is not illustrated, the data blocks outputted via execution of operator 2820.5 upon its operator queue 2822.5 in operator execution step 2840.$i$+1 are appended to operator queue 2822.6 to increase the number of data blocks in operator queue 2822.6 to a number of data blocks that is larger than K data blocks.

Figure 33C:
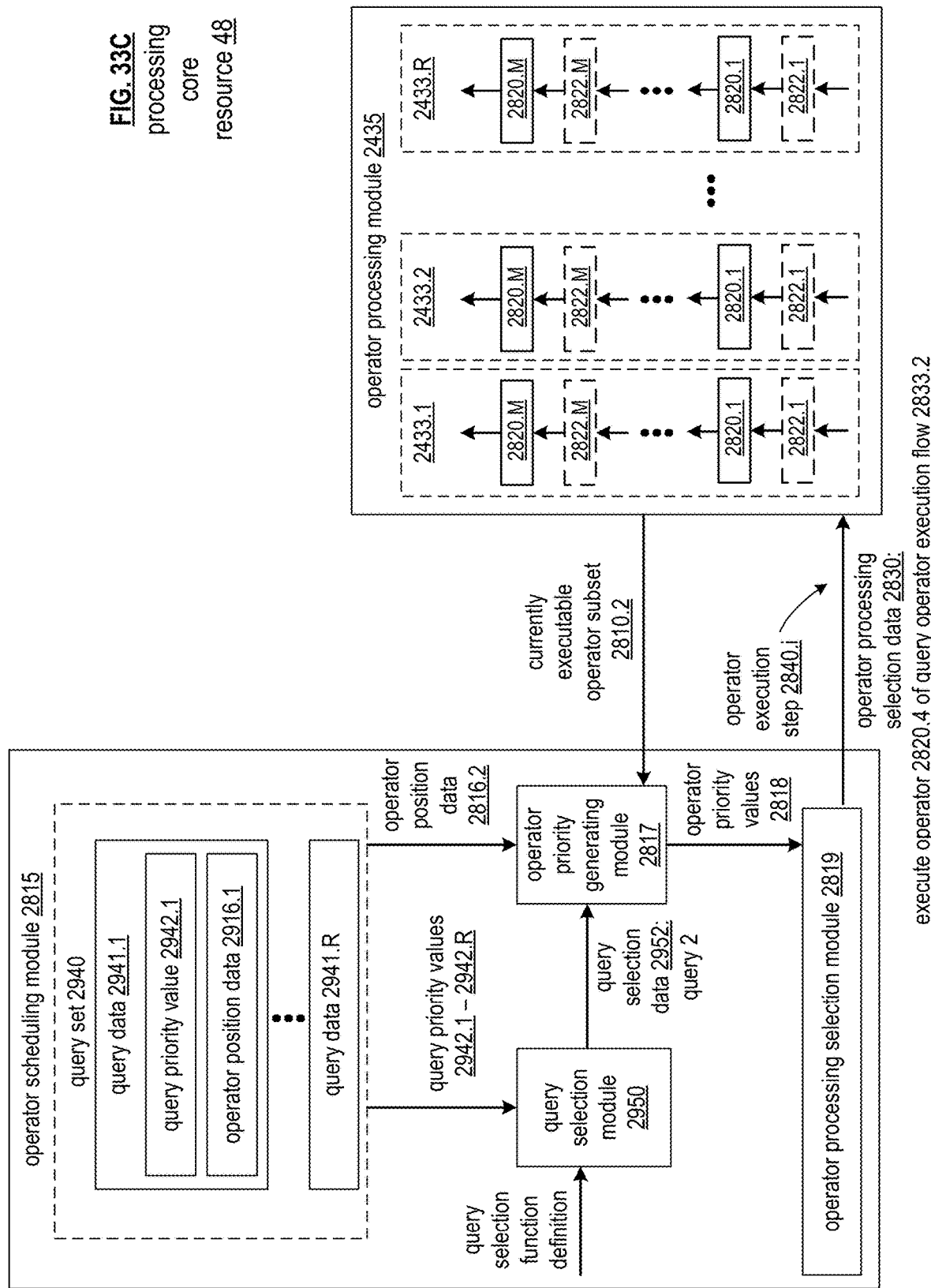
FIG. 33C is a schematic block diagram of a processing core resource that implements an operator scheduling module and an operator processing module in accordance with various embodiments of the present invention.

FIG. 33C illustrates a state of a plurality of R query operator execution flows 2433.1-2433.R at a time after execution of operator execution step 2840.($i$−1) and before execution of the next operator execution step 2840.$i$ in the plurality of sequential operator execution steps. This plurality of query operator execution flows 2433.1-2433.R can correspond to a set of R concurrently executing queries and can each have a plurality of operators 2820.1-2820.M with a corresponding plurality of operator queues 2822.1-2822.M. The number of operators M and the corresponding serial ordering of the M operators can be the same or different for each flow. For each query operator execution flow 2433, each of its operator queues 2822 can be empty or non-empty, where a subset of the plurality of operators 2820 are currently executable based on their corresponding operator queue 2822 as discussed in conjunction with FIGS. 33A-33B.

The currently executing queries 1-R can be denoted by corresponding query data 2941.1-2941-R in query set 2940 that is received by, stored in memory by, and/or otherwise determined by the operator scheduling module 2815. Each query data 2941 can indicate the operator position data 2816 of the corresponding query, which can indicate a plurality of position value or other relative position data for the query operator execution flow 2433 of the corresponding query. For example, query data 2941.1 for query 1 includes operator position data 2841.1 that indicates position values 1-M of the plurality of operators 2820.1-2820.M of the query operator execution flow 2433.1 for query 1.

The query data 2941 can optionally include query priority data indicating an assigned priority value of the query, for example, where the query priority data 2942.1-2942.R of the query data 2941.1-2942.R indicates relative priorities of the set of queries 1-R. The query data 2941 can be received with the query, for example, set by a user based on user input to a graphical user interface in conjunction with generating a query expression indicating the query. The query data 2941 can be generated automatically by a processing module of the database system 10. In some cases, the queries 1-R have no query priority data and/or are determined to have equal priority.

The operator scheduling module 2815 can implement a query selection module 2950 that selects which query of the set of queries 1-R will have an operator execution performed in the upcoming operator execution step 2840. The query selection module 2950 can perform a query selection function to select the query from the set of queries 1-R, for example, based on a query selection function definition that is received by the operator scheduling module 2815, stored in memory accessible by the operator scheduling module 2815, or otherwise determined by the operator scheduling module 2815.

The query selection function can dictate a turn-based selection of the plurality of queries, where each of the R queries are selected one at a time. In such cases, an operator execution is performed for each of the given queries every R operator execution steps and/or where operator executions are uniformly distributed across the set of queries 1-R. The query selection function can be implemented via a turn-based selection function when the queries 1-R are determined to have equal query priority values 2942 and/or when the query data does not include query priority values for the queries 1-R.

In other embodiments, the query priority values 2942.1-2942.R are utilized as input to the query selection function performed by the query selection module 2950. For example, a turn-based ordering can still be employed where the number of turns assigned to each query in each cycle of the turn-based ordering is determined to be proportional to and/or is otherwise determined based on the priority value of each query. For example, queries with higher or otherwise more favorable priority values are assigned a greater proportion of turns, are assigned a greater number of turns in each cycle of the turn-based ordering, and/or are otherwise selected more frequently by the query selection module that queries with lower or otherwise less favorable priority values. The turn-based ordering can be implemented per priority-based query group as discussed in conjunction with FIGS. 32A-32E, where higher priority queries are selected for execution, if possible.

The query selection module 2950 generates query selection data 2952 indicating the selected query for the upcoming operator execution step. Once this query is selected, the selection of the particular operator that will be executed in the upcoming operator execution step can be selected from the plurality of operators 2820.1-2820.M of this query's query operator execution flow 2433. Once the particular query is selection, the operator selection can be performed via the same mechanism as discussed in conjunction with FIGS. 33A-33B, for example, by utilizing the operator priority generating module 2817 and the operator processing selection module 2819.

In the particular example illustrated in FIG. 33C, query 2 is selected by the query selection module 2950 and is indicated in the query selection data 2952 accordingly. The operator priority generating module 2817 can utilize the query selection data 2952 to determine to only generate priority values for the query operator execution flow 2433.2 that corresponds to selected query 2. In such cases, only the currently executable operator subset 2810.2 and the operator position data 2816.2 is utilized by the operator priority generating module 2817 to generate a plurality of priority values 1-M for the operators 2820.1-2820.M of query operator execution flow 2433.2, for example, a same or similar fashion as discussed in conjunction with FIGS. 33A-33B.

In some embodiments, the currently executable operator subset 2810 and the operator position data 2816 is received for all queries, for example, in each cycle of the turn-based ordering, and priority values are generated for the operators of every query operator execution flow 2433.1-2433.R in response, where the priority values of each query are stored in local memory until the corresponding query is selected. In some cases, priority values of a given query operator execution flow 2433 are automatically updated in response to determining the state has changed, for example, based on an operator execution of the corresponding query being performed by the operator processing module 2435.

The plurality of operator priority values 2818 generated by operator priority generating module 2817 the for the selected query indicated in query selection data 2952 can be utilized by the operator processing selection module 2719 as discussed in FIGS. 28A-28B to generate the operator processing selection data 2830. The operator processing selection module 2817 can similarly select the operator in the selected query's query operator execution flow 2433 with the most favorable priority indicated based on the operator priority values 2818. In the example illustrated in FIG. 33C, operator 2820.4 of query 2 is selected for execution at operator execution 2840.$i$, for example, where query operator execution flow 2433.2 is the query operator execution flow 2433 of FIGS. 33A-33B in the same state prior to the same operator execution step 2840.$i$. However, in the next operator execution step 2840.$i$+1, an operator from a different query operator execution flow can be selected based on the query selection module determining to select a different query from query 2, for example, in accordance with a next ordered query in the turn-based ordering.

Figure 33D:
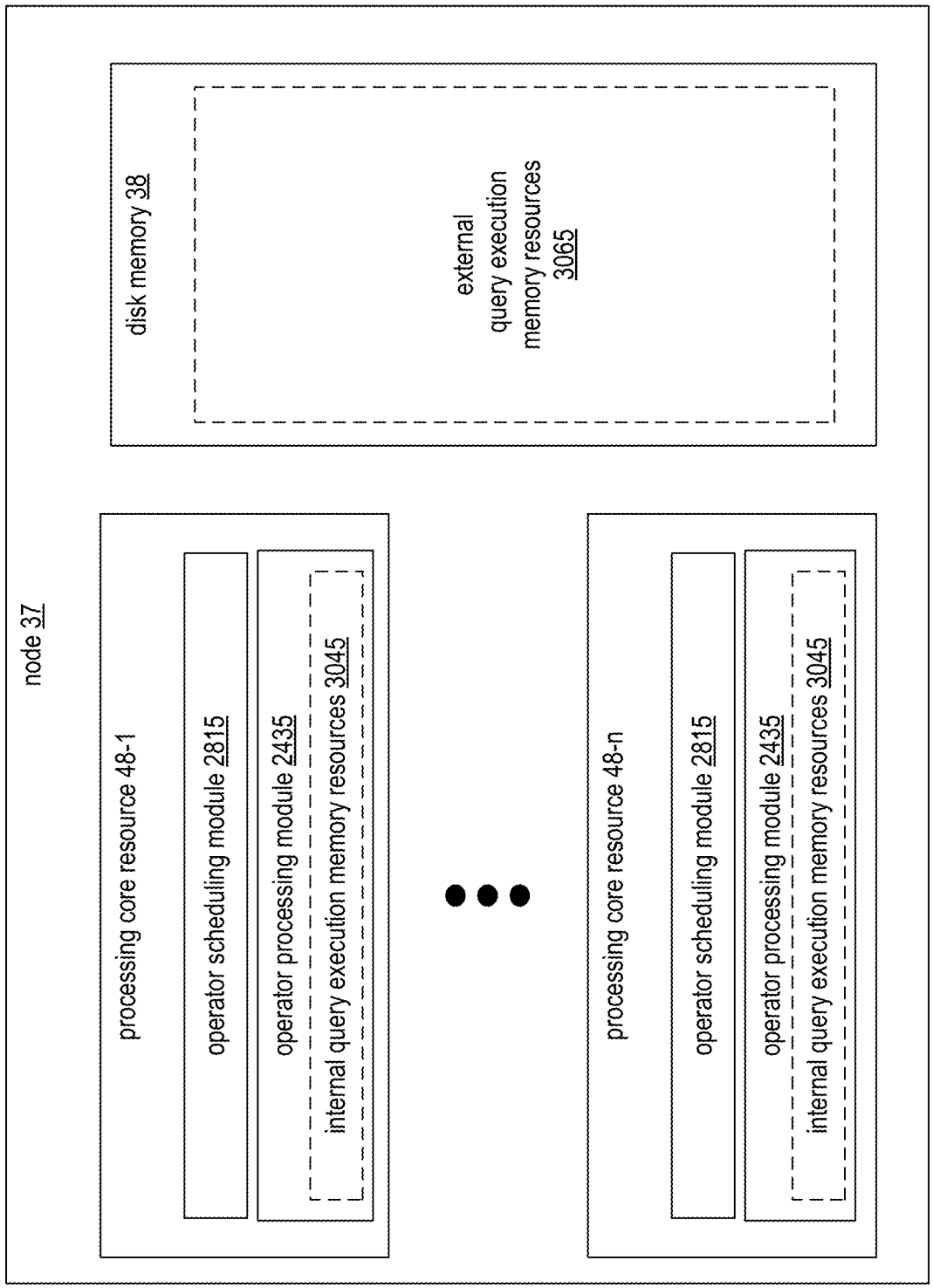
FIG. 33D is a schematic block diagram of a node that includes a plurality of processing core resources and disk memory in accordance with various embodiments of the present invention.

FIG. 33D illustrates an embodiment of a node 37, which can be utilized to implement some or all nodes 37 of some or all computing devices 18 of the database system 10. The node 37 can include the plurality of processing core resources 48-1-48-n as discussed previously, where each processing core resource 48 executes queries by implementing its own operator processing module 2435, such as embodiments, of the operator processing module 2435 discussed in conjunction with FIGS. 24A-29B. The operator executions performed by the operator processing module 2435 of a processing core resource 48 can be scheduled by its own corresponding operator scheduling module 2815, such as the embodiments of the operator scheduling module 2815 as discussed in conjunction with FIGS. 28A-29B. This embodiment of node 37 can be utilized to implement some or all of the particular embodiments of processing core resource 48 discussed in conjunction with FIGS. 33E, 31A, 31B, and/or 32B.

Each operator processing module 2435 can be operable to execute queries by utilizing its own internal query execution memory resources 3045. For example, the operator processing module can be operable to perform operator executions and/or to store operator queues 2822 via by utilizing its internal query execution memory resources 3045. The operator processing module can otherwise execute queries via the plurality of operator executions of operators of the corresponding query operator execution flows 2433 by utilizing these internal query execution memory resources 3045. For example, the internal query execution memory resources 3045 can be implemented by utilizing cache memory 45 of the corresponding processing core resource 48 and/or by utilizing other memory of the processing core resource 48 that is utilized by its processing module 44. In some cases, the internal query execution memory resources 3045 are shared by the operator scheduling module 2815 and/or other processing modules of the corresponding processing core resource 48 to facilitate performance of other functionality of the processing core resource 48 discussed herein.

The internal query execution memory resources 3045 can include a threshold amount of memory capacity that can be utilized for query execution by the operator processing module 2435, and/or other operations of the processing core resource, at any given time. In some cases, query execution, such as a particular operator execution, generates output or otherwise requires additional memory that is not available via internal query execution memory resources 3045, for example, due to the memory capacity of the internal query execution memory resources 3045 being reached via the current state of the plurality of query execution flows 2433-1-2433-R.

In these cases, the corresponding query can be spilled to disk. When a query spills to disk, some or all of the corresponding query operator execution flow 2433, such as some or all data blocks outputted by operators 2820 and/or already included in operator queues 2822, and/or other information indicating the current state of the query operator execution flow 2433, can be transferred to or otherwise stored in disk memory 38, such as memory device 42 of the particular processing core resource 48, and/or other disk memory accessible by the node 37. External query execution memory resources 3065 of disk memory 38 can be utilized to perform the remainder of operator executions of this query operator execution flow 2433 and/or the query operator execution flow 2433 is otherwise accessed in disk memory 38 via for performance the remainder of operator executions to facilitate completion of the query's execution. Spilling to disk can result in slower execution of the corresponding query due to slower access and/or processing of the query operator execution flow 2433 in disk memory 38.

Thus, in most cases as discussed herein, it is favorable to execute queries via internal query execution memory resources 3045 when possible and it is favorable to prevent executing queries from spilling to disk, when possible.

Figure 33E:
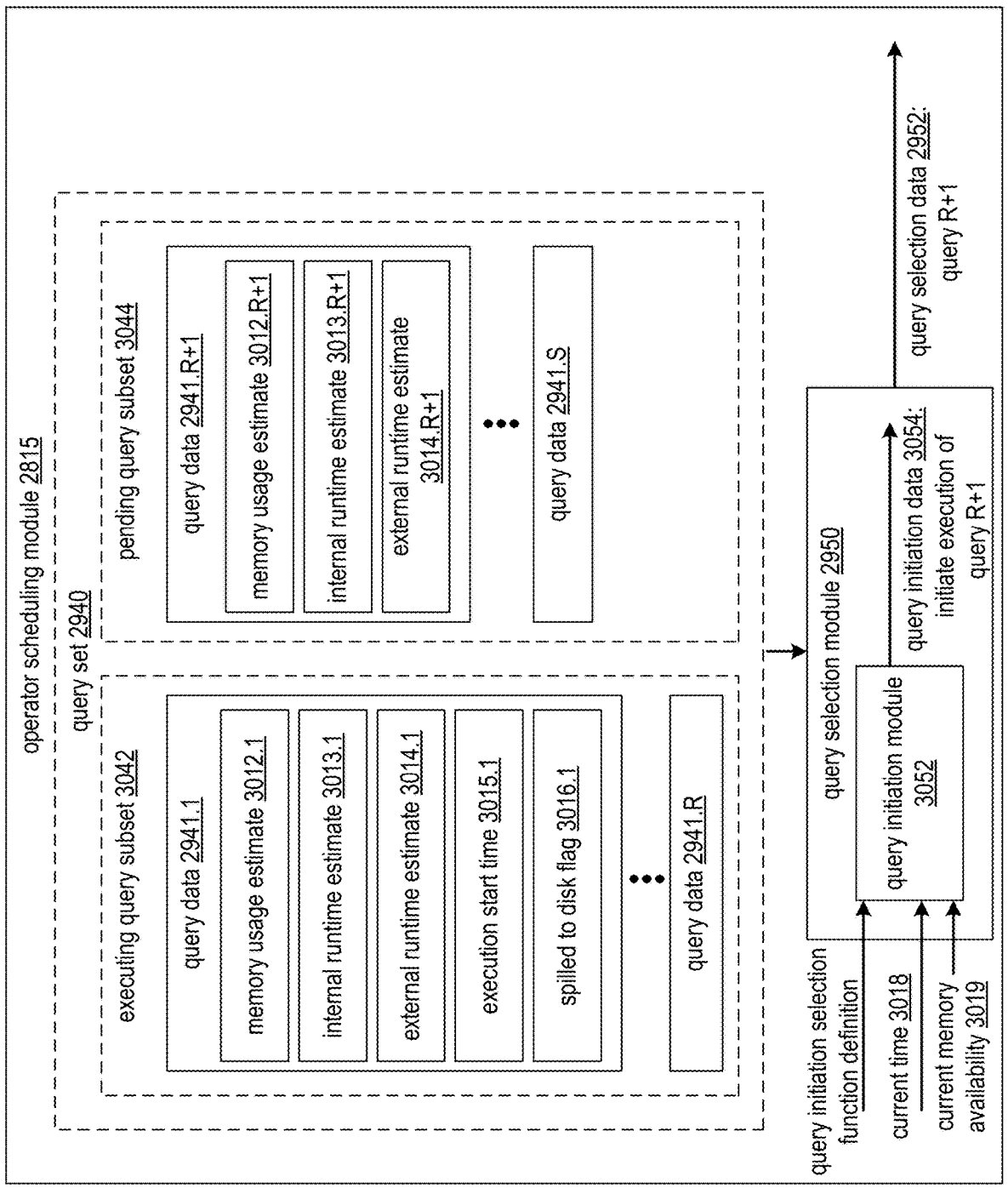
FIG. 33E is a schematic block diagram of a processing core resource that implements an operator scheduling module in accordance with various embodiments of the present invention.

FIG. 33E presents an embodiment of an operator scheduling module 2815 implemented by a processing core resource 48 that is operable to determine whether to initiate execution of new, pending queries. The query set 2940 determined by the operator scheduling module can indicate the query data 2941.1-2941.R of the set of concurrently executing queries 1-R as discussed in conjunction with FIGS. 29A-29B. These queries 1-R can correspond to an executing query subset 3042 of queries in the query set 2940 that are already executing, where at least one operator execution of the corresponding query has already been performed by the operator processing module 2435, and where at least one operator execution of the corresponding query has yet to be performed to render execution of the query completed. The query set 2940 can further indicate another, distinct subset of queries R+1-S in a pending query subset 3044 that are assigned to be executed by the processing core resource, but whose execution has not been initiated. In particular, the queries in the pending query subset 3044 have not had any operator executions scheduled by the operator scheduling module 2815 and/or have not had any operator executions performed by the operator processing module 2435.

Over time, the operator scheduling module 2815 eventually initiates execution of each query in the pending query subset 3044 by determining to schedule first operator executions of each query in the pending query subset 3044. For example, rather than selecting one of the currently executing queries 1-R from the executing query subset 3042 for execution in an upcoming operator execution step 2840 as discussed in conjunction with FIGS. 29A-29B, the query selection module 2950 can instead select one of the queries R+1-S in the pending query subset 3044 for execution in the upcoming operator execution step 2840.

Once a query is received and determined to be assigned for execution, it can be added to the pending query subset 3044 as a pending query or can otherwise be indicated in query data 2940 as a query whose execution has not yet been initiated. Once a pending query is selected for execution and has its first operator execution performed by the operator processing module 2435 in a corresponding operator execution step 2840 accordingly, this pending query can be removed from the pending query subset 3044 and can be added to the executing subset 3042, and/or can otherwise be indicated to have initiated execution. Once an executing query is scheduled for execution and has its execution completed via a final operator execution in a corresponding operator execution step 2840, this executing query can be removed from the executing query subset 3042 and/or can otherwise be indicated to have completed execution.

A new query can be added to the pending query subset 3044 at a time where the executing query subset 3042 includes exactly the set of the queries 1-R. In some cases, this query can be selected for execution at a time where all of the set of queries 1-R are still executing and thus are still in the executing query subset 3042. In other cases, this query can be selected for execution at a time where only a proper subset of queries 1-R are still executing, where at least one of the queries 1-R finished its execution between the time the new query is added to the pending query subset 3044 and the time the new query is selected for execution. In other cases, this query can be selected for execution at a time where none of queries 1-R are still executing, where all of the queries 1-R finished their execution between the time the new query is added to the pending query subset 3044 and the time the new query is selected for execution.

The query selection module 2950 can implement a query initiation module 3052 that is operable to generate query initiation data 3054 indicating whether or not to initiate execution of a pending query, such as a particular pending query in the pending query subset 3044 or any query in the pending query subset 3044. The query initiation module can generate the query initiation data 3054 by determining whether or not to initiate execution of a pending query based on performing a query initiation selection function. For example, the query initiation selection function can be operable to output a binary value indicating whether or not to initiate a pending query. The query initiation selection function can be performed based on a query initiation selection function received by the operator scheduling module 2815, stored in memory accessible by the operator scheduling module 2815, and/or otherwise determined by the operator scheduling module 2815.

The query selection module 2950 can implement the query initiation data 3054 to perform the query initiation selection function for every operator selection step 2840 of the plurality of sequential operator selection steps, where every query selection data 2952 outputted by the query selection module 2950 is based on performing the query initiation selection function. Alternatively, the query selection module 2950 can implement the query initiation data 3054 to perform the query initiation selection function for only a proper subset of operator selection steps 2840. For example, the query selection module 2950 can determine to perform the query initiation selection function in generating query selection data 2952 for a given upcoming operator execution step 2840: in a predefined proportion of operator selection steps 2840; in operator selection steps at predefined times; based on receiving a request to perform the query initiation selection function: in response to determining a new query has been added to the pending query subset 3044: in response to determining a query has been removed from the executing query set has been removed from the executing query subset 3042 based on completing its execution: in response to receiving input data blocks for execution of a pending query from another node 37 and/or from storage in memory; and/or based on another determination to perform the query initiation selection function.

If the query initiation data 3054 indicates a selection to initiate execution of a pending query, the query selection module 2950 can generate the query selection data 2952 to indicate the pending query. If the query initiation data 3054 indicates a selection to not initiate execution of a pending query, the query selection module 2950 can generate the query selection data 2952 by selecting a query from the executing query subset 3042, for example, based on executing a turn-based query selection function as discussed in conjunction with FIG. 33C. The query selection data 2952 can be processed in a same or similar fashion as discussed in conjunction with FIG. 33C to ultimately select a particular operator of the selected query's query operator execution flow 2433 by implementing the operator priority generating module 2817 and/or the operator processing selection module 2819. In cases where a pending query is selected for execution in the query selection data 2952, the operator processing selection module 2819 can automatically select the bottom-most operator in the operator flow for execution in the corresponding operator execution step 2840, for example, because other operators are not yet available to be executed lower operators have not yet outputted the data blocks to be operated upon. In such cases, the bottom-most operator in the operator flow of the selected, pending query can be automatically assigned a most favorable priority by the operator priority generating module 2817.

As illustrated in FIG. 33E, the query data 2941 of each query can include a memory usage estimate 3012, an internal runtime estimate 3013, and/or an external runtime estimate 3014. This information can be included instead or in addition to the query priority value 2942 and/or the operator position data 2916 of the embodiment of the query data illustrated in FIG. 33C. The memory usage estimate 3012 can indicate an estimated amount of memory required to execute the query, for example, based on an amount of memory required to perform operator executions of the query and/or to store operator queues of the query. The internal runtime estimate 3013 can indicate an estimated amount of time required to execute the query if internal memory resources, such as internal query execution memory resources 3045 of the operator processing module 2435 and/or of the processing core resource 48 are utilized to execute the query and/or of the query does not spill to disk during its execution. The external runtime estimate 3014 can indicate an estimated amount of time required to execute the query if external query execution memory resources 3065, such as disk memory 38 of the corresponding node 37 or of the corresponding computing device 18 that includes the processing core resource, are utilized to execute the query and/or if the query does spill to disk during its execution.

The internal runtime estimate and/or the external runtime estimate can correspond to estimated runtimes for execution of the query if run in isolation, for example, in the case where every operator execution step 2840 required to execute the query were performed consecutively, where no operator execution step 2840 in the plurality of operator execution steps between the first operator execution step of the query's execution and the last operator execution step of the query's execution correspond to performances of any other queries. In some cases, the internal runtime estimate and/or external runtime estimate can indicate or be determined based on an estimated number of operator execution steps that will be required to execute the corresponding query. An example embodiment of determining the memory usage estimate, the internal runtime estimate, and/or the external runtime estimate is discussed in further detail in conjunction with FIGS. 31A-31C.

For queries in the executing query subset 3042, the query data 2941 can further include an execution start time 3015 indicating when the corresponding query's execution was initiated and/or identifying the one of the plurality of sequential operator execution steps in which the first operator execution of the query was performed. For queries in the executing query subset 3042, the query data 2941 can also further include a spilled to disk flag 3016, which can be a binary indicator or other indication of whether or not the execution of the corresponding query has spilled to disk and/or an indication of whether the query is being executed internally via internal query execution memory resources 3045 or externally via external query execution memory resources 3065 of disk memory 3065.

Generating the query initiation data 3054 for a pending query can be based on the memory usage estimate 3012, the internal runtime estimate 3013, and/or the external runtime estimate 3014 of the pending query's query data. In particular, the query initiation selection function can be a function of a pending query's memory usage estimate 3012, the external runtime estimate 3013, and/or the external runtime estimate 3014. For example, query initiation data 3054 indicating whether to initiate execution of query R+1 can be generated by performing the query initiation selection function upon the query's memory usage estimate 3012.R+1, the internal runtime estimate 3013.R+1, and/or the external runtime estimate 3014.R+1.

The operator scheduling module 2815 can determine whether it is currently favorable to initiate execution if pending queries based on this information. This can include processing these estimates of a pending query in conjunction with estimates of currently executing queries to determine whether or not current execution initiation is favorable over waiting to execute the query, for example, by determining whether or not initiating execution is likely to cause the pending query or another currently executing query to spill to disk. In particular, as spilling to disk causes a query's execution to be less efficient, it can be more favorable to wait until enough memory is available to internally execute the query. However, if a set of many executing queries are expected to continue executing for a long length of time before freeing up space for the pending query, it can be more favorable in these cases to execute the query externally, with the knowledge and/or intention of spilling the query to disk, rather than waiting for the required amount of internal query execution memory resources 3045 to become available.

Scheduling initiation of pending queries by utilizing this information improves database systems by preventing or mitigating the changes of unnecessary spilling to disk caused by preemptive initiation of a query's execution. Scheduling initiation of pending queries by utilizing this information improves database systems by executing queries with fewer unnecessary external query executions via disk memory overall, thus improving the average speed of query execution. Scheduling initiation of pending queries by utilizing this information improves database systems because intentionally executing queries via external query executions when immediate external execution is expected to more quickly complete a pending query's execution than waiting for internal resources can also improving the average speed of query execution.

As illustrated in FIG. 33E, the query initiation module 3052 can receive, estimate, or otherwise determine the current time 3018 and/or the current memory availability 3019. The current time 3018 can optionally identify and/or be based on the current and/or upcoming one of the sequential operator execution steps, or can otherwise indicate the current time. The current memory availability 3019 can indicate an amount of currently available memory of the internal query execution memory resources 3045 utilized to execute queries, such as an estimated or measured level of memory usage of the internal memory resources utilized by the operator processing module to perform operator executions and/or to store operator queues.

As a particular example of generating the query initiation data 3054 for a particular pending query, the query initiation module 3052 can determine whether to initiate execution of the particular pending query by first comparing the memory usage estimate 3012 of the particular pending query to the current memory availability 3019. The memory usage estimate 3012 can be determined to compare favorably to the current memory availability 3019 if the memory usage estimate 3012 indicates a required amount of memory to execute the query that is less than or equal to the current memory availability 3019, and can be determined to compare unfavorably to the current memory availability 3019 if the memory usage estimate 3012 indicates a required amount of memory to execute the query that is greater than the current memory availability 3019. If the memory usage estimate 3012 compares favorably to the current memory availability 3019, the query initiation data 3054 is generated to indicate the particular query be executed.

If the memory usage estimate 3012 compares favorably to the current memory availability 3019, the query initiation module 3052 can further determine whether to initiate execution of the particular pending query by next comparing the memory usage estimate 3012 of the particular pending query to the current memory availability 3019 by determining an estimated wait time until memory will be available. This estimated wait time until memory will be available, indicating an estimated amount of time and/or operator execution steps from the current until the at least the required amount of memory to execute the query becomes available. An estimated total time required to internally execute the query via internal query execution memory resources 3045 can determined be as a function of the estimated wait time until memory will be available and the internal runtime estimate 3013, for example, where this estimated total time required to internally execute the query is determined based on a sum of the estimated wait time until memory will be available and the internal runtime estimate 3013. This estimated total time required to internally execute the query can be compared with the external runtime estimate 3014. If the estimated total time required to internally execute the query is less than the external runtime estimate 3014, and/or estimated total time required to internally execute the query otherwise is determined to be more favorable than the external runtime estimate 3014, the query initiation data 3054 is generated to indicate the particular query be not be executed, for example, based on determining to wait until internal query execution memory resources 3045 are later available to execute the query. If the estimated total time required to internally execute the query exceeds the external runtime estimate 3014, and/or estimated total time required to internally execute the query otherwise is determined to be less favorable than the external runtime estimate 3014, the query initiation data 3054 is generated to indicate the particular query be executed, for example, based on determining that it is more favorable to spill the query to disk for execution than to wait to internally execute the query. The query initiation data 3054 can further indicate an instruction that the particular query be spilled to disk, for example, rather than spilling other queries currently being executed to disk.

This estimated wait time until memory will be available can be calculated by the query initiation module 3052 or another processing module. In particular, the estimated wait time until memory will be available can be a function of the current time, the internal runtime estimates 3013 of each of the queries in the executing query subset 3042, and their respective execution start times 3015. In some cases, an internally running subset of the executing query subset 3042 can be determined by identifying only the queries in the executing query subset 3042 that have not spilled to disk and/or that are executing via internal query execution memory resources 3045, for example, based on the spill to disk flags 3016 of the queries in the executing query subset 3042. The estimated wait time until memory will be available can be calculated, for example, by performing a summation of internal runtime estimates 3013 of each of the queries determined to be in the internally running subset. The estimated wait time until memory will be available can be calculated as a function of the memory usage estimate 3012, and can indicate the estimated wait time until at least the amount of memory indicated by the memory usage estimate 3012 will be available.

In some cases, an estimated proportion of each query's execution that remains to be executed can be determined based on tracking the number of operator executions that have been performed; based on tracking how many queries have been executing via internal resources since one or more of the queries initiated execution: based on comparing the execution start time 3015 of each query to its estimated internal runtime; and/or based on another determination. Each estimated proportion can be applied to the corresponding query's internal runtime estimate to generate a plurality of time remaining estimates for each executing query in the internally executing subset. The estimated wait time until memory will be available can be calculated based on a summation of the plurality of estimated time remaining estimates.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%. 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining-A matches-B or not (A) matches not (B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc, described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage: (b) a wired or wireless medium for the transportation of data as a signal within a computing device from one element of the computing device to another element of the computing device for temporary storage or persistent storage: (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition-requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

The invention claimed is:

1. A method for execution by at least one processor a database system, comprising:
   determining a query operator execution flow that includes a multiplexer operation serially before a load operation serially after the multiplexer operation;
   executing the query operator execution flow in conjunction with executing a corresponding query based on:
      during a first temporal period of execution of the multiplexer operation in conjunction with a first mode of operation:
         executing the multiplexer operation in conjunction with the first mode of operation to generate a first plurality of multiplexer output for processing via the load operation:
         executing the load operation upon the first plurality of multiplexer output to process the first plurality of multiplexer output based on the load operation being serially after the multiplexer operation in the query operator execution flow, wherein processing the first plurality of multiplexer output includes:
            generating initial load operation output from the first plurality of multiplexer output:
            determining whether to transition to execution of the multiplexer operation in conjunction with a second mode of operation instead of the first mode of operation based on applying at least one heuristic to the initial load operation output:

in response to a determination to transition to execution of the multiplexer operation in conjunction with a second mode of operation, entering a second temporal period of execution of the multiplexer operation in conjunction with the second mode of operation;

during the second temporal period:
further executing the multiplexer operation in conjunction with the second mode of operation to generate a second plurality of multiplexer output for processing via the load operation:
further executing the load operation upon the second plurality of multiplexer output to process the second plurality of multiplexer output based on the load operation being serially after the multiplexer operation in the query operator execution flow, wherein processing the second plurality of multiplexer output includes generating further load operation output:
wherein output of the load operation generated via completing execution of the load operation is based on the initial load operation output and the further load operation output.

2. The method of claim 1, wherein the load operation is implemented via a plurality of parallelized instances of a load operator, wherein the multiplexer operation generates the first plurality of multiplexer output based on dispersing a corresponding first of input rows processed by multiplexer operation during the first temporal period across the plurality of parallelized instances of the load operator via a first mode of row dispersal in conjunction with operating under the first mode of operation during the first temporal period, and wherein the multiplexer operation generates the second plurality of multiplexer output based on dispersing a corresponding second of input rows processed by multiplexer operation during the second temporal period across the plurality of parallelized instances of the load operator via a second mode of row dispersal in conjunction with operating under the second mode of operation during the second temporal period.

3. The method of claim 2, wherein the first mode of row dispersal is implemented as a round robin row dispersal mode, and wherein second mode of row dispersal is implemented via a hash key-based row dispersal mode.

4. The method of claim 2, wherein rows of the first set of input rows and the second set of input rows each have a key of a plurality of keys utilized by the load operation, wherein the second mode of row dispersal guarantees that all rows having a same key of the plurality of keys are sent to a same parallelized load operator instance of the plurality of parallelized instances of the load operator based on dispersing rows based on the key of each row, and wherein the first mode of operation does not guarantee that all rows having a same key of the plurality of keys are sent to a same parallelized load operator instance of the plurality of parallelized instances of the load operator based on dispersing rows independent of the key of the each row.

5. The method of claim 4, wherein the load operation is a grouped aggregation operation executed based on each parallelized load operator instance generating a plurality of aggregation values by key, wherein the key of the each row is based on a subset of column values of the each row by which the grouped aggregation operation groups rows for separate aggregation, wherein each of the plurality of aggregation values corresponds to a different one of the plurality of keys, and wherein at least two different parallelized load operator instances of the plurality of parallelized instances of the load operator generate aggregation values for the same key of the plurality of keys based on rows of the same key being sent to the at least two different parallelized load operator instances based on dispersing rows independent of the key of the each row during the first temporal period while operating in accordance with the first mode of operation.

6. The method of claim 5, wherein the grouped aggregation operation corresponds to a first instance of the grouped aggregation operation in the query operator execution flow and wherein the multiplexer operation corresponds to a first instance of the multiplexer operation in the query operator execution flow, wherein the query operator execution flow includes a second instance of the multiplexer operation serially after the first instance of the grouped aggregation operation, wherein the query operator execution flow includes a second instance of the grouped aggregation operation serially after the second instance of the multiplexer operation, wherein the multiplexer operation is executed upon the plurality of aggregation values strictly in accordance with the second mode of operation to further disperse the plurality of aggregation values generated by the grouped aggregation operation in conjunction with a set of pluralities of other aggregation values generated by a plurality of other parallelized instances of the grouped aggregation operation across a second plurality of parallelized instances of the load operator of the second instance of the grouped aggregation operation based on key of each aggregation value, and wherein the second instance of the grouped aggregation operation generates exactly one aggregation value for each key of the plurality of keys based on each of the second plurality of parallelized instances of the load operator of the second instance of the grouped aggregation operation generating corresponding aggregation values for a corresponding set of keys based on all rows having a same key of the plurality of keys being sent to a same second parallelized load operator instance of the second plurality of parallelized instances.

7. The method of claim 4, wherein the load operation is a union distinct operation executed based on each parallelized load operator instance emitting a single row for duplicate rows having the same key, wherein the key of the each row is based on a set of column values of the each row, and wherein at least two different parallelized load operator instances of the plurality of parallelized instances of the load operator emit identical rows having the same key of the plurality of keys based on rows of the same key being sent to the at least two different parallelized load operator instances based on dispersing rows independent of the key of the each row during the first temporal period while operating in accordance with the first mode of operation.

8. The method of claim 7, wherein the union distinct operation corresponds to a first instance of the union distinct operation in the query operator execution flow and wherein the multiplexer operation corresponds to a first instance of the multiplexer operation in the query operator execution flow, wherein the query operator execution flow includes a second instance of the multiplexer operation serially after the first instance of the union distinct operation, wherein the query operator execution flow includes a second instance of the union distinct operation serially after the second instance of the multiplexer operation, wherein the multiplexer operation is executed upon a plurality of rows emitted by the first instance of the union distinct operation strictly in accordance with the second mode of operation to further disperse the plurality of rows emitted by the union distinct operation in conjunction with a set of pluralities of other generated by a plurality of other parallelized instances of the union distinct operation across a second plurality of parallelized instances of the load operator of the second instance of the union distinct operation based on key of each row, and wherein the second instance of the union distinct operation generates exactly one row for each key of the plurality of keys based on each of the second plurality of parallelized instances of the load operator of the second instance of the union distinct operation emitting corresponding rows for a corresponding set of keys based on all rows having a same key of the plurality of keys being sent to a same second parallelized load operator instance of the second plurality of parallelized instances.

9. The method of claim 2, wherein executing the load operation further includes, in response to determining to transition to determining to transition to execution of the multiplexer operation in conjunction with a second mode of operation, sending a signal indicating an instruction to transition to the second mode of operation to the multiplexer operation based on the multiplexer operation being a child operator of the load operation, and wherein the multiplexer operation transitions to operating in accordance with the second mode of operation based on receiving the signal from the load operation.

10. The method of claim 1,
wherein the multiplexer operation and the load operation are each executed separately via a plurality of nodes in conjunction with executing a corresponding query, wherein the load operation executed via each node of the plurality of nodes is implemented via a corresponding plurality of parallelized instances of a load operator via a plurality of corresponding processing core resources of the each node based on the multiplexer operation of the each node dispersing corresponding rows across the plurality of parallelized instances of a load operator for processing at a given time in accordance with one of: the first mode of operation or the second mode of operation, and wherein different nodes of the plurality of nodes independently determine whether to transition from the first mode of operation to the second mode of operation;
wherein a first node of the plurality of nodes executes the multiplexer operation in accordance with the first mode of operation during the first temporal period and executes multiplexer operation during the second temporal period based on the determination to transition from the first mode of operation to the second mode of operation being determined by the first node at a first corresponding time;
wherein a second node of plurality of nodes executes the multiplexer operation in accordance with the first mode of operation during a third temporal period and executes multiplexer operation during a fourth temporal period based on the second node determining transition from the first mode of operation to the second mode of operation a second corresponding time, wherein the fourth temporal period overlaps with both the first temporal period and the second temporal period based on the second corresponding time being different from the first corresponding time based on the different nodes of the plurality of nodes independently determining whether to transition from the first mode of operation to the second mode of operation.

11. The method of claim 1, wherein the at least one heuristic includes:
a local memory heuristic for query execution memory resources utilized to execute the query operator execution flow; and
a row cardinality heuristic for rows in the first plurality of multiplexer output.

12. The method of claim 11, wherein the determination to transition to execution of the multiplexer operation in conjunction with a second mode of operation is based on determining a measured amount of available memory of the query execution memory resources is below a memory threshold.

13. The method of claim 1, further comprising:
executing the load operation over a plurality of time slices to process rows received in corresponding multiplexer output;
evaluating the at least one heuristic during each of the plurality of time slices based on the rows received in the corresponding multiplexer output; and
determining, based on evaluating the at least one heuristic during each of the plurality of time slices, whether to maintain a current mode of operation of the multiplexer operation or to transition to a different mode of operation of the multiplexer operation;
wherein, over the plurality of time slices, the multiplexer operation transitions from the first mode of operation to the second mode of operation at least one time, and wherein the multiplexer operation further transitions from the second mode of operation back to the first mode of operation at least one time.

14. The method of claim 13, wherein output of the load operation is generated via executing based on grouping rows into a plurality of row groups, wherein evaluating the at least one heuristic during at least some of the plurality of time slices includes:
measuring a ratio of non-duplicate groups of plurality of row groups to duplicate groups of plurality of row groups; and
comparing the ratio to a configured threshold to determine whether to maintain a current mode of operation of the multiplexer operation or to transition to a different mode of operation of the multiplexer operation.

15. The method of claim 14, wherein grouping rows into a plurality of row groups to generate the output of the load operation via executing the load operation is based on maintaining a hash map indicating the plurality of row groups in accordance with the second mode of operation during the at least at some of the plurality of time slices based on operating under the second mode of operation during the at least some of the plurality of time slices, wherein new entries are added to the hash map over time based on new groups indicated in corresponding new multiplexer output over subsequent time slices of the plurality of time slices:
wherein measuring the ratio of non-duplicate groups of plurality of row groups to duplicate groups of plurality of row groups during the at least some of the plurality of time slices based on operating under the second mode of operation during the at least some of the plurality of time slices to determine whether to transition back to the first mode of operation, wherein measuring the ratio of non-duplicate groups of plurality of row groups to duplicate groups of plurality of row groups for a given time slice of the at least some of the plurality of time slices is based on a set of entries in a current hash map at the given time slice, and wherein the configured threshold changes over the at least some of the plurality of time slices as a configured coefficient of a logarithm of a total number of entries in the set of entries in the current hash map based on the total number of entries in the set of entries in the current hash map increasing over time.

16. The method of claim 14, wherein evaluating the at least one heuristic during the at least some of the plurality of time slices is based on determining when to reevaluate the at least one heuristic after a most recent evaluation of the at least one heuristic as an exponentially increasing function of a total number of rows received so far over all prior ones of the plurality of time slices, wherein a first amount of time between a first given evaluation of the at least one heuristic and a second given evaluation of the at least one heuristic corresponding to a next evaluation after the first given evaluation is less than a second amount of time between the second given evaluation of the at least one heuristic and a third given evaluation of the at least one heuristic corresponding to another next evaluation after the second given evaluation.

17. The method of claim 13, wherein a determination to transition from the current mode of operation of the multiplexer operation to a different mode of operation of the multiplexer operation during a given time slice of the plurality of time slices includes one of:
   determining to transition from a hash key-based row dispersal mode to a round robin row dispersal mode based on determining hash-key data utilized to perform row dispersal under the hash key-based row dispersal mode being very skewed: or
   determining to transition from the round robin row dispersal mode to the hash key-based row dispersal mode based on a current row cardinality indicating key-based data distribution is more favorable than speed.

18. The method of claim 1,
   wherein the query operator execution flow includes duplicate instances of the load operation, wherein a first instance the load operation is serially before a second instance of the load operation; and
   wherein the query operator execution flow is selected from a plurality of semantically equivalent query operator execution flow options, wherein another one of the plurality of semantically equivalent query operator execution flow options includes exactly one instance of the load operation based on the duplicate instances of the load operation applied in series being semantically equivalent with the exactly one instance of the load operation.

19. A database system includes:
   at least one processor; and
   at least one memory storing operational instructions that, when executed by the at least one processor, cause the database system to:
      determine a query operator execution flow that includes a multiplexer operation serially before a load operation serially after the multiplexer operation;
      execute the query operator execution flow in conjunction with executing a corresponding query based on:
         during a first temporal period of execution of the multiplexer operation in conjunction with a first mode of operation:
            executing the multiplexer operation in conjunction with the first mode of operation to generate a first plurality of multiplexer output for processing via the load operation:
            executing the load operation upon the first plurality of multiplexer output to process the first plurality of multiplexer output based on the load operation being serially after the multiplexer operation in the query operator execution flow, wherein processing the first plurality of multiplexer output includes:
               generating initial load operation output from the first plurality of multiplexer output:
               determining whether to transition to execution of the multiplexer operation in conjunction with a second mode of operation instead of the first mode of operation based on applying at least one heuristic to the initial load operation output:
         in response to a determination to transition to execution of the multiplexer operation in conjunction with a second mode of operation, entering a second temporal period of execution of the multiplexer operation in conjunction with the second mode of operation:
         during the second temporal period:
            further executing the multiplexer operation in conjunction with the second mode of operation to generate a second plurality of multiplexer output for processing via the load operation:
            further executing the load operation upon the second plurality of multiplexer output to process the second plurality of multiplexer output based on the load operation being serially after the multiplexer operation in the query operator execution flow, wherein processing the second plurality of multiplexer output includes generating further load operation output:
         wherein output of the load operation generated via completing execution of the load operation is based on the initial load operation output and the further load operation output.

20. A non-transitory computer readable storage medium comprises:
   at least one memory section that stores operational instructions that, when executed by at least one processing module that includes a processor and a memory, cause the at least one processing module to:
      determine a query operator execution flow that includes a multiplexer operation serially before a load operation serially after the multiplexer operation;
      execute the query operator execution flow in conjunction with executing a corresponding query based on:
         during a first temporal period of execution of the multiplexer operation in conjunction with a first mode of operation:
            executing the multiplexer operation in conjunction with the first mode of operation to generate a first plurality of multiplexer output for processing via the load operation:
            executing the load operation upon the first plurality of multiplexer output to process the first plurality of multiplexer output based on the load operation being serially after the multiplexer operation in the query operator execution flow, wherein processing the first plurality of multiplexer output includes:
               generating initial load operation output from the first plurality of multiplexer output:
               determining whether to transition to execution of the multiplexer operation in conjunction with a second mode of operation instead of the first mode of operation based on applying at least one heuristic to the initial load operation output:

in response to a determination to transition to execution of the multiplexer operation in conjunction with a second mode of operation, entering a second temporal period of execution of the multiplexer operation in conjunction with the second mode of operation:

during the second temporal period:
- further executing the multiplexer operation in conjunction with the second mode of operation to generate a second plurality of multiplexer output for processing via the load operation:
- further executing the load operation upon the second plurality of multiplexer output to process the second plurality of multiplexer output based on the load operation being serially after the multiplexer operation in the query operator execution flow, wherein processing the second plurality of multiplexer output includes generating further load operation output:

wherein output of the load operation generated via completing execution of the load operation is based on the initial load operation output and the further load operation output.

\* \* \* \* \*